(12) United States Patent
Carbonara et al.

(10) Patent No.: US 12,555,507 B2
(45) Date of Patent: *Feb. 17, 2026

(54) SYSTEM AND METHOD FOR A MULTI-PRIMARY WIDE GAMUT COLOR SYSTEM

(71) Applicant: Baylor University, Waco, TX (US)

(72) Inventors: Corey P. Carbonara, Waco, TX (US); Michael F. Korpi, Hewitt, TX (US); Gary B. Mandle, Los Altos, CA (US); Mitchell J. Bogdanowicz, Somis, CA (US); James M. DeFilippis, Pacific Palisades, CA (US); Matthew R. Brantley, China Spring, TX (US)

(73) Assignee: Baylor University, Waco, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/029,382

(22) Filed: Jan. 17, 2025

(65) Prior Publication Data
US 2025/0174167 A1    May 29, 2025

Related U.S. Application Data

(63) Continuation-in-part of application No. 18/652,237, filed on May 1, 2024, now Pat. No. 12,394,348, (Continued)

(51) Int. Cl.
*G09G 3/20* (2006.01)
*G02B 5/20* (2006.01)
(Continued)

(52) U.S. Cl.
CPC ........... *G09G 3/2003* (2013.01); *G02B 5/201* (2013.01); *G02F 1/133514* (2013.01); (Continued)

(58) Field of Classification Search
None
See application file for complete search history.

(56) References Cited

U.S. PATENT DOCUMENTS

| 3,481,258 A | 12/1969 | Mori et al. |
|---|---|---|
| 3,971,065 A | 7/1976 | Bayer |

(Continued)

FOREIGN PATENT DOCUMENTS

| JP | H07873 B2 | 1/1995 |
|---|---|---|
| JP | 2003315529 A | 11/2003 |

(Continued)

OTHER PUBLICATIONS

"Affordable Colour Grading Monitors", downloaded@https://jonnyelwyn.co.uk/film-and-video-editing/affordable-colour-grading-monitors-2/, posted on Apr. 4, 2015 (Year: 2015).

(Continued)

*Primary Examiner* — Yingchun He
(74) *Attorney, Agent, or Firm* — NEO IP

(57) ABSTRACT

The present invention includes systems and methods for a multi-primary color system for display. A multi-primary color system increases the number of primary colors available in a color system and color system equipment. Increasing the number of primary colors reduces metameric errors from viewer to viewer. One embodiment of the multi-primary color system includes Red, Green, Blue, Cyan, Yellow, and Magenta primaries. The systems of the present invention maintain compatibility with existing color systems and equipment and provide systems for backwards compatibility with older color systems.

19 Claims, 96 Drawing Sheets
(63 of 96 Drawing Sheet(s) Filed in Color)

Related U.S. Application Data which is a continuation of application No. 18/170,315, filed on Feb. 16, 2023, now Pat. No. 11,978,379, which is a continuation of application No. 17/976,347, filed on Oct. 28, 2022, now Pat. No. 11,587,491, which is a continuation-in-part of application No. 17/727,372, filed on Apr. 22, 2022, now Pat. No. 11,488,510, which is a continuation-in-part of application No. 17/671,074, filed on Feb. 14, 2022, now Pat. No. 11,403,987, which is a continuation-in-part of application No. 17/670,018, filed on Feb. 11, 2022, now Pat. No. 11,315,467, which is a continuation-in-part of application No. 17/516,143, filed on Nov. 1, 2021, now Pat. No. 11,341,890, which is a continuation-in-part of application No. 17/338,357, filed on Jun. 3, 2021, now Pat. No. 11,189,210, which is a continuation-in-part of application No. 17/225,734, filed on Apr. 8, 2021, now Pat. No. 11,289,000, which is a continuation-in-part of application No. 17/076,383, filed on Oct. 21, 2020, now Pat. No. 11,069,279, which is a continuation-in-part of application No. 17/009,408, filed on Sep. 1, 2020, now Pat. No. 11,043,157, which is a continuation-in-part of application No. 16/887,807, filed on May 29, 2020, now Pat. No. 10,950,162, which is a continuation-in-part of application No. 16/860,769, filed on Apr. 28, 2020, now Pat. No. 10,950,161, which is a continuation-in-part of application No. 16/853,203, filed on Apr. 20, 2020, now Pat. No. 10,997,896, which is a continuation-in-part of application No. 16/831,157, filed on Mar. 26, 2020, now Pat. No. 10,950,160, which is a continuation of application No. 16/659,307, filed on Oct. 21, 2019, now Pat. No. 10,607,527.

(60) Provisional application No. 62/876,878, filed on Jul. 22, 2019, provisional application No. 62/847,630, filed on May 14, 2019, provisional application No. 62/805,705, filed on Feb. 14, 2019, provisional application No. 62/750,673, filed on Oct. 25, 2018.

(51) Int. Cl.
   *G02F 1/1335* (2006.01)
   *G09G 3/34* (2006.01)
   *G09G 5/02* (2006.01)

(52) U.S. Cl.
   CPC .............. *G09G 3/3413* (2013.01); *G09G 5/02* (2013.01); *G09G 2300/0452* (2013.01); *G09G 2320/0242* (2013.01); *G09G 2340/06* (2013.01)

(56) References Cited

U.S. PATENT DOCUMENTS

| | | |
|---|---|---|
| 4,323,918 A | 4/1982 | Bendell |
| 4,489,349 A | 12/1984 | Okada |
| 4,967,263 A | 10/1990 | Dieterich |
| 5,216,522 A | 6/1993 | Ishikawa |
| 5,479,189 A | 12/1995 | Chesavage et al. |
| 5,506,696 A * | 4/1996 | Nakano ............. H04N 1/6055 358/518 |
| 5,543,820 A | 8/1996 | Edgar |
| 5,844,629 A | 12/1998 | Murray et al. |
| 5,937,089 A | 8/1999 | Kobayashi |
| 6,118,441 A | 9/2000 | Kobayashi et al. |
| 6,160,579 A | 12/2000 | Shiraiwa et al. |
| 6,175,644 B1 | 1/2001 | Scola et al. |
| 6,539,110 B2 | 3/2003 | Myers |
| 6,570,584 B1 | 5/2003 | Cok et al. |
| 6,769,772 B2 | 8/2004 | Roddy et al. |
| 6,870,523 B1 | 3/2005 | Ben-David et al. |
| 6,897,876 B2 | 5/2005 | Murdoch et al. |
| 6,962,414 B2 | 11/2005 | Roth |
| 7,077,524 B2 | 7/2006 | Roth |
| 7,113,152 B2 | 9/2006 | Ben-David et al. |
| 7,242,478 B1 | 7/2007 | Dombrowski et al. |
| 7,535,433 B2 | 5/2009 | Ledebohm et al. |
| 7,627,167 B2 | 12/2009 | Roth et al. |
| 7,771,098 B2 | 8/2010 | Chu Ke et al. |
| 7,787,702 B2 | 8/2010 | Elliott et al. |
| 7,812,797 B2 | 10/2010 | Joo et al. |
| 7,876,339 B2 | 1/2011 | Okazaki et al. |
| 7,876,341 B2 | 1/2011 | Credelle et al. |
| 7,916,939 B2 | 3/2011 | Roth et al. |
| 7,929,193 B2 | 4/2011 | Roth |
| 7,948,507 B2 | 5/2011 | Okada et al. |
| 7,990,393 B2 | 8/2011 | Higgins |
| 8,018,476 B2 | 9/2011 | Credelle et al. |
| 8,044,967 B2 | 10/2011 | Belik et al. |
| 8,063,862 B2 | 11/2011 | Hisatake |
| 8,081,835 B2 | 12/2011 | Brown Elliott et al. |
| 8,228,275 B2 | 7/2012 | Langendijk |
| 8,237,751 B2 | 8/2012 | Belik |
| 8,248,430 B2 | 8/2012 | Hekstra et al. |
| 8,310,498 B2 | 11/2012 | Ben-Chorin et al. |
| 8,339,344 B2 | 12/2012 | Okada et al. |
| 8,390,652 B2 | 3/2013 | Nakanishi et al. |
| 8,405,675 B2 | 3/2013 | Peng et al. |
| 8,405,687 B2 | 3/2013 | Miyazaki et al. |
| 8,411,022 B2 | 4/2013 | Elliott et al. |
| 8,436,875 B2 | 5/2013 | Ueki et al. |
| 8,451,405 B2 | 5/2013 | Roth et al. |
| 8,599,226 B2 | 12/2013 | Ben-Chorin et al. |
| 8,654,050 B2 | 2/2014 | Ueki et al. |
| 8,698,856 B2 | 4/2014 | Roth et al. |
| 8,717,348 B2 | 5/2014 | Basile et al. |
| 8,773,340 B2 | 7/2014 | Tomizawa et al. |
| 8,803,929 B2 | 8/2014 | Cok |
| 8,837,562 B1 | 9/2014 | Betts et al. |
| 8,885,120 B2 | 11/2014 | Ben-David et al. |
| 8,911,291 B2 | 12/2014 | Liu |
| 8,922,603 B2 | 12/2014 | Yonemaru et al. |
| 8,979,272 B2 | 3/2015 | Roth |
| 8,982,038 B2 | 3/2015 | Higgins et al. |
| 8,982,144 B2 | 3/2015 | Park |
| 9,035,969 B2 | 5/2015 | Ivashin et al. |
| 9,041,724 B2 | 5/2015 | Zeng et al. |
| 9,091,884 B2 | 7/2015 | Kim et al. |
| 9,099,046 B2 | 8/2015 | Whitehead et al. |
| 9,117,711 B2 | 8/2015 | Suzuki et al. |
| 9,147,362 B2 | 9/2015 | Znamenskiy et al. |
| 9,280,940 B2 | 3/2016 | Chen et al. |
| 9,307,616 B2 | 4/2016 | Robinson et al. |
| 9,311,841 B2 | 4/2016 | Nakagawa et al. |
| 9,317,939 B2 | 4/2016 | Yang et al. |
| 9,318,075 B2 | 4/2016 | Kim et al. |
| 9,324,286 B2 | 4/2016 | Mori et al. |
| 9,363,421 B1 | 6/2016 | Russell |
| 9,373,305 B2 | 6/2016 | Kawaguchi |
| 9,412,316 B2 | 8/2016 | Ben-David et al. |
| 9,430,974 B2 | 8/2016 | Roth |
| 9,430,986 B2 | 8/2016 | Ito et al. |
| 9,478,179 B2 | 10/2016 | Roth et al. |
| 9,583,054 B2 | 2/2017 | Nakagawa et al. |
| 9,589,494 B2 | 3/2017 | Park et al. |
| 9,607,576 B2 | 3/2017 | Buckley |
| 9,659,517 B2 | 5/2017 | Wu |
| 9,697,761 B2 | 7/2017 | Li |
| 9,851,599 B2 | 12/2017 | Ben-David et al. |
| 9,886,932 B2 | 2/2018 | Yoshida et al. |
| 9,911,176 B2 | 3/2018 | Griffin et al. |
| 9,911,387 B2 | 3/2018 | Kim et al. |
| 9,953,590 B2 | 4/2018 | Ben-David et al. |
| 9,966,014 B2 | 5/2018 | Yashiki |
| 10,079,963 B1 | 9/2018 | Liu et al. |
| 10,162,590 B2 | 12/2018 | Ritter |
| 10,185,533 B2 | 1/2019 | Kim et al. |

(56) References Cited

U.S. PATENT DOCUMENTS

| | | |
|---|---|---|
| 10,222,263 B2 | 3/2019 | Shigezane |
| 10,289,205 B1 | 5/2019 | Sumter et al. |
| 10,504,437 B2 | 12/2019 | Zhang et al. |
| 10,607,527 B1 | 3/2020 | Mandle |
| 10,832,611 B2 | 11/2020 | Xi et al. |
| 10,847,498 B2 | 11/2020 | Nakamura et al. |
| 10,896,635 B2 | 1/2021 | Xi et al. |
| 11,341,890 B2 | 5/2022 | Bogdanowicz et al. |
| 2001/0021260 A1 | 9/2001 | Chung et al. |
| 2002/0130957 A1 | 9/2002 | Gallagher et al. |
| 2003/0137610 A1 | 7/2003 | Ohsawa |
| 2003/0160881 A1 | 8/2003 | Roddy et al. |
| 2003/0185302 A1 | 10/2003 | Abrams, Jr. |
| 2004/0017379 A1 | 1/2004 | Ajito et al. |
| 2004/0070736 A1 | 4/2004 | Roddy et al. |
| 2004/0070834 A1 | 4/2004 | Hendrix et al. |
| 2004/0111627 A1 | 6/2004 | Evans et al. |
| 2004/0145599 A1 | 7/2004 | Taoka et al. |
| 2004/0196381 A1 | 10/2004 | Matsuzaka |
| 2004/0234098 A1 | 11/2004 | Reed |
| 2004/0263638 A1 | 12/2004 | Ohsawa et al. |
| 2005/0083344 A1 | 4/2005 | Higgins |
| 2005/0083352 A1 | 4/2005 | Higgins |
| 2005/0099426 A1 | 5/2005 | Primerano et al. |
| 2005/0134808 A1 | 6/2005 | Pettitt |
| 2005/0190967 A1 | 9/2005 | Ok et al. |
| 2005/0244051 A1 | 11/2005 | Shiohara |
| 2005/0275806 A1 | 12/2005 | Roth |
| 2005/0280851 A1 | 12/2005 | Kim et al. |
| 2006/0285217 A1 | 12/2006 | Roth |
| 2007/0001994 A1 | 1/2007 | Roth |
| 2007/0035752 A1 | 2/2007 | Evans et al. |
| 2007/0052861 A1 | 3/2007 | Osawa et al. |
| 2007/0070086 A1 | 3/2007 | Elliott et al. |
| 2007/0103646 A1 | 5/2007 | Young |
| 2007/0118821 A1 | 5/2007 | Yee et al. |
| 2007/0160057 A1 | 7/2007 | Kimn et al. |
| 2007/0165946 A1 | 7/2007 | Hong et al. |
| 2007/0176948 A1 | 8/2007 | Ben-David et al. |
| 2007/0189266 A1 | 8/2007 | Izumi et al. |
| 2007/0199039 A1 | 8/2007 | Diroo et al. |
| 2007/0220525 A1 | 9/2007 | State et al. |
| 2007/0268205 A1 | 11/2007 | Sasaguri |
| 2008/0012805 A1 | 1/2008 | Duncan et al. |
| 2008/0018506 A1 | 1/2008 | Raveendran |
| 2008/0024410 A1 | 1/2008 | Ben-David et al. |
| 2008/0158097 A1 | 7/2008 | Guo |
| 2008/0158257 A1 | 7/2008 | Bobrow et al. |
| 2008/0204469 A1 | 8/2008 | Jaspers |
| 2008/0252797 A1 | 10/2008 | Hamer et al. |
| 2008/0303927 A1 | 12/2008 | Khanh |
| 2009/0058777 A1 | 3/2009 | Cheng |
| 2009/0085924 A1 | 4/2009 | Ben-Chorin et al. |
| 2009/0091582 A1 | 4/2009 | Ajito et al. |
| 2009/0096815 A1 | 4/2009 | Fukuda et al. |
| 2009/0116085 A1 | 5/2009 | Yoshimura et al. |
| 2009/0220120 A1 | 9/2009 | Yen et al. |
| 2009/0313669 A1 | 12/2009 | Boudani et al. |
| 2010/0103200 A1 | 4/2010 | Langendijk |
| 2010/0118047 A1 | 5/2010 | Ajito et al. |
| 2010/0188437 A1 | 7/2010 | Itoh et al. |
| 2010/0214315 A1 | 8/2010 | Nguyen et al. |
| 2010/0225806 A1 | 9/2010 | Hsu et al. |
| 2010/0254452 A1 | 10/2010 | Unger |
| 2010/0265283 A1 | 10/2010 | Langendijk et al. |
| 2011/0080520 A1 | 4/2011 | Tomizawa et al. |
| 2011/0148910 A1 | 6/2011 | Botzas et al. |
| 2011/0188744 A1 | 8/2011 | Sun |
| 2011/0255608 A1 | 10/2011 | Kim et al. |
| 2011/0273493 A1 | 11/2011 | Yoshiga et al. |
| 2011/0303750 A1 | 12/2011 | Wang |
| 2011/0316973 A1 | 12/2011 | Miller et al. |
| 2012/0117365 A1 | 5/2012 | Navy et al. |
| 2012/0242719 A1 | 9/2012 | Klompenhouwer et al. |
| 2012/0287146 A1 | 11/2012 | Elliott et al. |
| 2012/0287168 A1 | 11/2012 | Botzas et al. |
| 2012/0299946 A1 | 11/2012 | Kim et al. |
| 2012/0320036 A1 | 12/2012 | Kang |
| 2012/0326627 A1 | 12/2012 | McDaniel, Jr. |
| 2013/0010187 A1 | 1/2013 | Yamashita |
| 2013/0057567 A1 | 3/2013 | Frank et al. |
| 2013/0063573 A1 | 3/2013 | Erinjippurath |
| 2013/0222708 A1 | 8/2013 | Seetzen et al. |
| 2013/0258147 A1 | 10/2013 | Kachi |
| 2013/0278993 A1 | 10/2013 | Heikenfeld et al. |
| 2014/0022410 A1 | 1/2014 | Gish et al. |
| 2014/0028698 A1 | 1/2014 | Maier et al. |
| 2014/0028699 A1 | 1/2014 | Kurtz et al. |
| 2014/0043371 A1 | 2/2014 | Langendijk et al. |
| 2014/0092105 A1 | 4/2014 | Guttag et al. |
| 2014/0218511 A1 | 8/2014 | Lee |
| 2014/0218610 A1 | 8/2014 | Chujoh et al. |
| 2014/0225912 A1 | 8/2014 | Govil et al. |
| 2014/0341272 A1 | 11/2014 | Miller et al. |
| 2015/0009360 A1 | 1/2015 | Takasumi et al. |
| 2015/0022685 A1 | 1/2015 | Gish et al. |
| 2015/0062124 A1 | 3/2015 | Goel et al. |
| 2015/0123083 A1 | 5/2015 | Xi et al. |
| 2015/0189329 A1 | 7/2015 | Wada |
| 2015/0192765 A1 | 7/2015 | Gouch et al. |
| 2015/0221280 A1 | 8/2015 | Van Der Vleuten |
| 2015/0221281 A1 | 8/2015 | Bosco et al. |
| 2015/0256778 A1 | 9/2015 | Kusaka |
| 2015/0339996 A1 | 11/2015 | Schuck et al. |
| 2016/0005349 A1 | 1/2016 | Atkins et al. |
| 2016/0117993 A1 | 4/2016 | Buckley et al. |
| 2016/0119595 A1 | 4/2016 | Lyubarsky et al. |
| 2016/0125580 A1 | 5/2016 | He |
| 2016/0189399 A1 | 6/2016 | Liu et al. |
| 2016/0205367 A1 | 7/2016 | Wallace et al. |
| 2016/0286187 A1 | 9/2016 | Takenaga et al. |
| 2016/0299417 A1 | 10/2016 | Lambot |
| 2016/0300538 A1 | 10/2016 | Lee et al. |
| 2016/0360214 A1 | 12/2016 | Rojals et al. |
| 2017/0006273 A1 | 1/2017 | Borer et al. |
| 2017/0026646 A1 | 1/2017 | Minoo et al. |
| 2017/0054989 A1 | 2/2017 | Stessen et al. |
| 2017/0074652 A1 | 3/2017 | Send et al. |
| 2017/0085878 A1 | 3/2017 | Rojals et al. |
| 2017/0085896 A1 | 3/2017 | Ramasubramonian et al. |
| 2017/0140556 A1 | 5/2017 | Safaee-Rad et al. |
| 2017/0147516 A1 | 5/2017 | De |
| 2017/0153382 A1 | 6/2017 | Wang et al. |
| 2017/0178277 A1 | 6/2017 | Sharma et al. |
| 2017/0185596 A1 | 6/2017 | Spirer |
| 2017/0200309 A1 | 7/2017 | Qian et al. |
| 2017/0201751 A1 | 7/2017 | Seo |
| 2017/0285307 A1 | 10/2017 | Kamm et al. |
| 2017/0339418 A1 | 11/2017 | Ramasubramonian et al. |
| 2018/0007374 A1 | 1/2018 | Atkins et al. |
| 2018/0063500 A1 | 3/2018 | Rusanovskyy et al. |
| 2018/0084024 A1 | 3/2018 | Xie et al. |
| 2018/0131841 A1 | 5/2018 | Mahmalat et al. |
| 2018/0146533 A1 | 5/2018 | Goodman et al. |
| 2018/0160126 A1 | 6/2018 | Andersson et al. |
| 2018/0160127 A1 | 6/2018 | Ström et al. |
| 2018/0165809 A1 | 6/2018 | Stanitsas et al. |
| 2018/0198754 A1 | 7/2018 | Kielhofner et al. |
| 2018/0224333 A1 | 8/2018 | Sakakibara et al. |
| 2018/0225993 A1 | 8/2018 | Buras et al. |
| 2018/0308410 A1 | 10/2018 | Chen |
| 2018/0308450 A1 | 10/2018 | Appu et al. |
| 2018/0324481 A1 | 11/2018 | Bordes et al. |
| 2018/0348574 A1 | 12/2018 | Lin et al. |
| 2018/0350322 A1 | 12/2018 | Marcu et al. |
| 2018/0359489 A1 | 12/2018 | Lakshman et al. |
| 2018/0376047 A1 | 12/2018 | Li et al. |
| 2019/0043161 A1 | 2/2019 | Brooks |
| 2019/0043179 A1 | 2/2019 | Lucas et al. |
| 2019/0069768 A1 | 3/2019 | Chiba |
| 2019/0098317 A1 | 3/2019 | Lu et al. |
| 2019/0130519 A1 | 5/2019 | Hu et al. |
| 2019/0141291 A1 | 5/2019 | McNelley et al. |
| 2019/0147832 A1 | 5/2019 | Kim et al. |

(56) References Cited

U.S. PATENT DOCUMENTS

| | | |
|---|---|---|
| 2019/0158894 A1 | 5/2019 | Lee et al. |
| 2019/0172415 A1 | 6/2019 | Davis et al. |
| 2019/0189084 A1 | 6/2019 | Anderson et al. |
| 2019/0265552 A1 | 8/2019 | Shiomi |
| 2019/0356881 A1 | 11/2019 | Huang et al. |
| 2020/0045340 A1 | 2/2020 | Chen et al. |
| 2020/0105221 A1 | 4/2020 | Marcu et al. |
| 2020/0105657 A1 | 4/2020 | Lee et al. |
| 2020/0128220 A1 | 4/2020 | Bao et al. |
| 2020/0144327 A1 | 5/2020 | Lee et al. |
| 2020/0209678 A1 | 7/2020 | Hsu et al. |
| 2020/0226965 A1 | 7/2020 | Xi et al. |
| 2020/0226967 A1 | 7/2020 | Mandle |
| 2020/0251039 A1 | 8/2020 | Mandle et al. |
| 2020/0258442 A1 | 8/2020 | Mandle et al. |
| 2020/0294439 A1 | 9/2020 | Mandle et al. |
| 2020/0402441 A1 | 12/2020 | Mandle |
| 2021/0020094 A1 | 1/2021 | Bogdanowicz et al. |
| 2021/0027692 A1 | 1/2021 | Mandle et al. |
| 2021/0027693 A1 | 1/2021 | Mandle et al. |
| 2021/0035486 A1 | 2/2021 | Mandle |
| 2021/0035487 A1 | 2/2021 | Bogdanowicz et al. |
| 2021/0043127 A1 | 2/2021 | Bogdanowicz et al. |
| 2021/0097922 A1 | 4/2021 | Mandle |
| 2021/0097923 A1 | 4/2021 | Mandle |
| 2021/0097943 A1 | 4/2021 | Wyatt |
| 2021/0174729 A1 | 6/2021 | Mandle |
| 2021/0209990 A1 | 7/2021 | Bogdanowicz et al. |
| 2021/0233454 A1 | 7/2021 | Mandle et al. |
| 2021/0272500 A1 | 9/2021 | Mandle |
| 2021/0280118 A1 | 9/2021 | Mandle et al. |
| 2021/0295762 A1 | 9/2021 | Mandle et al. |
| 2021/0304656 A1 | 9/2021 | Mandle et al. |
| 2021/0304657 A1 | 9/2021 | Mandle |
| 2021/0327330 A1 | 10/2021 | Bogdanowicz et al. |
| 2021/0335188 A1 | 10/2021 | Mandle |
| 2021/0343218 A1 | 11/2021 | Bogdanowicz et al. |
| 2021/0343219 A1 | 11/2021 | Bogdanowicz et al. |
| 2021/0381893 A1 | 12/2021 | Balas |
| 2021/0390899 A1 | 12/2021 | Mandle |
| 2022/0036794 A1 | 2/2022 | Mandle et al. |
| 2022/0051605 A1 | 2/2022 | Bogdanowicz et al. |
| 2022/0059007 A1 | 2/2022 | Mandle et al. |
| 2022/0059008 A1 | 2/2022 | Bogdanowicz et al. |
| 2022/0059009 A1 | 2/2022 | Mandle |
| 2022/0165198 A1 | 5/2022 | Bogdanowicz et al. |
| 2022/0165199 A1 | 5/2022 | Mandle et al. |
| 2022/0172663 A1 | 6/2022 | Bogdanowicz et al. |
| 2022/0215787 A1 | 7/2022 | Mandle et al. |
| 2022/0215788 A1 | 7/2022 | Mandle |
| 2022/0223089 A1 | 7/2022 | Bogdanowicz et al. |
| 2022/0230577 A1 | 7/2022 | Bogdanowicz et al. |
| 2022/0254295 A1 | 8/2022 | Mandle et al. |
| 2022/0383795 A1 | 12/2022 | Bogdanowicz et al. |
| 2022/0383796 A1 | 12/2022 | Bogdanowicz et al. |
| 2022/0406238 A1 | 12/2022 | Mandle et al. |
| 2023/0005407 A1 | 1/2023 | Mandle et al. |
| 2023/0056238 A1 | 2/2023 | Mandle et al. |
| 2023/0056348 A1 | 2/2023 | Bogdanowicz et al. |
| 2023/0068081 A1 | 3/2023 | Mandle |
| 2023/0070395 A1 | 3/2023 | DeFilippis et al. |
| 2023/0093757 A1 | 3/2023 | Bogdanowicz et al. |
| 2023/0131826 A1 | 4/2023 | Bogdanowicz et al. |
| 2023/0196966 A1 | 6/2023 | DeFilippis et al. |
| 2023/0206812 A1 | 6/2023 | DeFilippis et al. |
| 2023/0260444 A1 | 8/2023 | Bogdanowicz et al. |
| 2023/0282147 A1 | 9/2023 | Bogdanowicz et al. |
| 2023/0326386 A1 | 10/2023 | DeFilippis et al. |
| 2023/0343265 A1 | 10/2023 | DeFilippis et al. |
| 2023/0351939 A1 | 11/2023 | Mandle |
| 2023/0386384 A1 | 11/2023 | Shafer et al. |
| 2024/0029612 A1 | 1/2024 | DeFilippis et al. |
| 2024/0062695 A1 | 2/2024 | Bogdanowicz et al. |
| 2024/0177643 A1 | 5/2024 | Bogdanowicz et al. |
| 2024/0221571 A1 | 7/2024 | Bogdanowicz et al. |
| 2024/0290240 A1 | 8/2024 | DeFilippis et al. |
| 2024/0312383 A1 | 9/2024 | Bogdanowicz et al. |

FOREIGN PATENT DOCUMENTS

| | | |
|---|---|---|
| JP | 2005260318 A | 9/2005 |
| JP | 2008064988 A | 3/2008 |
| JP | 2008065174 A | 3/2008 |
| JP | 2008065175 A | 3/2008 |
| WO | 2017184784 A1 | 10/2017 |

OTHER PUBLICATIONS

"Color Temperature Scale", downloaded@https://web.archive.org/web/20170711064110/https://www.atlantalightbulbs.com/color-temperature-scale/, available online Jul. 2017 (Year: 2017).

Ajito, T., Obi, T., Yamaguchi, M., & Ohyama, N. (2000). Expanded color gamut reproduced by six-primary projection display. In Projection Displays 2000: Sixth in a Series (vol. 3954, pp. 130-138). International Society for Optics and Photonics. https://doi.org/10.1117/12.383364.

Anzagira "Color filter array patterns for small-pixel image sensors with substantial cross talk", J. Opt. Soc. Am. A vol. 32, No. 1, Jan. 2015 (Year: 2015).

Brill, M. H., & Larimer, J. (2005a). Avoiding on-screen metamerism in N-primary displays. Journal of the Society for Information Display, 13(6), 509-516. https://doi.org/10.1889/1.1974003.

Brill, M. H., & Larimer, J. (2005b). Color-matching issues in multi-primary displays. SID Conference Record of the International Display Research Conference, 119-122.

Centore, et. al, Extensible Multi-Primary Control Sequences, Oct. 2011.

Chan, C.-C., Wei, G.-F., Hui, C.-K., & Cheng, S.-W. (2007). Development of multi-primary color LCD.

Chang, C.-K. (2013). The Effect on Gamut Expansion of Real Object Colors in Multi-primary Display. Retrieved from http://www.color.org/events/chiba/Chang.pdf.

Charles Poynton "Digital Video and HD Algorithms and Interfaces" ISBN 978-0-12-391926-7, 2012 (Year: 2012).

ColorSpace.Rgb, downloaded@https://web.archive.org/ web/20171113045313/ https://developer.android.com/reference/ android/graphics/ ColorSpace.Rgb.html, archived on Nov. 13, 2017 (Year: 2017).

Consumer Technology Association CTA Standard CTA-861-G (Nov. 2016). A DTV Profile for Uncompressed High Speed Digital Interfaces including errata dated Sep. 13, 2017 and Nov. 28, 2017.

CYGM filter, Wikipedia published on Dec. 14, 2017, downloaded@https://en.wikipedia.org/w/index.php?title=CYGM_filter&oldid=815388285 (Year: 2017).

De Vaan, A. T. S. M. (2007). Competing display technologies for the best image performance. Journal of the Society for Information Display, 15(9), 657-666. https://doi.org/10.1889/1.2785199.

Decarlo, Blog "4:4:4 vs 4:2:0: Which Chroma Subsampling Do You Need for Your Video Application?", posted on May 2, 2014 @ https://www.semiconductorstore.com/blog/2014/444-vs-420-chroma-subsampling/667/ (Year: 2014).

Display Daily WCG Standards Needed for Multi-Primary Displays, Matthew Brennesholtz. https://www.displaydaily.com/article/display-daily/wcg-standards-needed-for-multi-primary-displays.

Dolby Labs white paper V7.2 What is ICtCp? https://www.dolby.com/us/en/technologies/dolby-vision/ICtCp-white-paper.pdf.

Eliav, D., Roth, S., & Chorin, M. B. (2006). Application driven design of multi-primary displays.

Hsieh, Y.-F., Chuang, M.-C., Ou-Yang, M., Huang, S.-W., Li, J., & Kuo, Y.-T. (2008). Establish a six-primary color display without pixel-distortion and brightness loss. In Emerging Liquid Crystal Technologies III (vol. 6911, p. 69110R). International Society for Optics and Photonics. https://doi.org/10.1117/12.762944.

Jansen, "The Pointer's Gamut—The Coverage of Real Surface Colors by RGB Color Spaces and Wide Gamut Displays", TFT Central, downloaded @https://tftcentral.co.uk/articles/pointers_gamut, posted on Feb. 19, 2014 (Year: 2014).

(56) References Cited

OTHER PUBLICATIONS

Kerr, The CIE XYZ and xyY Color Space, downloaded @ https://graphics.stanford.edu/courses/cs148-10-summer/docs/2010--kerr--cie_xyz.pdf, Mar. 21, 2010 (Year: 2010).

Langendijk, E. H. A., Belik, O., Budzelaar, F., & Vossen, F. (2007). Dynamic Wide-Color-Gamut RGBW Display. SID Symposium Digest of Technical Papers, 38(1), 1458-1461. https://doi.org/10.1889/1.2785590.

Li, Y., Majumder, A., Lu, D., & Gopi, M. (2015). Content-Independent Multi-Spectral Display Using Superimposed Projections. Computer Graphics Forum, 34(2), 337-348. https://doi.org/10.1111/cgf.12564.

Lovetskiy et al. "Numerical modeling of color perception of optical radiation", Mathematical Modelling and Geometry, vol. 6, No. 1, pp. 21-36, 2018 (Year: 2018).

Nagase, A., Kagawa, S., Someya, J., Kuwata, M., Sasagawa, T., Sugiura, H., & Miyata, A. (2007). Development of PTV Using Six-Primary-Color Display Technology. SID Symposium Digest of Technical Papers, 38(1), 27-30. https://doi.org/10.1889/1.2785217.

Noble, The Technology Inside the New Kodak Professional DCS 620x Digital Camera High-Quality Images at Extremely High ISO Settings, available online @ https://web.archive.org/web/20160303171931/http://www.modernimaging.com/Kodak_DCS-620x_Technology.htm on Mar. 3, 2016 (Year: 2016).

Pascale, A Review of RGB Color Spaces, downloaded @https://www.babelcolor.com/index_htm_files/A%20review%20of%20RGB%20color%20spaces.pdf, 2003 (Year: 2003).

Pointer, M. R. (1980), The Gamut of Real Surface Colours. Color Res. Appl., 5: 145-155. doi: 10.1002/col.5080050308.

Poynton, Chroma subsampling notation, downloaded @ https://poynton.ca/PDFs/Chroma_subsampling_notation.pdf, published on Jan. 24, 2008 (Year: 2008).

Rfc4566, SOP: Session Description Protocol, published in Jul. 2006 (Year: 2006).

Samsung You tube video "Quantum Dot Technology on Samsung monitors", posted on Mar. 24, 2017 (Year: 2017).

Song et al. Studies on different primaries for a nearly-ultimate gamut in a laser display, Optics Express, vol. 36, No. 18, Sep. 3, 2018 (Year: 2018).

Susstrunk, "Computing Chromatic Adaptation", PhD thesis, Univ. of East Anglia Norwich, Jul. 2005 (Year: 2005).

Toda et al. "High Dynamic Range Rendering for YUV Images with a constraint on Perceptual Chroma Preservation", ICIP 2009 (Year: 2009).

Toto, Video: NH K's Super Hi-Vision Camera With 33-Megapixel Sensor, downloaded@https://web.archive.org/web/20140618050248/https://techcrunch.com/2011/06/01/videonhks-super-hi-vision-camera-with-33-megapixel-sensor (Year: 2014).

Tremeau, A., Tominaga, S., & Plataniotis, K. N. (2008). Color in Image and Video Processing: Most Recent Trends and Future Research Directions. EURASIP Journal on Image and Video Processing, 2008, 1-26. https://doi.org/10.1155/2008/581371.

Urban, "How Chroma Subsampling Works", downloaded @ https://blog.biamp.com/how-chroma-subsampling-works/, posted on Sep. 14, 2017 (Year: 2017).

Xilinx, Implementing SMPTE SDI Interfaces with 7 Series GTX transceivers, 2018 (Year: 2018).

\* cited by examiner

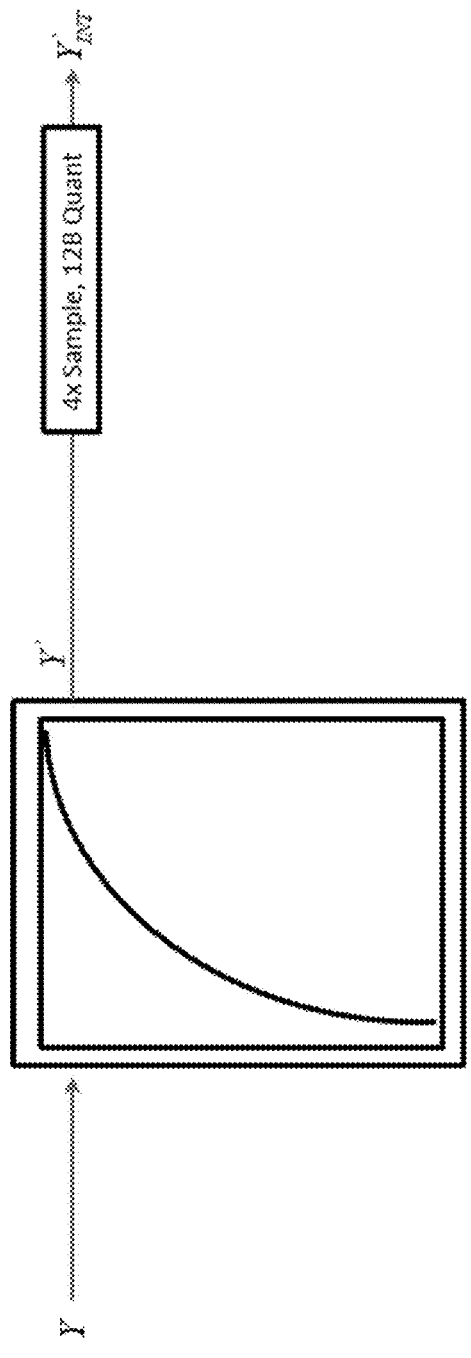
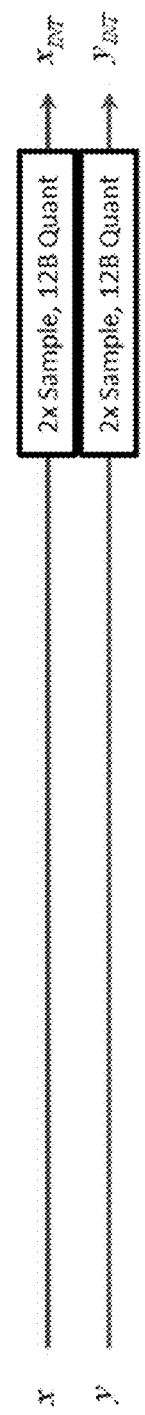
FIG. 15A
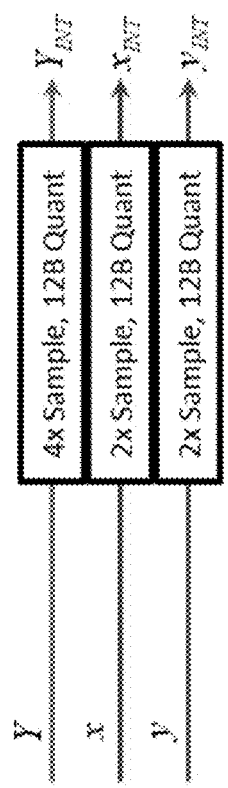
FIG. 15B

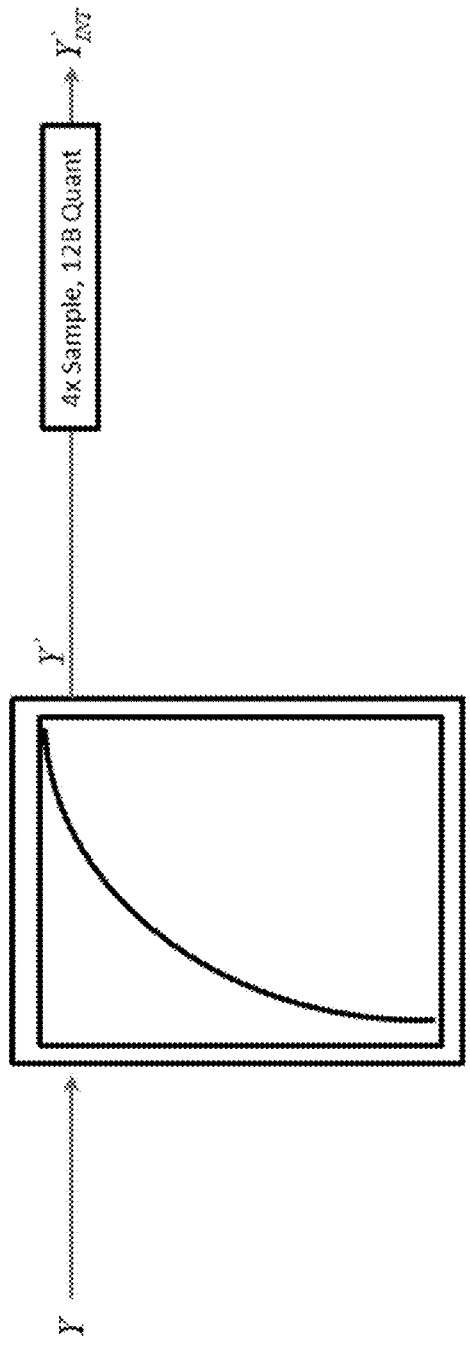
FIG. 17A
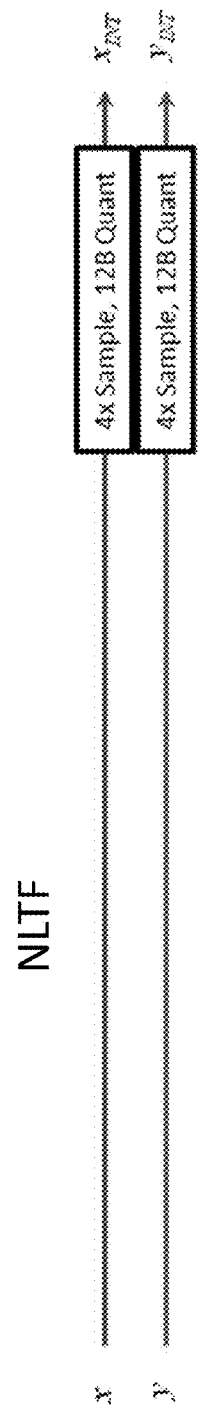
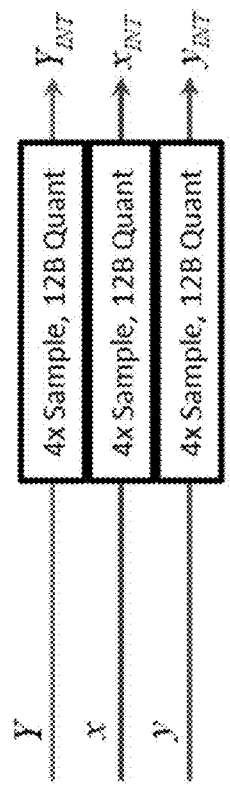
FIG. 17B

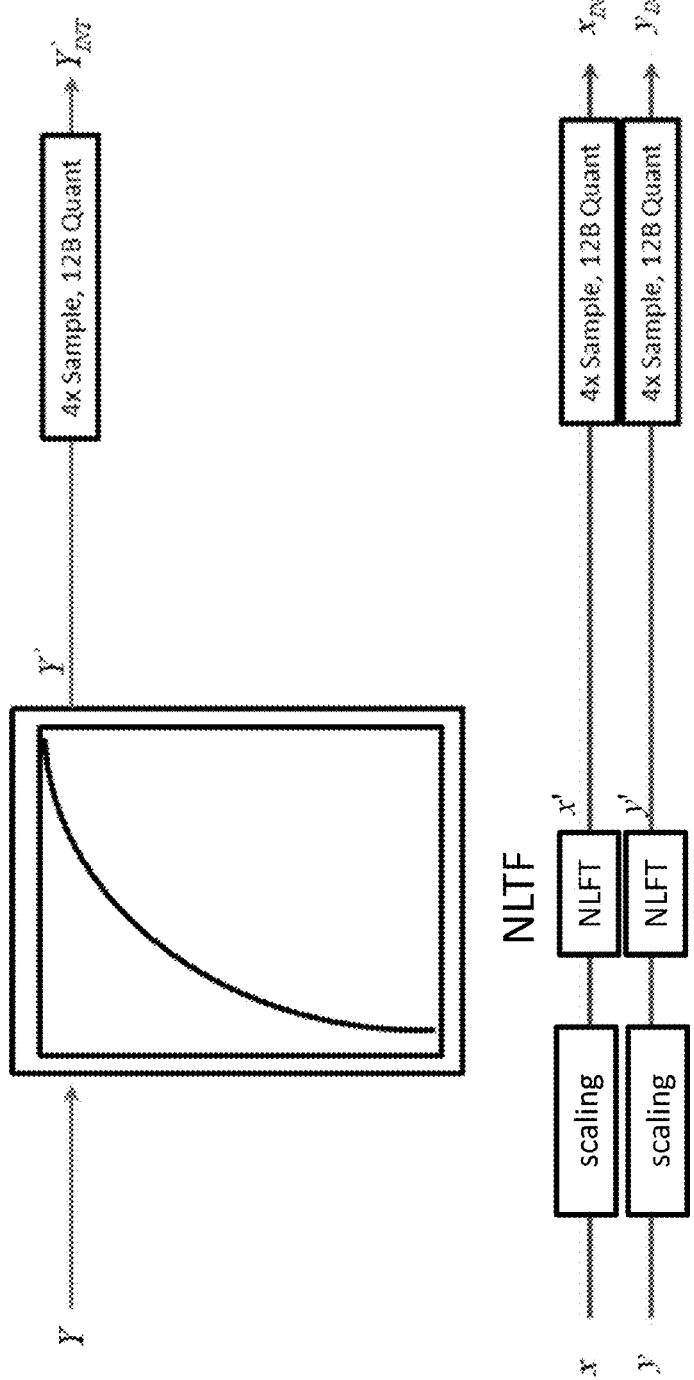
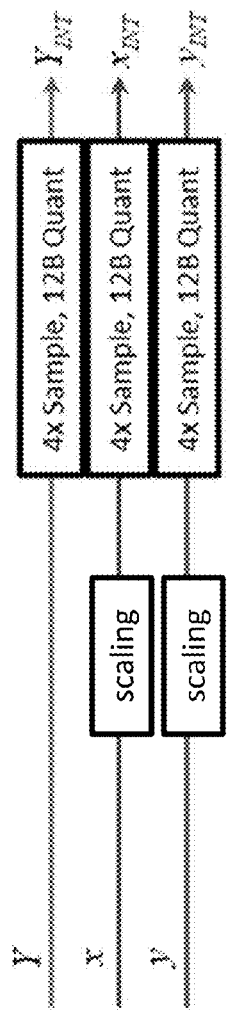
FIG. 18A
FIG. 18B

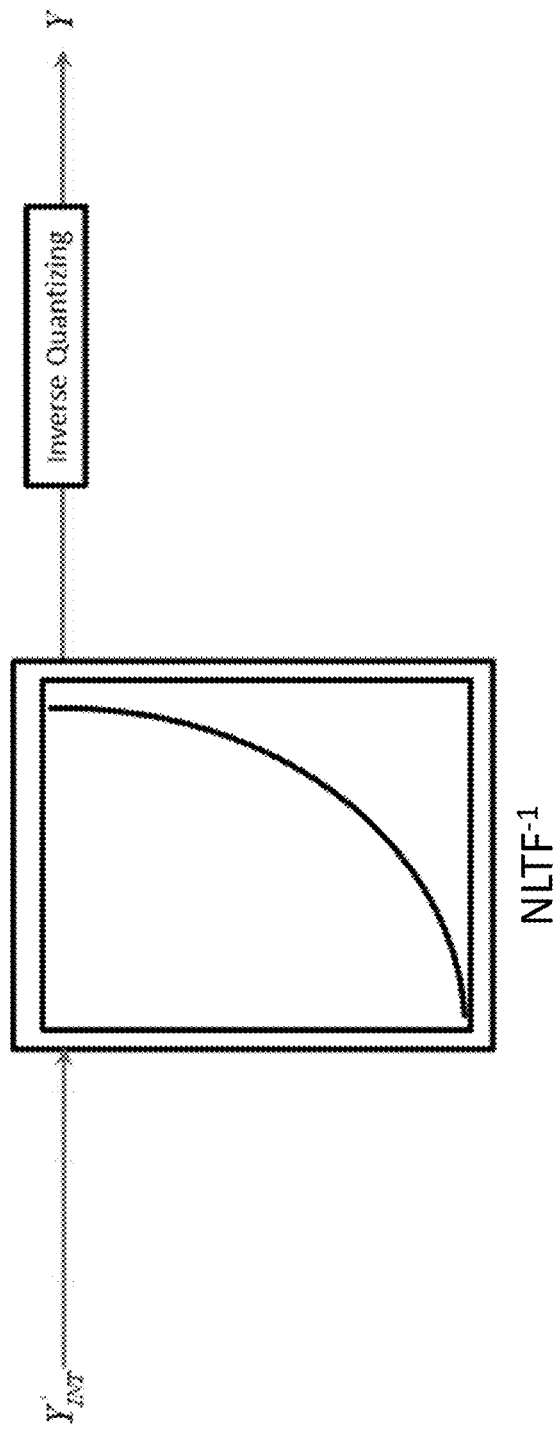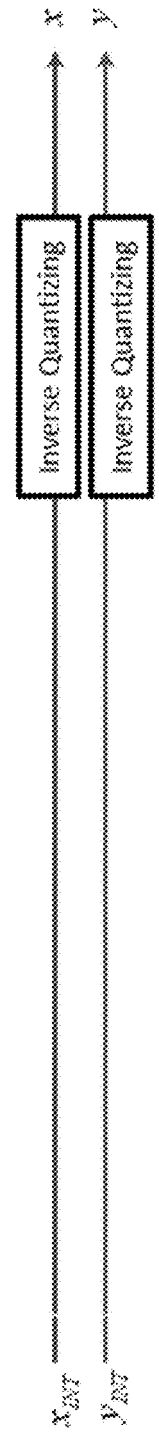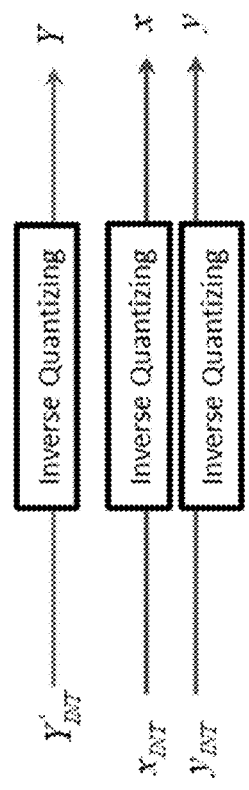
FIG. 24A
FIG. 24B

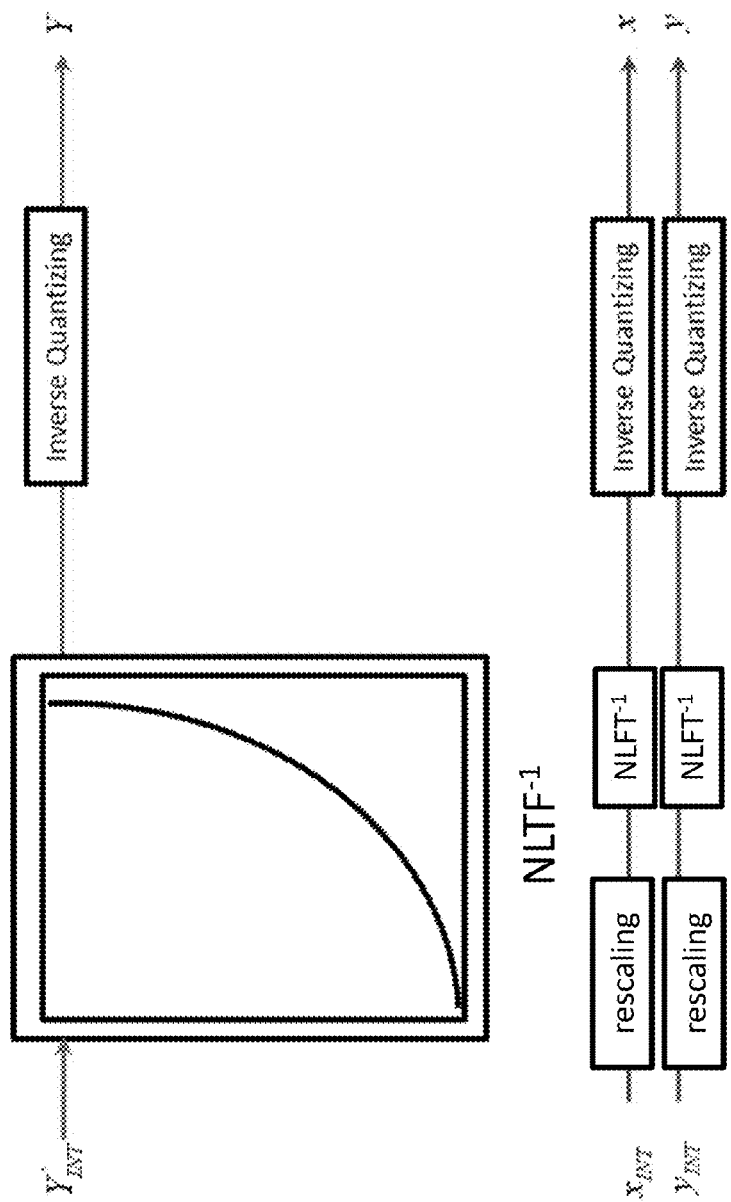
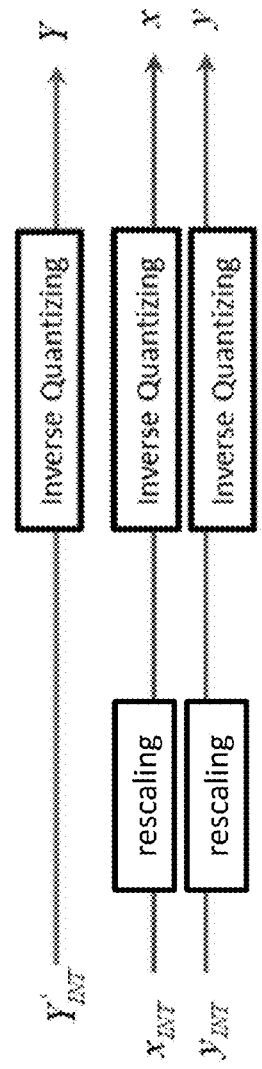
FIG. 25A
FIG. 25B

| Bits | Byte 2 | Byte 3 | Byte 4 |
|---|---|---|---|
| Bit 7 | Interlaced (0) or Progressive (1) transport | Aspect ratio 16:9 (1), unknown (0) | Reserved |
| Bit 6 | Interlaced (0) or Progressive (1) picture | Horizontal Pixel Array Size 1920 (0) or 2048 (1) | Reserved |
| Bit 5 | Transfer characteristics | Colorimetry | Luminance, Color Difference, or Colorimetric Y'C'BC'R (0h) ICTCP (1h) Y'xy/Yu'v' (2h) Unspecified (3h) |
| Bit 4 | SDR-TV (0h) HLG (1h) PQ (2h) Unspecified (3h) | Rec 709*1 (0h) Reserved (1h) UHDTV*2 (2h) Unknown (3h) | |
| Bit 3 | Picture Rate (Refer to SMPTE ST 352 Table 2) | Sampling structure (Refer to Table 5a) | Yxy (0h) Yu'v' (1h) |
| Bit 2 | | | Reserved |
| Bit 1 | | | Bit depth 10-bit Full Range (0h), 10-bit (1h), Bit 0 12-bit (2h), 12-bit Full Range (3h) |
| Bit 0 | | | |
| *1 Rec 709 indicates Conventional System Colorimetry as defined in Recommendation ITU-R BT.709 and referenced in SMPTE ST274. | | | |
| *2 UHDTV indicates Recommendation ITU-R BT.2020 Reference primaries and reference white as referred in Recommendation ITU-R BT.2100 | | | |

FIG. 37

Payload ID per S352:2013 & S292:2018
Byte 3/Bits 0-3

| Value | Sampling | Value | Sampling | Value | Sampling | Value | Sampling |
|---|---|---|---|---|---|---|---|
| 0h | 4:2:2 (Y/C$_b$/C$_r$) or (I/C$_t$/C$_p$) or (Y/X/y) or (Y/u'/v') | 1h | 4:4:4 (Y/C$_b$/C$_r$) or (I/C$_t$/C$_p$) or (Y/X/y) or (Y/u'/v') | 2h | 4:4:4 (R/G/B) | 3h | 4:2:0 (Y/C$_b$/C$_r$) or (I/C$_t$/C$_p$) or (Y/X/y) or (Y/u'/v') |
| 4h | 4:2:2:4 (Y/C$_b$/C$_r$/A) or (I/C$_t$/C$_p$/A) or (Y/X/y/A) or (Y/u'/v'/A) | 5h | 4:4:4:4 (Y/C$_b$/C$_r$/A) or (I/C$_t$/C$_p$/A) or (Y/X/y/A) or (Y/u'/v'/A) | 6h | 4:4:4:4 (R/G/B/A) | 7h | SMPTE ST2048-2 FS |
| 8h | 4:2:2:4 (Y/C$_b$/C$_r$/D) or (I/C$_t$/C$_p$/D) or (Y/X/y/D) or (Y/u'/v'/D) | 9h | 4:4:4:4 (Y/C$_b$/C$_r$/D) or (I/C$_t$/C$_p$/D) or (Y/X/y/D) or (Y/u'/v'/D) | Ah | 4:4:4:4 (R/G/B/D) | Bh | Reserved |
| Ch | Reserved | Dh | Reserved | Eh | 4:4:4 (X/Y/Z) | Fh | Reserved |

FIG. 38A

Payload ID per S352:2013 & S372:2017
Byte 3/Bits 0-3

| Value | Sampling | Value | Sampling | Value | Sampling | Value | Sampling |
|---|---|---|---|---|---|---|---|
| 0h | 4:2:2 (Y/C_b/C_r) or (I/C_t/C_p) or (Y/x/y) or (Y/u'/v') | 1h | 4:4:4 (Y/C_b/C_r) or (I/C_t/C_p) or (Y/x/y) or (Y/u'/v') | 2h | 4:4:4 (R/G/B) | 3h | 4:2:0 (Y/C_b/C_r) or (I/C_t/C_p) or (Y/x/y) or (Y/u'/v') |
| 4h | 4:2:2:4 (Y/C_b/C_r/A) or (I/C_t/C_p/A) or (Y/u'/v'/A) | 5h | 4:4:4:4 (Y/C_b/C_r/A) or (I/C_t/C_p/A) or (Y/u'/v'/A) | 6h | 4:4:4:4 (R/G/B/A) | 7h | SMPTE ST2048-2 FS |
| 8h | 4:2:2:4 (Y/C_b/C_r/D) or (I/C_t/C_p/D) or (Y/u'/v'/D) | 9h | 4:4:4:4 (Y/C_b/C_r/D) or (I/C_t/C_p/D) or (Y/u'/v'/D) | Ah | 4:4:4:4 (R/G/B/D) | Bh | Reserved |
| Ch | Reserved | Dh | Reserved | Eh | 4:4:4 (X/Y/Z) | Fh | Reserved |

FIG. 38B

Payload ID per S352:2013 & S425:2017
Byte 3/Bits 0-3

| Value | Sampling | Value | Sampling | Value | Sampling |
|---|---|---|---|---|---|
| 0h | 4:2:2 (Y/C_b/C_r) or (I/C_t/C_p) or (Y/x/y) or (Y/u'/v') | 1h | 4:4:4 (Y/C_b/C_r) or (I/C_t/C_p) or (Y/x/y) or (Y/u'/v') | 2h | 4:4:4 (R/G/B) | 3h | 4:2:0 (Y/C_b/C_r) or (I/C_t/C_p) or (Y/x/y) or (Y/u'/v') |
| 4h | 4:2:2:4 (Y/C_b/C_r+A) or (I/C_t/C_p+A) or (Y/x/y+A) or (Y/u'/v'+A) | 5h | 4:4:4:4 (Y/C_b/C_r+A) or (I/C_t/C_p+A) or (Y/x/y+A) or (Y/u'/v'+A) | 6h | 4:4:4:4 (R/G/B/A) | 7h | SMPTE ST2048-2 FS |
| 8h | 4:2:2:4 (Y/C_b/C_r+D) or Y/C_b/C_r or (I/C_t/C_p+D) or (Y/x/y+D) or (Y/u'/v'+D) | 9h | 4:4:4:4 (Y/C_b/C_r+D) or Y/C_b/C_r or (I/C_t/C_p+D) or (Y/x/y+D) or (Y/u'/v'+D) | Ah | 4:4:4:4 (R/G/B/D) | Bh | Reserved |
| Ch | Reserved | Dh | Reserved | Eh | 4:4:4 (X/Y/Z) | Fh | Reserved |

| Word 0 | $Y_0$ | $Y_1$ | $Y_2$ | $Y_3$ | $Y_4$ | $Y_5$ | $Y_6$ | $Y_7$ | $Y_8$ | $Y_9$ | ⇐ | $Y_0$ |
|---|---|---|---|---|---|---|---|---|---|---|---|---|
| Word 1 | $Y_0$ | $Y_1$ | $Y_2$ | $Y_3$ | $Y_4$ | $Y_5$ | $Y_6$ | $Y_7$ | $Y_8$ | $Y_9$ | ⇐ | $Y_1$ |
| Word 2 | $Y_0$ | $Y_1$ | $Y_2$ | $Y_3$ | $Y_4$ | $Y_5$ | $Y_6$ | $Y_7$ | $Y_8$ | $Y_9$ | ⇐ | $Y_2$ |
| Word 3 | $Y_0$ | $Y_1$ | $Y_2$ | $Y_3$ | $Y_4$ | $Y_5$ | $Y_6$ | $Y_7$ | $Y_8$ | $Y_9$ | ⇐ | $Y_3$ |
| Word 4 | $Y_0$ | $Y_1$ | $Y_2$ | $Y_3$ | $Y_4$ | $Y_5$ | $Y_6$ | $Y_7$ | $Y_8$ | $Y_9$ | ⇐ | $Y_4$ |
| Word 5 | $Y_0$ | $Y_1$ | $Y_2$ | $Y_3$ | $Y_4$ | $Y_5$ | $Y_6$ | $Y_7$ | $Y_8$ | $Y_9$ | ⇐ | $Y_5$ |
| Word 6 | $Y_0$ | $Y_1$ | $Y_2$ | $Y_3$ | $Y_4$ | $Y_5$ | $Y_6$ | $Y_7$ | $Y_8$ | $Y_9$ | ⇐ | $Y_6$ |
| Word 7 | $Y_0$ | $Y_1$ | $Y_2$ | $Y_3$ | $Y_4$ | $Y_5$ | $Y_6$ | $Y_7$ | $Y_8$ | $Y_9$ | ⇐ | $Y_7$ |
| Word 8 | $Y_0$ | $Y_1$ | $Y_2$ | $Y_3$ | $Y_4$ | $Y_5$ | $Y_6$ | $Y_7$ | $Y_8$ | $Y_9$ | ⇐ | $Y_8$ |
| Word 9 | $Y_0$ | $Y_1$ | $Y_2$ | $Y_3$ | $Y_4$ | $Y_5$ | $Y_6$ | $Y_7$ | $Y_8$ | $Y_9$ | ⇐ | $Y_9$ |
| Word 10 | $Y_0$ | $Y_1$ | $Y_2$ | $Y_3$ | $Y_4$ | $Y_5$ | $Y_6$ | $Y_7$ | $Y_8$ | $Y_9$ | ⇐ | $Y_{10}$ |
| Word 11 | $Y_0$ | $Y_1$ | $Y_2$ | $Y_3$ | $Y_4$ | $Y_5$ | $Y_6$ | $Y_7$ | $Y_8$ | $Y_9$ | ⇐ | $Y_{11}$ |
| Word 12 | $Y_0$ | $Y_1$ | $Y_2$ | $Y_3$ | $Y_4$ | $Y_5$ | $Y_6$ | $Y_7$ | $Y_8$ | $Y_9$ | ⇐ | $Y_{12}$ |
| Word 13 | $Y_0$ | $Y_1$ | $Y_2$ | $Y_3$ | $Y_4$ | $Y_5$ | $Y_6$ | $Y_7$ | $Y_8$ | $Y_9$ | ⇐ | $Y_{13}$ |
| Word 14 | $Y_0$ | $Y_1$ | $Y_2$ | $Y_3$ | $Y_4$ | $Y_5$ | $Y_6$ | $Y_7$ | $Y_8$ | $Y_9$ | ⇐ | $Y_{14}$ |

Continuing Image Data - Data Stream 1

FIG. 44A

| | | | | | | | | | | | |
|---|---|---|---|---|---|---|---|---|---|---|---|
| Word 0-1 | $x_0$ | $x_1$ | $x_2$ | $x_3$ | $x_4$ | $x_5$ | $x_6$ | $x_7$ | $x_8$ | $x_9$ | ← $c^b_0$ |
| | $y_0$ | $y_1$ | $y_2$ | $y_3$ | $y_4$ | $y_5$ | $y_6$ | $y_7$ | $y_8$ | $y_9$ | ← $c^a_0$ |
| Word 2-3 | $x_0$ | $x_1$ | $x_2$ | $x_3$ | $x_4$ | $x_5$ | $x_6$ | $x_7$ | $x_8$ | $x_9$ | ← $c^b_1$ |
| | $y_0$ | $y_1$ | $y_2$ | $y_3$ | $y_4$ | $y_5$ | $y_6$ | $y_7$ | $y_8$ | $y_9$ | ← $c^a_1$ |
| Word 4-5 | $x_0$ | $x_1$ | $x_2$ | $x_3$ | $x_4$ | $x_5$ | $x_6$ | $x_7$ | $x_8$ | $x_9$ | ← $c^b_2$ |
| | $y_0$ | $y_1$ | $y_2$ | $y_3$ | $y_4$ | $y_5$ | $y_6$ | $y_7$ | $y_8$ | $y_9$ | ← $c^a_2$ |
| Word 6-7 | $x_0$ | $x_1$ | $x_2$ | $x_3$ | $x_4$ | $x_5$ | $x_6$ | $x_7$ | $x_8$ | $x_9$ | ← $c^b_3$ |
| | $y_0$ | $y_1$ | $y_2$ | $y_3$ | $y_4$ | $y_5$ | $y_6$ | $y_7$ | $y_8$ | $y_9$ | ← $c^a_3$ |
| Word 8-9 | $x_0$ | $x_1$ | $x_2$ | $x_3$ | $x_4$ | $x_5$ | $x_6$ | $x_7$ | $x_8$ | $x_9$ | ← $c^b_4$ |
| | $y_0$ | $y_1$ | $y_2$ | $y_3$ | $y_4$ | $y_5$ | $y_6$ | $y_7$ | $y_8$ | $y_9$ | ← $c^a_4$ |
| Word 10-11 | $x_0$ | $x_1$ | $x_2$ | $x_3$ | $x_4$ | $x_5$ | $x_6$ | $x_7$ | $x_8$ | $x_9$ | ← $c^b_5$ |
| | $y_0$ | $y_1$ | $y_2$ | $y_3$ | $y_4$ | $y_5$ | $y_6$ | $y_7$ | $y_8$ | $y_9$ | ← $c^a_5$ |
| Word 12-13 | $x_0$ | $x_1$ | $x_2$ | $x_3$ | $x_4$ | $x_5$ | $x_6$ | $x_7$ | $x_8$ | $x_9$ | ← $c^b_6$ |
| | $y_0$ | $y_1$ | $y_2$ | $y_3$ | $y_4$ | $y_5$ | $y_6$ | $y_7$ | $y_8$ | $y_9$ | ← $c^a_6$ |
| Word 14 | $x_0$ | $x_1$ | $x_2$ | $x_3$ | $x_4$ | $x_5$ | $x_6$ | $x_7$ | $x_8$ | $x_9$ | ← $c^b_7$ |

Continuing Image Data - Data Stream 2

FIG. 44B

| Word 0 | $Y_0$ | $Y_1$ | $Y_2$ | $Y_3$ | $Y_4$ | $Y_5$ | $Y_6$ | $Y_7$ | $Y_8$ | $Y_9$ |
|---|---|---|---|---|---|---|---|---|---|---|
| | $x_0$ | $x_1$ | $x_2$ | $x_3$ | $x_4$ | $x_5$ | $x_6$ | $x_7$ | $x_8$ | $x_9$ |
| Word 1 | $Y_0$ | $Y_1$ | $Y_2$ | $Y_3$ | $Y_4$ | $Y_5$ | $Y_6$ | $Y_7$ | $Y_8$ | $Y_9$ |
| | $x_0$ | $x_1$ | $x_2$ | $x_3$ | $x_4$ | $x_5$ | $x_6$ | $x_7$ | $x_8$ | $x_9$ |
| Word 2 | $Y_0$ | $Y_1$ | $Y_2$ | $Y_3$ | $Y_4$ | $Y_5$ | $Y_6$ | $Y_7$ | $Y_8$ | $Y_9$ |
| | $x_0$ | $x_1$ | $x_2$ | $x_3$ | $x_4$ | $x_5$ | $x_6$ | $x_7$ | $x_8$ | $x_9$ |
| Word 3 | $Y_0$ | $Y_1$ | $Y_2$ | $Y_3$ | $Y_4$ | $Y_5$ | $Y_6$ | $Y_7$ | $Y_8$ | $Y_9$ |
| | $x_0$ | $x_1$ | $x_2$ | $x_3$ | $x_4$ | $x_5$ | $x_6$ | $x_7$ | $x_8$ | $x_9$ |
| Word 4 | $Y_0$ | $Y_1$ | $Y_2$ | $Y_3$ | $Y_4$ | $Y_5$ | $Y_6$ | $Y_7$ | $Y_8$ | $Y_9$ |
| | $x_0$ | $x_1$ | $x_2$ | $x_3$ | $x_4$ | $x_5$ | $x_6$ | $x_7$ | $x_8$ | $x_9$ |
| Word 5 | $Y_0$ | $Y_1$ | $Y_2$ | $Y_3$ | $Y_4$ | $Y_5$ | $Y_6$ | $Y_7$ | $Y_8$ | $Y_9$ |
| | $x_0$ | $x_1$ | $x_2$ | $x_3$ | $x_4$ | $x_5$ | $x_6$ | $x_7$ | $x_8$ | $x_9$ |
| Word 6 | $Y_0$ | $Y_1$ | $Y_2$ | $Y_3$ | $Y_4$ | $Y_5$ | $Y_6$ | $Y_7$ | $Y_8$ | $Y_9$ |
| Word 7 | $Y_0$ | $Y_1$ | $Y_2$ | $Y_3$ | $Y_4$ | $Y_5$ | $Y_6$ | $Y_7$ | $Y_8$ | $Y_9$ |

Continuing Image Data - Data Stream 1

| Item | | 10 bit system | 12 bit system | ST Notes |
|---|---|---|---|---|
| R'G'B'Y' xy-u'v' | Signal level of 100% | 3ACh ($940_{10}$) | EB0h ($3760_{12}$) | Section 7.5 |
| | Signal Level of 0% | 040h ($64_{10}$) | 100h ($256_{12}$) | |
| | Headroom for Overshoot | 3ADh-3FBh ($941_{10}$-$1019_{10}$) | EB1h-FEFh ($3761_{12}$-$4079_{12}$) | Section 7.10 |
| | Footroom for Undershoot | 004h-03Fh ($4_{10}$-$63_{10}$) | 010h-0FFh ($16_{12}$-$255_{12}$) | |
| C'$_B$, C'$_R$ | Signal level of 50% | 3C0h ($960_{10}$) | F00h ($3840_{12}$) | Section 7.6 |
| | Signal Level of 0% | 200h ($512_{10}$) | 800h ($2048_{12}$) | |
| | Signal level of -50% | 040h ($64_{10}$) | 100h ($256_{12}$) | |
| | Headroom for Overshoot | 3C1h-3FBh ($961_{10}$-$1019_{10}$) | F01h-FEFh ($3841_{12}$-$4097_{12}$) | Section 7.10 |
| | Footroom for Undershoot | 004h-03Fh ($4_{10}$-$63_{10}$) | 010h-0FFh ($16_{12}$-$255_{12}$) | |
| Y'xy-u'v' | Signal level of 100% | $1019_{10}$ | $4079_{12}$ | To be added |
| | Signal Level of 0% | $4_{10}$ | $16_{12}$ | |
| Prohibited codes | Upper Range | 3FCh-3FFh ($1020_{10}$-$1023_{10}$) | FF0h-FFFh ($4080_{12}$-$4095_{12}$) | Section 7.8 |
| | Lower Range | 000h-003h ($0_{10}$-$3_{10}$) | 000h-00Fh ($0_{12}$-$15_{12}$) | |

FIG. 51

| Colorimetry | Transfer Function | | | |
| --- | --- | --- | --- | --- |
| | Gamma-SDR (P=100cd/m² unless specified below) | Gamma-HDR (P=max_display_mastering_luminance) | PQ | HLG |
| RGB | Rec. ITU-R BT.709 [7] Item 1.2 | Rec. ITU-R BT.709 [7] Item 1.2 | Rec.ITU-R BT.2100 [48] Table 4 | Rec.ITU-R BT.2100 [48] Table 5 |
| opRGB | γ=2.19921875 P=160 cd/m² | γ=2.19921875 | Rec.ITU-R BT.2100 [48] Table 4 | Rec.ITU-R BT.2100 [48] Table 5 |
| Rec.ITU-R BT.2020 R'G'B' | Rec.ITU-R BT.2020 [40] Table 4 | Rec.ITU-R BT.2020 [40] Table 4 | Rec.ITU-R BT.2100 [48] Table 4 | Rec.ITU-R BT.2100 [48] Table 5 |
| SMPTE ST2113 P3D65 R'G'B' | γ=2.6 P=48 cd/m² | γ=2.6 | Rec.ITU-R BT.2100 [48] Table 4 | Rec.ITU-R BT.2100 [48] Table 5 |
| SMPTE ST2113 P3DCI R'G'B' | γ=2.6 P=48 cd/m² | γ=2.6 | Rec.ITU-R BT.2100 [48] Table 4 | Rec.ITU-R BT.2100 [48] Table 5 |
| SMPTE ST170 or Rec.ITU-R BT.709 | Rec. ITU-R BT.709 [7] Item 1.2 | Rec. ITU-R BT.709 [7] Item 1.2 | Rec.ITU-R BT.2100 [48] Table 4 | Rec.ITU-R BT.2100 [48] Table 5 |
| xvYCC$_{601}$ | IEC 61966-2-4 [5] Section 4.2 | IEC 61966-2-4 [5] Section 4.2 | Reserved | Reserved |
| xvYCC$_{709}$ | IEC 61966-2-4 [5] Section 4.3 | IEC 61966-2-4 [5] Section 4.3 | Reserved | Reserved |
| sYCC$_{601}$ | IEC 61966-2-1 [33] Section 5.2 | IEC 61966-2-1 [33] Section 5.2 | Reserved | Reserved |
| opYCC$_{601}$ | γ=2.19921875 P=160 cd/m² | γ=2.19921875 | Reserved | Reserved |
| Rec.ITU-R BT.2020 Y'C'$_{bc}$C'$_{rc}$ | Rec.ITU-R BT.2020 [40] Table 4 (CL) | Rec.ITU-R BT.2020 [40] Table 4 (CL) | Reserved | Reserved |
| Rec.ITU-R BT.2020 Y'C'$_b$C'$_r$ | Rec.ITU-R BT.2020 [40] Table 4 (NCL) | Rec.ITU-R BT.2020 [40] Table 4 (NCL) | Rec.ITU-R BT.2100 [48] Table 4 | Rec.ITU-R BT.2100 [48] Table 5 |
| Rec.ITU-R BT.2020 IC$_T$C$_P$ | Reserved | Reserved | Rec.ITU-R BT.2100 [48] Table 7 (PQ) | Rec.ITU-R BT.2100 [48] Table 7 (HLG) |
| Yx'y' or Yu'v' | DRB Applied | DRB Applied | Reserved | Reserved |

FIG. 52

| Yxy 8bit 4:2:2 - 4 Lane | | | |
|---|---|---|---|
| Lane 0 | Lane 1 | Lane 2 | Lane 3 |
| x0-7:0 | x1-7:0 | x2-7:0 | x3-7:0 |
| Y0-7:0 | Y1-7:0 | Y2-7:0 | Y3-7:0 |
| y0-7:0 | y1-7:0 | y2-7:0 | y3-7:0 |
| x4-7:0 | x5-7:0 | x6-7:0 | x7-7:0 |
| Y4-7:0 | Y5-7:0 | Y6-7:0 | Y7-7:0 |
| y4-7:0 | y5-7:0 | y6-7:0 | y7-7:0 |
| x8-7:0 | x9-7:0 | x10-7:0 | x11-7:0 |
| Y8-7:0 | Y9-7:0 | Y10-7:0 | Y11-7:0 |
| y8-7:0 | y9-7:0 | y10-7:0 | y11-7:0 |

FIG. 53A

| Yxy 8bit 4:2:2 - 2 Lane | |
|---|---|
| Lane 0 | Lane 1 |
| x0-7:0 | x1-7:0 |
| Y0-7:0 | Y1-7:0 |
| y0-7:0 | y1-7:0 |
| x2-7:0 | x3-7:0 |
| Y2-7:0 | Y3-7:0 |
| y2-7:0 | y3-7:0 |
| x4-7:0 | x5-7:0 |
| Y4-7:0 | Y5-7:0 |
| y4-7:0 | y5-7:0 |

FIG. 53B

| Yxy 8bit 4:2:2 - 1 Lane |
|---|
| Lane 0 |
| x0-7:0 |
| Y0-7:0 |
| y0-7:0 |
| x1-7:0 |
| Y1-7:0 |
| y1-7:0 |
| x2-7:0 |
| Y2-7:0 |
| y2-7:0 |

FIG. 53C

| Yxy 10bit 4:2:2 - 4 Lane | | | |
|---|---|---|---|
| Lane 0 | Lane 1 | Lane 2 | Lane 3 |
| x0-9:2 | y0-9:2 | x2-9:2 | x2-9:2 |
| x0-1:0\|Y0-9:4 | y0-1:0\|Y1-9:4 | x2-1:0\|Y2-9:4 | x2-1:0\|Y3-9:4 |
| Y0-3:0\|x4-9:6 | Y1-3:0\|y4-9:6 | Y2-3:0\|x6-9:6 | Y3-3:0\|y6-9:6 |
| x4-5:0\|Y4-9:8 | y4-5:0\|Y5-9:8 | x6-5:0\|Y6-9:8 | y6-5:0\|Y7-9:8 |
| Y4-7:0 | Y5-7:0 | Y6-7:0 | Y7-7:0 |
| x8-9:2 | y8-9:2 | x10-9:2 | y10-9:2 |
| x8-1:0\|Y8-9:4 | y8-1:0\|Y9-9:4 | x10-1:0\|Y10-9:4 | y10-1:0\|Y11-9:4 |
| Y8-3:0\|x12-9:6 | Y9-3:0\|y12-9:6 | Y10-3:0\|x14-9:6 | Y11-3:0\|y14-9:6 |
| x12-5:0\|Y12-9:8 | y12-5:0\|Y13-9:8 | x14-5:0\|Y114-9:8 | y14-5:0\|Y15-9:8 |
| Y12-7:0 | Y13-7:0 | Y14-7:0 | Y15-7:0 |

FIG. 54A

| Yxy 10bit 4:2:2 - 2 Lane | |
|---|---|
| Lane 0 | Lane 1 |
| x0-9:2 | y0-9:2 |
| x0-1:0\|Y0-9:4 | y2-1:0\|Y1-9:4 |
| Y0-3:0\|x2-9:6 | Y1-3:0\|y2-9:6 |
| x2-5:0\|Y2-9:8 | y2-5:0\|Y3-9:8 |
| Y2-7:0 | Y3-7:0 |
| x4-9:2 | y4-9:2 |
| x4-1:0\|Y4-9:4 | y4-1:0\|Y5-9:4 |
| Y4-3:0\|x6-9:6 | Y5-3:0\|y6-9:6 |
| x4-5:0\|Y6-9:8 | y6-5:0\|Y7-9:8 |
| Y6-7:0 | Y7-7:0 |

FIG. 54B

| Yxy 10bit 4:2:2 - 1 Lane |
|---|
| Lane 0 |
| x0-9:2 |
| x0-1:0\|Y0-9:4 |
| Y0-3:0\|y0-9:6 |
| y0-5:0\|Y1-9:8 |
| Y1-7:0 |
| x2-9:2 |
| x2-1:0\|Y2-9:4 |
| Y2-3:0\|y2-9:6 |
| y2-5:0\|Y3-9:8 |
| Y3-7:0 |

FIG. 54C

| Yxy 12bit 4:2:2 - 4 Lane | | | |
|---|---|---|---|
| Lane 0 | Lane 1 | Lane 2 | Lane 3 |
| x0-11:4 | y0-11:4 | x2-11:4 | y2-11:4 |
| x0-3:0\|Y0-11:8 | y0-3:0\|Y1-11:8 | x2-3:0\|Y2-11:8 | y2-3:0\|Y3-11:8 |
| Y0-7:0 | Y1-7:0 | Y2-7:0 | Y3-7:0 |
| x4-11:4 | y4-11:4 | x6-11:4 | y6-11:4 |
| x4-3:0\|Y4-11:8 | y4-3:0\|Y5-11:8 | x63:0\|Y6-11:8 | y6-3:0\|Y7-11:8 |
| Y4-7:0 | Y5-7:0 | Y6-7:0 | Y7-7:0 |

FIG. 55A

| Yxy 12bit 4:2:2 - 2 Lane | |
|---|---|
| Lane 0 | Lane 1 |
| x0-11:4 | y0-11:4 |
| x0-3:0\|Y0-11:8 | y0-3:0\|Y1-11:8 |
| Y0-7:0 | Y1-7:0 |
| x2-11:4 | y2-11:4 |
| x2-3:0\|Y2-11:8 | y2-3:0\|Y3-11:8 |
| Y2-7:0 | Y3-7:0 |

FIG. 55B

| Yxy 12bit 4:2:2 - 1 Lane |
|---|
| Lane 0 |
| x0-11:4 |
| x0-3:0\|Y0-11:8 |
| Y0-7:0 |
| y0-11:4 |
| y0-3:0\|Y1-11:8 |
| Y1-7:0 |

FIG. 55C

| Yxy 16bit 4:2:2 - 4 Lane | | | |
|---|---|---|---|
| Lane 0 | Lane 1 | Lane 2 | Lane 3 |
| x0-15:8 | y0-15:8 | x2-15:8 | y2-15:8 |
| x0-7:0 | y0-7:0 | x2-7:0 | y2-7:0 |
| Y0-15:8 | Y1-15:8 | Y2-15:8 | Y3-15:8 |
| Y0-7:0 | Y1-7:0 | Y2-7:0 | Y3-7:0 |
| x4-15:8 | y4-15:8 | x6-15:8 | y6-15:8 |
| x4-7:0 | y4-7:0 | x6-7:0 | y6-7:0 |
| Y4-15:8 | Y5-15:8 | Y6-15:8 | Y7-15:8 |
| Y4-7:0 | Y5-7:0 | Y6-7:0 | Y7-7:0 |

FIG. 56A

| Yxy 16bit 4:2:2 - 2 Lane | |
|---|---|
| Lane 0 | Lane 1 |
| x0-15:8 | y0-15:8 |
| x0-7:0 | y0-7:0 |
| Y0-15:8 | Y1-15:8 |
| Y0-7:0 | Y1-7:0 |
| x2-15:8 | y2-15:8 |
| x2-7:0 | y2-7:0 |
| Y2-15:8 | Y3-15:8 |
| Y2-7:0 | Y3-7:0 |

FIG. 56B

| Yxy 16bit 4:2:2 - 1 Lane |
|---|
| Lane 0 |
| x0-15:8 |
| x0-7:0 |
| Y0-15:8 |
| Y0-7:0 |
| y0-15:8 |
| y0-7:0 |
| Y1-15:8 |
| Y1-7:0 |
| x2-15:8 |
| x2-7:0 |
| Y2-15:8 |
| Y2-7:0 |
| y2-15:8 |
| y2-7:0 |
| Y3-15:8 |
| Y3-7:0 |

FIG. 56C

| Yxy 10bit 4:4:4 - 4 Lane | | | |
|---|---|---|---|
| Lane 0 | Lane 1 | Lane 2 | Lane 3 |
| x0-9:2 | x1-9:2 | x2-9:2 | x3-9:2 |
| x0-1:0\|Y0-9:4 | x1-1:0\|Y1-9:4 | x2-1:0\|Y2-9:4 | x3-1:0\|Y3-9:4 |
| Y0-3:0\|y0-9:6 | Y1-3:0\|y1-9:6 | Y2-3:0\|y2-9:6 | Y3-3:0\|y3-9:6 |
| y0-5:0\|x4-9:8 | y1-5:0\|x5-9:8 | y2-5:0\|x6-9:8 | y3-5:0\|x7-9:8 |
| x4-7:0 | x5-7:0 | x6-7:0 | x7-7:0 |
| Y4-9:2 | Y5-9:2 | Y6-9:2 | Y7-9:2 |
| Y4-1:0\|y4-9:4 | Y5-1:0\|y5-9:4 | Y6-1:0\|y6-9:4 | Y7-1:0\|y7-9:4 |
| y4-3:0\|x8-9:6 | y5-3:0\|x9-9:6 | y6-3:0\|x10-9:6 | y7-3:0\|x11-9:6 |
| x8-5:0\|Y8-9:8 | x9-5:0\|Y9-9:8 | x10-5:0\|Y10-9:8 | x11-5:0\|Y11-9:8 |

FIG. 57A

| Yxy 10bit 4:4:4 - 2 Lane | |
|---|---|
| Lane 0 | Lane 1 |
| x0-9:2 | x1-9:2 |
| x0-1:0\|Y0-9:4 | x1-1:0\|Y1-9:4 |
| Y0-3:0\|y0-9:6 | Y1-3:0\|y1-9:6 |
| y0-5:0\|x2-9:8 | y1-5:0\|x3-9:8 |
| x2-7:0 | x3-7:0 |
| Y2-9:2 | Y3-9:2 |
| Y2-1:0\|y2-9:4 | Y3-1:0\|y3-9:4 |
| y2-3:0\|x4-9:6 | y3-3:0\|x5-9:6 |
| x4-5:0\|Y4-9:8 | x5-5:0\|Y5-9:8 |
| Y4-7:0 | Y5-7:0 |
| y4-9:2 | y5-9:2 |
| y4-1:0\|x6-9:4 | y5-1:0\|x7-9:4 |
| x6-3:0\|Y6-9:6 | x7-3:0\|Y7-9:6 |

FIG. 57B

| Yxy 10bit 4:4:4 - 1 Lane |
|---|
| Lane 0 |
| x0-9:2 |
| x0-1:0\|Y0-9:4 |
| Y0-3:0\|y0-9:6 |
| y0-5:0\|x1-9:8 |
| x1-7:0 |
| Y1-9:2 |
| Y1-1:0\|y1-9:4 |
| y1-3:0\|x2-9:6 |
| x2-5:0\|Y2-9:8 |
| Y2-7:0 |
| y2-9:2 |
| y2-1:0\|x3-9:4 |
| x3-3:0\|Y3-9:6 |
| Y3-5:0\|y3-9:8 |
| y3-7:0 |

FIG. 57C

| Yxy 12bit 4:4:4 – 4 Lane | | | |
|---|---|---|---|
| Lane 0 | Lane 1 | Lane 2 | Lane 3 |
| x0-11:4 | x1-11:4 | x2-11:4 | x3-11:4 |
| x0-3:0\|Y0-11:8 | x1-3:0\|Y1-11:8 | x2-3:0\|Y2-11:8 | x3-3:0\|Y3-11:8 |
| Y0-7:0 | Y1-7:0 | Y2-7:0 | Y3-7:0 |
| y0-11:4 | y1-11:4 | y2-11:4 | y3-11:4 |
| y0-3:0\|x4-11:8 | y1-3:0\|x5-11:8 | y2-3:0\|x6-11:8 | y3-3:0\|x7-11:8 |
| x4-7:0 | x5-7:0 | x6-7:0 | x7-7:0 |
| Y4-11:4 | Y5-11:4 | Y6-11:4 | Y7-11:4 |
| Y4-3:0\|y4-11:8 | Y5-3:0\|y5-11:8 | Y6-3:0\|y6-11:8 | Y7-3:0\|y7-11:8 |
| y4-7:0 | y5-7:0 | y6-7:0 | y7-7:0 |

FIG. 58A

| Yxy 12bit 4:4:4 – 2 Lane | |
|---|---|
| Lane 0 | Lane 1 |
| x0-11:4 | x1-11:4 |
| x0-3:0\|Y0-11:8 | x1-3:0\|Y1-11:8 |
| Y0-7:0 | Y1-7:0 |
| y0-11:4 | y1-11:4 |
| y0-3:0\|x2-11:8 | y1-3:0\|x3-11:8 |
| x2-7:0 | x3-7:0 |
| Y2-11:4 | Y3-11:4 |
| Y2-3:0\|y2-11:8 | Y3-3:0\|y3-11:8 |
| y2-7:0 | y3-7:0 |

FIG. 58B

| Yxy 12bit 4:4:4 – 1 Lane |
|---|
| Lane 0 |
| x0-11:4 |
| x0-3:0\|Y0-11:8 |
| Y0-7:0 |
| y0-11:4 |
| y0-3:0\|x1-11:8 |
| x1-7:0 |
| Y1-11:4 |
| Y1-3:0\|y1-11:8 |
| y1-7:0 |

FIG. 58C

| Yxy 16bit 4:4:4 – 4 Lane | | | |
|---|---|---|---|
| Lane 0 | Lane 1 | Lane 2 | Lane 3 |
| x0-15:8 | x1-15:8 | x2-15:8 | x3-15:8 |
| x0-7:0 | x1-7:0 | x2-7:0 | x3-7:0 |
| Y0-15:8 | Y1-15:8 | Y2-15:8 | Y3-15:8 |
| Y0-7:0 | Y1-7:0 | Y2-7:0 | Y3-7:0 |
| y0-15:8 | y1-15:8 | y2-15:8 | y3-15:8 |
| y0-7:0 | y1-7:0 | y2-7:0 | y3-7:0 |
| x4-15:8 | x5-15:8 | x6-15:8 | x7-15:8 |
| x4-7:0 | x5-7:0 | x6-7:0 | x7-7:0 |
| Y4-15:8 | Y5-15:8 | Y6-15:8 | Y7-15:8 |
| Y4-7:0 | Y5-7:0 | Y6-7:0 | Y7-7:0 |
| y4-15:8 | y5-15:8 | y6-15:8 | y7-15:8 |
| y4-7:0 | y5-7:0 | y6-7:0 | y7-7:0 |

FIG. 59A

| Yxy 16yit 4:4:4 - 2 Lane | |
|---|---|
| Lane 0 | Lane 1 |
| x0-15:8 | x1-15:8 |
| x0-7:0 | x1-7:0 |
| Y0-15:8 | Y1-15:8 |
| Y0-7:0 | Y1-7:0 |
| y0-15:8 | y1-15:8 |
| y0-7:0 | y1-7:0 |
| x2-15:8 | x3-15:8 |
| x2-7:0 | x3-7:0 |
| Y2-15:8 | Y3-15:8 |
| Y2-7:0 | Y3-7:0 |
| y2-15:8 | y3-15:8 |
| y2-7:0 | y3-7:0 |

FIG. 59B

| Yxy 16yit 4:4:4 - 1 Lane |
|---|
| Lane 0 |
| x0-15:8 |
| x0-7:0 |
| Y0-15:8 |
| Y0-7:0 |
| y0-15:8 |
| y0-7:0 |
| x1-15:8 |
| x1-7:0 |
| Y1-15:8 |
| Y1-7:0 |
| y1-15:8 |
| y1-7:0 |

FIG. 59C

| Auxiliary Video Information (AVI) InfoFrame V4 | | | | | | | |
|---|---|---|---|---|---|---|---|
| InfoFrame Type Code | InfoFrame Type = 0x02 | | | | | | |
| InfoFrame Version Number | Version = 0x04 | | | | | | |
| Length of AVI InfoFrame | Length of AVI InfoFrame (14) | | | | | | |
| Data Byte 1 | [Y2] | Y1 | Y0 | A0 | B1 | B0 | S1 | S0 |
| Data Byte 2 | C1 | C0 | M1 | M0 | R3 | R2 | R1 | R0 |
| Data Byte 3 | ITC | EC2 | EC1 | EC0 | Q1 | Q0 | SC1 | SC0 |
| Data Byte 4 | [VIC7] | VIC6 | VIC5 | VIC4 | VIC3 | VIC2 | VIC1 | VIC0 |
| Data Byte 5 | [YQ1] | YQ0 | CN1 | CN0 | PR3 | PR2 | PR1 | PR0 |
| Data Byte 6 | ETB07-ETB00 (Line Number of End of Top Bar – lower 8 bits) | | | | | | |
| Data Byte 7 | ETB15-ETB08 (Line Number of End of Top Bar – upper 8 bits) | | | | | | |
| Data Byte 8 | SBB07-SBB00 (Line Number of Start of Bottom Bar – lower 8 bits) | | | | | | |
| Data Byte 9 | SBB15-SBB08 (Line Number of Start of Bottom Bar – upper 8 bits) | | | | | | |
| Data Byte 10 | ELB07-ELB00 (Pixel Number of End of Left Bar – lower 8 bits) | | | | | | |
| Data Byte 11 | ELB15-ELB08 (Pixel Number of End of Left Bar – upper 8 bits) | | | | | | |
| Data Byte 12 | SRB07-SRB00 (Pixel Number of Start of Right Bar – lower 8 bits) | | | | | | |
| Data Byte 13 | SRB15-SRB08 (Pixel Number of Start of Right Bar – upper 8 bits) | | | | | | |
| Data Byte 14 | ACE3 | ACE2 | ACE1 | ACE0 | F143=0 | F142=0 | F141=0 | F140=0 |

FIG. 60

SYSTEM AND METHOD FOR A MULTI-PRIMARY WIDE GAMUT COLOR SYSTEM

CROSS REFERENCES TO RELATED APPLICATIONS

This application is a continuation-in-part of U.S. application Ser. No. 18/652,237, filed May 1, 2024, which is a continuation of U.S. application Ser. No. 18/170,315, filed Feb. 16, 2023, which is a continuation of U.S. application Ser. No. 17/976,347, filed Oct. 28, 2022, which is a continuation-in-part of U.S. application Ser. No. 17/727,372, filed Apr. 22, 2022, which is a continuation-in-part of U.S. application Ser. No. 17/671,074, filed Feb. 14, 2022, which is a continuation-part-of U.S. application Ser. No. 17/670,018, filed Feb. 11, 2022, which is a continuation-in-part of U.S. application Ser. No. 17/516,143, filed Nov. 1, 2021, which is a continuation-in-part of U.S. application Ser. No. 17/338,357, filed Jun. 3, 2021, which is a continuation-in-part of U.S. application Ser. No. 17/225,734, filed Apr. 8, 2021, which is a continuation-in-part of U.S. application Ser. No. 17/076,383, filed Oct. 21, 2020, which is a continuation-in-part of U.S. application Ser. No. 17/009,408, filed Sep. 1, 2020, which is a continuation-in-part of U.S. application Ser. No. 16/887,807, filed May 29, 2020, which is a continuation-in-part of U.S. application Ser. No. 16/860,769, filed Apr. 28, 2020, which is a continuation-in-part of U.S. application Ser. No. 16/853,203, filed Apr. 20, 2020, which is a continuation-in-part of U.S. patent application Ser. No. 16/831,157, filed Mar. 26, 2020, which is a continuation of U.S. patent application Ser. No. 16/659,307, filed Oct. 21, 2019, now U.S. Pat. No. 10,607,527, which is related to and claims priority from U.S. Provisional Patent Application No. 62/876,878, filed Jul. 22, 2019, U.S. Provisional Patent Application No. 62/847,630, filed May 14, 2019, U.S. Provisional Patent Application No. 62/805,705, filed Feb. 14, 2019, and U.S. Provisional Patent Application No. 62/750,673, filed Oct. 25, 2018, each of which is incorporated herein by reference in its entirety.

BACKGROUND OF THE INVENTION

1. Field of the Invention

The present invention relates to color systems, and more specifically to a wide gamut color system with an increased number of primary colors.

2. Description of the Prior Art

It is generally known in the prior art to provide for an increased color gamut system within a display.

Prior art patent documents include the following:

U.S. Pat. No. 10,222,263 for RGB value calculation device by inventor Yasuyuki Shigezane, filed Feb. 6, 2017 and issued Mar. 5, 2019, is directed to a microcomputer that equally divides the circumference of an RGB circle into 6×n (n is an integer of 1 or more) parts, and calculates an RGB value of each divided color. (255, 0, 0) is stored as a reference RGB value of a reference color in a ROM in the microcomputer. The microcomputer converts the reference RGB value depending on an angular difference of the RGB circle between a designated color whose RGB value is to be found and the reference color, and assumes the converted RGB value as an RGB value of the designated color.

U.S. Pat. No. 9,373,305 for Semiconductor device, image processing system and program by inventor Hiorfumi Kawaguchi, filed May 29, 2015 and issued Jun. 21, 2016, is directed to an image process device including a display panel operable to provide an input interface for receiving an input of an adjustment value of at least a part of color attributes of each vertex of n axes (n is an integer equal to or greater than 3) serving as adjustment axes in an RGB color space, and an adjustment data generation unit operable to calculate the degree of influence indicative of a following index of each of the n-axis vertices, for each of the n axes, on a basis of distance between each of the n-axis vertices and a target point which is an arbitrary lattice point in the RGB color space, and operable to calculate adjusted coordinates of the target point in the RGB color space.

U.S. Publication No. 20130278993 for Color-mixing bi-primary color systems for displays by inventors Heikenfeld, et al., filed Sep. 1, 2011 and published Oct. 24, 2013, is directed to a display pixel. The pixel includes first and second substrates arranged to define a channel. A fluid is located within the channel and includes a first colorant and a second colorant. The first colorant has a first charge and a color. The second colorant has a second charge that is opposite in polarity to the first charge and a color that is complimentary to the color of the first colorant. A first electrode, with a voltage source, is operably coupled to the fluid and configured to moving one or both of the first and second colorants within the fluid and alter at least one spectral property of the pixel.

U.S. Pat. No. 8,599,226 for Device and method of data conversion for wide gamut displays by inventors Ben-Chorin, et al., filed Feb. 13, 2012 and issued Dec. 3, 2013, is directed to a method and system for converting color image data from a, for example, three-dimensional color space format to a format usable by an n-primary display, wherein n is greater than or equal to 3. The system may define a two-dimensional sub-space having a plurality of two-dimensional positions, each position representing a set of n primary color values and a third, scaleable coordinate value for generating an n-primary display input signal. Furthermore, the system may receive a three-dimensional color space input signal including out-of range pixel data not reproducible by a three-primary additive display, and may convert the data to side gamut color image pixel data suitable for driving the wide gamut color display.

U.S. Pat. No. 8,081,835 for Multiprimary color sub-pixel rendering with metameric filtering by inventors Elliott, et al., filed Jul. 13, 2010 and issued Dec. 20, 2011, is directed to systems and methods of rendering image data to multiprimary displays that adjusts image data across metamers as herein disclosed. The metamer filtering may be based upon input image content and may optimize sub-pixel values to improve image rendering accuracy or perception. The optimizations may be made according to many possible desired effects. One embodiment comprises a display system comprising: a display, said display capable of selecting from a set of image data values, said set comprising at least one metamer; an input image data unit; a spatial frequency detection unit, said spatial frequency detection unit extracting a spatial frequency characteristic from said input image data; and a selection unit, said unit selecting image data from said metamer according to said spatial frequency characteristic.

U.S. Pat. No. 7,916,939 for High brightness wide gamut display by inventors Roth, et al., filed Nov. 30, 2009 and issued Mar. 29, 2011, is directed to a device to produce a color image, the device including a color filtering arrangement to produce at least four colors, each color produced by a filter on a color filtering mechanism having a relative segment size, wherein the relative segment sizes of at least two of the primary colors differ.

U.S. Pat. No. 6,769,772 for Six color display apparatus having increased color gamut by inventors Roddy, et al., filed Oct. 11, 2002 and issued Aug. 3, 2004, is directed to a display system for digital color images using six color light sources or two or more multicolor LED arrays or OLEDs to provide an expanded color gamut. Apparatus uses two or more spatial light modulators, which may be cycled between two or more color light sources or LED arrays to provide a six-color display output. Pairing of modulated colors using relative luminance helps to minimize flicker effects.

SUMMARY OF THE INVENTION

It is an object of this invention to provide an enhancement to the current RGB systems or a replacement for them.

In one embodiment, the present invention provides a system for displaying a primary color system, including a set of image data including a set of primary color signals, wherein the set of primary color signals corresponds to a set of values in an International Commission on Illumination (CIE) Yxy color space, wherein the set of values in the CIE Yxy color space includes a luminance (Y) and two colorimetric coordinates (x,y), wherein the set of image data includes medical image data, and an image data converter, wherein the image data converter includes a digital interface, and wherein the digital interface is operable to encode and decode the set of values in the CIE Yxy color space, wherein the encode and the decode includes transportation of processed data, wherein the processed data includes a first channel related to the luminance (Y), a second channel related to a first colorimetric coordinate (x) of the two colorimetric coordinates (x,y), and a third channel related to the second colorimetric coordinate (y) of the two colorimetric coordinates (x,y), and wherein the image data converter is operable to convert the set of image data for display on at least one viewing device.

In another embodiment, the present invention provides a system for displaying a primary color system, including a set of image data including a set of primary color signals, wherein the set of primary color signals corresponds to a set of values in an International Commission on Illumination (CIE) Yxy color space, wherein the set of values in the CIE Yxy color space includes a luminance (Y) and two colorimetric coordinates (x,y), wherein the set of image data includes medical image data, at least one imager, wherein one or more of the at least one imager is operable to provide the medical image data, and an image data converter, wherein the image data converter includes a digital interface, and wherein the digital interface is operable to encode and decode the set of values in the CIE Yxy color space, wherein the encode and the decode includes transportation of processed data, wherein the processed data includes a first channel related to the luminance (Y), a second channel related to a first colorimetric coordinate (x) of the two colorimetric coordinates (x,y), and a third channel related to the second colorimetric coordinate (y) of the two colorimetric coordinates (x,y), wherein the one or more of the at least one imager is incorporated into at least one medical device, and wherein the image data converter is operable to convert the set of image data for display on at least one viewing device.

In yet another embodiment, the present invention provides a system for displaying a primary color system including a set of image data including a set of primary color signals, wherein the set of primary color signals corresponds to a set of values in an International Commission on Illumination (CIE) Yxy color space, wherein the set of values in the CIE Yxy color space includes a luminance (Y) and two colorimetric coordinates (x,y), wherein the set of image data includes medical image data, at least one imager, wherein one or more of the at least one imager is operable to provide the medical image data, an image data converter, wherein the image data converter includes a digital interface, and wherein the digital interface is operable to encode and decode the set of values in the CIE Yxy color space, and at least one viewing device, wherein the image data converter and the at least one viewing device are in communication, wherein the encode and the decode includes transportation of processed data, wherein the processed data includes a first channel related to the luminance (Y), a second channel related to a first colorimetric coordinate (x) of the two colorimetric coordinates (x,y), and a third channel related to the second colorimetric coordinate (y) of the two colorimetric coordinates (x,y), and wherein the image data converter is operable to convert the set of image data for display on the at least one viewing device.

In one embodiment, the present system provides a system for displaying a primary color system, including a set of image data including a set of primary color signals, wherein the set of primary color signals corresponds to a set of values in an International Commission on Illumination (CIE) Yxy color space, wherein the set of values in the CIE Yxy color space includes a luminance (Y) and two colorimetric coordinates (x,y), an image data converter, wherein the image data converter includes a digital interface, and wherein the digital interface is operable to encode and decode the set of values in the CIE Yxy color space, and at least one viewing device, wherein processed Yxy data is transported between the encode and the decode, wherein the image data converter is operable to convert the set of image data for display on the at least one viewing device, wherein a learning algorithm is operable to output a visualization from the set of image data, wherein the visualization comprises a plurality of visually distinct colors, and wherein the at least one viewing device is operable to display the visualization.

In another embodiment, the present system provides a system for displaying a primary color system, including a set of image data including a set of primary color signals, wherein the set of primary color signals corresponds to a set of values in an International Commission on Illumination (CIE) Yxy color space, wherein the set of values in the CIE Yxy color space includes a luminance (Y) and two colorimetric coordinates (x,y), at least one imager, at least one processor coupled to at least one memory, a learning algorithm, and an image data converter, wherein the image data converter includes a digital interface, and wherein the digital interface is operable to encode and decode the set of values in the CIE Yxy color space, wherein processed Yxy data is transported between the encode and the decode, wherein the set of image data is operable to be converted for display, wherein the learning algorithm is operable to output a visualization from the set of image data, wherein the visualization comprises a plurality of visually distinct colors, and wherein the visualization is operable to be displayed.

In yet another embodiment, the present system presents a system for displaying a primary color system, including a set of image data including a set of primary color signals, wherein the set of primary color signals corresponds to a set of values in an International Commission on Illumination (CIE) Yxy color space, wherein the set of values in the CIE Yxy color space includes a luminance (Y) and two colorimetric coordinates (x,y), at least one imager, wherein one or more of the at least one imager is operable to provide the set of image data, at least one display device, wherein the imager and the at least one display device are in communication, wherein processed Yxy data is transported between the encode and the decode, wherein the set of image data is operable to be converted for display, wherein an artificial intelligence model is operable to output a visualization from the set of image data, wherein the visualization comprises a plurality of visually distinct colors, and wherein the at least one display device is operable to display the visualization.

These and other aspects of the present invention will become apparent to those skilled in the art after a reading of the following description of the preferred embodiment when considered with the drawings, as they support the claimed invention.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 15A illustrates one embodiment of a 4:2:2 Yxy encode with an NLTF.

FIG. 15B illustrates one embodiment of a 4:2:2 Yxy encode without an NLTF.

FIG. 17A illustrates one embodiment of a 4:4:4 Yxy encode with an NLTF.

FIG. 17B illustrates one embodiment of a 4:4:4 Yxy encode without an NLTF.

FIG. 18A illustrates one embodiment of a 4:4:4 Yxy encode with an NLTF applied to all three channels and linear scaling of x and y.

FIG. 18B illustrates one embodiment of a 4:4:4 Yxy encode without an NLTF and with linear scaling of x and y.

FIG. 24A illustrates one embodiment of a Yxy decode with an inverse non-linear transfer function (NLTF$^{-1}$) applied only to the Y channel.

FIG. 24B illustrates one embodiment of a Yxy decode without an NLTF$^{-1}$ applied to any of the channels.

FIG. 25A illustrates one embodiment of a Yxy decode with an NLTF$^{-1}$ applied to all three channels and rescaling of x and y.

FIG. 25B illustrates one embodiment of a Yxy decode without an NLTF$^{-1}$ applied to any of the channels and with rescaling applied to the x and y channels.

FIG. 37 illustrates one embodiment of modifications to payload ID metadata as applied to SMPTE ST352.

FIG. 38A illustrates one embodiment of modifications to payload ID as applied to SMPTE ST352 and ST292.

FIG. 38B illustrates one embodiment of payload ID as applied to SMPTE ST352 and ST372.

FIG. 38C illustrates one embodiment of payload ID as applied to SMPTE ST352 and ST425.

FIG. 39 illustrates one embodiment of a System 4 Yxy 10-bit 4:2:2 encode as applied to SMPTE ST292.

FIG. 40A illustrates one embodiment of a first link for a System 4 Yxy 10-bit 4:4:4 $YC_BC_R$ encode as applied to SMPTE ST372.

FIG. 41A illustrates one embodiment of a first link for a System 4 Yxy 10-bit 4:4:4 RGB encode as applied to SMPTE ST372.

FIG. 41B illustrates one embodiment of a second link for a System 4 Yxy 10-bit 4:4:4 RGB encode as applied to SMPTE ST372.

FIG. 42A illustrates one embodiment of a first link for a System 4 Yxy 12-bit 4:4:4 $YC_BC_R$ encode as applied to SMPTE ST372.

FIG. 42B illustrates one embodiment of a second link for a System 4 Yxy 12-bit 4:4:4 $YC_BC_R$ encode as applied to SMPTE ST372.

FIG. 43A illustrates one embodiment of a first link for a System 4 12-bit Yxy 4:4:4 RGB encode as applied to SMPTE ST372.

FIG. 43B illustrates one embodiment of a second link for a System 4 Yxy 12-bit 4:4:4 RGB encode as applied to SMPTE ST372.

FIG. 44A illustrates one embodiment of a first data stream for a System 4 Yxy 10-bit 4:2:2 Level A encode as applied to SMPTE ST425.

FIG. 44B illustrates one embodiment of a second data stream for a System 4 Yxy 10-bit 4:2:2 Level A encode as applied to SMPTE ST425.

FIG. 45A illustrates one embodiment of a first data stream for a Yxy System 4 10-bit 4:4:4 Level A encode as applied to SMPTE ST425.

FIG. 46A illustrates one embodiment of a first data stream for a Yxy System 4 12-bit 4:4:4 Level A encode as applied to SMPTE ST425.

FIG. 46B illustrates one embodiment of a second data stream for a Yxy System 4 12-bit 4:4:4 Level A encode as applied to SMPTE ST425.

FIG. 47A illustrates one embodiment of a first data stream for a System 4 Yxy 12-bit 4:2:2 Level A encode as applied to SMPTE ST425.

FIG. 48A illustrates one embodiment of a first data stream for a System 4 Yxy Level B Multiplex Dual Stream (DS) encode as applied to SMPTE ST425.

FIG. 48B illustrates one embodiment of a second data stream for a System 4 Yxy Level B Multiplex Dual Stream (DS) encode as applied to SMPTE ST425.

FIG. 49A illustrates one embodiment of a first data link for a System 4 Yxy 10-bit Level B Multiplex Dual Link (DL) encode as applied to SMPTE ST425.

FIG. 49B illustrates one embodiment of a second data link for a System 4 Yxy 10-bit Level B Multiplex Dual Link (DL) encode as applied to SMPTE ST425.

FIG. 50A illustrates one embodiment of a first data link for a System 4 Yxy 12-bit Level B Multiplex Dual Link (DL) encode as applied to SMPTE ST425.

FIG. 50B illustrates one embodiment of a second data link for a System 4 Yxy 12-bit Level B Multiplex Dual Link (DL) encode as applied to SMPTE ST425.

FIG. 51 is a table illustrating modification of SMPTE ST2036-1 (2014) parameters to include System 4 (e.g., Yxy, Yu'v').

FIG. 52 is a table illustrating modification of CTA 861 Table 6-Colorimetry Transfer Characteristics to include System 4 (e.g., Yxy, Yu'v').

FIG. 53A is a table for Yxy 8-bit 4:2:2 encoding with 4 lanes.

FIG. 53B is a table for Yxy 8-bit 4:2:2 encoding with 2 lanes.

FIG. 53C is a table for Yxy 8-bit 4:2:2 encoding with 1 lane.

FIG. 54A is a table for Yxy 10-bit 4:2:2 encoding with 4 lanes.

FIG. 54B is a table for Yxy 10-bit 4:2:2 encoding with 2 lanes.

FIG. 54C is a table for Yxy 10-bit 4:2:2 encoding with 1 lane.

FIG. 55A is a table for Yxy 12-bit 4:2:2 encoding with 4 lanes.

FIG. 55B is a table for Yxy 12-bit 4:2:2 encoding with 2 lanes.

FIG. 55C is a table for Yxy 12-bit 4:2:2 encoding with 1 lane.

FIG. 56A is a table for Yxy 16-bit 4:2:2 encoding with 4 lanes.

FIG. 56B is a table for Yxy 16-bit 4:2:2 encoding with 2 lanes.

FIG. 56C is a table for Yxy 16-bit 4:2:2 encoding with 1 lane.

FIG. 57A is a table for Yxy 10-bit 4:4:4 encoding with 4 lanes.

FIG. 57B is a table for Yxy 10-bit 4:4:4 encoding with 2 lanes.

FIG. 57C is a table for Yxy 10-bit 4:4:4 encoding with 1 lane.

FIG. 58A is a table for Yxy 12-bit 4:4:4 encoding with 4 lanes.

FIG. 58B is a table for Yxy 12-bit 4:4:4 encoding with 2 lanes.

FIG. 58C is a table for Yxy 12-bit 4:4:4 encoding with 1 lane.

FIG. 59A is a table for Yxy 16-bit 4:4:4 encoding with 4 lanes.

FIG. 59B is a table for Yxy 16-bit 4:4:4 encoding with 2 lanes.

FIG. 59C is a table for Yxy 16-bit 4:4:4 encoding with 1 lane.

FIG. 60 is table with auxiliary video information (AVI) for InfoFrame version 4.

DETAILED DESCRIPTION

Figure 1:
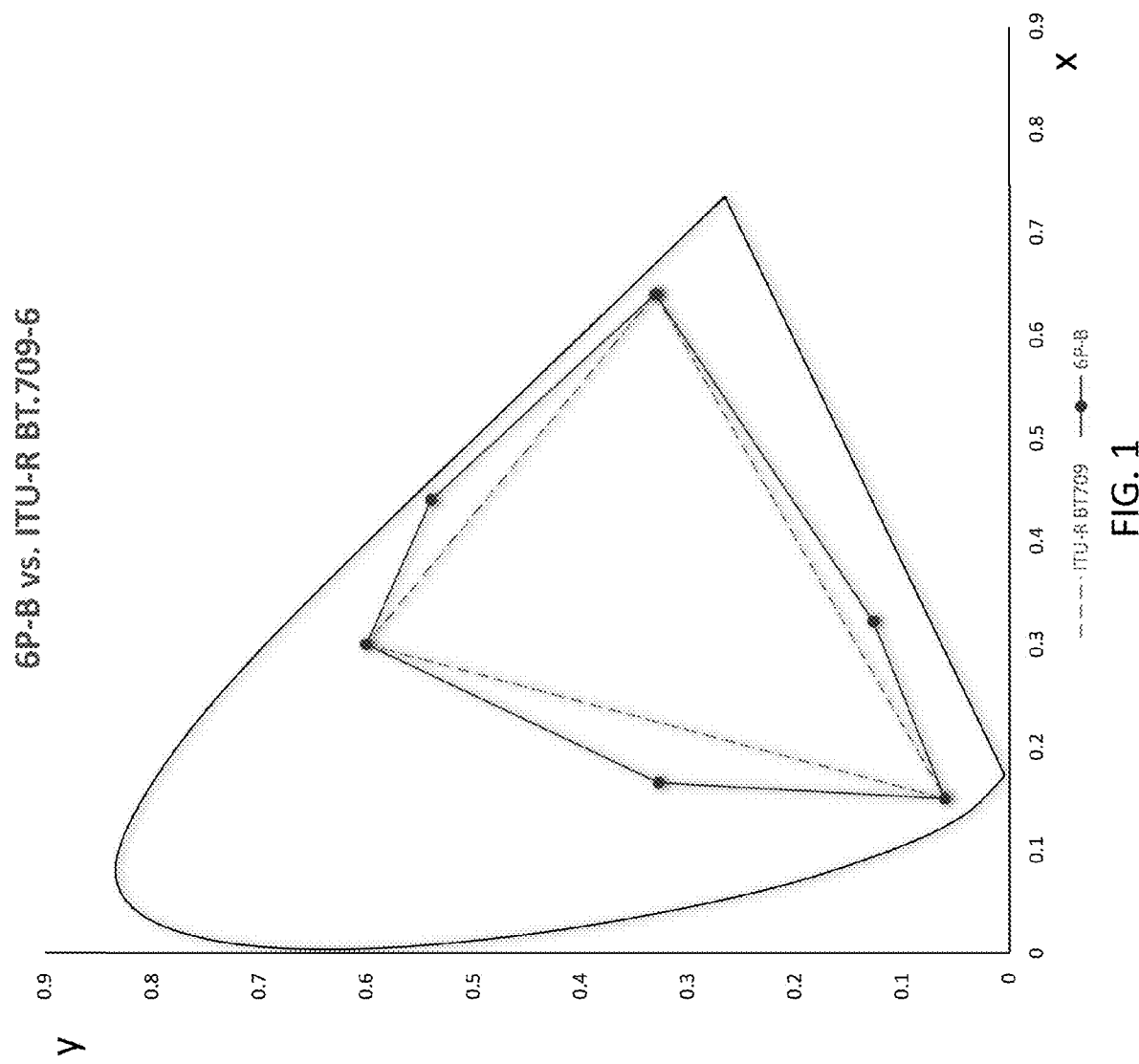
FIG. 1 illustrates one embodiment of a six primary system including a red primary, a green primary, a blue primary, a cyan primary, a magenta primary, and a yellow primary ("6P-B") compared to ITU-R BT.709-6.

The present invention is generally directed to a multi-primary color system.

In one embodiment, the present invention provides a system for displaying a primary color system, including a set of image data including a set of primary color signals, wherein the set of primary color signals corresponds to a set of values in an International Commission on Illumination (CIE) Yxy color space, wherein the set of values in the CIE Yxy color space includes a luminance (Y) and two colorimetric coordinates (x,y), wherein the set of image data includes medical image data, and an image data converter, wherein the image data converter includes a digital interface, and wherein the digital interface is operable to encode and decode the set of values in the CIE Yxy color space, wherein the encode and the decode includes transportation of processed data, wherein the processed data includes a first channel related to the luminance (Y), a second channel related to a first colorimetric coordinate (x) of the two colorimetric coordinates (x,y), and a third channel related to the second colorimetric coordinate (y) of the two colorimetric coordinates (x,y), and wherein the image data converter is operable to convert the set of image data for display on at least one viewing device. In one embodiment, the image data converter is operable to convert the set of values in the CIE Yxy color space to a plurality of color gamuts. In one embodiment, the image data converter includes a look-up table. In one embodiment, the set of image data includes colors outside of an International Telecommunication Union Recommendation (ITU-R) BT.2020 color gamut. In one embodiment, the image data converter is operable to fully sample the processed data on the first channel and subsample the processed data on the second channel and the third channel. In one embodiment, the processed data on the first channel, the second channel, and the third channel are fully sampled. In one embodiment, the encode includes scaling of the two colorimetric coordinates (x,y), thereby creating a first scaled colorimetric coordinate and a second scaled colorimetric coordinate and/or the decode includes rescaling of data related to the first scaled colorimetric coordinate and data related to the second scaled colorimetric coordinate. In one embodiment, the encode includes converting the set of primary color signals to XYZ data and then converting the XYZ data to create the set of values in the CIE Yxy color space and/or the decode includes converting the processed data to XYZ data and then converting the XYZ data to a format operable to display on the at least one viewing device. In one embodiment, the system further includes at least one non-linear function, wherein the at least one non-linear function includes a data range reduction function with a value between about 0.25 and about 0.9 and/or an inverse data range reduction function with a value between about 1.1 and about 4. In one embodiment, the system further includes at least one imager, wherein one or more of the at least one imager is operable to provide the medical image data. In one embodiment, the system is compatible with Digital Imaging Communication in Medicine standards for metadata. In one embodiment, the system further includes at least one processor coupled to at least one memory and at least one learning algorithm for image processing and comparison. In one embodiment, the set of image data further includes hyperspectral data, ultraviolet (UV) data, and/or infrared (IR) data. In one embodiment, the image data converter is operable to create two different three-coordinate format elements, wherein the first three-coordinate format element is Yxy and the second three-coordinate format element includes a first coordinate related to the UV data, a second coordinate related to the IR data, and a third coordinate proportional to an intensity of the UV data and the IR data. In one embodiment, the system further includes at least one chip chart or at least one tele-med-chart with a plurality of colors and/or at least one reference to calibrate the system.

In another embodiment, the present invention provides a system for displaying a primary color system, including a set of image data including a set of primary color signals, wherein the set of primary color signals corresponds to a set of values in an International Commission on Illumination (CIE) Yxy color space, wherein the set of values in the CIE Yxy color space includes a luminance (Y) and two colorimetric coordinates (x,y), wherein the set of image data includes medical image data, at least one imager, wherein one or more of the at least one imager is operable to provide the medical image data, and an image data converter, wherein the image data converter includes a digital interface, and wherein the digital interface is operable to encode and decode the set of values in the CIE Yxy color space, wherein the encode and the decode includes transportation of processed data, wherein the processed data includes a first channel related to the luminance (Y), a second channel related to a first colorimetric coordinate (x) of the two colorimetric coordinates (x,y), and a third channel related to the second colorimetric coordinate (y) of the two colorimetric coordinates (x,y), wherein the one or more of the at least one imager is incorporated into at least one medical device, and wherein the image data converter is operable to convert the set of image data for display on at least one viewing device.

In yet another embodiment, the present invention provides a system for displaying a primary color system including a set of image data including a set of primary color signals, wherein the set of primary color signals corresponds to a set of values in an International Commission on Illumination (CIE) Yxy color space, wherein the set of values in the CIE Yxy color space includes a luminance (Y) and two colorimetric coordinates (x,y), wherein the set of image data includes medical image data, at least one imager, wherein one or more of the at least one imager is operable to provide the medical image data, an image data converter, wherein the image data converter includes a digital interface, and wherein the digital interface is operable to encode and decode the set of values in the CIE Yxy color space, and at least one viewing device, wherein the image data converter and the at least one viewing device are in communication, wherein the encode and the decode includes transportation of processed data, wherein the processed data includes a first channel related to the luminance (Y), a second channel related to a first colorimetric coordinate (x) of the two colorimetric coordinates (x,y), and a third channel related to the second colorimetric coordinate (y) of the two colorimetric coordinates (x,y), and wherein the image data converter is operable to convert the set of image data for display on the at least one viewing device. In one embodiment, the at least one viewing device includes at least four primaries. In one embodiment, the at least one viewing device is operable to display colors outside of an International Telecommunication Union Recommendation (ITU-R) BT.2020 color gamut. In one embodiment, the at least one viewing device includes a headset configured for virtual reality, augmented reality, and/or mixed reality environments.

In one embodiment, the present system provides a system for displaying a primary color system, including a set of image data including a set of primary color signals, wherein the set of primary color signals corresponds to a set of values in an International Commission on Illumination (CIE) Yxy color space, wherein the set of values in the CIE Yxy color space includes a luminance (Y) and two colorimetric coordinates (x,y), an image data converter, wherein the image data converter includes a digital interface, and wherein the digital interface is operable to encode and decode the set of values in the CIE Yxy color space, and at least one viewing device, wherein processed Yxy data is transported between the encode and the decode, wherein the image data converter is operable to convert the set of image data for display on the at least one viewing device, wherein a learning algorithm is operable to output a visualization from the set of image data, wherein the visualization comprises a plurality of visually distinct colors, and wherein the at least one viewing device is operable to display the visualization.

In another embodiment, the present system provides a system for displaying a primary color system, including a set of image data including a set of primary color signals, wherein the set of primary color signals corresponds to a set of values in an International Commission on Illumination (CIE) Yxy color space, wherein the set of values in the CIE Yxy color space includes a luminance (Y) and two colorimetric coordinates (x,y), at least one imager, at least one processor coupled to at least one memory, a learning algorithm, and an image data converter, wherein the image data converter includes a digital interface, and wherein the digital interface is operable to encode and decode the set of values in the CIE Yxy color space, wherein processed Yxy data is transported between the encode and the decode, wherein the set of image data is operable to be converted for display, wherein the learning algorithm is operable to output a visualization from the set of image data, wherein the visualization comprises a plurality of visually distinct colors, and wherein the visualization is operable to be displayed.

In yet another embodiment, the present system presents a system for displaying a primary color system, including a set of image data including a set of primary color signals, wherein the set of primary color signals corresponds to a set of values in an International Commission on Illumination (CIE) Yxy color space, wherein the set of values in the CIE Yxy color space includes a luminance (Y) and two colorimetric coordinates (x,y), at least one imager, wherein one or more of the at least one imager is operable to provide the set of image data, at least one display device, wherein the imager and the at least one display device are in communication, wherein processed Yxy data is transported between the encode and the decode, wherein the set of image data is operable to be converted for display, wherein an artificial intelligence model is operable to output a visualization from the set of image data, wherein the visualization comprises a plurality of visually distinct colors, and wherein the at least one display device is operable to display the visualization.

The present invention relates to color systems. A multitude of color systems are known, but they continue to suffer numerous issues. As imaging technology is moving forward, there has been a significant interest in expanding the range of colors that are replicated on electronic displays. Enhancements to the television system have expanded from the early CCIR 601 standard to ITU-R BT.709-6, to Society of Motion Picture and Television Engineers (SMPTE) RP431-2, and ITU-R BT.2020. Each one has increased the gamut of visible colors by expanding the distance from the reference white point to the position of the Red (R), Green (G), and Blue (B) color primaries (collectively known as "RGB") in chromaticity space. While this approach works, it has several disadvantages. When implemented in content presentation, issues arise due to the technical methods used to expand the gamut of colors seen (typically using a more-narrow emissive spectrum) can result in increased viewer metameric errors and require increased power due to lower illumination source. These issues increase both capital and operational costs.

With the current available technologies, displays are limited in respect to their range of color and light output. There are many misconceptions regarding how viewers interpret the display output technically versus real-world sensations viewed with the human eye. The reason we see more than just the three emitting primary colors is because the eye combines the spectral wavelengths incident on it into the three bands. Humans interpret the radiant energy (spectrum and amplitude) from a display and process it so that an individual color is perceived. The display does not emit a color or a specific wavelength that directly relates to the sensation of color. It simply radiates energy at the same spectrum which humans sense as light and color. It is the observer who interprets this energy as color.

When the CIE 2° standard observer was established in 1931, common understanding of color sensation was that the eye used red, blue, and green cone receptors (James Maxwell & James Forbes 1855). Later with the Munsell vision model (Munsell 1915), Munsell described the vision system to include three separate components: luminance, hue, and saturation. Using RGB emitters or filters, these three primary colors are the components used to produce images on today's modern electronic displays.

There are three primary physical variables that affect sensation of color. These are the spectral distribution of radiant energy as it is absorbed into the retina, the sensitivity of the eye in relation to the intensity of light landing on the retinal pigment epithelium, and the distribution of cones within the retina. The distribution of cones (e.g., L cones, M cones, and S cones) varies considerably from person to person.

Enhancements in brightness have been accomplished through larger backlights or higher efficiency phosphors. Encoding of higher dynamic ranges is addressed using higher range, more perceptually uniform electro-optical transfer functions to support these enhancements to brightness technology, while wider color gamuts are produced by using narrow bandwidth emissions. Narrower bandwidth emitters result in the viewer experiencing higher color saturation. But there can be a disconnect between how saturation is produced and how it is controlled. What is believed to occur when changing saturation is that increasing color values of a color primary represents an increase to saturation. This is not true, as changing saturation requires the variance of a color primary spectral output as parametric. There are no variable spectrum displays available to date as the technology to do so has not been commercially developed, nor has the new infrastructure required to support this been discussed.

Instead, the method that a display changes for viewer color sensation is by changing color luminance. As data values increase, the color primary gets brighter. Changes to color saturation are accomplished by varying the brightness of all three primaries and taking advantage of the dominant color theory.

Expanding color primaries beyond RGB has been discussed before. There have been numerous designs of multi-primary displays. For example, SHARP has attempted this with their four-color QUATTRON TV systems by adding a yellow color primary and developing an algorithm to drive it. Another four primary color display was proposed by Matthew Brennesholtz which included an additional cyan primary, and a six primary display was described by Yan Xiong, Fei Deng, Shan Xu, and Sufang Gao of the School of Physics and Optoelectric Engineering at the Yangtze University Jingzhou China. In addition, AU OPTRONICS has developed a five primary display technology. SONY has also recently disclosed a camera design featuring RGBCMY (red, green, blue, cyan, magenta, and yellow) and RGBCMYW (red, green, blue cyan, magenta, yellow, and white) sensors.

Actual working displays have been shown publicly as far back as the late 1990's, including samples from Tokyo Polytechnic University, Nagoya City University, and Genoa Technologies. However, all of these systems are exclusive to their displays, and any additional color primary information is limited to the display's internal processing.

Additionally, the Visual Arts System for Archiving and Retrieval of Images (VASARI) project developed a colorimetric scanner system for direct digital imaging of paintings. The system provides more accurate coloring than conventional film, allowing it to replace film photography. Despite the project beginning in 1989, technical developments have continued. Additional information is available at https://www.southampton.ac.uk/~km2/projs/vasari/(last accessed Mar. 30, 2020), which is incorporated herein by reference in its entirety.

None of the prior art discloses developing additional color primary information outside of the display. Moreover, the system driving the display is often proprietary to the demonstration. In each of these executions, nothing in the workflow is included to acquire or generate additional color primary information. The development of a multi-primary color system is not complete if the only part of the system that supports the added primaries is within the display itself.

Referring now to the drawings in general, the illustrations are for the purpose of describing one or more preferred embodiments of the invention and are not intended to limit the invention thereto.

Additional details about multi-primary systems are available in U.S. Pat. Nos. 10,607,527; 10,950,160; 10,950,161; 10,950,162; 10,997,896; 11,011,098; 11,017,708; 11,030,934; 11,037,480; 11,037,481; 11,037,482; 11,043,157; 11,049,431; 11,062,638; 11,062,639; 11,069,279; 11,069,280; and 11,100,838 and U.S. Publication Nos. 20200251039, 20210233454, and 20210209990, each of which is incorporated herein by reference in its entirety.

Traditional displays include three primaries: red, green, and blue. The multi-primary systems of the present invention include at least four primaries. The at least four primaries preferably include at least one red primary, at least one green primary, and/or at least one blue primary. In one embodiment, the at least four primaries include a cyan primary, a magenta primary, and/or a yellow primary. In one embodiment, the at least four primaries include at least one white primary.

In one embodiment, the multi-primary system includes six primaries. In one preferred embodiment, the six primaries include a red (R) primary, a green (G) primary, a blue (B) primary, a cyan (C) primary, a magenta (M) primary, and a yellow (Y) primary, often referred to as "RGBCMY". However, the systems and methods of the present invention are not restricted to RGBCMY, and alternative primaries are compatible with the present invention.

6P-B

6P-B is a color set that uses the same RGB values that are defined in the ITU-R BT.709-6 television standard. The gamut includes these RGB primary colors and then adds three more color primaries orthogonal to these based on the white point. The white point used in 6P-B is D65 (ISO 11664-2).

In one embodiment, the red primary has a dominant wavelength of 609 nm, the yellow primary has a dominant wavelength of 571 nm, the green primary has a dominant wavelength of 552 nm, the cyan primary has a dominant wavelength of 491 nm, and the blue primary has a dominant wavelength of 465 nm as shown in Table 1. In one embodiment, the dominant wavelength is approximately (e.g., within ±10%) the value listed in the table below. Alternatively, the dominant wavelength is within ±5% of the value listed in the table below. In yet another embodiment, the dominant wavelength is within ±2% of the value listed in the table below.

TABLE 1

|  | x | y | u' | v' | λ |
|---|---|---|---|---|---|
| W (D65) | 0.3127 | 0.3290 | 0.1978 | 0.4683 |  |
| R | 0.6400 | 0.3300 | 0.4507 | 0.5228 | 609 nm |
| G | 0.3000 | 0.6000 | 0.1250 | 0.5625 | 552 nm |
| B | 0.1500 | 0.0600 | 0.1754 | 0.1578 | 464 nm |
| C | 0.1655 | 0.3270 | 0.1041 | 0.4463 | 491 nm |
| M | 0.3221 | 0.1266 | 0.3325 | 0.2940 |  |
| Y | 0.4400 | 0.5395 | 0.2047 | 0.5649 | 571 nm |

FIG. 1 illustrates 6P-B compared to ITU-R BT.709-6.

6P-C

6P-C is based on the same RGB primaries defined in SMPTE RP431-2 projection recommendation. Each gamut includes these RGB primary colors and then adds three more color primaries orthogonal to these based on the white point. The white point used in 6P-B is D65 (ISO 11664-2). Two versions of 6P-C are used. One is optimized for a D60 white point (SMPTE ST2065-1), and the other is optimized for a D65 white point. Additional information about white points is available in ISO 11664-2:2007 "Colorimetry—Part 2: CIE standard illuminants" published in 2007 and "ST 2065-1: 2012-SMPTE Standard-Academy Color Encoding Specification (ACES)," in ST 2065-1:2012, pp. 1-23, 17 Apr. 2012, doi: 10.5594/SMPTE.ST2065-1.2012, each of which is incorporated herein by reference in its entirety.

In one embodiment, the red primary has a dominant wavelength of 615 nm, the yellow primary has a dominant wavelength of 570 nm, the green primary has a dominant wavelength of 545 nm, the cyan primary has a dominant wavelength of 493 nm, and the blue primary has a dominant wavelength of 465 nm as shown in Table 2. In one embodiment, the dominant wavelength is approximately (e.g., within ±10%) the value listed in the table below. Alternatively, the dominant wavelength is within ±5% of the value listed in the table below. In yet another embodiment, the dominant wavelength is within ±2% of the value listed in the table below.

TABLE 2

|   | x | y | u' | v' | λ |
|---|---|---|---|---|---|
| W (D60) | 0.3217 | 0.3377 | 0.2008 | 0.4742 | |
| R | 0.6800 | 0.3200 | 0.4964 | 0.5256 | 615 nm |
| G | 0.2650 | 0.6900 | 0.0980 | 0.5777 | 545 nm |
| B | 0.1500 | 0.0600 | 0.1754 | 0.1579 | 465 nm |
| C | 0.1627 | 0.3419 | 0.0960 | 0.4540 | 493 nm |
| M | 0.3523 | 0.1423 | 0.3520 | 0.3200 | |
| Y | 0.4502 | 0.5472 | 0.2078 | 0.5683 | 570 nm |

Figure 2:
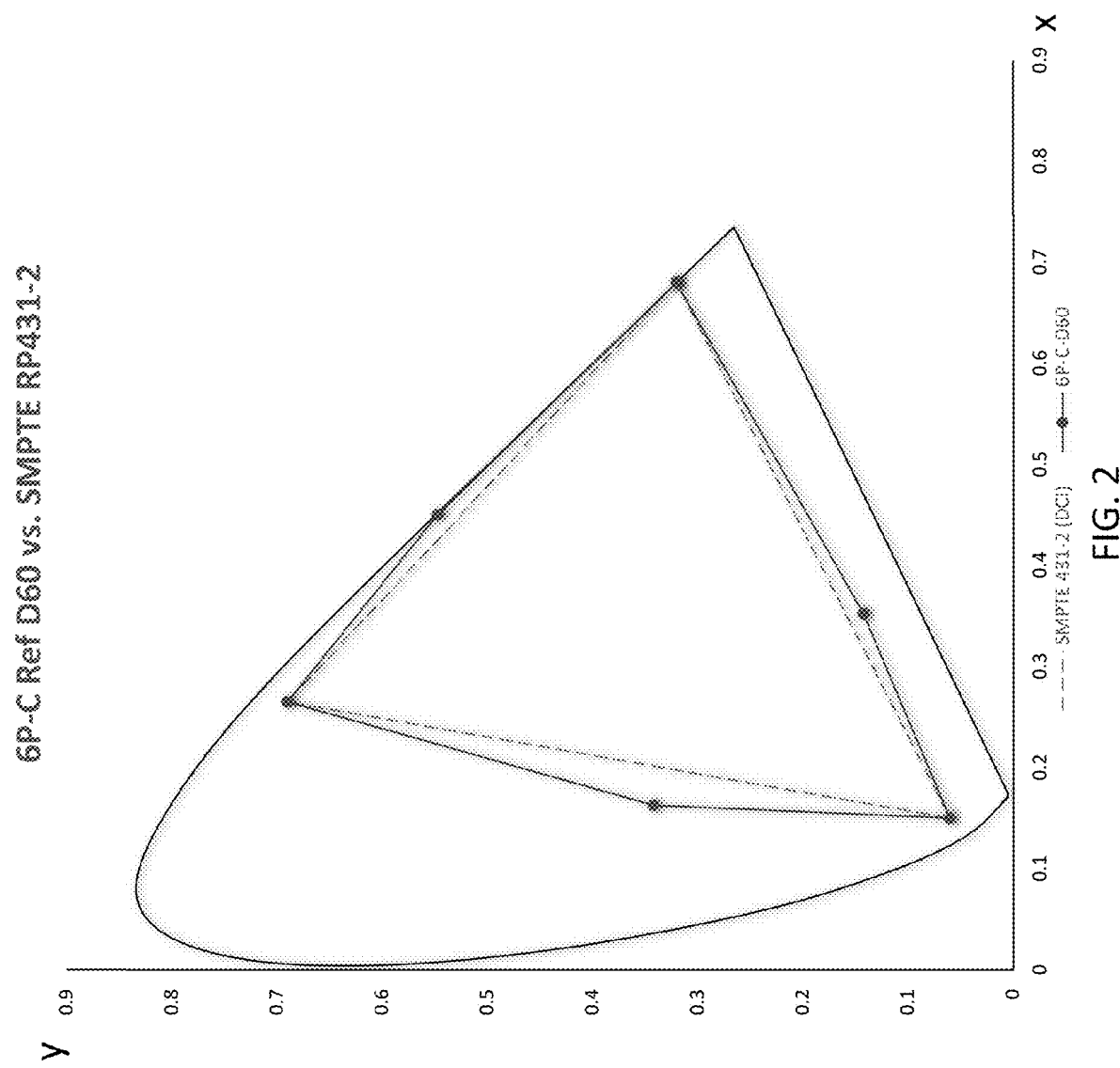
FIG. 2 illustrates another embodiment of a six primary system including a red primary, a green primary, a blue primary, a cyan primary, a magenta primary, and a yellow primary ("6P-C") compared to Society of Motion Picture and Television Engineers (SMPTE) RP431-2 for a D60 white point.

FIG. 2 illustrates 6P-C compared to SMPTE RP431-2 for a D60 white point.

In one embodiment, the red primary has a dominant wavelength of 615 nm, the yellow primary has a dominant wavelength of 570 nm, the green primary has a dominant wavelength of 545 nm, the cyan primary has a dominant wavelength of 423 nm, and the blue primary has a dominant wavelength of 465 nm as shown in Table 3. In one embodiment, the dominant wavelength is approximately (e.g., within ±10%) the value listed in the table below. Alternatively, the dominant wavelength is within ±5% of the value listed in the table below. In yet another embodiment, the dominant wavelength is within ±2% of the value listed in the table below.

TABLE 3

|   | x | y | u' | v' | λ |
|---|---|---|---|---|---|
| W (D65) | 0.3127 | 0.3290 | 0.1978 | 0.4683 | |
| R | 0.6800 | 0.3200 | 0.4964 | 0.5256 | 615 nm |
| G | 0.2650 | 0.6900 | 0.0980 | 0.5777 | 545 nm |
| B | 0.1500 | 0.0600 | 0.1754 | 0.1579 | 465 nm |
| C | 0.1617 | 0.3327 | 0.0970 | 0.4490 | 492 nm |
| M | 0.3383 | 0.1372 | 0.3410 | 0.3110 | |
| Y | 0.4470 | 0.5513 | 0.2050 | 0.5689 | 570 nm |

Figure 3:
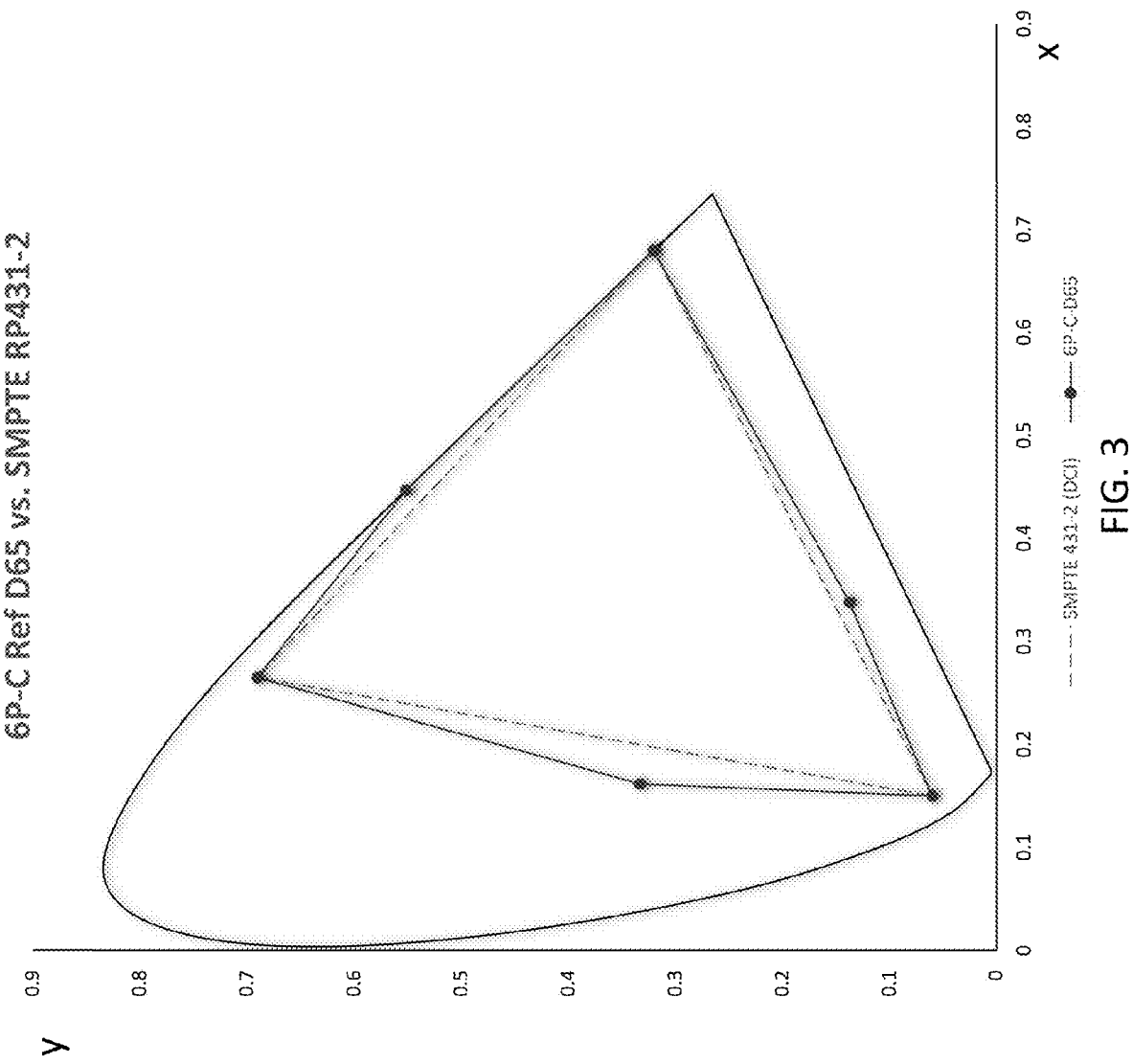
FIG. 3 illustrates yet another embodiment of a six primary system including a red primary, a green primary, a blue primary, a cyan primary, a magenta primary, and a yellow primary ("6P-C") compared to SMPTE RP431-2 for a D65 white point.

FIG. 3 illustrates 6P-C compared to SMPTE RP431-2 for a D65 white point.

Super 6P

Figure 4:
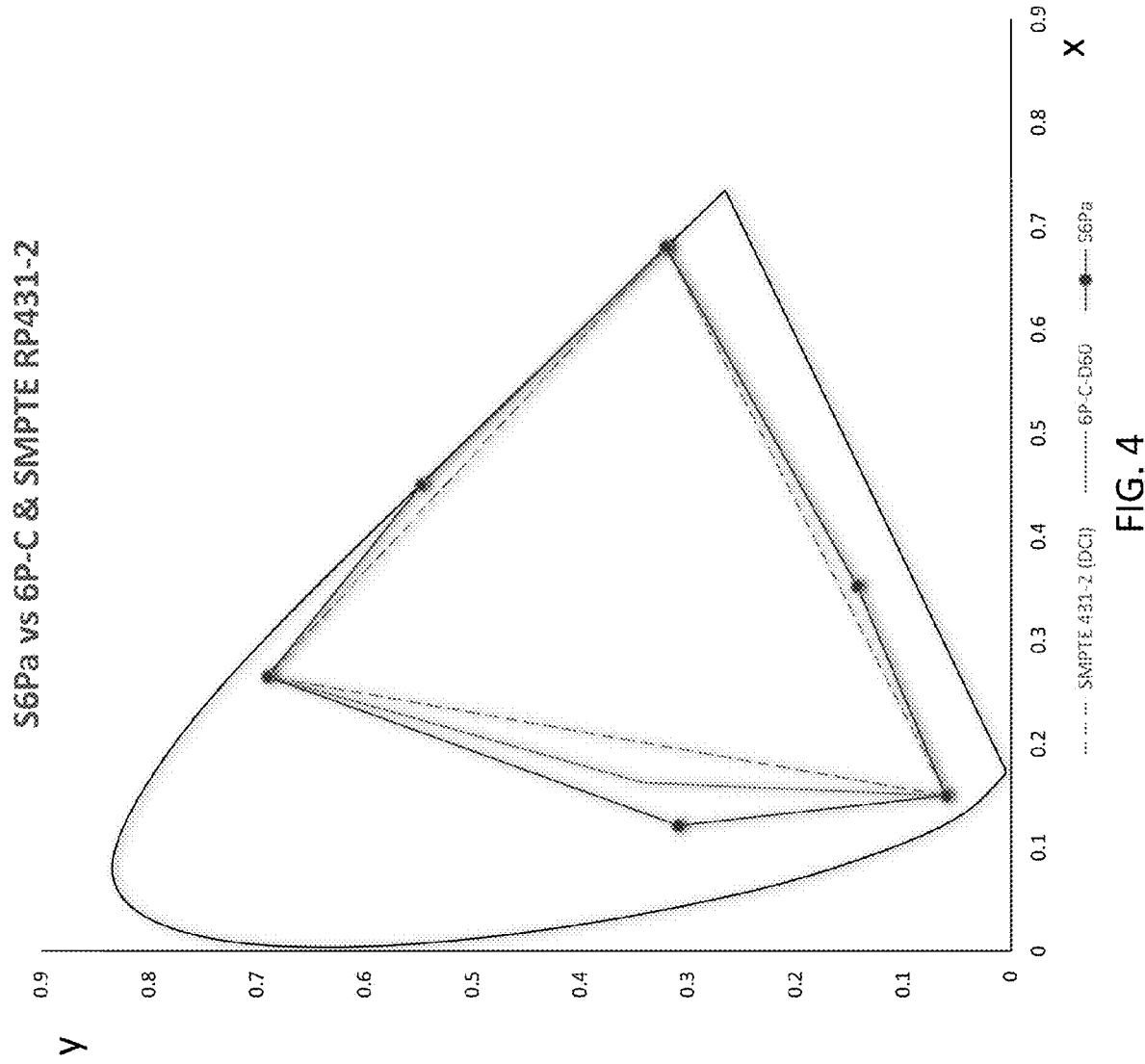
FIG. 4 illustrates Super 6Pa compared to 6P-C.

One of the advantages of ITU-R BT.2020 is that it is operable to include all of the Pointer colors and that increasing primary saturation in a six-color primary design is also operable to do this. Pointer is described in "The Gamut of Real Surface Colors", M. R. Pointer, Published in Colour Research and Application Volume #5, Issue #3 (1980), which is incorporated herein by reference in its entirety. However, extending the 6P gamut beyond SMPTE RP431-2 ("6P-C") adds two problems. The first problem is the requirement to narrow the spectrum of the extended primaries. The second problem is the complexity of designing a backwards compatible system using color primaries that are not related to current standards. But in some cases, there is a need to extend the gamut beyond 6P-C and avoid these problems. If the goal is to encompass Pointer's data set, then it is possible to keep most of the 6P-C system and only change the cyan color primary position. In one embodiment, the cyan color primary position is located so that the gamut edge encompasses all of Pointer's data set. In another embodiment, the cyan color primary position is a location that limits maximum saturation. With 6P-C, cyan is positioned as u'=0.096, v'=0.454. In one embodiment of Super 6P, cyan is moved to u'=0.075, v'=0.430 ("Super 6Pa" (S6Pa)). Advantageously, this creates a new gamut that covers Pointer's data set almost in its entirety. FIG. 4 illustrates Super 6Pa compared to 6P-C.

Table 4 is a table of values for Super 6Pa. The definition of x,y are described in ISO 11664-3: 2012/CIE S 014 Part 3, which is incorporated herein by reference in its entirety. The definition of u', v' are described in ISO 11664-5:2016/CIE S 014 Part 5, which is incorporated herein by reference in its entirety. λ defines each color primary as dominant color wavelength for RGB and complementary wavelengths CMY.

TABLE 4

|   | x | y | u' | v' | λ |
|---|---|---|---|---|---|
| W (D60) | 0.3217 | 0.3377 | 0.2008 | 0.4742 | |
| W (D65) | 0.3127 | 0.3290 | 0.1978 | 0.4683 | |
| R | 0.6800 | 0.3200 | 0.4964 | 0.5256 | 615 nm |
| G | 0.2650 | 0.6900 | 0.0980 | 0.5777 | 545 nm |
| B | 0.1500 | 0.0600 | 0.1754 | 0.1579 | 465 nm |
| C | 0.1211 | 0.3088 | 0.0750 | 0.4300 | 490 nm |
| M | 0.3523 | 0.1423 | 0.3520 | 0.3200 | |
| Y | 0.4502 | 0.5472 | 0.2078 | 0.5683 | 570 nm |

Figure 5:
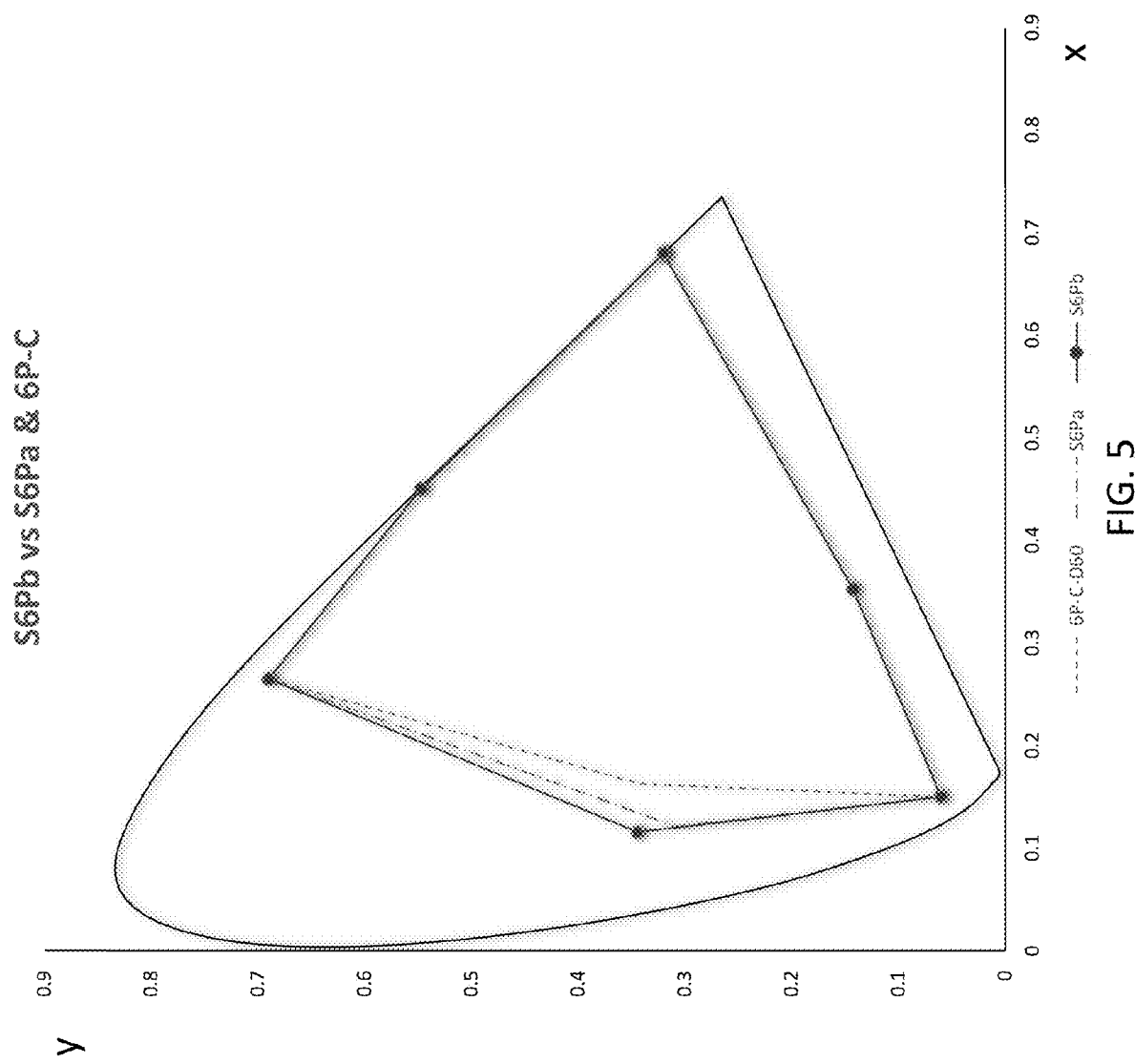
FIG. 5 illustrates Super 6Pb compared to Super 6Pa and 6P-C.

In an alternative embodiment, the saturation is expanded on the same hue angle as 6P-C as shown in FIG. 5. Advantageously, this makes backward compatibility less complicated. However, this requires much more saturation (i.e., narrower spectra). In another embodiment of Super 6P, cyan is moved to u'=0.067, v'=0.449 ("Super 6Pb" (S6Pb)). Additionally, FIG. 5 illustrates Super 6Pb compared to Super 6Pa and 6P-C.

Table 5 is a table of values for Super 6Pb. The definition of x,y are described in ISO 11664-3:2012/CIE S 014 Part 3 published in 2012, which is incorporated herein by reference in its entirety. The definition of u', v' are described in ISO 11664-5:2016/CIE S 014 Part 5 published in 2016, which is incorporated herein by reference in its entirety. λ defines each color primary as dominant color wavelength for RGB and complementary wavelengths CMY.

TABLE 5

|   | x | y | u' | v' | λ |
|---|---|---|---|---|---|
| W (ACES D60) | 0.32168 | 0.33767 | 0.2008 | 0.4742 | |
| W (D65) | 0.3127 | 0.3290 | 0.1978 | 0.4683 | |
| R | 0.6800 | 0.3200 | 0.4964 | 0.5256 | 615 nm |

TABLE 5-continued

| | x | y | u' | v' | λ |
|---|---|---|---|---|---|
| G | 0.2650 | 0.6900 | 0.0980 | 0.5777 | 545 nm |
| B | 0.1500 | 0.0600 | 0.1754 | 0.1579 | 465 nm |
| C | 0.1156 | 0.3442 | 0.0670 | 0.4490 | 493 nm |
| M | 0.3523 | 0.1423 | 0.3520 | 0.3200 | |
| Y | 0.4502 | 0.5472 | 0.2078 | 0.5683 | 570 nm |

In a preferred embodiment, a matrix is created from XYZ values of each of the primaries. As the XYZ values of the primaries change, the matrix changes. Additional details about the matrix are described below.

Formatting and Transportation of Multi-Primary Signals

The present invention includes three different methods to format video for transport: System 1, System 2, and System 3. System 1 is comprised of an encode and decode system, which is operable to be divided into base encoder and digitation, image data stacking, mapping into the standard data transport, readout, unstack, and finally image decoding. In one embodiment, the basic method of this system is to combine opposing color primaries within the three standard transport channels and identify them by their code value.

System 2 uses a sequential method where three color primaries are passed to the transport format as full bit level image data and inserted as normal. The three additional channels are delayed by one pixel and then placed into the transport instead of the first colors. This is useful in situations where quantizing artifacts is critical to image performance. In one embodiment, this system is comprised of the six primaries (e.g., RGB plus a method to delay the CMY colors for injection), image resolution identification to allow for pixel count synchronization, start of video identification, and RGB Delay.

System 3 utilizes a dual link method where two wires are used. In one embodiment, a first set of three channels (e.g., RGB) are sent to link A and a second set of three channels (e.g., CMY) is sent to link B. Once they arrive at the image destination, they are recombined.

To transport up to six color components (e.g., four, five, or six), System 1, System 2, or System 3 is operable to be used as described. If four color components are used, two of the channels are set to 0. If five color components are used, one of the channels is set to 0. Advantageously, this transportation method works for all primary systems described herein that include up to six color components.

Comparison of Three Systems

Advantageously, System 1 fits within legacy SDI, CTA, and Ethernet transports. Additionally, System 1 has zero latency processing for conversion to an RGB display. However, System 1 is limited to 11-bit words.

System 2 is advantageously operable to transport 6 channels using 16-bit words with no compression. Additionally, System 2 fits within newer SDI, CTA, and Ethernet transport formats. However, System 2 requires double bit rate speed. For example, a 4K image requires a data rate for an 8K RGB image.

In comparison, System 3 is operable to transport up to 6 channels using 16-bit words with compression and at the same data required for a specific resolution. For example, a data rate for an RGB image is the same as for a 6P image using System 3. However, System 3 requires a twin cable connection within the video system.

Nomenclature

In one embodiment, a standard video nomenclature is used to better describe each system.

R describes red data as linear light (e.g., without a non-linear function applied). G describes green data as linear light. B describes blue data as linear light. (describes cyan data as linear light. M describes magenta data as linear light. $Y^c$ and/or Y describe yellow data as linear light.

R' describes red data as non-linear light (e.g., with a non-linear function applied). G' describes green data as non-linear light. B' describes blue data as non-linear light. C' describes cyan data as non-linear light. M' describes magenta data as non-linear light. $Y^{c'}$ and/or Y' describe yellow data as non-linear light.

$Y_6$ describes the luminance sum of RGBCMY data. $Y_{RGB}$ describes a System 2 encode that is the linear luminance sum of the RGB data. $Y_{CMY}$ describes a System 2 encode that is the linear luminance sum of the CMY data.

$C_R$ describes the data value of red after subtracting linear image luminance. $C_B$ describes the data value of blue after subtracting linear image luminance. $C_C$ describes the data value of cyan after subtracting linear image luminance. $C_Y$ describes the data value of yellow after subtracting linear image luminance.

$Y'_{RGB}$ describes a System 2 encode that is the nonlinear luminance sum of the RGB data. $Y'_{CMY}$ describes a System 2 encode that is the nonlinear luminance sum of the CMY data. $-Y$ describes the sum of RGB data subtracted from $Y_6$.

$C'_R$ describes the data value of red after subtracting nonlinear image luminance. $C'_B$ describes the data value of blue after subtracting nonlinear image luminance. $C'_C$ describes the data value of cyan after subtracting nonlinear image luminance. $C'_Y$ describes the data value of yellow after subtracting nonlinear image luminance.

B+Y describes a System 1 encode that includes either blue or yellow data. G+M describes a System 1 encode that includes either green or magenta data. R+C describes a System 1 encode that includes either green or magenta data.

$C_R+C_C$ describes a System 1 encode that includes either color difference data. $C_B+C_Y$ describes a System 1 encode that includes either color difference data.

4:4:4 describes full bandwidth sampling of a color in an RGB system. 4:4:4:4:4:4 describes full sampling of a color in an RGBCMY system. 4:2:2 describes an encode where a full bandwidth luminance channel (Y) is used to carry image detail and the remaining components are half sampled as a Cb Cr encode. 4:2:2:2:2 describes an encode where a full bandwidth luminance channel (Y) is used to carry image detail and the remaining components are half sampled as a Cb Cr Cy Cc encode. 4:2:0 describes a component system similar to 4:2:2, but where Cr and Cb samples alternate per line. 4:2:0:2:0 describes a component system similar to 4:2:2, but where Cr, Cb, Cy, and Cc samples alternate per line.

Constant luminance is the signal process where luminance (Y) values are calculated in linear light. Non-constant luminance is the signal process where luminance (Y) values are calculated in nonlinear light.

Deriving Color Components

When using a color difference method (4:2:2), several components need specific processing so that they are operable to be used in lower frequency transports. These are derived as:

$$Y'_6 = 0.1063R' + 0.23195Y^{C'} + 0.3576G' + 0.19685C' + 0.0361B' + 0.0712M'$$

$$G'_6 = \left(\frac{1}{0.3576Y}\right) - (0.1063R') -$$

$$(0.0361B') - (0.19685C') - (0.23195Y^{C'}) - (0.0712M')$$

$$-Y' = Y'_6 - (C' + Y^{C'} + M')$$

$$C'_R = \frac{R' - Y'_6}{1.7874} \quad C'_B = \frac{B' - Y'_6}{1.9278} \quad C'_C = \frac{C' - Y'_6}{1.6063} \quad C'_Y = \frac{Y^{C'} - Y'_6}{1.5361}$$

$$R' = \frac{C'_R - Y'_6}{1.7874} \quad B' = \frac{C'_B - Y'_6}{1.9278} \quad C' = \frac{C'_C - Y'_6}{1.6063} \quad Y^{C'} = \frac{C'_Y - Y'_6}{1.5361}$$

The ratios for Cr, Cb, Cc, and Cy are also valid in linear light calculations.

Magenta is operable to be calculated as follows:

$$M' = \frac{B' + R'}{B' \times R'} \quad \text{or} \quad M = \frac{B + R}{B \times R}$$

System 1

In one embodiment, the multi-primary color system is compatible with legacy systems. A backwards-compatible multi-primary color system is defined by a sampling method. In one embodiment, the sampling method is 4:4:4. In one embodiment, the sampling method is 4:2:2. In another embodiment, the sampling method is 4:2:0. In one embodiment of a backwards compatible multi-primary color system, new encode and decode systems are divided into the steps of performing base encoding and digitization, image data stacking, mapping into the standard data transport, readout, unstacking, and image decoding ("System 1"). In one embodiment, System 1 combines opposing color primaries within three standard transport channels and identifies them by their code value. In one embodiment of a backwards-compatible multi-primary color system, the processes are analog processes. In another embodiment of a backwards compatible multi-primary color system, the processes are digital processes.

In one embodiment, the sampling method for a multi-primary color system is a 4:4:4 sampling method. Black and white bits are redefined. In one embodiment, putting black at midlevel within each data word allows the addition of CMY color data.

Figure 6:
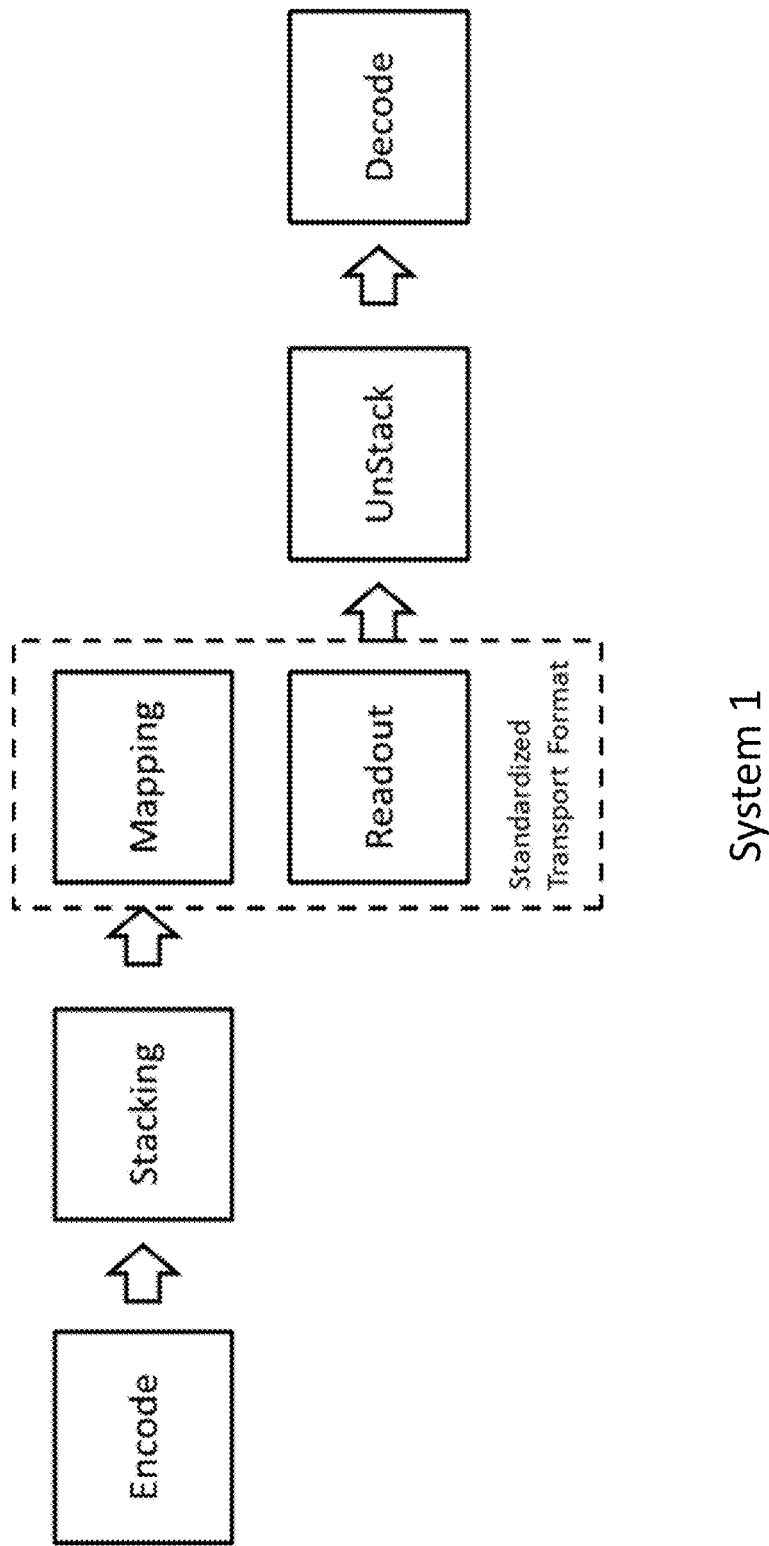
FIG. 6 illustrates an embodiment of an encode and decode system for a multi-primary color system.

FIG. 6 illustrates an embodiment of an encode and decode system for a multi-primary color system. In one embodiment, the multi-primary color encode and decode system is divided into a base encoder and digitation, image data stacking, mapping into the standard data transport, readout, unstack, and finally image decoding ("System 1"). In one embodiment, the method of this system combines opposing color primaries within the three standard transport channels and identifies them by their code value. In one embodiment, the encode and decode for a multi-primary color system are analog-based. In another embodiment, the encode and decode for a multi-primary color system are digital-based. System 1 is designed to be compatible with lower bandwidth systems and allows a maximum of 11 bits per channel and is limited to sending only three channels of up to six primaries at a time. In one embodiment, it does this by using a stacking system where either the color channel or the complementary channel is decoded depending on the bit level of that one channel.

System 2

Figure 7:
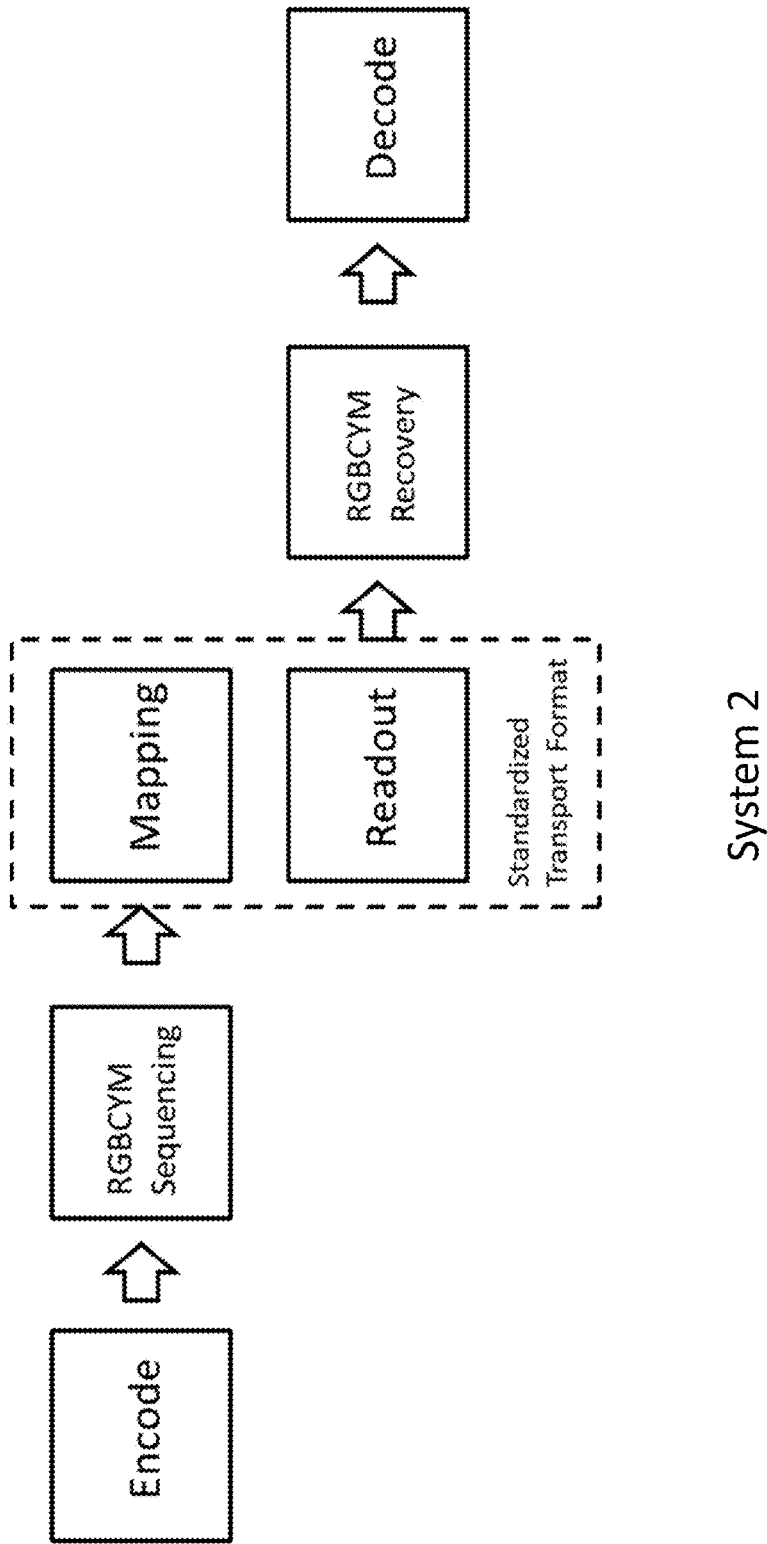
FIG. 7 illustrates a sequential method where three color primaries are passed to the transport format as full bit level image data and inserted as normal ("System 2").

FIG. 7 illustrates a sequential method where three color primaries are passed to the transport format as full bit level image data and inserted as normal ("System 2"). The three additional channels are delayed by one pixel and then placed into the transport instead of the first colors. This method is useful in situations where quantizing artifacts is critical to image performance. In one embodiment, this system is comprised of six primaries (RGBCMY), a method to delay the CMY colors for injection, image resolution identification to all for pixel count synchronization, start of video identification, RGB delay, and for YCCCCC systems, logic to select the dominant color primary. The advantage of System 2 is that full bit level video is operable to be transported, but at double the normal data rate.

System 2A

System 2 sequences on a pixel-to-pixel basis. However, a quadrature method is also possible ("System 2A") that is operable to transport six primaries in stereo or twelve primary image information. Each quadrant of the frame contains three color primary data sets. These are combined in the display. A first set of three primaries is displayed in the upper left quadrant, a second set of three primaries is displayed in the upper right quadrant, a third set of primaries is displayed in the lower left quadrant, and a fourth set of primaries is displayed in lower right quadrant. In one embodiment, the first set of three primaries, the second set of three primaries, the third set of three primaries, and the fourth set of three primaries do not contain any overlapping primaries (i.e., twelve different primaries). Alternatively, the first set of three primaries, the second set of three primaries, the third set of three primaries, and the fourth set of three primaries contain overlapping primaries (i.e., at least one primary is contained in more than one set of three primaries). In one embodiment, the first set of three primaries and the third set of three primaries contain the same primaries and the second set of three primaries and the fourth set of three primaries contain the same primaries.

System 3

Figure 8:
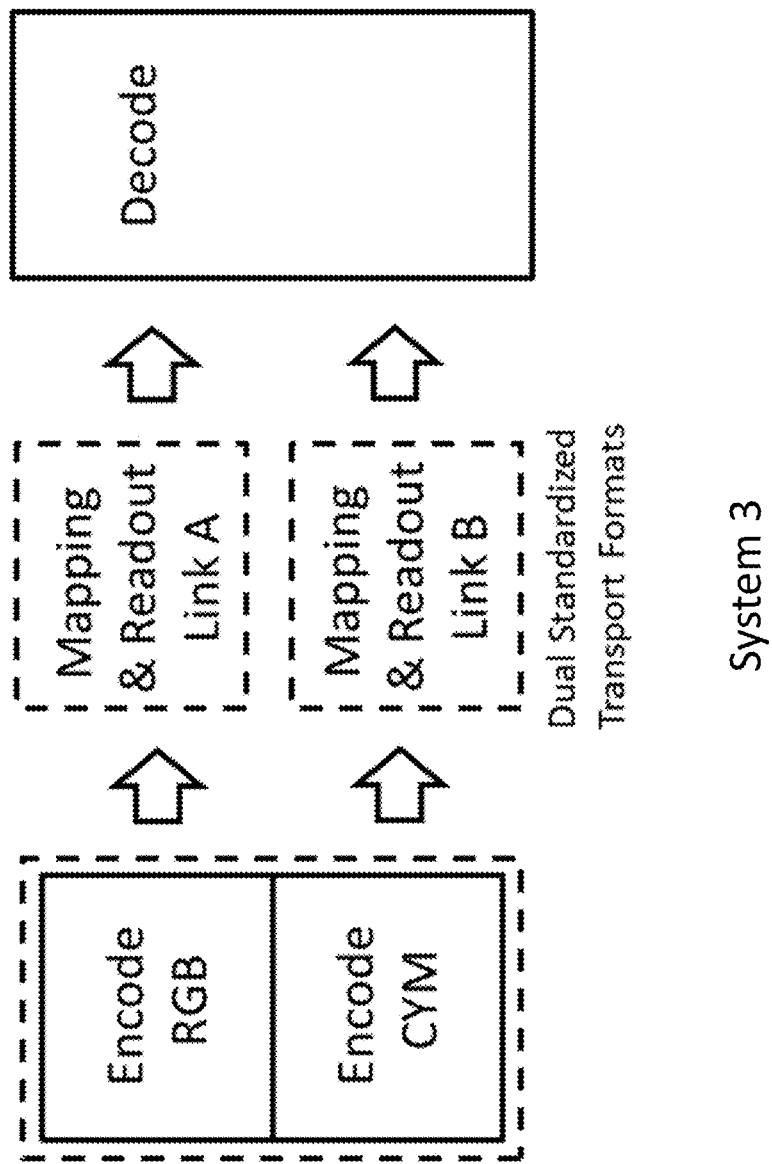
FIG. 8 illustrates one embodiment of a system encode and decode process using a dual link method ("System 3").

FIG. 8 illustrates one embodiment of a system encode and decode process using a dual link method ("System 3"). System 3 utilizes a dual link method where two wires are used. In one embodiment, RGB is sent to link A and CMY is sent to link B. After arriving at the image destination, the two links are recombined. Alternative primaries are compatible with the present invention.

System 3 is simpler and more straight forward than Systems 1 and 2. The advantage with this system is that adoption is simply to format non-RGB primaries (e.g., CMY) on a second link. In one example, for an SDI design, RGB is sent on a standard SDI stream just as it is currently done. There is no modification to the transport and this link is operable to be sent to any RGB display requiring only the compensation for the luminance difference because the non-RGB (e.g., CMY) components are not included. Data for the non-RGB primaries (e.g., CMY data) is transported in the same manner as RGB data. This data is then combined in the display to make up a 6P image. The downside is that the system requires two wires to move one image. This system is operable to work with most any format including SMPTE ST292, 424, 2082, and 2110. It also is operable to work with dual High-Definition Multimedia Interface (HDMI)/CTA connections. In one embodiment, the system includes at least one transfer function (e.g., OETF, EOTF).

Figure 9:
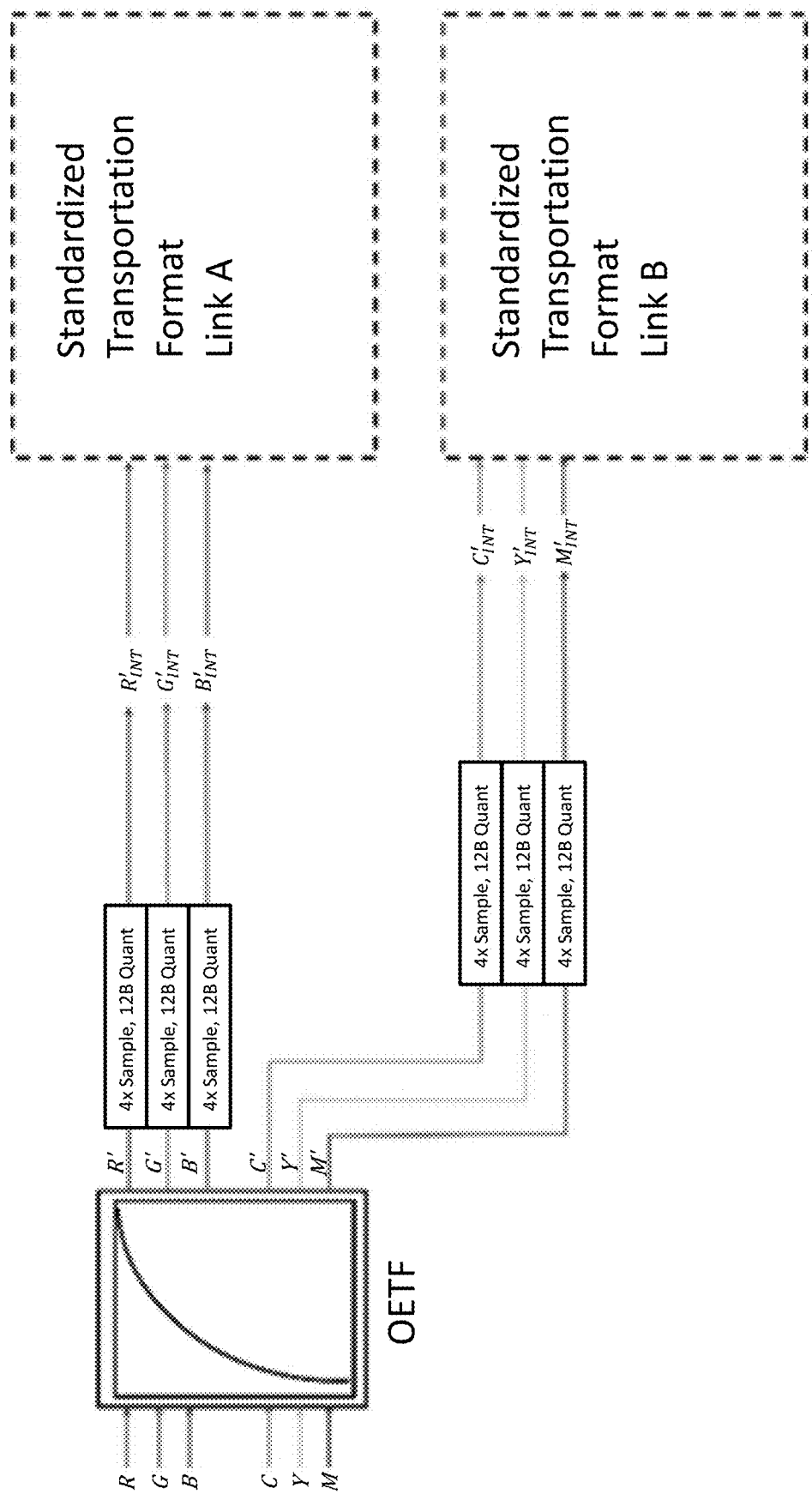
FIG. 9 illustrates one embodiment of an encoding process using a dual link method.

FIG. 9 illustrates one embodiment of an encoding process using a dual link method. Alternative numbers of primaries and alternative primaries are compatible with the present invention.

Figure 10:
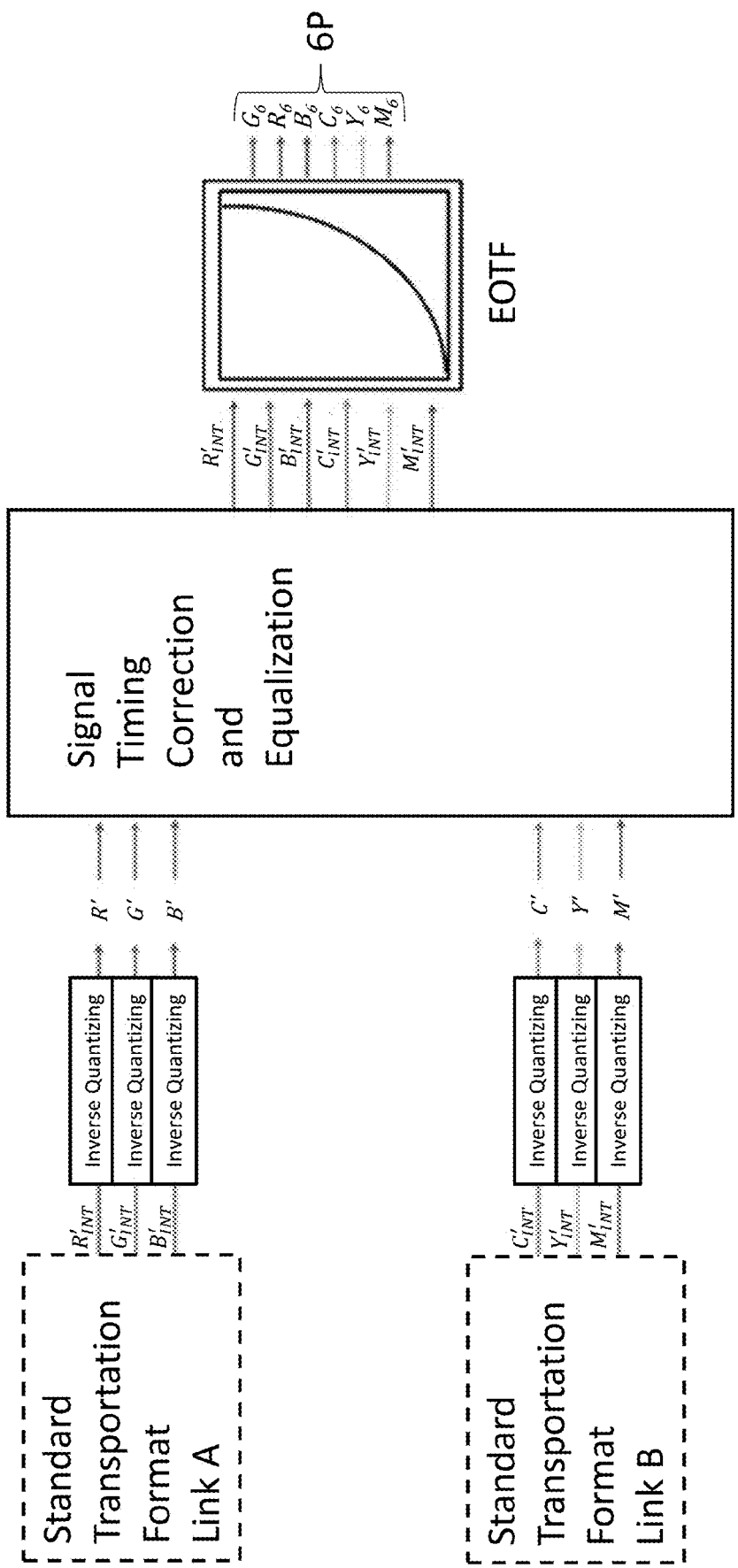
FIG. 10 illustrates one embodiment of a decoding process using a dual link method.

FIG. 10 illustrates one embodiment of a decoding process using a dual link method. Alternative numbers of primaries and alternative primaries are compatible with the present invention.

System 4

Color is generally defined by three component data levels (e.g., RGB, YCbCr). A serial data stream must accommodate a word for each color contributor (e.g., R, G, B). Use of more than three primaries requires accommodations to fit this data based on an RGB concept. This is why System 1, System 2, and System 3 use stacking, sequencing, and/or dual links. Multiple words are required to define a single pixel, which is inefficient because not all values are needed. In one embodiment, System 4 includes, but is not limited to, Yxy, L*a*b*, $IC_TC_P$, YCbCr, YUV, Yu'v', YPbPr, YIQ, OkLab, LMS, Mlm, and/or XYZ. The previously mentioned color spaces are all based on a set of three human spectral response functions.

In a preferred embodiment, color is defined as a colorimetric coordinate. Thus, every color is defined by three words. Serial systems are already based on three color contributors (e.g., RGB, YCbCr). System 4 preferably uses XYZ or Yxy as the three color contributors. System 4 more preferably uses Yxy as the three color contributors. In another preferred embodiment, System 4 uses Yu'v' as the three color contributors. System 4 preferably uses two colorimetric coordinates and a luminance or a luma. In a preferred embodiment, System 4 uses color formats described in CIE and/or ISO colorimetric standards. In a preferred embodiment, System 4 uses color contributors that are independent of a white point and/or a reference white value. Alternatively, System 4 uses color contributors that are not independent of a white point and/or a reference white value (e.g., YCbCr, L*a*b*). In another embodiment, System 4 uses color contributors that require at least one known primary.

Advantageously, Yxy does not require reference to a white point and/or at least one known primary. While YUV and/or L*a*b are plausible solutions, both are based on the CIE 1931 standard observer and would require additional processing with no gain in accuracy or gamut coverage when compared to Yxy. While XYZ is the basis for YUV and L*a*b, both require additional mathematical conversions beyond those required by Yxy. For example, x and y must be calculated before calculating a*b*. Additionally, YUV requires converting back to RGB and then converting to YUV via a known white point and color primaries. The reliance on a known white point also requires additional processing (e.g., chromatic adaptation) if the display white point is different from the encoded white point. Further, the 3×3 matrix used in the conversion of RGB to YUV has negative values that impact the chrominance because the values are centered around 0 and can have positive and negative values, while luminance can only be positive. In comparison, although Yxy is derived from XYZ, it advantageously only deals with positive coefficients. In addition, because luminance is only in Y, as brightness is reduced, chrominance is not affected. However, in YUV, the chrominance gets less contrast as brightness is reduced. Because Y is independent, it does not have to be calculated within xy because these are just data points for color, and not used for calculating luminance.

In yet another embodiment, L*C*h or other non-rectangular coordinate systems (e.g., cylindrical, polar) are compatible with the present invention. In one embodiment, a polar system is defined from Yxy by converting x,y to a hue angle (e.g., θ=arctan (y/x)) and a magnitude vector (e.g., r) that is similar to C* in an L*C*h polar system. However, when converting Yxy to a polar system, θ is restricted from 0 to 90 degrees because x and y are always non-negative. In one embodiment, the θ angle is expanded by applying a transform (e.g., an affine transform) to x, y data wherein the x, y values of the white point of the system (e.g., D65) are subtracted from the x, y data such that the x, y data includes negative values. Thus, θ ranges from 0 to 360 degrees and the polar plot of the Yxy data is operable to occupy more than one quadrant.

XYZ has been used in cinema for over 10 years. The Digital Cinema Initiative (DCI) defined the file format for distribution to theaters using an XYZ format. The reason for adopting XYZ was specifically to allow adaptation of new display technologies of the future. By including every color possible within a 3D space, legacy content would be compatible with any new display methods. This system has been in place since 2005.

While XYZ works very well within the closed infrastructure of digital cinema, it has drawbacks once it is used in other applications (e.g., broadcast, streaming). The reason for this is that many applications have limits on signal bandwidth. Both RGB and XYZ contain luminance in all three channels, which requires a system where each subpixel uses discrete image information. To get around this, a technology is employed to spread color information over several pixel areas. The logic behind this is that (1) image detail is held in the luminance component of the image and (2) resolution of the color areas is operable to be much lower without an objectionable loss of picture quality. Therefore, methods such as $YP_BP_R$, $YC_BC_R$, and $IC_TC_P$ are used to move images. Using color difference encoding with image subsampling allows quality images to be moved at lower signal bandwidths. Thus, RGB or XYZ only utilize a 4:4:4 sampling system, while $YC_BC_R$ is operable be implemented as a 4:4:4, 4:2:2, 4:1:1, or a 4:2:0 sampled system.

There is a long-standing, unmet need for a system operable to describe more than an RGB image. In a preferred embodiment, the present invention advantageously uses Yxy or Yu'v' to describe images outside of an RGB gamut. Further, the Yxy or Yu'v' system is operable to transmit data using more than three primaries (e.g., more than RGB). The Yxy or Yu'v' system advantageously provides for all color possibilities to be presented to the display. Further, the Yxy or Yu'v' system bridges the problems between scene referred and display referred imaging. In an end-to-end system, with a defined white point and EOTF, image data from a camera or graphics generator must conform to the defined display. With the advent of new displays and the use of High Dynamic Range displays, this often requires that the source image data (e.g., scene referred) be re-authored for the particular display (e.g., display referred). A scene-referred workflow refers to manipulating an image prior to its transformation from camera color space to display color space. The ease with which XYZ or ACES 0 are operable to be used to color time, then move to Yxy or Yu'v' to meet the display requirements, allows for a smoother approach to the display not losing any of the color values and keeping the color values as positive values. This is an advantage of Yxy or Yu'v', even if an image is only manipulated after it has been transformed from camera color space to display color space as displayed referred imaging. The Yxy or Yu'v' system is agnostic to both the camera data and the display characteristics, thus simplifying the distribution of electronic images. The Yxy or Yu'v' system of the present invention additionally does not increase data payloads and is operable to be substituted into any RGB file or transport system. Additionally, xy or u'v' information is operable to be subsampled, allowing for 4:2:2, 4:1:1, and 4:2:0 packaging. The present invention also does not require specific media definitions to address limits in a display gamut. Displays with different color primaries (e.g., multi-primary display) are operable to display the same image if the color falls within the limits of that display using the Yxy or Yu'v' system of the present invention. The Yxy or Yu'v' system also allows for the addition of more primaries to fill the visual spectrum, reducing metameric errors. Color fidelity is operable to extend beyond the prior art R+G+B=W model. Displays with any number of color primaries and various white points are operable to benefit from the use of a Yxy or Yu'v' approach to define one media source encode for all displays. Conversion from wide gamut cameras to multi-primary displays is operable to be accomplished using a multiple triad conversion method, which is operable to reside in the display, thereby simplifying transmission of image data.

Out of gamut information is operable to be managed by the individual display, not by the media definitions. Luminance is described only in one channel (Y), and because xy or u'v' do not contain any luminance information, a change in Y is independent of hue or chroma, making conversions between SDR and HDR simpler. Any camera gamut is operable to be coded into a Yxy or Yu'v' encode, and only minor modifications are required to implement a Yxy or Yu'v' system. Conversion from Yxy or Yu'v' to RGB is simple, with minimal latency processing and is completely compatible with any legacy RGB system.

There is also a long-standing, unmet need for a system that replaces optically-based gamma functions with a code efficient non-linearity method (e.g., data range reduction (DRR)). DRR is operable to optimize data efficiency and simplify image display. Further, DRR is not media or display specific. By using a data efficient non-linearity instead of a representation of an optical gamma, larger data words (e.g., 16-bit float) are operable to be preserved as 12-bit, 10-bit, or 8-bit integer data words.

As previously described, the addition of primaries is simplified by the Yxy or Yu'v' process. Further, the brightness of the display is advantageously operable to be increased by adding more primaries. When brightness is delivered in a range from 0 to 1, the image brightness is operable to be scaled to any desired display brightness using DRR.

XYZ needs 16-bit float and 32-bit float encode or a minimum of 12 bits for gamma or log encoded images for better quality. Transport of XYZ must be accomplished using a 4:4:4 sample system. Less than a 4:4:4 sample system causes loss of image detail because Y is used as a coordinate along with X and Z and carries color information, not a value. Further, X and Z are not orthogonal to Y and, therefore, also include luminance information. Advantageously, converting to Yxy or Yu'v' concentrates the luminance in Y only, leaving two independent and pure chromaticity values. In a preferred embodiment, X, Y, and Z are used to calculate x and y. Alternatively, X, Y, and Z are used to calculate u' and v'.

However, if Y or an equivalent component is used as a luminance value with two independent colorimetric coordinates (e.g., x and y, u' and v', u and v, etc.) used to describe color, then a system using subsampling is possible because of differing visual sensitivity to color and luminance. In one embodiment, I or L* components are used instead of Y. In one embodiment, I and/or L* data is created from XYZ via a matrix conversion to LMS values. In one embodiment, L* has a non-linear form that uses a power function of ⅓. In one embodiment, I has a non-linear curve applied (e.g., PQ, HLG). For example, and not limitation, in the case of ICtCp, in one embodiment, I has a power function of 0.43 applied (e.g., in the case of ITP). The system is operable to use any two independent colorimetric coordinates with similar properties to x and y, u' and v', and/or u and v. In a preferred embodiment, the two independent colorimetric coordinates are x and y and the system is a Yxy system. In another preferred embodiment, the two colorimetric coordinates are u' and v' and the system is a Yu'v' system. Advantageously, the two independent colorimetric coordinates (e.g., x and y, u' and v') are independent of a white point. Further, this reduces the complexity of the system when compared to XYZ, which includes a luminance value for all three channels (i.e., X, Y, and Z). Further, this also provides an advantage for subsampling (e.g., 4:2:2, 4:2:0 and 4:1:1). In one embodiment, other systems (e.g., $IC_TC_P$ and L*a*b*) require a white point in calculations. However, a conversion matrix using the white point of [1,1,1] is operable to be used for $IC_TC_P$ and L*a*b* which would remove the white point reference. The white point reference is operable to then be recaptured because it is the white point of [1,1,1] in XYZ space. In a preferred embodiment, the image data includes a reference to at least one white point.

Current technology uses components derived from the legacy National Television System Committee (NTSC). Encoding described in SMPTE, International Telecommunication Union (ITU), and CTA standards includes methods using subsampling as 4:2:2, 4:2:0, and 4:1:1. Advantageously, this allows for color transportation of more than three primaries, including, but not limited to, at least four primaries, at least five primaries, at least six primaries, at least seven primaries, at least eight primaries, at least nine primaries, at least ten primaries, at least eleven primaries, and/or at least twelve primaries (e.g., through a SMPTE ST292 or an HDMI 1.2 transport). In one embodiment, color transportation of more than three primaries occurs through SMPTE defined Serial Digital Interfaces (SDI), HDMI, or Display Port digital display interfaces. In one embodiment, color transportation of more than three primaries occurs through an imaging serial data stream format.

System 1, System 2, and System 3 use a YCbCr expansion to transport six color primary data sets, and the same transport (e.g., a YCbCr expansion) is operable to accommodate the image information as Yxy where Y is the luminance information and x,y describe CIE 1931 color coordinates in the half sample segments of the data stream (e.g., 4:2:2). The same transport (e.g., a YCbCr expansion) is also operable to accommodate the image information as Yu'v', where Y is the luminance information and u' and v' describe CIE 1976 color coordinates in the half sample segments of the data stream (e.g., 4:2:2). Alternatively, x,y or u',v' are fully sampled (e.g., 4:4:4). In yet another embodiment, the sampling rate is 4:2:0 or 4:1:1. In still another embodiment, the same transport is operable to accommodate the information as luminance and colorimetric coordinates other than x,y (e.g., u',v'). In one embodiment, the same transport is operable to accommodate data set using one channel of luminance data and two channels of colorimetric data. Alternatively, the same transport is operable to accommodate the image information as Yu'v' with full sampling (e.g., 4:4:4) or partial sampling (e.g., 4:2:2, 4:2:0, 4:1:1). In one embodiment, the same transport is used with full sampling (e.g., XYZ).

Advantageously, there is no need to add more channels, nor is there any need to separate the luminance information from the color components. Further, for example, x,y have no reference to any primaries because x,y are explicit colorimetric positions. In the Yxy space, x and y are chromaticity coordinates such that x and y are operable to be used to define a gamut of visible color. Similarly, in the Yu'v' space, u' and v' are explicit colorimetric positions. It is possible to define a gamut of visible color in other formats (e.g., L*a*b*, $IC_TC_P$, YCbCr), but it is not always trivial. For example, while L*a*b* and $IC_TC_P$ are colorimetric and are operable to describe any visible color, YCbCr is constrained to the available colors within the RGB primary color triad. Further, $IC_TC_P$ requires a gamut limitation/description before it is operable to encode color information.

To determine if a color is visible in Yxy space, it must be determined if the sum of x and y is greater than or equal to zero. If not, the color is not defined. If the x,y point is within the CIE x,y locus (CIE horseshoe), the color is visible. If not, the color is not visible. Similarly, if a u', v' point is within the CIE u', v' locus (CIE horseshoe), the color is visible. The Yxy chromaticity diagram is non-linear, such that there is not a vector of unit magnitude operable to represent the difference between two chromaticities that is uniformly visible. Advantageously, Yu'v' reduces non-uniformity present in Yxy systems and is perceptually more uniform than Yxy.

The Y value plays a role especially in a display. In one embodiment, the display is operable to reproduce an x,y color within a certain range of Y values, wherein the range is a function of the primaries. In another embodiment, the display is operable to reproduce a u',v' color within a certain range of Y values, wherein the range is a function of the primaries. Another advantage is that an image is operable to be sent as linear data (e.g., without a non-linear function applied) with a non-linear function (e.g., electro-optical transfer function (EOTF)) added after the image is received, rather than requiring a non-linear function (e.g., OETF) applied to the signal. This allows for a much simpler encode and decode system. In one embodiment, only Y, L*, or I are altered by a non-linear function. Alternatively, Y, L*, or I are sent linearly (e.g., without a non-linear function applied). In a preferred embodiment, a non-linear function is applied to all three channels (e.g., Yxy, Yu'v'). Advantageously, applying the non-linear function to all three channels provides data compression.

Figure 11:
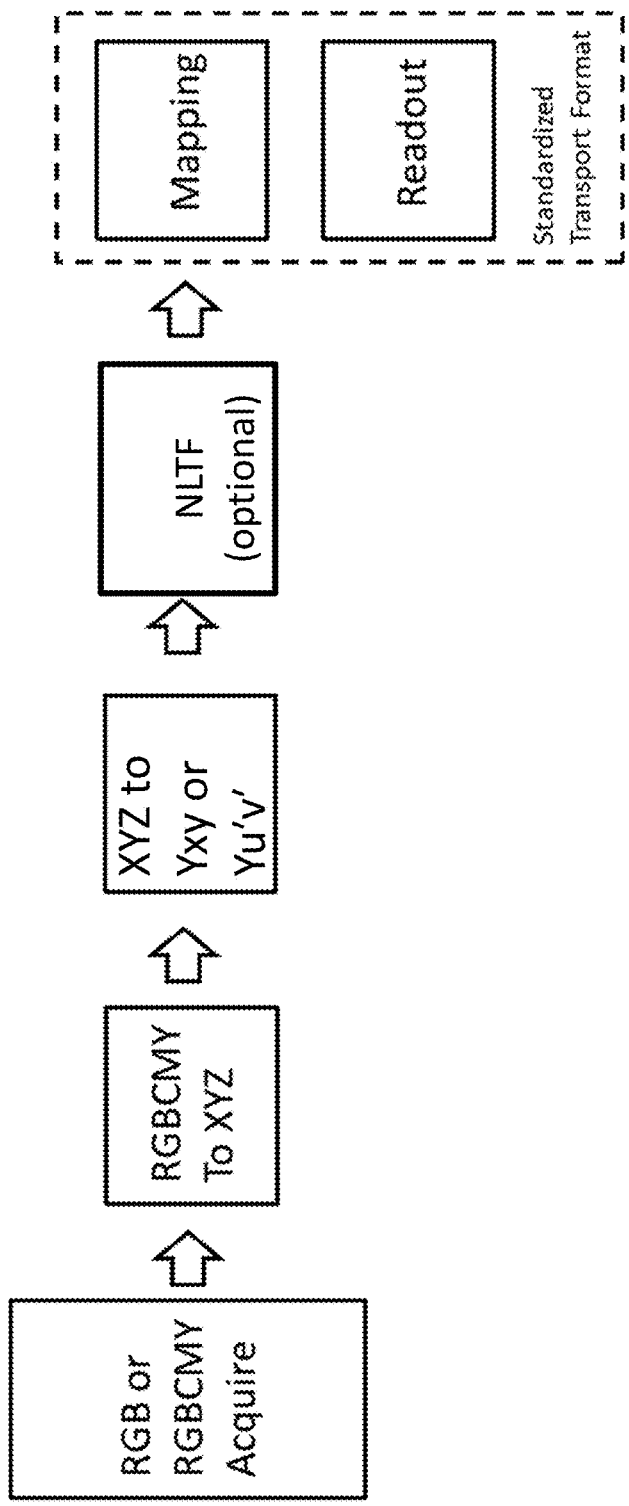
FIG. 11 illustrates one embodiment of a Yxy or Yu'v' encode with a non-linear transfer function (NLTF).

FIG. 11 illustrates one embodiment of a Yxy or Yu'v' encode with a non-linear transfer function (NLTF). Image data is acquired in any format (e.g., RGB, RGBCMY, CMYK) operable to be converted to XYZ linear data. The XYZ data is then converted to Yxy or Yu'v' data, and the Yxy or Yu'v' data is processed through an NLTF. The processed Yxy or Yu'v' data is then converted to a standardized transportation format for mapping and readout. Advantageously, in one embodiment, x and y remain as independent colorimetric coordinates and the non-linear transfer function is only applied to Y, thus providing simpler decoding of x and y values. In one embodiment, u' and v' remain as independent colorimetric coordinates and the non-linear transfer function is only applied to Y, thus providing simpler decoding of u' and v' values. In another embodiment, advantageously, application of the NLTF to all three channels provides compression in the system. In one embodiment, the NLTF is described in ITU-R BT.2100 or ITU-R BT.1886. Advantageously, Y is orthogonal to x and y, and remains orthogonal to x and y even when a non-linear function is applied. Y is also orthogonal to u' and v', and remains orthogonal to u' and v' even when a non-linear function is applied. Although the example shown includes Yxy and Yu'v' data, System 4 is compatible with a plurality of data formats including data formats using one luminance coordinate and two colorimetric coordinates. There are many different RGB sets so the matrix used to convert the image data from a set of RGB primaries to XYZ will involve a specific solution given the RGB values:

$$\begin{bmatrix} X \\ Y \\ Z \end{bmatrix} = \begin{bmatrix} a_{11} & a_{12} & a_{13} \\ a_{21} & a_{22} & a_{23} \\ a_{31} & a_{32} & a_{33} \end{bmatrix} \begin{bmatrix} R \\ G \\ B \end{bmatrix}$$

In an embodiment where the image data is 6P-B data, the following equation is used to convert to XYZ data:

$$\begin{bmatrix} X \\ Y \\ Z \end{bmatrix}_{D65} = \begin{bmatrix} 0.4124000 & 0.3576000 & 0.1805000 & 0.1574900 & 0.3427600 & 0.4502060 \\ 0.2126000 & 0.7152000 & 0.0721998 & 0.3132660 & 0.1347200 & 0.5520130 \\ 0.0193001 & 0.1192000 & 0.9505000 & 0.4814200 & 0.5866620 & 0.0209755 \end{bmatrix} \begin{bmatrix} R \\ G \\ B \\ C \\ M \\ Y \end{bmatrix}_{6P-B}$$

In an embodiment where the image data is 6P-C data with a D60 white point, the following equation is used to convert to XYZ data:

$$\begin{bmatrix} X \\ Y \\ Z \end{bmatrix}_{D65} = \begin{bmatrix} 0.50836664 & 0.26237069 & 0.18337670 & 0.15745217 & 0.36881328 & 0.42784843 \\ 0.23923145 & 0.68739938 & 0.07336917 & 0.33094114 & 0.14901541 & 0.52004327 \\ -0.0001363 & 0.04521596 & 0.96599714 & 0.47964602 & 0.52900498 & 0.00242485 \end{bmatrix} \begin{bmatrix} R \\ G \\ B \\ C \\ M \\ Y \end{bmatrix}_{6P-C_{refD60}}$$

In an embodiment where the image data is 6P-C data with a D65 white point, the following equation is used to convert to XYZ data:

$$\begin{bmatrix} X \\ Y \\ Z \end{bmatrix}_{D65} = \begin{bmatrix} 0.48657095 & 0.26566769 & 0.19821729 & 0.32295962 & -0.54969800 & 1.177199435 \\ 0.22897456 & 0.69173852 & 0.07928691 & 0.67867175 & -0.22203240 & 0.543360700 \\ 0.00000000 & 0.04511338 & 1.04394437 & 0.98336936 & -0.78858190 & 0.894270250 \end{bmatrix} \begin{bmatrix} R \\ G \\ B \\ C \\ M \\ Y \end{bmatrix}_{6P-C_{refD65}}$$

To convert the XYZ data to Yxy data, the following equations are used:

$$x = \frac{X}{(X+Y+Z)} \quad y = \frac{Y}{(X+Y+Z)}$$

To convert the XYZ data to Yu'v' data, the following equations are used:

$$u' = \frac{4X}{X+15Y+3Z} \quad v' = \frac{9Y}{X+15Y+3Z}$$

To convert x,y data to u', v' data, the following equations are used:

$$u' = \frac{4x}{-2x+12y+3} \quad v' = \frac{9y}{-2x+12y+3}$$

In one embodiment, LMS data is transformed to a projected representation using the following equations:

$$l = \frac{L}{(L+M+S)} \quad m = \frac{M}{(L+M+S)} \quad s = 1.0 - l - m$$

In contrast with Yxy and Yu'v', where the Y is the tristimulus relative luminance, the M channel, which is the closest to the Y response is not exactly Y. The projected representation is operable to be used analogous to Yxy as Mlm. Alternatively, the projected representation is operable to be used as Ylm where l ms is operable to be transformed back to XYZ via a 3×3 matrix.

In one embodiment, to convert XYZ data to LMS data with equal-energy illuminants, the following equation is used:

$$\begin{bmatrix} L \\ M \\ S \end{bmatrix}_E = \begin{bmatrix} 0.38971 & 0.68898 & -0.07868 \\ -0.22981 & 1.18340 & 0.04641 \\ 0.00000 & 0.00000 & 1.00000 \end{bmatrix} \begin{bmatrix} X \\ Y \\ Z \end{bmatrix}$$

In one embodiment, to convert XYZ data to LMS data normalized to D65, the following equation is used:

$$\begin{bmatrix} L \\ M \\ S \end{bmatrix}_{D65} = \begin{bmatrix} 0.4002 & 0.7076 & -0.0808 \\ -0.2263 & 1.1653 & 0.0457 \\ 0 & 0 & 0.9182 \end{bmatrix} \begin{bmatrix} X \\ Y \\ Z \end{bmatrix}$$

In one embodiment, to convert LMS data to XYZ data, the Hunt-Pointer-Estevez matrix is used as shown below:

$$\begin{bmatrix} X \\ Y \\ Z \end{bmatrix} = \begin{bmatrix} 1.91020 & -1.11212 & 0.20191 \\ 0.37095 & 0.62905 & 0.00000 \\ 0.00000 & 0.00000 & 1.00000 \end{bmatrix} \begin{bmatrix} L \\ M \\ S \end{bmatrix}$$

The XYZ data from the above equation is operable to be rescaled by using a ratio of $Y_{original}$ to $Y_{matrix}$ using the following equation:

$$\begin{bmatrix} X \\ Y \\ Z \end{bmatrix}_{rescaled} = \frac{Y_{original}}{Y_{matrix}} \begin{bmatrix} X \\ Y \\ Z \end{bmatrix}_{matrix}$$

Figure 12:
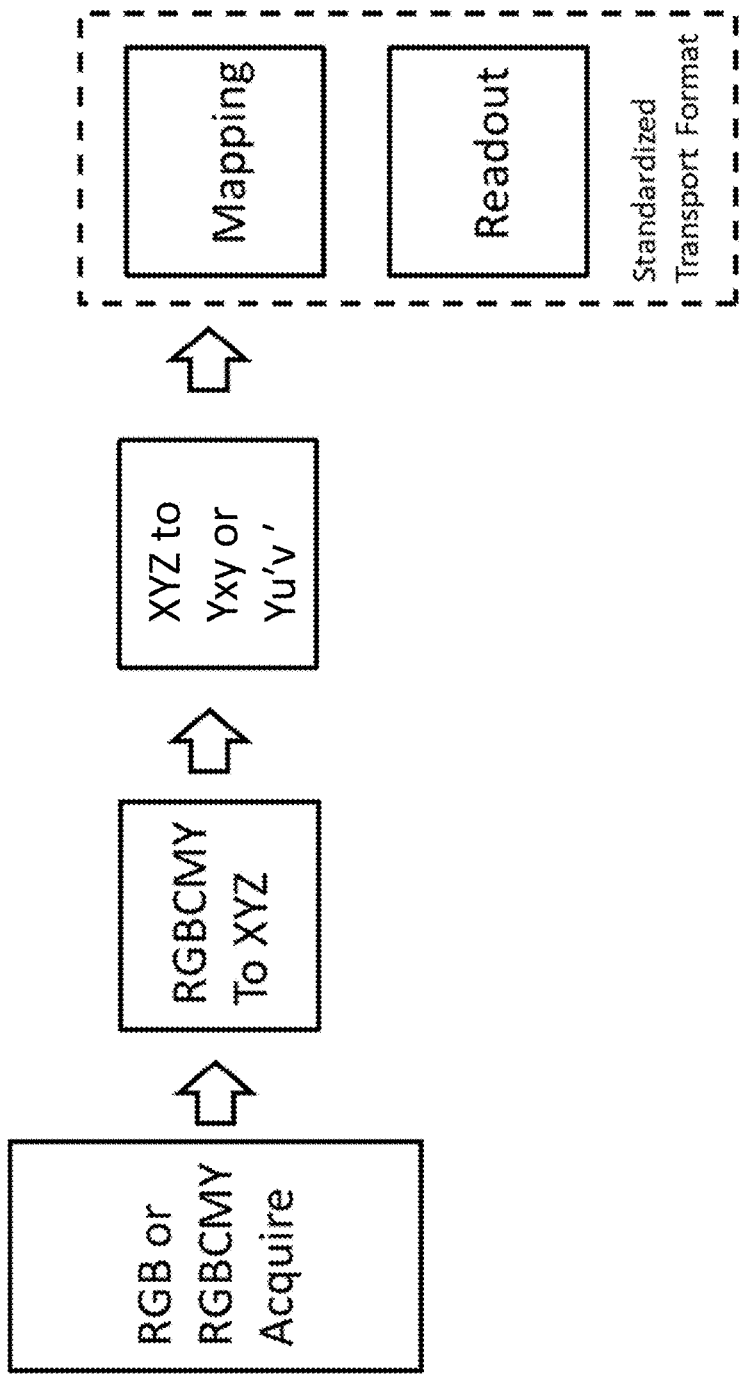
FIG. 12 illustrates one embodiment of a Yxy or Yu'v' encode without an NLTF.

FIG. 12 illustrates one embodiment of a Yxy or Yu'v' encode without an NLTF. Image data is acquired in any format (e.g., RGB, RGBCMY, CMYK) operable to be converted to XYZ data. The XYZ data is then converted to Yxy or Yu'v' data, and then converted to a standardized transportation format for mapping and readout. Although the example in FIG. 12 shows a Yxy or Yu'v' encode, System 4 is operable to be used with a plurality of data formats.

Figure 13:
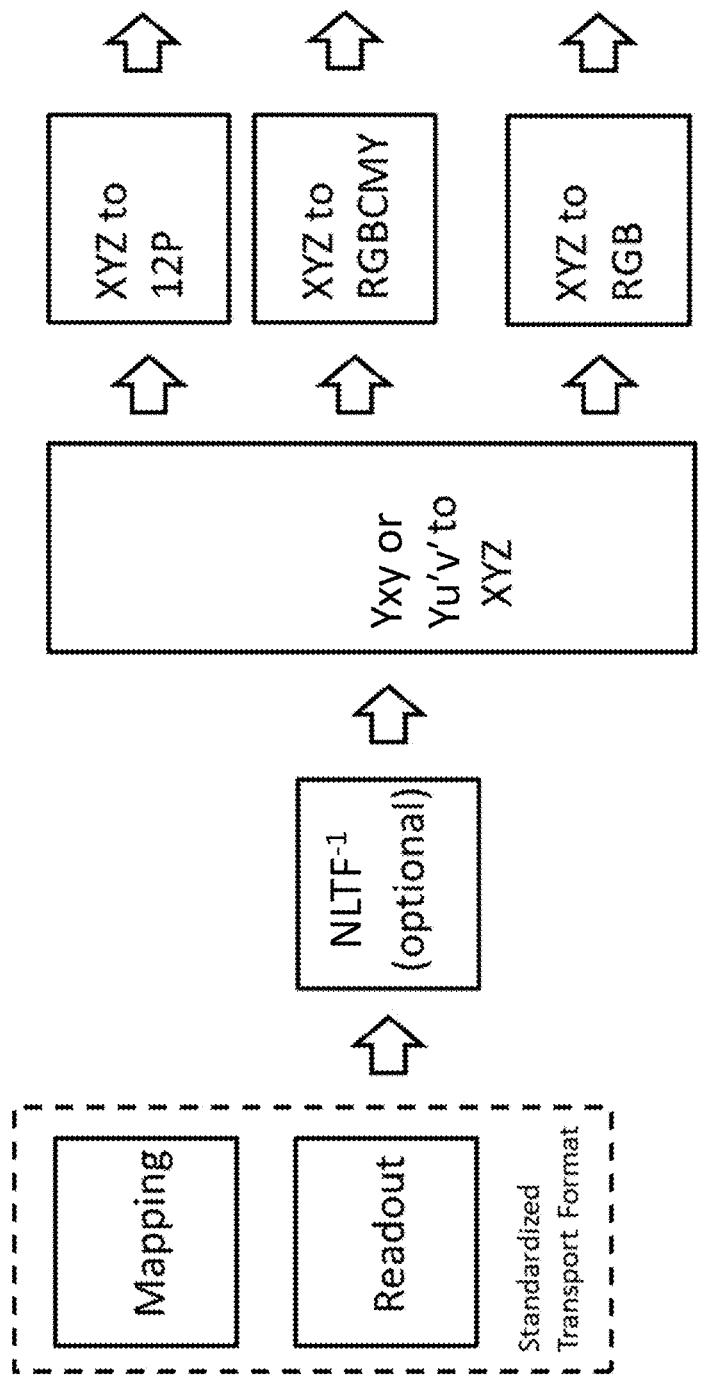
FIG. 13 illustrates one embodiment of a Yxy or Yu'v' decode with an inverse non-linear transfer function (NLTF$^{-1}$).

FIG. 13 illustrates one embodiment of a Yxy or Yu'v' decode with an inverse non-linear transfer function (NLTF$^{-1}$). After mapping and readout, the data is processed through an NLTF$^{-1}$ to yield the Yxy or Yu'v' data. The Yxy or Yu'v' data is then converted back to the XYZ data. The XYZ data is operable to be converted to multiple data formats including, but not limited to, RGB, CMYK, 6P (e.g., 6P-B, 6P-C), and gamuts including at least four primaries through at least twelve primaries. Although the example in FIG. 13 shows a Yxy or Yu'v' decode, System 4 is operable to be used with a plurality of data formats.

Finally, the XYZ data must converted to the correct standard color space. In an embodiment where the color gamut used is a 6P-B color gamut, the following equations are used:

$$\begin{bmatrix} R \\ G \\ B \end{bmatrix}_{6P-B} = \begin{bmatrix} 3.240625 & -1.537208 & -0.498629 \\ -0.968931 & 1.875756 & 0.041518 \\ 0.055710 & -0.204021 & 1.056996 \end{bmatrix} \begin{bmatrix} X \\ Y \\ Z \end{bmatrix}_{D65}$$

$$\begin{bmatrix} C \\ M \\ Y \end{bmatrix}_{6P-B} = \begin{bmatrix} -3.496203 & 2.798197 & 1.400100 \\ 2.822710 & -2.324505 & 0.589173 \\ 1.295195 & 0.790883 & -0.938342 \end{bmatrix} \begin{bmatrix} X \\ Y \\ Z \end{bmatrix}_{D65}$$

In an embodiment where the color gamut used is a 6P-C color gamut with a D60 white point, the following equations are used:

$$\begin{bmatrix} R \\ G \\ B \end{bmatrix}_{6P-C_{refD60}} = \begin{bmatrix} 2.402666 & -0.897456 & -0.388041 \\ -0.832567 & 1.769204 & 0.023712 \\ 0.038833 & -0.082520 & 1.036625 \end{bmatrix} \begin{bmatrix} X \\ Y \\ Z \end{bmatrix}_{D60_{ACES}}$$

-continued $$\begin{bmatrix} C \\ M \\ Y \end{bmatrix}_{6P-C_{refD60}} = \begin{bmatrix} -2.959036 & 2.427947 & 1.379050 \\ 2.695538 & -2.220786 & 0.647402 \\ 1.116577 & 1.007431 & -1.061986 \end{bmatrix} \begin{bmatrix} X \\ Y \\ Z \end{bmatrix}_{D60_{ACES}}$$

In another embodiment where the color used is a 6P-C color gamut with a D65 white point, the following equations are used:

$$\begin{bmatrix} R \\ G \\ B \end{bmatrix}_{6P-C_{refD65}} = \begin{bmatrix} 2.479190 & -0.919911 & -0.400759 \\ -0.829514 & 1.762731 & 0.023585 \\ 0.036423 & -0.076852 & 0.957005 \end{bmatrix} \begin{bmatrix} X \\ Y \\ Z \end{bmatrix}_{D65}$$

$$\begin{bmatrix} C \\ M \\ Y \end{bmatrix}_{6P-C_{refD65}} = \begin{bmatrix} -3.020525 & 2.444939 & 1.309331 \\ 2.686642 & -2.180032 & 0.575266 \\ 1.198493 & 0.982883 & -1.030246 \end{bmatrix} \begin{bmatrix} X \\ Y \\ Z \end{bmatrix}_{D65}$$

In an embodiment where the color gamut used is an ITU-R BT709.6 color gamut, the matrices are as follows:

$$\begin{bmatrix} R \\ G \\ B \end{bmatrix}_{BT.709} = \begin{bmatrix} 3.2405 & -1.5371 & -0.4985 \\ -0.9693 & 1.8760 & 0.0416 \\ 0.0556 & -0.2040 & 1.0572 \end{bmatrix} \begin{bmatrix} X \\ Y \\ Z \end{bmatrix}$$

In an embodiment where the color gamut used is a SMPTE RP431-2 color gamut, the matrices are as follows:

$$\begin{bmatrix} R \\ G \\ B \end{bmatrix}_{RP431} = \begin{bmatrix} 2.7254 & -1.0180 & -0.4402 \\ -0.7952 & 1.6897 & 0.0226 \\ 0.0412 & -0.0876 & 1.1009 \end{bmatrix} \begin{bmatrix} X \\ Y \\ Z \end{bmatrix}$$

In an embodiment where the color gamut used is an ITU-R BT.2020/2100 color gamut, the matrices are as follows:

$$\begin{bmatrix} R \\ G \\ B \end{bmatrix}_{BT2020} = \begin{bmatrix} 1.7166512 & -0.3556708 & -0.2533663 \\ -0.6666844 & 1.6164812 & 0.0157685 \\ 0.0176399 & -0.0427706 & 0.9421031 \end{bmatrix} \begin{bmatrix} X \\ Y \\ Z \end{bmatrix}$$

To convert the Yxy data to the XYZ data, the following equations are used:

$$X = \left(\frac{x}{y}\right) Y \quad Z = \left(\frac{(1-x-y)}{y}\right) Y$$

To convert the Yu'v' data to the XYZ data, the following equations are used:

$$X = \left(\frac{9u'}{4v'}\right) Y \quad Z = \left(\frac{12 - 3u' - 20v'}{4v'}\right) Y$$

Figure 14:
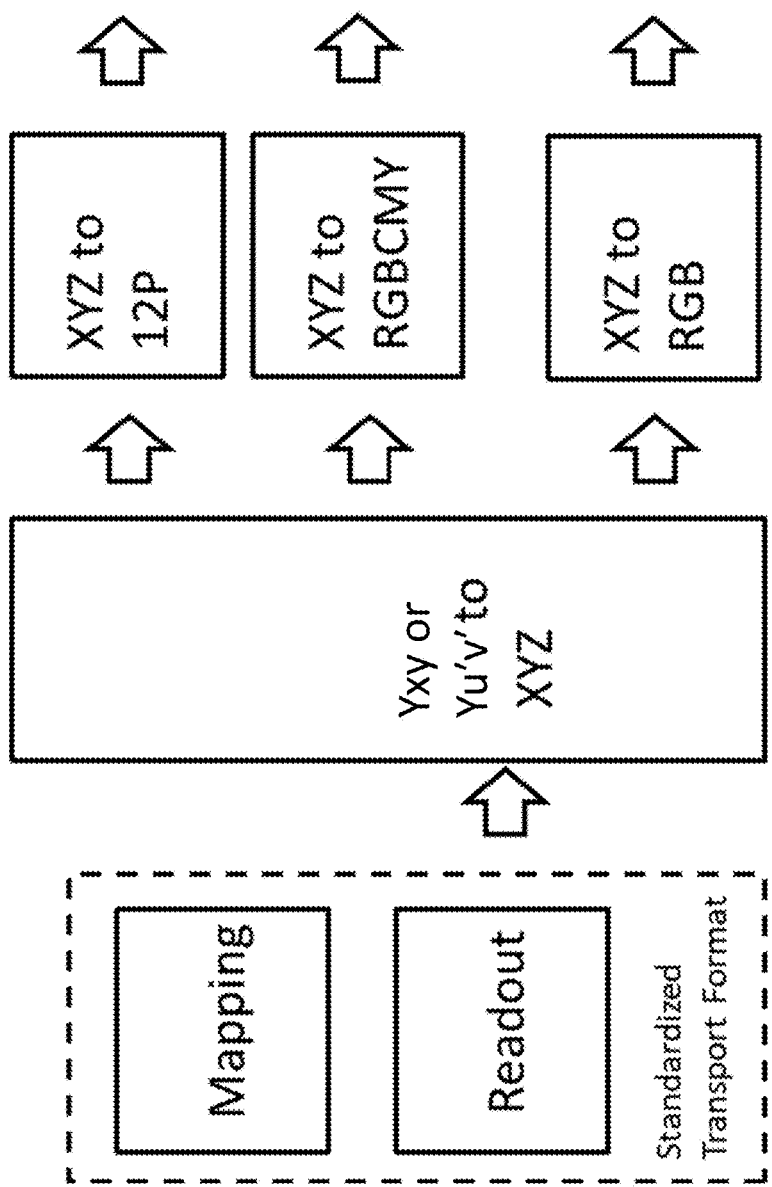
FIG. 14 illustrates one embodiment of a Yxy or Yu'v' decode without an NLTF$^{-1}$.

FIG. 14 illustrates one embodiment of a Yxy or Yu'v' decode without an NLTF. After mapping and readout, the Yxy or Yu'v' data is then converted to the XYZ data. The XYZ data is operable to be converted to multiple data formats including, but not limited to, RGB, CMYK, 6P (e.g., 6P-B, 6P-C), and gamuts including at least four primaries through at least twelve primaries. Although the example in FIG. 14 shows a Yxy or Yu'v' encode, System 4 is operable to be used with a plurality of data formats.

FIG. 15A illustrates one embodiment of a 4:2:2 Yxy encode with an NLTF. A full bandwidth luminance channel (Y) is used to carry image detail and the remaining color coordinate components (e.g., x,y) are half sampled. In the example shown in FIG. 15A, the Yxy data undergoes a 4:2:2 encode. Other encoding methods (e.g., 4:4:4, 4:2:0, 4:1:1) are compatible with the present invention. Other quantization methods and bit depths are also compatible with the present invention. In one embodiment, the bit depth is 8 bits, 10 bits, 12 bits, 14 bits, and/or 16 bits. In one embodiment, the Yxy values are sampled as floats (e.g., 16-bit floating point representation, 32-bit floating point representation). For example, and not limitation, the floats include IEEE 754 defined floats. Although the example in FIG. 15A shows a Yxy decode, System 4 is operable to be used with a plurality of data formats.

In one embodiment, the NLTF is a DRR function between about 0.25 and about 0.9. In another embodiment, the NLTF is a DRR function between about 0.25 and about 0.7. In one embodiment, the NLTF is a ½ DRR function including a value between about 0.41 and about 0.7. In one embodiment, the NLTF is a ⅓ DRR function including a value between about 0.25 and about 0.499.

FIG. 15B illustrates one embodiment of a 4:2:2 Yxy encode without an NLTF. In the example shown in FIG. 15B, the Yxy data undergoes a 4:2:2 encode. Other encoding methods (e.g., 4:4:4, 4:2:0, 4:1:1) are compatible with the present invention. Although the example in FIG. 15B shows a Yxy encode, System 4 is operable to be used with a plurality of data formats.

Figure 16A:
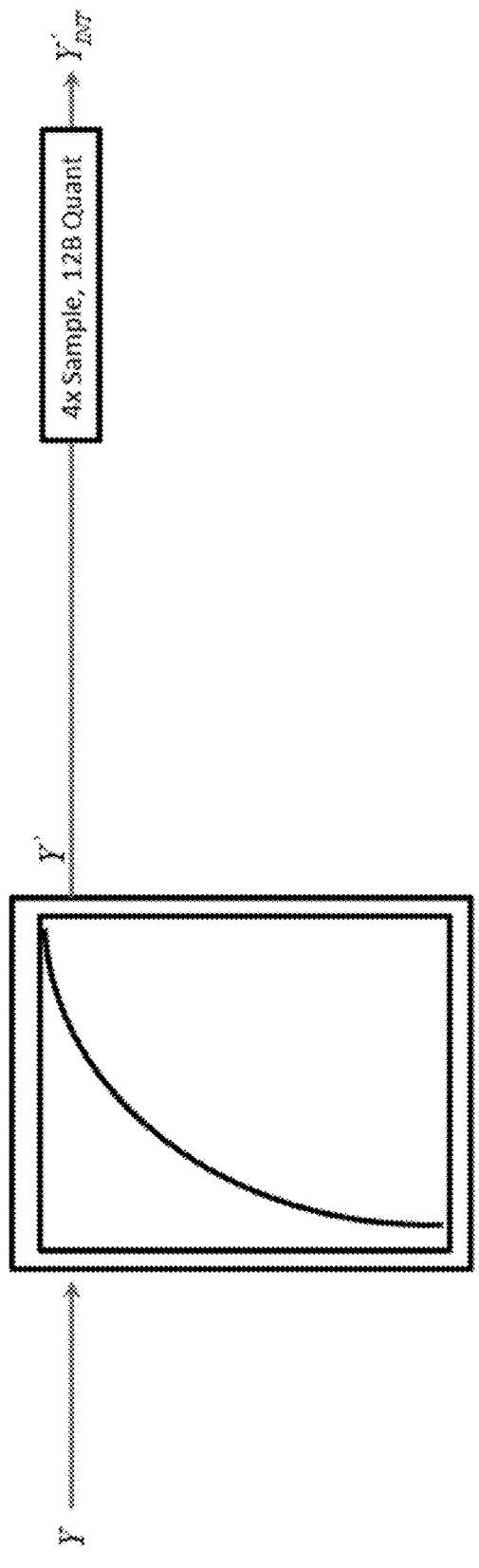
FIG. 16A illustrates one embodiment of a 4:2:2 Yxy encode with an NLTF applied to all three channels and linear scaling of x and y.

FIG. 16A illustrates one embodiment of a 4:2:2 Yxy encode with an NLTF applied to all three channels and linear scaling of x,y. A full bandwidth luminance channel (Y) is used to carry image detail and the remaining color coordinate components (e.g., x,y) are half sampled. In the example shown in FIG. 16A, the Yxy data undergoes a 4:2:2 encode. Other encoding methods (e.g., 4:4:4, 4:2:0, 4:1:1) are compatible with the present invention. Other quantization methods and bit depths are also compatible with the present invention. In one embodiment, the bit depth is 8 bits, 10 bits, 12 bits, 14 bits, and/or 16 bits. In one embodiment, the Yxy values are sampled as floats (e.g., 16-bit floating point representation, 32-bit floating point representation). For example, and not limitation, the floats include IEEE 754 defined floats. Although the example in FIG. 16A shows a Yxy decode, System 4 is operable to be used with a plurality of data formats.

Figure 16B:
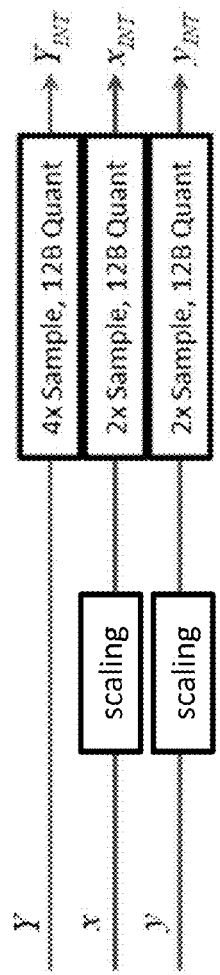
FIG. 16B illustrates one embodiment of a 4:2:2 Yxy encode without an NLTF and with linear scaling of x and y.

FIG. 16B illustrates one embodiment of a 4:2:2 Yxy encode without an NLTF and with linear scaling of x,y. In the example shown in FIG. 16B, the Yxy data undergoes a 4:2:2 encode. Other encoding methods (e.g., 4:4:4, 4:2:0, 4:1:1) are compatible with the present invention. Although the example in FIG. 16B shows a Yxy encode, System 4 is operable to be used with a plurality of data formats.

FIG. 17A illustrates one embodiment of a 4:4:4 Yxy encode with an NLTF. A full bandwidth luminance channel (Y) is used to carry image detail and the remaining color coordinate components (e.g., x,y) are also fully sampled. In the example shown in FIG. 17A, the Yxy data undergoes a 4:4:4 encode. Other encoding methods (e.g., 4:2:2, 4:2:0, 4:1:1) are compatible with the present invention. Although the example in FIG. 17A shows a Yxy encode, System 4 is operable to be used with a plurality of data formats.

FIG. 17B illustrates one embodiment of a 4:4:4 Yxy encode without an NLTF. In the example shown in FIG. 17B, the Yxy data undergoes a 4:4:4 encode. Other encoding methods (e.g., 4:2:2, 4:2:0, 4:1:1) are compatible with the present invention. Although the example in FIG. 17B shows a Yxy encode, System 4 is operable to be used with a plurality of data formats.

FIG. 18A illustrates one embodiment of a 4:4:4 Yxy encode with an NLTF applied to all three channels and linear scaling of x,y. A full bandwidth luminance channel (Y) is used to carry image detail and the remaining color coordinate components (e.g., x,y) are also fully sampled. In the example shown in FIG. 18A, the Yxy data undergoes a 4:4:4 encode. Other encoding methods (e.g., 4:2:2, 4:2:0, 4:1:1) are compatible with the present invention. Although the example in FIG. 18A shows a Yxy encode, System 4 is operable to be used with a plurality of data formats.

FIG. 18B illustrates one embodiment of a 4:4:4 Yxy encode without an NLTF and with linear scaling of x,y. In the example shown in FIG. 18B, the Yxy data undergoes a 4:4:4 encode. Other encoding methods (e.g., 4:2:2, 4:2:0, 4:1:1) are compatible with the present invention. Although the example in FIG. 18B shows a Yxy encode, System 4 is operable to be used with a plurality of data formats.

Figure 19:
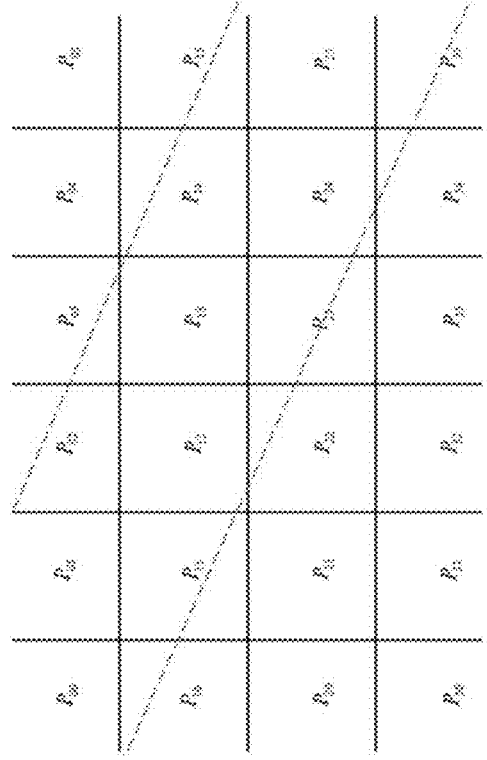
FIG. 19 illustrates sample placements of Yxy system components for a 4:2:2 pixel mapping.

FIG. 19 illustrates sample placements of Yxy system components for a 4:2:2 pixel mapping. A plurality of pixels (e.g., $P_{00}$-$P_{35}$) is shown in FIG. 19. The first subscript number refers to a row number and the second subscript number refers to a column number. For pixel $P_{00}$, $Y'_{INT00}$ is the luma and the color components are $x_{INT00}$ and $y_{INT00}$. For pixel $P_{01}$, $Y'_{INT01}$ is the luma. For pixel $P_{10}$, $Y'_{INT10}$ is the luma and the color components are $x_{INT10}$ and $y_{INT10}$. For pixel $P_{11}$, $Y'_{INT11}$ is the luma. In one embodiment, the luma and the color components (e.g., the set of image data) corresponding to a particular pixel (e.g., $P_{00}$) is used to calculate color and brightness of subpixels. Although the example shown in FIG. 19 includes luma, it is equally possible that the data is sent linearly as luminance (e.g., $Y_{INT00}$). Further, although the example in FIG. 19 includes Yxy system components, System 4 is operable to be used with a plurality of data formats. While prior art systems often use x,y coordinates to map a gamut, the present invention is operable to provide pixel mapping data as Yxy data and transport data as a Y channel, a first colorimetric coordinate channel (e.g., x), and a second colorimetric coordinate channel (e.g., y).

Figure 20:
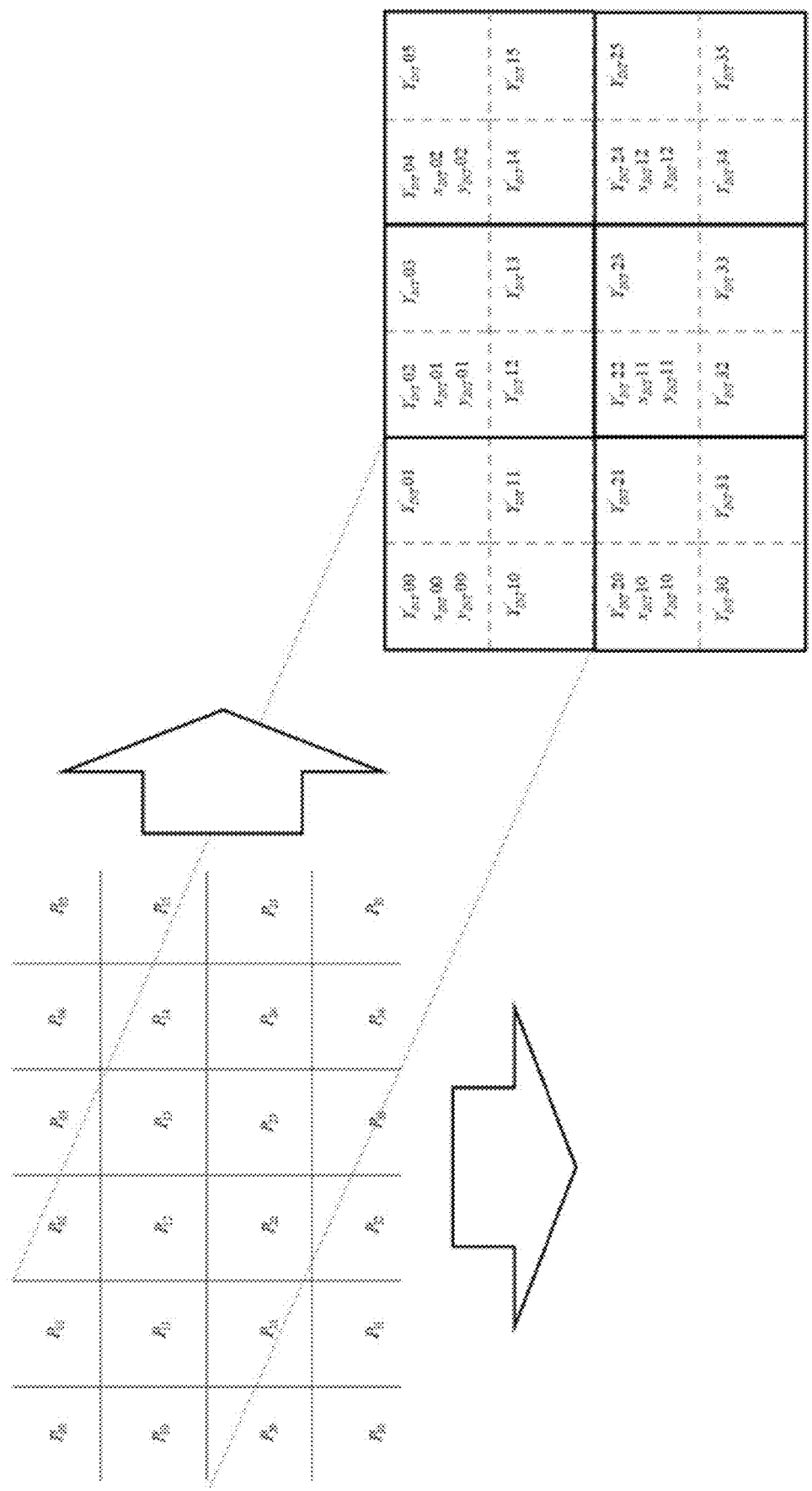
FIG. 20 illustrates sample placements of Yxy system components for a 4:2:0 pixel mapping.

FIG. 20 illustrates sample placements of Yxy system components for a 4:2:0 pixel mapping. A plurality of pixels (e.g., $P_{000}$-$P_{35}$) is shown in FIG. 20. The first subscript number refers to a row number and the second subscript number refers to a column number. For pixel $P_{00}$, $Y'_{INT00}$ is the luma and the color components are $x_{INT00}$ and $y_{INT00}$. For pixel $P_{01}$, $Y'_{INT01}$ is the luma. For pixel $P_{10}$, $Y'_{INT10}$ is the luma. For pixel $P_{11}$, $Y'_{INT11}$ is the luma. In one embodiment, the luma and the color components corresponding to a particular pixel (e.g., $P_{00}$) is used to calculate color and brightness of subpixels. Although the example shown in FIG. 20 includes luma, it is equally possible that the data is sent linearly as luminance (e.g., $Y_{INT00}$). Further, Although the example in FIG. 20 includes Yxy system components, System 4 is operable to be used with a plurality of data formats.

In one embodiment, the set of image data includes pixel mapping data. In one embodiment, the pixel mapping data includes a subsample of the set of values in a color space. In a preferred embodiment, the color space is a Yxy color space (e.g., 4:2:2). In one embodiment, the pixel mapping data includes an alignment of the set of values in the color space (e.g., Yxy color space, Yu'v' colorspace).

Table 6 illustrates mapping to SMPTE ST2110 for 4:2:2 sampling of Yxy and Yu'v' data. Table 7 illustrates mapping to SMPTE ST2110 for 4:4:4 linear and non-linear sampling of Yxy and Yu'v' data. The present invention is compatible with a plurality of data formats and not restricted to Yxy and Yu'v' data.

TABLE 6

| Sampling | Bit Depth | pgroup octets | pgroup pixels | Y PbPr Sample Order | Sample Order |
|---|---|---|---|---|---|
| 4:2:2 Yxy | 8 | 8 | 2 | $C_B$', Y0', $C_R$', Y1' | y0, Y0', x0, y1, Y1', x1 |
| | 10 | 10 | 2 | $C_B$', Y0', $C_R$', Y1' | y0, Y0', x0, y1, Y1', x1 |
| | 12 | 12 | 2 | $C_B$', Y0', $C_R$', Y1' | y0, Y0', x0, y1, Y1', x1 |
| | 16, 16f | 16 | 2 | C'$_B$, Y0', C'$_R$, Y'1 | y0, Y0', x0, y1, Y1', x1 |
| 4:2:2 Yu'v' | 8 | 8 | 2 | $C_B$', Y0', $C_R$', Y1' | v'0, Y0', u'0, v'1, Y1', u'1 |
| | 10 | 10 | 2 | CB', Y0', CR', Y1' | v'0, Y0', u'0, v'1, Y1', u'1 |
| | 12 | 12 | 2 | $C_B$', Y0', $C_R$', Y1' | v'0, Y0', u'0, v'1, Y1 ', u'1 |
| | 16, 16f | 16 | 2 | C'$_B$, Y0', C'$_R$, Y'1 | v'0, Y0', u'0, v'1, Y1 ', u'1 |

TABLE 7

| Sampling | Bit Depth | pgroup octets | pgroup pixels | RGB/XYZ Sample Order | Sample Order |
|---|---|---|---|---|---|
| 4:4:4 Linear Yxy | 8 | 3 | 1 | R, G, B | x, Y, y |
| | 10 | 15 | 4 | R0, G0, B0, R1, G1, B1, R2, G2, B2 | x, Y0, y, x, Y1, y, x, Y2',y |
| | 12 | 9 | 2 | R0, G0, B0, R1, G1, B1 | x, Y0, y, x, Y1, y |
| | 16, 16f | 6 | 1 | R, G, B | x, Y, y |
| 4:4:4 Non-Linear Yxy | 8 | 3 | 1 | R', G', B' | x, Y', y |
| | 10 | 15 | 4 | R0', G0', B0', R1', G1', B1', R2', G2 ', B2' | x, Y0', y, x, Y1', y, x, Y2', y |
| | 12 | 9 | 2 | R0', G0', B0', R1', G1', B1' | x, Y0', y, x, Y1', y |
| | 16, 16f | 6 | 1 | R', G', B' | x, Y', y |
| 4:4:4 Linear Yu'v' | 8 | 3 | 1 | R, G, B | u', Y, v' |
| | 10 | 15 | 4 | R0, G0, B0, R1, G1, B1, R2, G2, B2 | u', Y0, v', u', Y1, v', u', Y2', v' |
| | 12 | 9 | 2 | R0, G0, B0, R1, G1, B1 | u', Y0, v', u', Y1, v' |
| | 16, 16f | 6 | 1 | R, G, B | u', Y, v' |
| 4:4:4 Non-Linear Yu'v' | 8 | 3 | 1 | R', G', B' | u', Y', v' |
| | 10 | 15 | 4 | R0', G0', B0', R1, G1', B1', R2', G2', B2' | u', Y0', v', u', Y1', v', u', Y2', v' |
| | 12 | 9 | 2 | R0', G0', B0', R1', G1', B1' | u', Y0', v', u', Y1', v' |
| | 16, 16f | 6 | 1 | R', G', B' | u', Y', v' |

Figure 21:
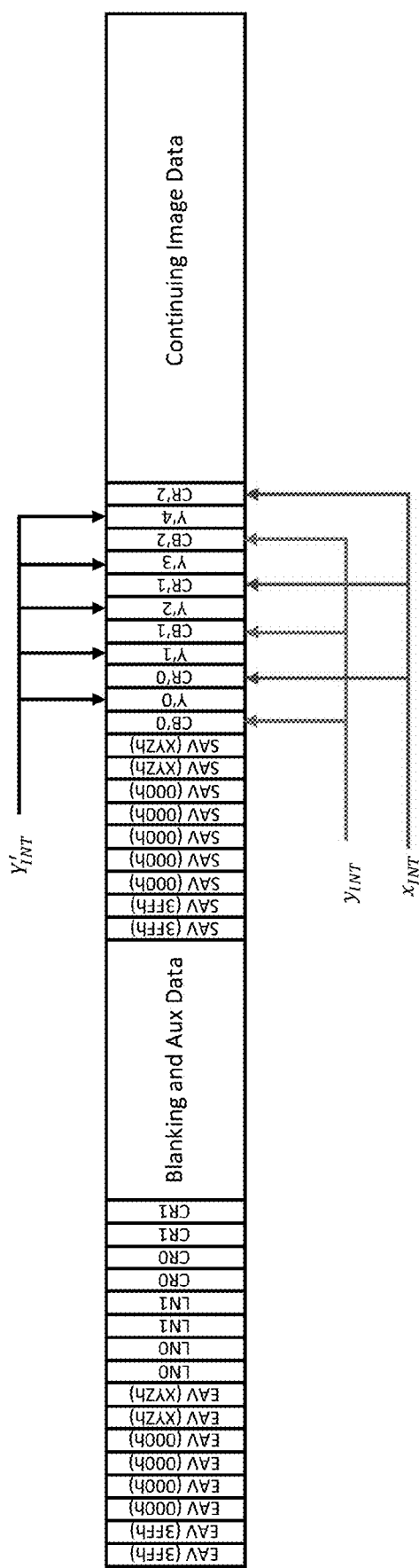
FIG. 21 illustrates one embodiment of a SMPTE ST292 Yxy system mapping.

FIG. 21 illustrates one embodiment of a SMPTE ST292 Yxy system mapping. To fit a Yxy system into a SMPTE ST292 stream involves the following substitutions: $Y'_{INT}$ is placed in the Y data segments, $x_{INT}$ is placed in the Cr data segments, and $y_{INT}$ is placed in the Cb data segments. In a preferred embodiment, luminance or luma is placed in the Y data segments, a first colorimetric coordinate is placed in the Cr data segments, and a second colorimetric coordinate is placed in the Cb data segments. Although the example in FIG. 21 shows a Yxy system mapping, System 4 is operable to be used with a plurality of data formats.

Figure 22:
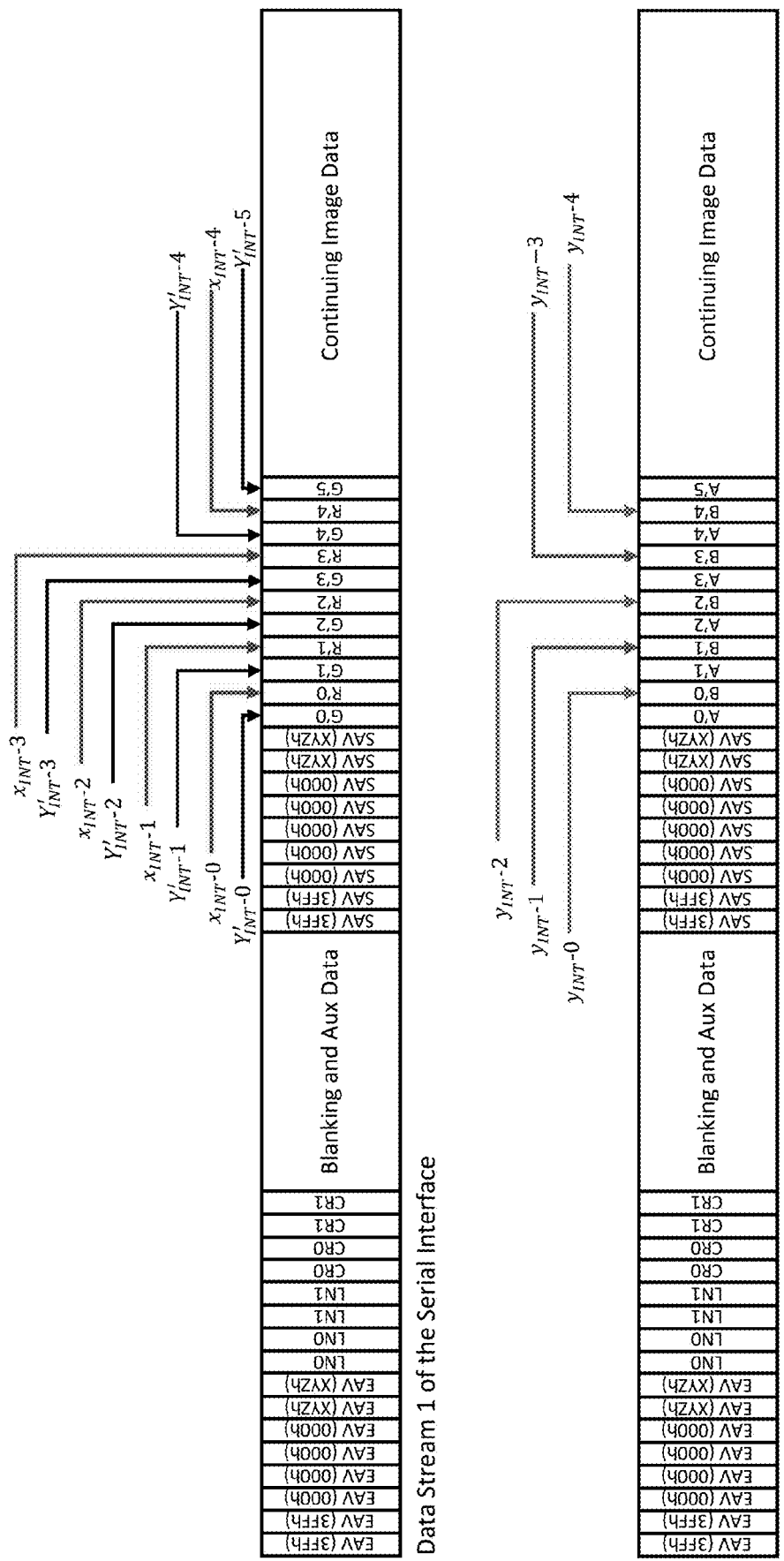
FIG. 22 illustrates one embodiment of a SMPTE ST2082 Yxy system mapping.

FIG. 22 illustrates one embodiment of a SMPTE ST2082 Yxy system mapping. To fit a Yxy system into a SMPTE ST292 stream involves the following substitutions: $Y'_{INT}$ is placed in the G data segments, $x_{INT}$ is placed in the R data segments, and $y_{INT}$ is placed in the B data segments. In a preferred embodiment, luminance or luma is placed in the G data segments, a first colorimetric coordinate is placed in the R data segments, and a second colorimetric coordinate is placed in the B data segments. Although the example in FIG. 22 shows a Yxy system mapping, System 4 is operable to be used with a plurality of data formats.

Figure 23:
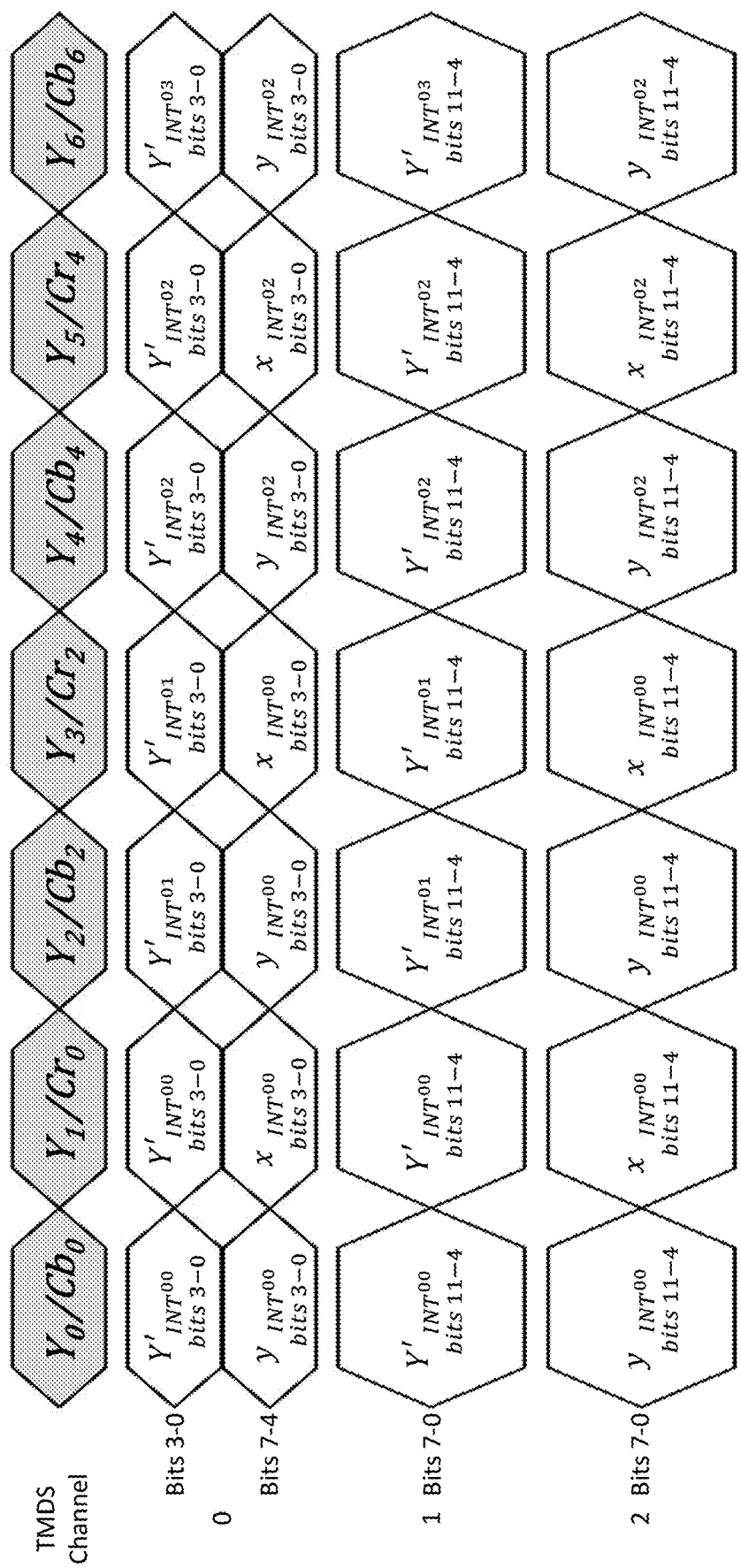
FIG. 23 illustrates one embodiment of Yxy inserted into a CTA 861 stream.

FIG. 23 illustrates one embodiment of Yxy inserted into a CTA 861 data stream. Although the example in FIG. 23 shows a Yxy system mapping, System 4 is operable to be used with a plurality of data formats.

FIG. 24A illustrates one embodiment of a Yxy decode with an $NLTF^{-1}$ applied only to the Y channel. In one embodiment, a non-linear function (e.g., $NLTF^{-1}$) is applied to the luma. The non-linear function is not applied to the two colorimetric coordinates. Although the example in FIG. 24A shows a Yxy decode, System 4 is operable to be used with a plurality of data formats.

In one embodiment, the $NLTF^{-1}$ is an inverse DRR function with a value between about 1.1 and about 4. In one embodiment, the $NLTF^{-1}$ is an inverse DRR function with a value between about 1.4 and about 4. In one embodiment, the $NLTF^{-1}$ is an inverse DRR function with a value between about 1.4 and about 2.4. In one embodiment, the $NLTF^{-1}$ is an inverse DRR function with a value between about 2 and about 4.

FIG. 24B illustrates one embodiment of a Yxy decode without an $NLTF^{-1}$ applied to any of the channels. In one embodiment, data is sent linearly as luminance. A non-linear function (e.g., an $NLTF^{-1}$) is not applied to the luminance or the two colorimetric coordinates. Although the example in FIG. 24B shows a Yxy decode, System 4 is operable to be used with a plurality of data formats.

FIG. 25A illustrates one embodiment of a Yxy decode with an $NLTF^{-1}$ applied to all three channels and rescaling of x and y. In one embodiment, a non-linear function (e.g., an $NLTF^{-1}$) is applied to the luma and to the two colorimetric coordinates. Although the example in FIG. 25A shows a Yxy decode, System 4 is operable to be used with a plurality of data formats.

FIG. 25B illustrates one embodiment of a Yxy decode without an $NLTF^{-1}$ applied to any of the channels and with rescaling applied to the x,y channels. In one embodiment, data is sent linearly as luminance. A non-linear function (e.g., an $NLTF^{-1}$) is not applied to the luminance or the two colorimetric coordinates. Although the example in FIG. 25B shows a Yxy decode, System 4 is operable to be used with a plurality of data formats (e.g., Yu'v').

Advantageously, XYZ is used as the basis of ACES for cinematographers and allows for the use of colors outside of the ITU-R BT.709 and/or the P3 color spaces, encompassing all of the CIE color space. Colorists often work in XYZ, so there is widespread familiarity with XYZ. Further, XYZ is used for other standards (e.g., JPEG 2000, Digital Cinema Initiatives (DCI)), which could be easily adapted for System 4. Additionally, most color spaces use XYZ as the basis for conversion, so the conversions between XYZ and most color spaces are well understood and documented. Many professional displays also have XYZ option as a color reference function.

In one embodiment, the image data converter includes at least one processor coupled to at least one memory. In one embodiment, the image data converter includes at least one look-up table (LUT). In one embodiment, the at least one look-up table maps out-of-gamut colors to zero. In one embodiment, the at least one look-up table maps out-of-gamut colors to a periphery of visible colors. In one embodiment, an out-of-gamut color is mapped to the periphery along a straight line between the out-of-gamut color in its original location and a white point of the system (e.g., D65). In one embodiment, the luminance and/or luma value is maintained, and only the colorimetric coordinates are affected by the mapping. In one embodiment, gamma transforms and/or scaling are added after mapping. In one embodiment, the mapping is used to convert Yxy to XYZ and back. Alternatively, the mapping is used to convert Y'xy to X'Y'Z' and back. In one embodiment, a gamma function and/or a scaling is maintained throughout the conversion. As a non-limiting example, a 2.6 gamma function is used to scale x by 0.74 and y by 0.84. Alternatively, the gamma and/or the scaling are removed after conversion of gamut colors to zero. In one embodiment, the at least one look-up table maps out of gamut colors to a periphery of visible colors.

In one embodiment, the image data converter includes at least one look-up table (LUT). In one embodiment, the at least one look-up table maps out-of-gamut colors to zero. In one embodiment, the at least one look-up table maps out-of-gamut colors to a periphery of visible colors. In one embodiment, an out-of-gamut color is mapped to the periphery along a straight line between the out-of-gamut color in its original location and a white point of the system (e.g., D65). In one embodiment, the luminance and/or luma value is maintained, and only the colorimetric coordinates are affected by the mapping. In one embodiment, gamma transforms and/or scaling are added after mapping. In one embodiment, the mapping is used to convert Yxy to XYZ and back. Alternatively, the mapping is used to convert Y'xy to X'Y'Z' and back. In one embodiment, a gamma function and/or a scaling is maintained throughout the conversion. As a non-limiting example, a 2.6 gamma function is used to scale x by 0.74 and y by 0.84. Alternatively, the gamma and/or the scaling are removed after conversion.

Additional details regarding System 4 are available in U.S. patent application Ser. No. 17/727,372, filed Apr. 22, 2022, and U.S. patent application Ser. No. 17/849,220, filed Jun. 24, 2022, each of which is incorporated herein by reference in its entirety.

Transfer Functions

The system design minimizes limitations to use standard transfer functions for both encode and/or decode processes. Current practices used in standards include, but are not limited to, ITU-R BT.1886, ITU-R BT.2020, SMPTE ST274, SMPTE ST296, SMPTE ST2084, and ITU-R BT.2100. These standards are compatible with this system and require no modification.

Encoding and decoding multi-primary (e.g., 6P, RGBC) images is formatted into several different configurations to adapt to image transport frequency limitations. The highest quality transport is obtained by keeping all components as multi-primary (e.g., RGBCMY) components. This uses the highest sampling frequencies and requires the most signal bandwidth. An alternate method is to sum the image details in a luminance channel at full bandwidth and then send the color difference signals at half or quarter sampling (e.g., Y Cr Cb Cc Cy). This allows a similar image to pass through lower bandwidth transports.

An IPT system is a similar idea to the Yxy system with several exceptions. An IPT system or an $IC_TC_P$ system is still an extension of XYZ and is operable to be derived from RGB and multiprimary (e.g., RGBCMY, RGBC) color coordinates. An IPT color description is operable to be substituted within a 4:4:4 sampling structure, but XYZ has already been established and does not require the same level of calculations. For an $IC_TC_P$ transport system, similar substitutions are operable to be made. However, both substitution systems are limited in that a non-linear function (e.g., OOTF) is contained in all three components. Although the non-linear function is operable to be removed for IPT or $IC_TC_P$, the derivation is still based on a set of RGB primaries with a white point reference. Removing the non-linear function may also alter the bit depth noise and compressibility.

For transport, simple substitutions are operable to be made using the foundation of what is described with transport of XYZ for the use of IPT in current systems as well as the current standards used for $IC_TC_P$.

Figure 26A:
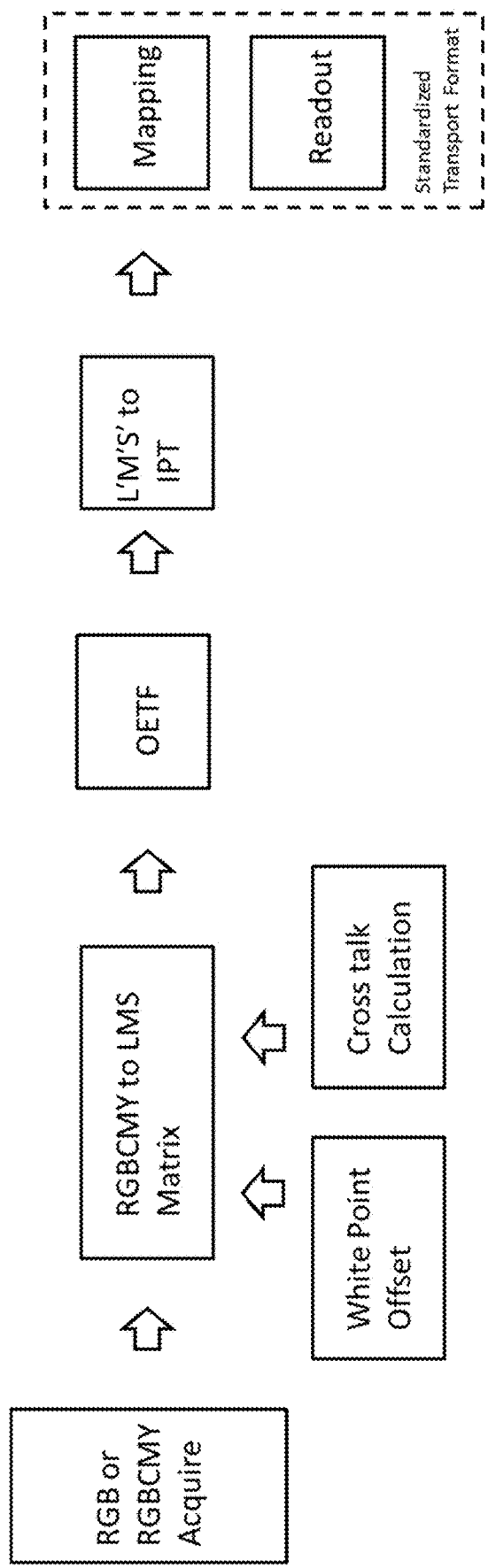
FIG. 26A illustrates one embodiment of an IPT 4:4:4 encode.

FIG. 26A illustrates one embodiment of an IPT 4:4:4 encode.

Figure 26B:
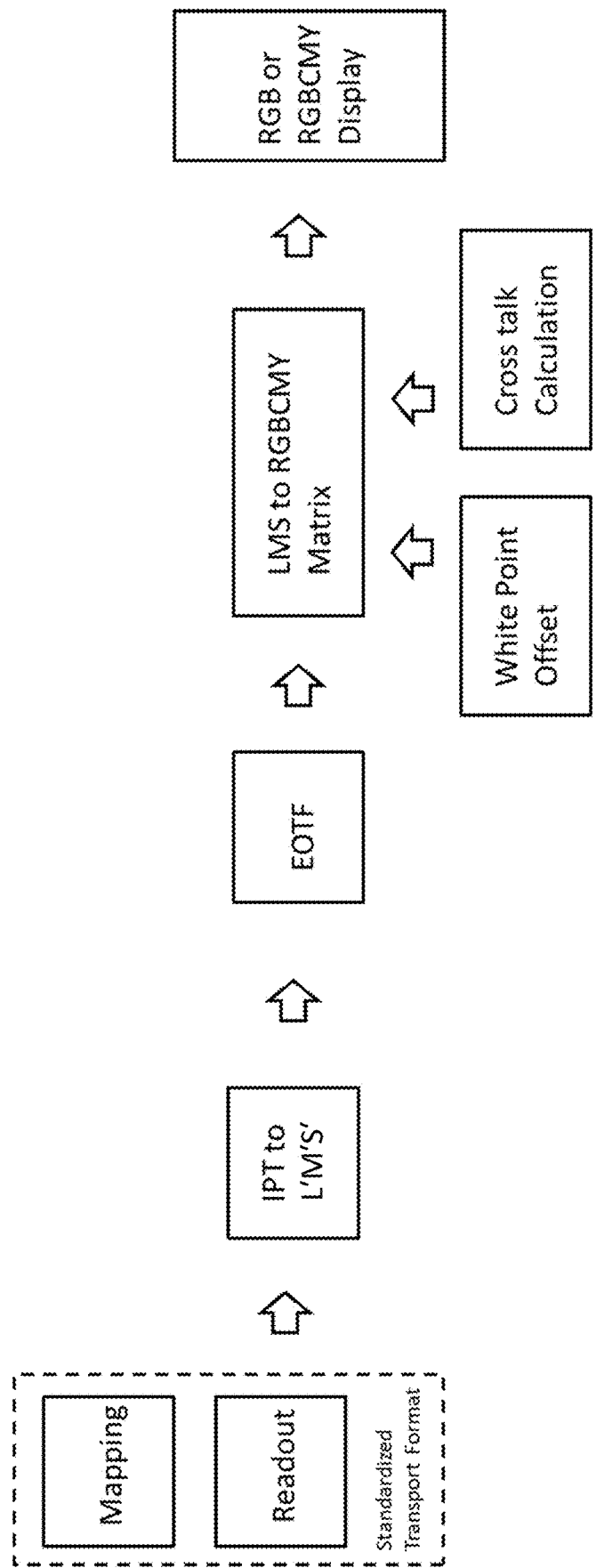
FIG. 26B illustrates one embodiment of an IPT 4:4:4 decode.

FIG. 26B illustrates one embodiment of an IPT 4:4:4 decode.

Figure 27A:
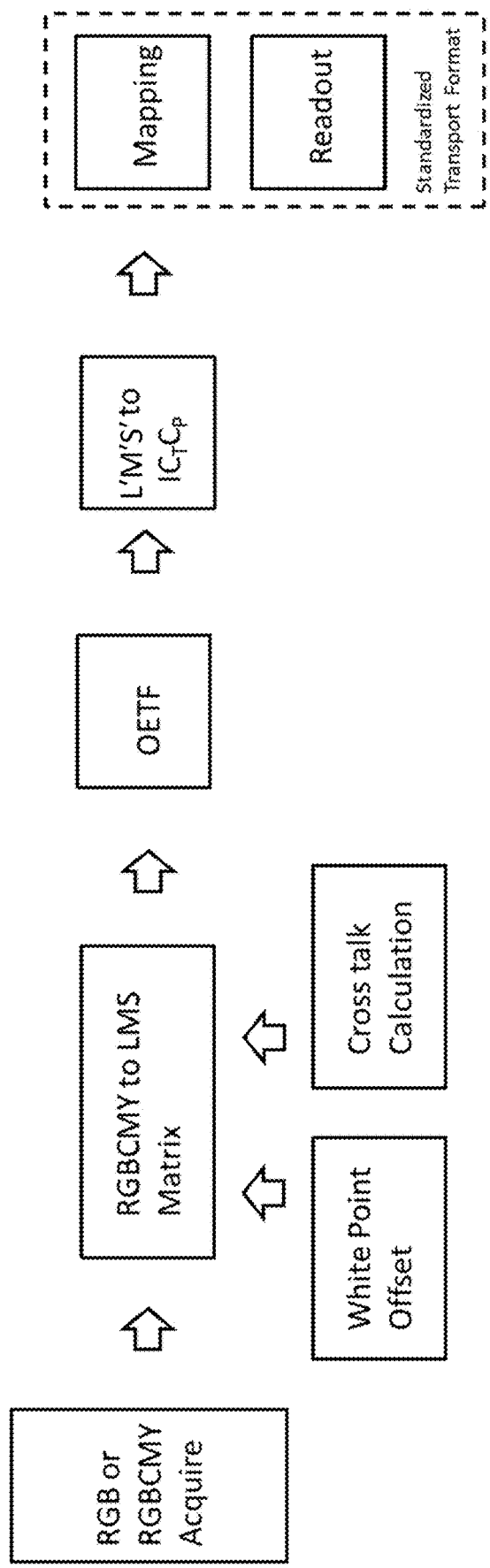
FIG. 27A illustrates one embodiment of an $IC_TC_P$ 4:2:2 encode.

FIG. 27A illustrates one embodiment of an $IC_TC_P$ 4:2:2 encode.

Figure 27B:
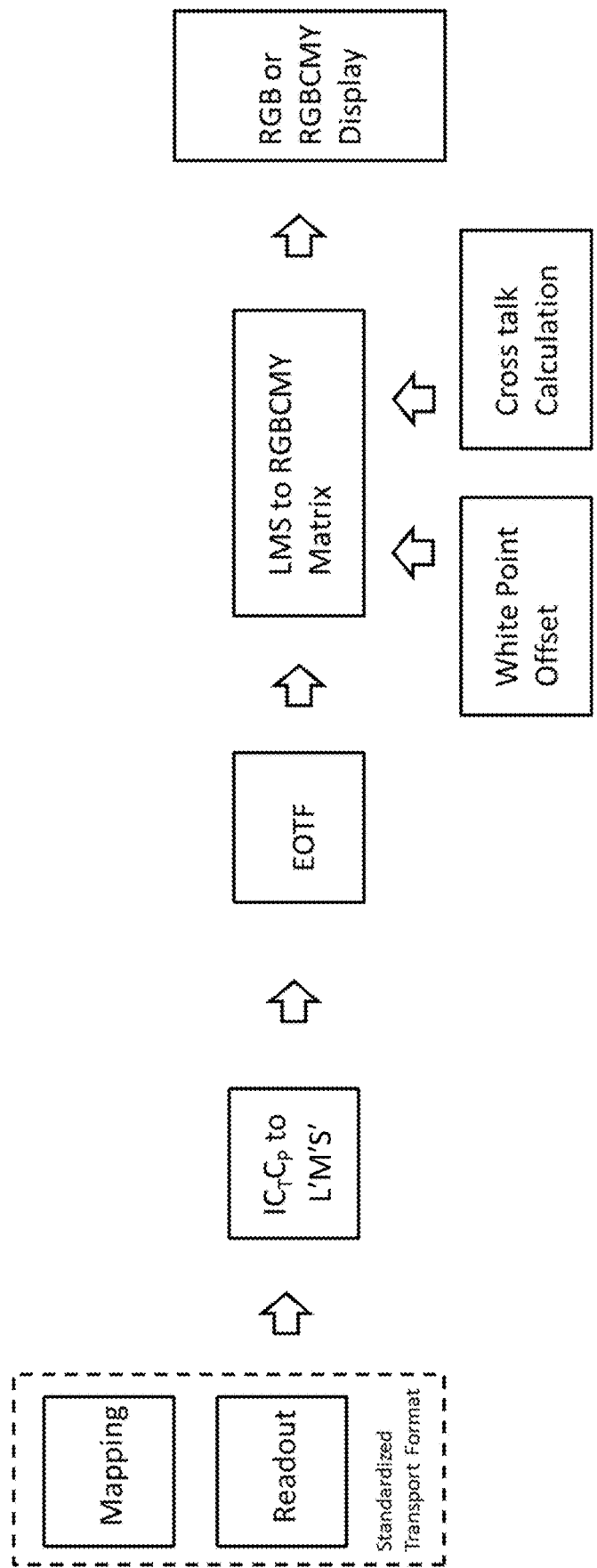
FIG. 27B illustrates one embodiment of an $IC_TC_P$ 4:2:2 decode.

FIG. 27B illustrates one embodiment of an $IC_TC_P$ 4:2:2 decode.

Transfer functions used in systems 1, 2, and 3 are generally framed around two basic implementations. For images displaying using a standard dynamic range, the transfer functions are defined within two standards. The OETF is defined in ITU-R BT.709-6, table 1, row 1.2. The inverse function, the EOTF, is defined in ITU-R BT.1886. For high dynamic range imaging, the perceptual quantizer (PQ) and hybrid log-gamma (HLG) curves are described in ITU-R BT.2100-2:2018, table 4.

Prior art involves the inclusion of a non-linearity based on a chosen optical performance. As imaging technology has progressed, different methods have evolved. At one time, computer displays were using a simple 1.8 gamma, while television assumed an inverse of a 0.045 gamma. When digital cinema was established, a 2.6 gamma was used, and complex HDR solutions have recently been introduced. However, because these are embedded within the RGB structure, conversion between formats is operable to be very complicated and requires vast amounts of processing. Advantageously, a Yxy or Yu'v' system does not require complicated conversion or large amounts of processing.

Reexamination of the use of gamma and optical based transfer curves for data compression led to the development of the Data Range Reduction (DRR) technique. While the form of DRR is similar to the use of gamma, the purpose of DRR is to maximize the efficiency of the number of bits available to the display. The advantage is that DRR is operable to transfer to and/or from any OOTF system using a simple conversion method, such that any input transform is operable to be displayed using any output transform with minimal processing.

By using the DRR process, the image is operable to be encoded within the source device. The use of a common non-linearity allows faster and more accurate conversion. The design of this non-linearity is for data transmission efficiency, not as an optical transform function. This only works if certain parameters are set for the encode. Any pre-process is acceptable, but it must ensure an accurate 16-bit linear result.

Two methods are available for decode: (1) applying the inverse DRR to the input data and converting to a linear data format or (2) a difference between the DRR value and the desired display gamma is operable to be used to directly map the input data to the display for simple display gammas.

Another requirement is that the calculation be simple. By using DRR, processing is kept to a minimum, which reduces signal latency. The non-linearity (e.g., DRR) is applied based on bit levels, not image intensity.

System 4 is operable to use any of the transfer functions, which are operable to be applied to the Y component. However, to improve compatibility and to simplify conversion between standard transfer functions, a new method has been developed: a ½ DRR function. Advantageously, the ½ DRR function allows for a single calculation from the luminance (e.g., Y) component of the signal (e.g., Yxy signal, Yu'v' signal) to the display. Advantageously, the ½ DRR function is designed for data efficiency, not as an optical transform function. In one embodiment, the ½ DRR function is used instead of a non-linear function (e.g., OETF or EOTF). In one embodiment, signal input to the ½ DRR function is assumed to be linear and constrained between values of 0 and 1. In one embodiment, the ½ DRR function is optimized for 10-bit transport and/or 12-bit transport. Alternatively, the ½ DRR function is optimized for 14-bit transport and/or 16-bit transport. In an alternative embodiment, the ½ DRR function is optimized for 8-bit transport. A typical implementation applies an inverse of the ½ DRR function, which linearizes the signal. A conversion to a display gamut is then applied.

Figure 28:
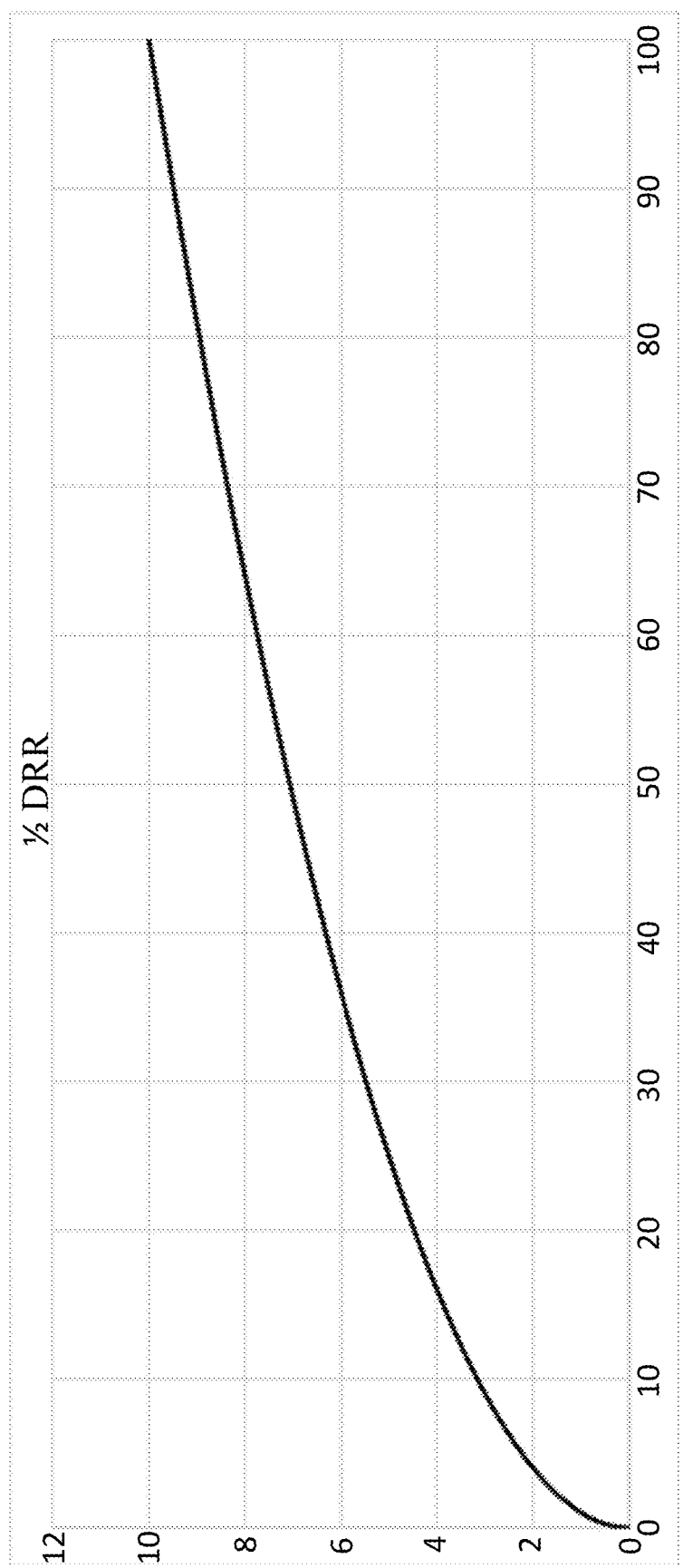
FIG. 28 illustrates one embodiment of a ½ gamma function.

FIG. 28 illustrates one embodiment of a ½ DRR function.

In one embodiment, a DRR is applied to source media as $n=L^{1/\tau}$ and an inverse DRR ($DRR^{-1}$) is applied to a display (or sink) as $L=n^\tau$, where $\tau$ represents the exponent of the inverse non-linearity. In one embodiment, the system incorporates both the source gamma (e.g., OETF) and the display gamma (e.g., EOTF). For example, the following equation for a DRR is used:

$$L = n^{OETF+EOTF}/_{DRR\,value}$$

where the DRR value in this equation is the conversion factor from linear to non-linear. An inverse DRR ($DRR^{-1}$) is the re-expansion coefficient from the non-linear to the linear.

Advantageously, using the ½ DRR function with the OOTF gamma combines the functions into a single step rather than utilizing a two-step conversion process. In one embodiment, at least one tone curve is applied after the ½ DRR function. The ½ DRR function advantageously provides ease to convert to and from linear values. Given that all color and tone mapping has to be done in the linear domain, having a simple to implement conversion is desirable and makes the conversion to and from linear values easier and simpler.

Figure 29:
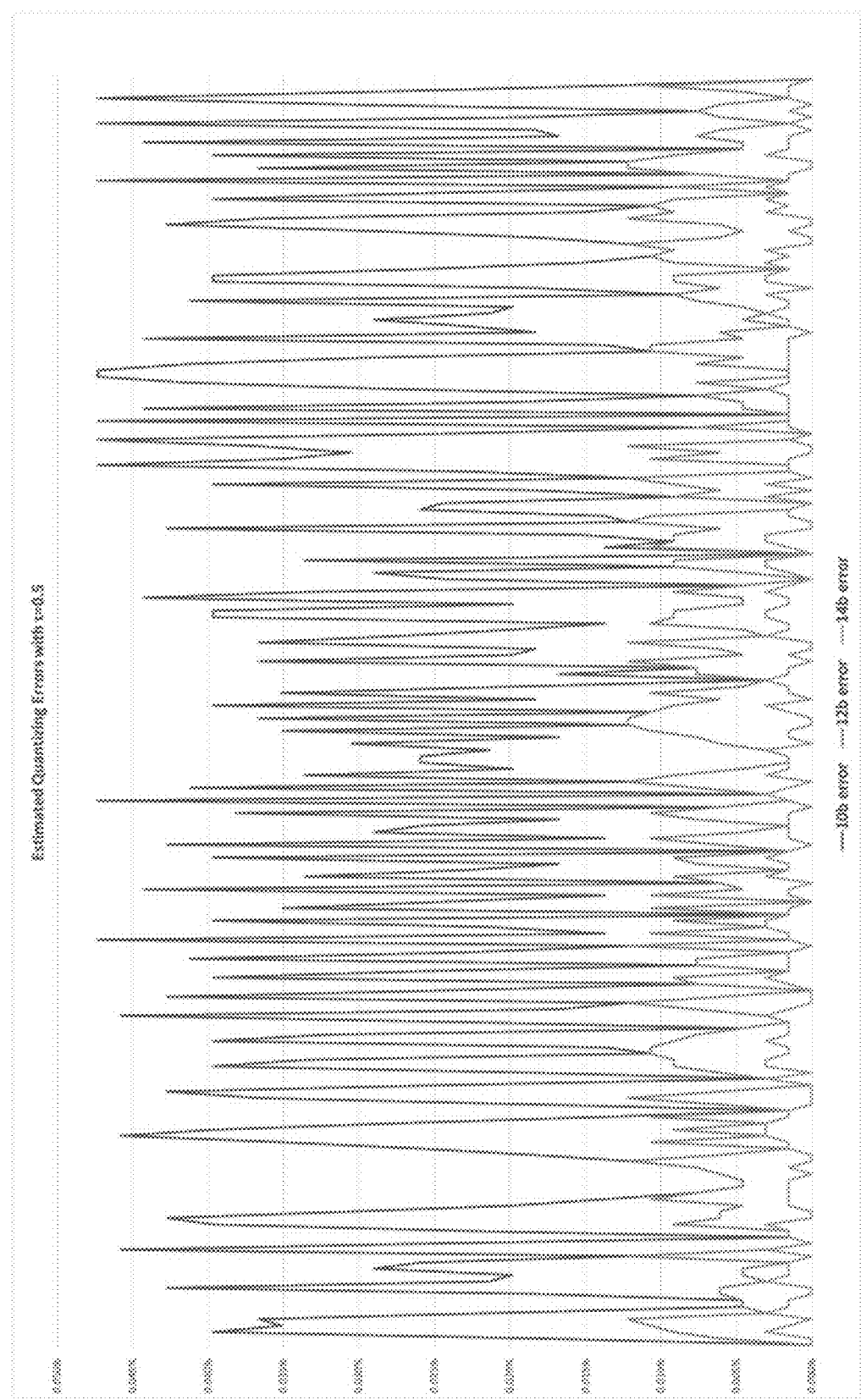
FIG. 29 illustrates a graph of maximum quantizing error using the ½ gamma function.

FIG. 29 illustrates a graph of maximum quantizing error using the ½ DRR function. The maximum quantizing error from an original 16-bit image to a 10-bit (blue trace) signal is shown in the graph. In the embodiment shown in the graph, the maximum quantizing error is less than 0.05% (e.g., 0.047%) for 16-bit to 10-bit conversion using the ½ DRR function. The graph also shows the maximum quantizing error from the original 16-bit image to a 12-bit (orange trace) signal and a 14-bit (gray trace) signal.

While a ½ DRR is ideal for converting images with 16-bit (e.g., 16-bit float) values to 12-bit (e.g., 12-bit integer) values, for other data sets a ⅓ DRR provides equivalent performance in terms of peak signal-to-noise ratio (PSNR). For HDR content, which has a wider luminance dynamic range (e.g., up to 1000 cd/m²), the ⅓ DRR conversion from 16-bit float maintains the same performance as ½ DRR. In one embodiment, an equation for finding an optimum value of tau is:

$$\tau = \frac{-\log_2 (\text{Minimum Float Value})}{\text{Integer Bit Depth}}$$

In one embodiment, the Minimum Float Value is based on the IEEE Standard for Floating-Point Arithmetic (IEEE 754) (July 2019), which is incorporated herein by reference in its entirety. In one embodiment, the range of image values is normalized to between 0 and 1. The range of image values is preferably normalized to between 0 and 1 and then the DRR function is applied.

For example, for an HDR system (e.g., with a luminance dynamic range of 1000-4000 cd/m²), the above equation becomes:

$$\tau = \frac{-\{\log_2 (\text{Minimum Float Value}) - \log_2 (\text{Peak } HDR \text{ value})\}}{\text{Integer Bit Depth}}$$

Figure 30:
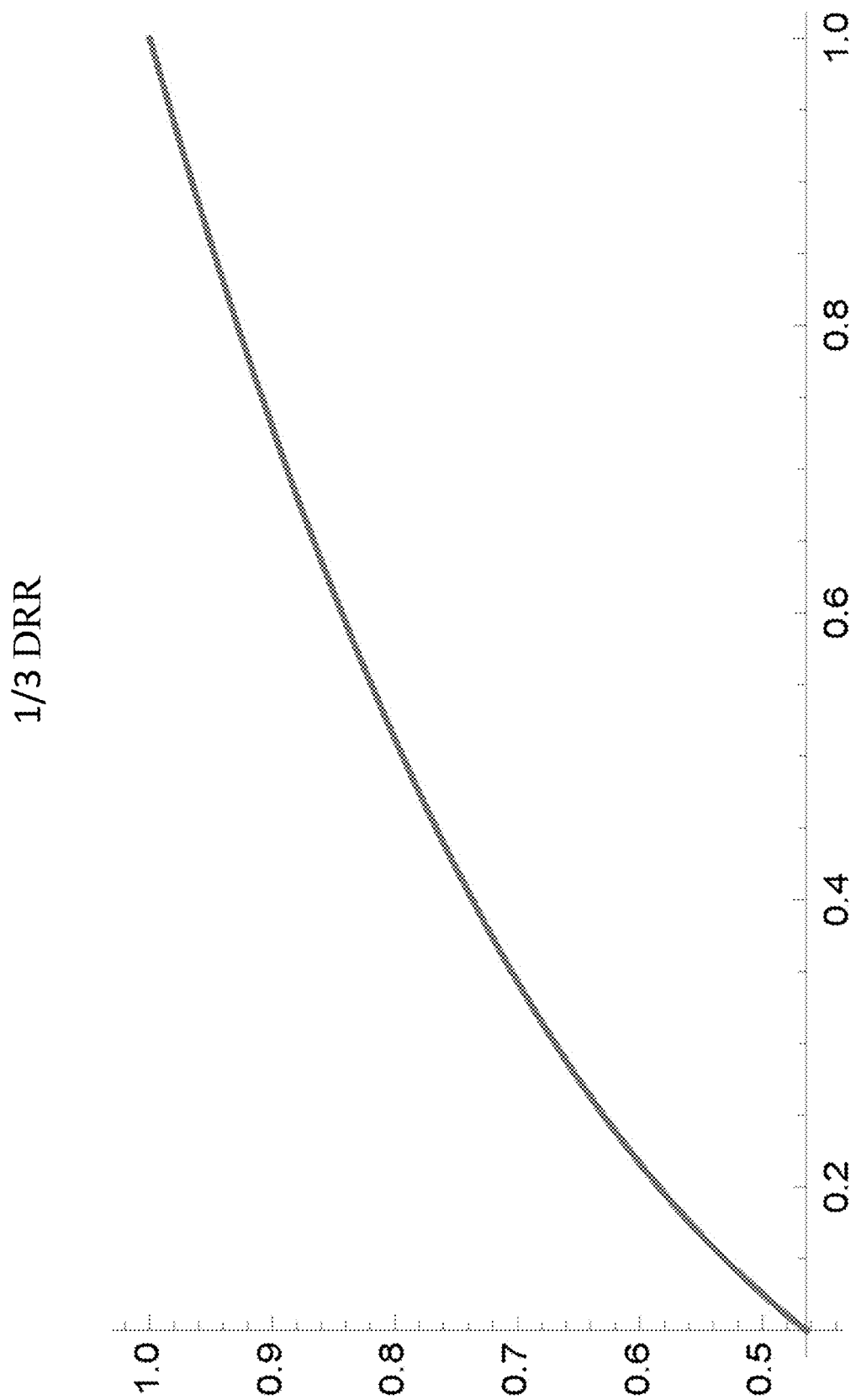
FIG. 30 illustrates one embodiment of a ⅓ gamma function.

FIG. 30 illustrates one embodiment of a ⅓ DRR function.

In one embodiment, the DRR value is preferably between 0.25 and 0.9. Table 8 illustrates one embodiment of an evaluation of DRR vs. bit depth vs. full 16-bit float (equivalent to 24 f-stops). Table 9 illustrates one embodiment of a recommended application of DRR. Table 10 illustrates one embodiment of DRR functions optimized for 8 bits, 10 bits, and 12 bits, based on the desired dynamic range as indicted in f-stops. Each f-stop represents a doubling of light values. The f-stops provide a range of tones over which the noise, measured in f-stops (e.g., the inverse of the perceived signal-to-noise ratio, PSNR) remains under a specified maximum value. The lower the maximum noise, or the higher the PSNR, the better the image quality. In one embodiment, no DRR is applied to Yxy or Yu'v' 16-bit data. In one embodiment, the Yxy or Yu'v' 16-bit data covers 24 f-stops. In one embodiment, a 0.6 DRR is applied to Yxy or Yu'v' 12-bit data, a 0.5 DRR is applied to Yxy or Yu'v' 10-bit data, and/or a 0.4 DRR is applied to Yxy or Yu'v' 8-bit data. In one embodiment, the Yxy or Yu'v' 12-bit data, the Yxy or Yu'v' 10-bit data, and/or the Yxy or Yu'v' 8-bit data cover 20 f-stops.

TABLE 8

Evaluation of DRR vs bit depth vs. full 16 bit float (equiv to 24 f-stops)

| Bit Depth | DRR | PSNR |
|---|---|---|
| 12 | 0.5 | 76 |
| 10 | 0.417 | 63.7 |
| 8 | 0.333 | 49.7 |

TABLE 9

Recommended Application of DRR (equivalent to 20 f-stops)

| Bit Depth | f-stop | DRR | PSNR (test image) | PSNR (linear gradient) |
|---|---|---|---|---|
| 12 | 20 | 0.6 | 68.8 | 80.3 |
| 10 | 20 | 0.5 | 51.5 | 73.6 |
| 8 | 20 | 0.4 | 43.6 | 56.2 |

TABLE 10

Evaluation of DRR vs bit depth vs dynamic range in f-stops

| Bit Depth | f-stop | DRR | PSNR |
|---|---|---|---|
| 12 | 14 | 0.8571 | 63.3 |
| 12 | 16 | 0.75 | 67.4 |
| 12 | 20 | 0.6 | 68.8 |
| 10 | 14 | 0.7143 | 53.8 |
| 10 | 16 | 0.625 | 51.5 |
| 10 | 20 | 0.5 | 51.5 |
| 8 | 14 | 0.5714 | 40 |
| 8 | 16 | 0.5 | 39.8 |
| 8 | 20 | 0.4 | 43.6 |

Encoder and Decoder

In one embodiment, the multi-primary system includes an encoder operable to accept image data input (e.g., RAW, SDI, HDMI, DisplayPort, ethernet). In one embodiment, the image data input is from a camera, a computer, a processor, a flash memory card, a network (e.g., local area network (LAN)), or any other file storage or transfer medium operable to provide image data input. The encoder is operable to send processed image data (e.g., Yxy, XYZ, Yu'v') to a decoder (e.g., via wired or wireless communication). The decoder is operable to send formatted image data (e.g., SDI, HDMI, Ethernet, DisplayPort, Yxy, XYZ, Yu'v', legacy RGB, multi-primary data (e.g., RGBC, RGBCMY, etc.)) to at least one viewing device (e.g., display, monitor, projector) for display (e.g., via wired or wireless communication). In one embodiment, the decoder is operable to send formatted image data to at least two viewing devices simultaneously. In one embodiment, two or more of the at least two viewing devices use different color spaces and/or formats. In one example, the decoder sends formatted image data to a first viewing device in HDMI and a second viewing device in SDI. In another example, the decoder sends formatted image data as multi-primary (e.g., RGBCMY, RGBC) to a first viewing device and as legacy RGB (e.g., Rec. 709) to a second viewing device. In one embodiment, the Ethernet formatted image data is compatible with SMPTE ST2022. Additionally or alternatively, the Ethernet formatted image data is compatible with SMPTE ST2110 and/or any internet protocol (IP)-based transport protocol for image data.

The encoder and the decoder preferably include at least one processor. By way of example, and not limitation, the at least one processor is be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated or transistor logic, discrete hardware components, or any other suitable entity or combinations thereof that can perform calculations, process instructions for execution, and/or other manipulations of information. In one embodiment, one or more of the at least one processor is operable to run predefined programs stored in at least one memory of the encoder and/or the decoder.

The encoder and/or the decoder include hardware, firmware, and/or software. In one embodiment, the encoder and/or the decoder is operable to be inserted into third party software (e.g., via a dynamic-link library (DLL)). In one embodiment, functionality and/or features of the encoder and/or the decoder are combined for efficiency.

Figure 31:
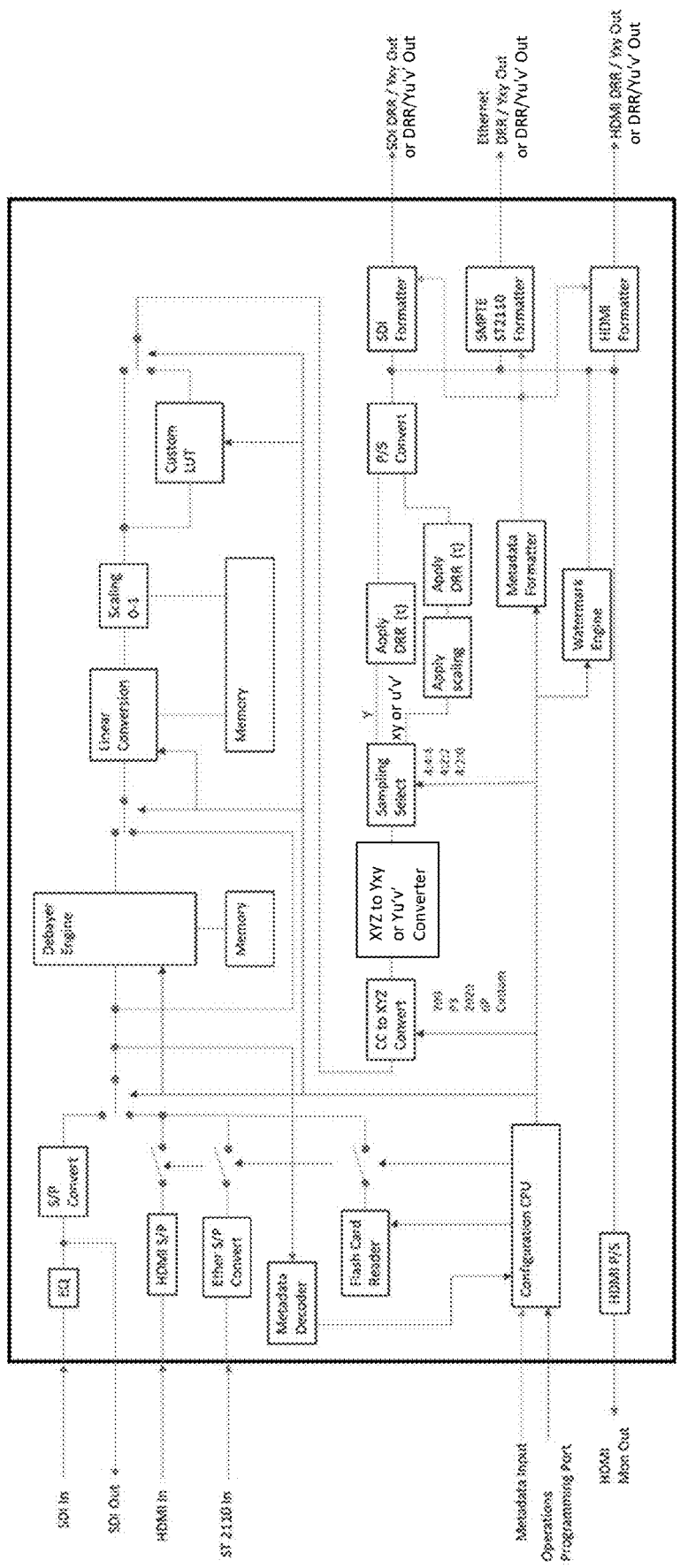
FIG. 31 illustrates one embodiment of an encoder.

FIG. 31 illustrates one embodiment of an encoder. The encoder includes at least one encoder input (e.g., SDI, HDMI, SMPTE ST2110, SMPTE ST2022, DisplayPort, fiber, ethernet) and at least one encoder output (e.g., SDI, HDMI, SMPTE ST2110, SMPTE ST2022, Yxy SDI, Yxy HDMI, Yu'v' SDI, Yu'v' HDMI, DisplayPort, fiber, ethernet). The encoder preferably includes an encoder operations programming port operable to provide updates to firmware and/or software on the encoder. For example, the encoder operations programming port is operable to update library functions, internal formatting, camera demosaicing (e.g., DeBayer) pattern algorithms, and/or look-up tables in the encoder. In one embodiment, the encoder includes a metadata input. In one embodiment, the encoder includes an encoder configuration central processing unit (CPU) operable to interface with at least one encoder memory. The encoder further includes an encoder equalizer, at least one encoder serial to parallel (S/P) converter (e.g., SDI S/P converter, HDMI S/P, Ethernet S/P converter), at least one encoder flash card reader, at least one Ethernet port, a demosaicing (e.g., DeBayer) engine, a linear converter, a scaler (e.g., 0-1), at least one custom encoder LUT, a color channel-to-XYZ converter (e.g., RGB in Rec. 709, P3, Rec. 2020; 6P; multi-primary; ACES; custom), an XYZ-to-Yxy converter, an XYZ-to-Yu'v' converter, a DRR function (e.g., ½ DRR), an xy scaler, a u'v' scaler, a sampling selector (e.g., 4:4:4, 4:2:2, 4:2:0), a metadata decoder, an encoder metadata formatter, at least one encoder parallel to serial (P/S) converter (e.g., SDI P/S converter, HDMI P/S converter, Ethernet P/S converter), at least one encoder formatter (e.g., SDI formatter, HDMI formatter, Ethernet formatter), and/or a watermark engine. In one embodiment, the input data is operable to bypass any combination of processing stages and/or components in the encoder.

The at least one encoder input includes, but is not limited to, an SDI input, an HDMI input, a DisplayPort input, an ethernet input, and/or a SMPTE ST2110 input. The SDI input preferably follows a modified version of SMPTE ST352 payload identification (ID) standard. In one embodiment, the SDI input is SMPTE ST292, SMPTE ST425, and/or SMPTE ST2082. In one embodiment, a video signal from the SDI input is then sent to the encoder equalizer to compensate for cable type and length. In one embodiment, the HDMI input is decoded with a standard HDMI receiver circuit. In one embodiment, the HDMI input is converted to a parallel format. In one embodiment, the HDMI input is defined within the CTA 861 standard. In another embodiment, the at least one encoder input includes image data (e.g., RAW data) from a flash device. The configuration CPU identifies a format on the flash card and/or a file type, and has software operable to read the image data and make it available to the encoder.

In one embodiment, the encoder operations port is operable to connect to an encoder control system (e.g., via a micro universal serial bus (USB) or equivalent). In one embodiment, the encoder control system is operable to control the at least one encoder memory that holds tables for the decmosaicing (e.g., DeBayer) engine, load modifications to the linear converter and/or scaler, select the at least one input, loads a table for the at least one custom encoder LUT, bypass one or more of the at least one custom encoder LUT, bypass the demosaicing (e.g., DeBayer) engine, add or modify conversion tables for the RGB to XYZ converter, modify the DRR function (e.g., a ½ DRR function), turn the watermark engine on or off, modify a digital watermark for the watermark engine, and/or perform functions for the flash memory player (e.g., play, stop, forward, fast forward, rewind, fast rewind, frame selection).

In one embodiment, the metadata decoder is operable to decode Extended Display Identification Data (EDID) (e.g., for HDMI inputs), SDP parameters (SMPTE ST 2110), payload ID, and/or ancillary information (e.g., vertical ancillary data (VANC)). The encoder configuration CPU is operable to process data from the metadata decoder. Further, the encoder configuration CPU is operable to select particular settings and/or deliver selected data to the encoder metadata formatter. The metadata input is operable to insert additional data and/or different data values, which are also operable to be sent to the encoder metadata formatter. The encoder metadata formatter is operable to take information from the encoder configuration CPU and arrange the information to be reinserted into the output of the process. In one embodiment, each encoder output formatter then takes this formatted data and times it to be used in the serial stream.

In one embodiment, the at least one S/P converter is up to n bit for improved processing efficiency. The at least one S/P converter preferably formats the processed image data so that the encoder and/or the decoder is operable to use parallel processing. Advantageously, parallel processing keeps processing fast and minimizes latency.

The at least one encoder formatter is operable to organize the serial stream as a proper format. In a preferred embodiment, the encoder includes a corresponding encoder formatter for each of the at least one encoder output. For example, if the encoder includes at least one HDMI output in the at least one encoder output, the encoder also includes at least one HDMI formatter in the at least one encoder formatter; if the encoder includes at least one SDI output in the at least one encoder output, the encoder also includes at least one SDI formatter in the at least one encoder formatter; if the encoder includes at least one Ethernet output in the at least one encoder output, the encoder also includes at least one Ethernet formatter in the at least one encoder formatter; and so forth.

There is an advantage of inputting a RAW camera image to take advantage of the extended dynamic range and wider color gamut versus using a standard video input. In one embodiment, the demosaicing (e.g., DeBayer) engine is operable to convert RAW image data into a raster image. In one embodiment, the raster image is a 3-channel image (e.g., RGB). In one embodiment, the demosaicing (e.g., DeBayer) engine is bypassed for data that is not in a RAW image format. In one embodiment, the demosaicing (e.g., DeBayer) engine is configured to accommodate at least three primaries (e.g., 3, 4, 5, 6, 7, 8, etc.) in the Bayer or stripe pattern. To handle all of the different demosaicing (e.g., DeBayer) options, the operations programming port is operable to load a file with code required to adapt a specific pattern (e.g., Bayer). For images that are not RAW, a bypass path is provided and switched to and from using the encoder configuration CPU. In one embodiment, the encoder is operable to recognize the image data format and select the correct path automatically. Alternatively, the image data format is included in metadata.

The encoder configuration CPU is operable to recognize an input non-linearity value and provide an inverse value to the linear converter to linearize the image data. The scaler is operable to map out of gamut values into in gamut values.

In one embodiment, the at least one custom encoder LUT is operable to transform an input (e.g., a standard from a manufacturer) to XYZ, Yxy, or Yu'v'. Examples of the input include, but are not limited to, RED Log 3G10, ARRI log C, ACEScc, SONY S-Log, CANON Log, PANASONIC V Log, PANAVISION Panalog, and/or BLACK MAGIC CinemaDNG. In one embodiment, the at least one custom encoder LUT is operable to transform the input to an output according to artistic needs. In one embodiment, the encoder does not include the color channel-to-XYZ converter or the XYZ-to-Yxy converter, as this functionality is incorporated into the at least one custom encoder LUT. In one embodiment, the at least one custom encoder LUT is a 65-cube look-up table. The at least one custom encoder LUT is preferably compatible with ACES Common LUT Format (CLF)—A Common File Format for Look-Up Tables S-2014-006, which was published Jul. 22, 2021 and which is incorporated herein by reference in its entirety. In one embodiment, the at least one custom encoder LUT is a multi-column LUT. The at least one custom encoder LUT is preferably operable to be loaded through the operations programming port. If no LUT is required, the encoder configuration CPU is operable to bypass the at least one custom encoder LUT.

In one embodiment, RGB or multi-primary (e.g., RGBCMY, RGBC) data is converted into XYZ data using the color channel-to-XYZ converter. In a preferred embodiment, a white point value for the original video data (e.g., RGB, RGBCMY) is stored in one or more of the at least one encoder memory. The encoder configuration CPU is operable to provide an adaption calculation using the white point value. The XYZ-to-Yxy converter is operable to convert XYZ data to Yxy data. Advantageously, the Yxy image data is segmented into a luminance value and a set of colorimetric values, the relationship between Y and x,y is operable to be manipulated to use lower data rates. Similarly, the XYZ-to-Yu'v' converter is operable to convert XYZ data to Yu'v' data, and the conversion is operable to be manipulated to use lower data rates. Any system with a luminance value and a set of colorimetric values is compatible with the present invention. The configuration CPU is operable to set the sample selector to fit one or more of the at least one encoder output. In one embodiment, the sampling selector sets a sampling structure (e.g., 4:4:4, 4:2:2, 4:2:0, 4:1:1). The sampling selector is preferably controlled by the encoder configuration CPU. In a preferred embodiment, the sampling selector also places each component in the correct serial data position as shown in Table 8.

TABLE 8

|  | 4:4:4 | 4:2:2, 4:2:0, or 4:1:1 |
| --- | --- | --- |
| Y | Y, G, I | Y, I |
| x or u' | CB, R, X, CT | CB, CT |
| y or v' | CR, B, Z, CP | CR, CP |

The watermark engine is operable to modify an image from an original image to include a digital watermark. In one embodiment, the digital watermark is outside of the ITU-R BT.2020 color gamut. In one embodiment, the digital watermark is compressed, collapsed, and/or mapped to an edge of the smaller color gamut such that it is not visible and/or not detectable when displayed on a viewing device with a smaller color gamut than ITU-R BT.2020. In another embodiment, the digital watermark is not visible and/or not detectable when displayed on a viewing device with an ITU-R BT.2020 color gamut. In one embodiment, the digital watermark is a watermark image (e.g., logo), alphanumeric text (e.g., unique identification code), and/or a modification of pixels. In one embodiment, the digital watermark is invisible to the naked eye. In a preferred embodiment, the digital watermark is perceptible when decoded by an algorithm. In one embodiment, the algorithm uses an encryption key to decode the digital watermark. In another embodiment, the digital watermark is visible in a non-obtrusive manner (e.g., at the bottom right of the screen). The digital watermark is preferably detectable after size compression, scaling, cropping, and/or screenshots. In yet another embodiment, the digital watermark is an imperceptible change in sound and/or video. In one embodiment, the digital watermark is a pattern (e.g., a random pattern, a fixed pattern) using a luminance difference (e.g., 1 bit luminance difference). In one embodiment, the pattern is operable to change at each frame. The digital watermark is a dynamic digital watermark and/or a static digital watermark. In one embodiment, the dynamic digital watermark works as a full frame rate or a partial frame rate (e.g., half frame rate). The watermark engine is operable to accept commands from the encoder configuration CPU.

In an alternative embodiment, the at least one encoder input already includes a digital watermark when input to the encoder. In one embodiment, a camera includes the digital watermark on an image signal that is input to the encoder as the at least one encoder input.

The at least one encoder output includes, but is not limited to SDI, HDMI, DisplayPort, and/or ethernet. In one embodiment, at least one encoder formatter formats the image data to produce the at least one encoder output. The at least one encoder formatter includes, but is not limited to, an SDI formatter, an SMPTE ST2110, and/or an HDMI formatter. In one embodiment, the SDI formatter formats the serial video data into an SDI package as a Yxy or Yu'v' output. The SMPTE ST2110 formatter formats the serial video data into an ethernet package as a Yxy or Yu'v' output. The HDMI formatter formats the serial video data into an HDMI package as a Yxy or Yu'v' output.

Figure 32:
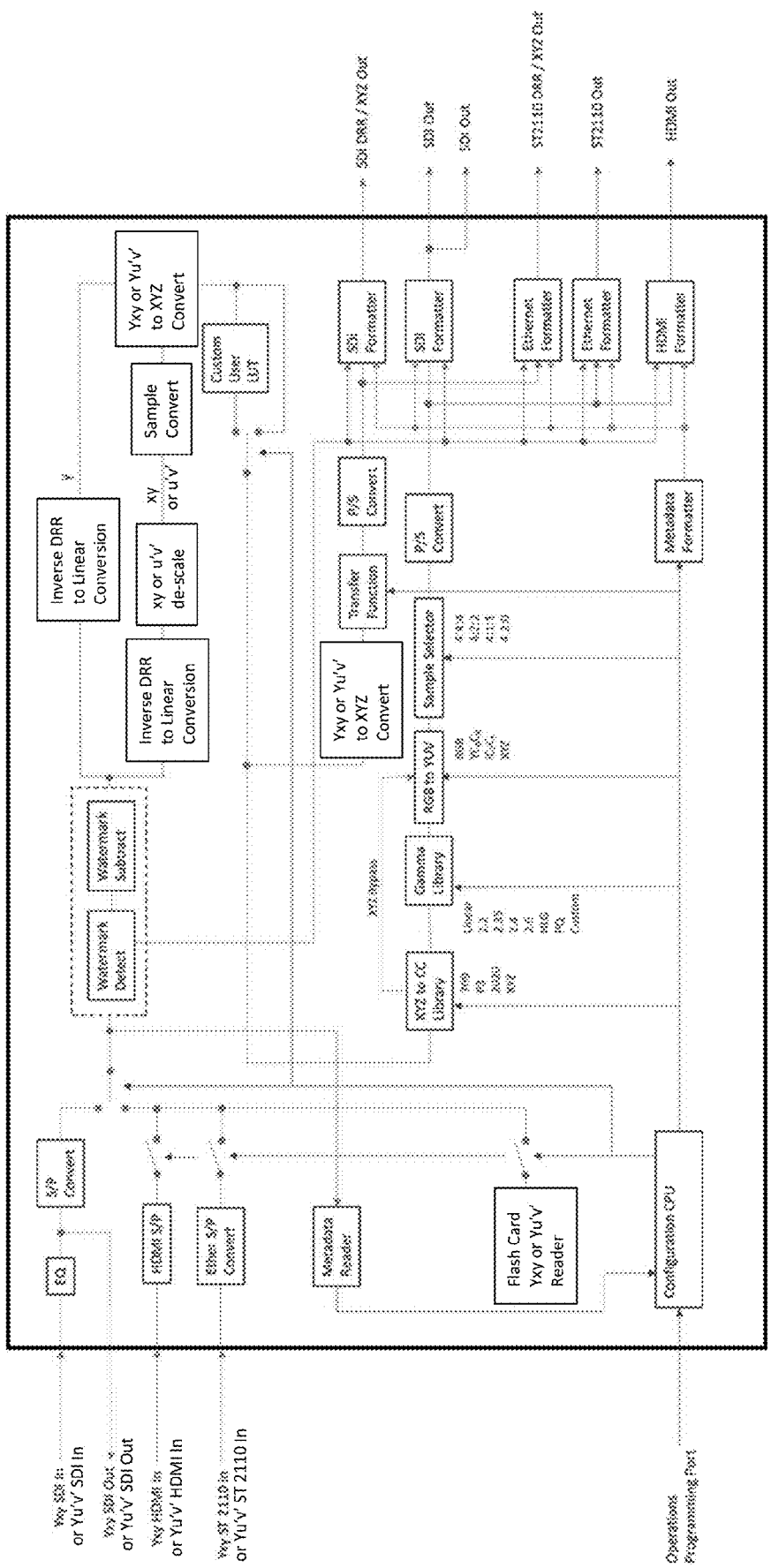
FIG. 32 illustrates one embodiment of a decoder.

FIG. 32 illustrates one embodiment of a decoder. The decoder includes at least one decoder input (e.g., SDI, HDMI, Ethernet, Yxy SDI, Yxy HDMI, Yxy Ethernet, Yu'v' SDI, Yu'v' HDMI, Yu'v' Ethernet, DisplayPort, fiber) and at least one decoder output (e.g., Yxy SDI, Yu'v' SDI, at least one SDI, X'Y'Z', HDMI, Ethernet, DisplayPort, fiber). In one embodiment, the decoder includes a decoder configuration central processing unit (CPU) operable to interface with at least one decoder memory. The decoder preferably includes a decoder operations programming port operable to provide updates to firmware and/or software on the decoder. The decoder further includes a decoder equalizer, at least one decoder serial to parallel (S/P) converter (e.g., SDI S/P converter, HDMI S/P converter, Ethernet S/P converter), a watermark detection engine, a watermark subtraction engine, a DRR-to-linear converter (e.g., ½ DRR-to-linear converter), an xy de-scaler, a u'v' de-scaler, at least one sampling converter (e.g., 4:2:2 or 4:2:0 to 4:4:4 converter), at least one Yxy-to-XYZ converter, at least one Yu'v'-to-XYZ converter, a gamma library (e.g., linear, 2.2, 2.35, 2.4, 2.6, HLG, PQ, custom), an XYZ-to-color channel library (e.g., RGB (e.g., Rec. 709, P3, Rec. 2020); multi-primary data), a color channel-to-YUV library (e.g., RGB (e.g., Rec.

709, P3, Rec. 2020); multi-primary data), at least one sample selector, at least one transfer function, at least one custom decoder LUT, a metadata reader, a decoder metadata formatter, at least one decoder parallel to serial (P/S) converter (e.g., SDI X'Y'Z', at least one SDI, HDMI), and/or at least one decoder formatter (e.g., SDI X'Y'Z' formatter, SDI RGB formatter, SDI CMY formatter, HDMI formatter). In one embodiment, X'Y'Z' output includes a non-linear function (e.g., gamma, PQ, HLG) applied to XYZ data. In one embodiment, the processed image data is operable to bypass any combination of processing stages and/or components in the decoder.

In one embodiment, the decoder operations port is operable to connect to a decoder control system (e.g., via a micro universal serial bus (USB) or equivalent). In one embodiment, the decoder control system is operable to select the at least one decoder input, perform functions for the flash memory player (e.g., play, stop, forward, fast forward, rewind, fast rewind, frame selection), turn watermark detection on or off, add or modify the gamma library and/or look-up table selection, add or modify the XYZ-to-RGB library and/or look-up table selection, load data to the at least one custom decoder LUT, select bypass of one or more of the custom decoder LUT, and/or modify the Ethernet SDP. The gamma library preferably takes linear data and applies at least one non-linear function to the linear data. The at least non-linear function includes, but is not limited to, at least one standard gamma (e.g., those used in standard dynamic range (SDR) and high definition range (HDR) formats) and/or at least one custom gamma. In one embodiment, the at least one standard gamma is defined in ITU BT.709 or ITU BT.2100.

In one embodiment, the output of the gamma library is fed to the XYZ-to-RGB library, where tables are included to map the XYZ data to a standard RGB or YCbCr output format. In another embodiment, the output of the gamma library bypasses the XYZ-to-RGB library. This bypass leaves an output of XYZ data with a gamma applied. The selection of the XYZ-to-RGB library or bypass is determined by the configuration CPU. If the output format selected is YCbCr, then the XYZ-to-RGB library flags which sampling method is desired and provides that selection to the sampling selector. The sampling selector then formats the YCbCr data to a 4:2:2, 4:2:0, or 4:1:1 sampling structure.

In one embodiment, an input to the decoder does not include full pixel sampling (e.g., 4:2:2, 4:2:0, 4:1:1). The at least one sampling converter is operable to take subsampled images and convert the subsampled images to full 4:4:4 sampling. In one embodiment, the 4:4:4 Yxy image data is then converted to XYZ using the at least one Yxy-to-XYZ converter. In another embodiment, the 4:4:4 Yu'v' image data is then converted to XYZ using the Yu'v' using the at least one Yu'v'-to-XYZ converter. Image data is then converted from a parallel form to a serial stream.

The metadata reader is operable to read Extended Display Identification Data (EDID) (e.g., for HDMI inputs), SDP parameters (SMPTE ST 2110), payload ID, and/or ancillary information (e.g., vertical ancillary data (VANC)). The decoder configuration CPU is operable to process data from the metadata reader. Further, the decoder configuration CPU is operable to select particular settings and/or deliver selected data to the decoder metadata formatter. The decoder metadata formatter is operable to take information from the decoder configuration CPU and arrange the information to be reinserted into the output of the process. In one embodiment, each decoder output formatter then takes this formatted data and times it to be used in the serial stream.

In one embodiment, the at least one SDI output includes more than one SDI output. Advantageously, this allows for output over multiple links (e.g., System 3). In one embodiment, the at least one SDI output includes a first SDI output and a second SDI output. In one embodiment, the first SDI output is used to transport a first set of color channel data (e.g., RGB) and the second SDI output is used to transport a second set of color channel data (e.g., CMY).

The watermark detection engine detects the digital watermark. In one embodiment, a pattern of the digital watermark is loaded to the decoder using the operations programming port. In one embodiment, the decoder configuration CPU is operable to turn the watermark detection engine on and off. The watermark subtraction engine removes the digital watermark from image data before formatting for display on the at least one viewing device. In one embodiment, the decoder configuration CPU is operable to allow bypass of the watermark subtraction engine, which will leave the digital watermark on an output image. In a preferred embodiment, the decoder requires the digital watermark in the processed image data sent from the encoder to provide the at least one decoder output. Thus, the decoder does not send color channel data to the at least one viewing device if the digital watermark is not present in the processed image data. In an alternate embodiment, the decoder is operable to provide the at least one decoder output without the digital watermark in the processed image data sent from the encoder. If the digital watermark is not present in the processed image data, an image displayed on the at least one viewing device preferably includes a visible watermark.

In one embodiment, output from the watermark subtraction process includes data including a non-linearity (e.g., ½ DRR). Non-linear data is converted back to linear data using an inverse non-linear transfer function (e.g., $NLTF^{-1}$) for the Y channel and the xy or u'v' channels. The xy or u'v' channels are rescaled and undergo sampling conversion.

In one embodiment, the at least one custom decoder LUT includes a 9-column LUT. In one embodiment, the 9-column LUT includes 3 columns for a legacy RGB output (e.g., Rec. 709, Rec. 2020, P3) and 6 columns for a 6P multi-primary display (e.g., RGBCMY). Other numbers of columns (e.g., 7 columns) and alternative multi-primary displays (e.g., RGBC) are compatible with the present invention. In one embodiment, the at least one custom decoder LUT (e.g., the 9-column LUT) is operable to produce output values using tetrahedral interpolation. Advantageously, tetrahedral interpolation uses a smaller volume of color space to determine the output values, resulting in more accurate color channel data. In one embodiment, each of the tetrahedrons used in the tetrahedral interpolation includes a neutral diagonal. Advantageously, this embodiment works even with having less than 6 color channels. For example, a 4P output (e.g., RGBC) or a 5P output (e.g., RGBCY) using an FPGA is operable to be produced using tetrahedral interpolation. Further, this embodiment allows for an encoder to produce legacy RGB output in addition to multi-primary output. In an alternative embodiment, the at least one custom decoder LUT is operable to produce output value using cubic interpolation. The at least one custom decoder LUT is preferably operable to accept linear XYZ data. In one embodiment, the at least one custom decoder LUT is a multi-column LUT. The at least one custom decoder LUT is preferably operable to be loaded through the operations programming port. If no LUT is required, the decoder configuration CPU is operable to bypass the at least one custom decoder LUT.

In one embodiment, the at least one custom decoder LUT is operable to be used for streamlined HDMI transport. In one embodiment, the at least one custom decoder LUT is a 3D LUT. In one embodiment, the at least one custom decoder LUT is operable to take in a 3-column input (e.g., RGB, XYZ) and produce an output of greater than three columns (e.g., RGBC, RGBCY, RGBCMY). Advantageously, this system only requires 3 channels of data as the input to the at least one custom decoder LUT. In one embodiment, the at least one custom decoder LUT applies a non-linear function (e.g., inverse gamma) and/or a curve to produce a linear output. In another embodiment, the at least one custom decoder LUT is a trimming LUT.

The at least one decoder formatter is operable to organize a serial stream as a proper format for the at least one output. In a preferred embodiment, the decoder includes a corresponding decoder formatter for each of the at least one decoder output. For example, if the decoder includes at least one HDMI output in the at least one decoder output, the decoder also includes at least one HDMI formatter in the at least one decoder formatter; if the decoder includes at least one SDI output in the at least one decoder output, the decoder also includes at least one SDI formatter in the at least one decoder formatter; if the decoder includes at least one Ethernet output in the at least one decoder output, the decoder also includes at least one Ethernet formatter in the at least one decoder formatter; and so forth.

The encoder and/or the decoder are operable to generate, insert, and/or recover metadata related to an image signal. The metadata includes, but is not limited to, a color space (e.g., 6P-B, 6P-C), an image transfer function (e.g., DRR, gamma, PQ, HLG, ½ DRR), a peak white value, a white point (e.g., D65, D60, DCI), an image signal range (e.g., narrow (SMPTE) or full), sampling structure (e.g., 4:4:4, 4:2:2, 4:2:0, 4:1:1), bit depth, (e.g., 8, 10, 12, 16), and/or a signal format (e.g., RGB, Yxy, Yu'v', multi-primary (e.g., RGBCMY, RGBC)). In one embodiment, the metadata is inserted into SDI or ST2110 using ancillary (ANC) data packets. In another embodiment, the metadata is inserted using Vendor Specific InfoFrame (VSIF) data as part of the CTA 861 standard. In one embodiment, the metadata is compatible with SMPTE ST 2110-10:2017, SMPTE ST 2110-20:2017, SMPTE ST 2110-40:2018, SMPTE ST 352: 2013, and/or SMPTE ST 352:2011, each of which is incorporated herein by reference in its entirety.

Additional details about the multi-primary system and the display are included in U.S. application Ser. Nos. 17/180, 441 and 17/209,959, and U.S. Patent Publication Nos. 20210027693, 20210020094, 20210035487, and 20210043127, each of which is incorporated herein by reference in its entirety.

Display Engine

In one embodiment, the present invention provides a display engine operable to interact with a graphics processing unit (GPU) and provide Yxy, XYZ, YUV, Yu'v', RGB, YCrCb, and/or $IC_TC_P$ configured outputs. In one embodiment, the display engine and the GPU are on a video card. Alternatively, the display engine and the GPU are embedded on a motherboard or a central processing unit (CPU) die. The display engine and the GPU are preferably included in and/or connected to at least one viewing device (e.g., display, video game console, smartphone, etc.). Additional information related to GPUs are disclosed in U.S. Pat. Nos. 9,098,323; 9,235,512; 9,263,000; 9,318,073; 9,442,706; 9,477,437; 9,494,994; 9,535,815; 9,740,611; 9,779,473; 9,805,440; 9,880,851; 9,971,959; 9,978,343; 10,032,244; 10,043,232; 10,114,446; 10,185,386; 10,191,759; 10,229, 471; 10,324,693; 10,331,590; 10,460,417; 10,515,611; 10,521,874; 10,559,057; 10,580,105; 10,593,011; 10,600, 141; 10,628,909; 10,705,846; 10,713,059; 10,769,746; 10,839,476; 10,853,904; 10,867,362; 10,922,779; 10,923, 082; 10,963,299; and 10,970,805 and U.S. Patent Publication Nos. 20140270364, 20150145871, 20160180487, 20160350245, 20170178275, 20170371694, 20180121386, 20180314932, 20190034316, 20190213706, 20200098082, 20200183734, 20200279348, 20200294183, 20200301708, 20200310522, 20200379864, and 20210049030, each of which is incorporated herein by reference in its entirety.

In one embodiment, the GPU includes a render engine. In one embodiment, the render engine includes at least one render pipeline (RP), a programmable pixel shader, a programmable vector shader, a vector array processor, a curvature engine, and/or a memory cache. The render engine is operable to interact with a memory controller interface, a command CPU, a host bus (e.g., peripheral component interconnect (PCI), PCI Express (PCIe), accelerated graphics port (AGP)), and/or an adaptive full frame anti-aliasing. The memory controller interface is operable to interact with a display memory (e.g., double data rate (DDR) memory), a pixel cache, the command CPU, the host bus, and a display engine. The command CPU is operable to exchange data with the display engine.

Figure 33:
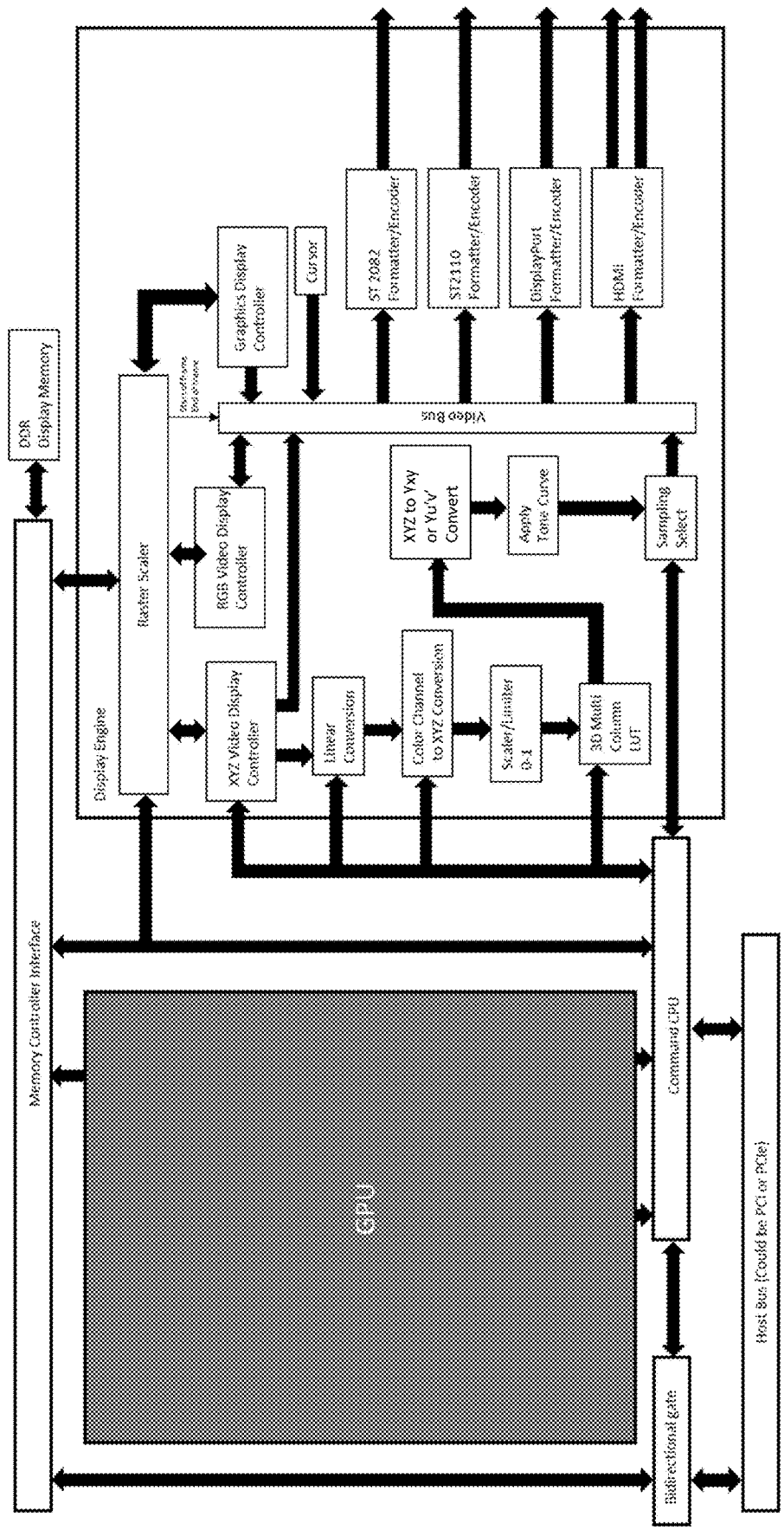
FIG. 33 illustrates one embodiment of a display engine operable to interact with a graphics processing unit (GPU) according to the present invention.

FIG. 33 illustrates one embodiment of a display engine operable to interact with a graphics processing unit (GPU) according to the present invention. In a preferred embodiment, the display engine operable to interact with the GPU is included on a video card. The video card is operable to interface with a computer. In a preferred embodiment, the video card is operable to be inserted into a connector (e.g., PCIe connector, PCI connector, accelerated graphics port (AGP) connector, etc.) located within a computer. The computer includes a command central processing unit (CPU). The command CPU is dedicated to communication between the video card and the computer core. The command CPU is preferably operable to input instructions from an application programming interface (API). The command CPU is further operable to distribute appropriate commands to components in the video card. The video card further includes a memory controller interface. The memory controller interface is preferably a bus including hardware operable to manage which data is allowed on the bus and where the data is routed.

In one embodiment, the video card includes a plurality of video cards linked together to allow scaling of graphics processing. In one embodiment, the plurality of video cards is linked with a PCIe connector. Other connectors are compatible with the plurality of video cards. In one embodiment, each of the plurality of video cards has the same technical specifications. In one embodiment, the API includes methods for scaling the graphics processing, and the command CPU is operable to distribute the graphics processing across the plurality of video cards. The command CPU is operable to scale up the graphics processing as well as scale down the graphics processing based on processing demands and/or power demands of the system.

The display engine is operable to take rendered data from the GPU and convert the rendered data to a format operable to be displayed on at least one viewing device. The display engine includes a raster scaler, at least one video display controller (e.g., XYZ video display controller, RGB video display controller, $IC_TC_P$ video display controller), a color channel-to-XYZ converter, a linear converter, a scaler and/ or limiter, a multi-column LUT with at least three columns (e.g., three-dimensional (3D) LUT (e.g., 1293 LUT)), an XYZ-to-Yxy converter, an XYZ-to-Yu'v' converter, a non-linear function and/or tone curve applicator (e.g., ½ DRR), a sampling selector, a video bus, and/or at least one output formatter and/or encoder (e.g., ST 2082, ST 2110, DisplayPort, HDMI). In one embodiment, the color channel-to-XYZ converter includes an RGB-to-XYZ converter. Additionally or alternatively, the color channel-to-XYZ converter includes a Yu'v'-to-XYZ converter, an $IC_TC_P$-to-XYZ converter and/or an ACES-to-XYZ converter. The video bus is operable to receive input from a graphics display controller and/or at least one input device (e.g., a cursor, a mouse, a joystick, a keyboard, a videogame controller, etc.).

The video card is operable to connect through any number of lanes provided by hardware on the computer. The video card is operable to communicate through a communication interface including, but not limited to, a PCIe Physical Layer (PHY) interface. In one embodiment, the communication interface is an API supported by the computer (e.g., OpenGL, Direct3D, OpenCL, Vulkan). Image data in the form of vector data or bitmap data is output from the communication interface into the command CPU. The communication interface is operable to notify the command CPU when image data is available. The command CPU opens the bus bidirectional gate and instructs the memory controller interface to transmit the image data to a double data rate (DDR) memory. The memory controller interface is operable to open a path from the DDR memory to allow the image data to pass to the GPU for rendering. After rendering, the image data is channeled back to the DDR for storage pending output processing by the display engine.

After the image data is rendered and stored in the DDR memory, the command CPU instructs the memory controller interface to allow rendered image data to load into the raster scaler. The command CPU loads the raster scaler with framing information. The framing information includes, but is not limited to, a start of file (SOF) identifier, an end of file (EOF) identifier, a pixel count, a pixel order, multi-primary data (e.g., RGBCMY data), and/or a frame rate. In one embodiment, the framing information includes HDMI and/or DisplayPort (e.g., CTA 861 format) information. In one embodiment, Extended Display Identification Data (EDID) is operable to override specifications in the API. The raster scaler provides output as image data formatted as a raster in the same format as the file being read (e.g., RGB, XYZ, Yxy, Yu'v'). In one embodiment, the output of the raster scaler is RGB data, XYZ data, or Yxy data. Alternatively, the output of the raster scaler is Yu'v' data, $IC_TC_P$ data, or ACES data.

In one embodiment, the output of the raster scaler is sent to a graphics display controller. In one embodiment, the graphics display controller is operable to provide display information for a graphical user interface (GUI). In one embodiment, the RGB video controller and the XYZ video controller block image data from entering the video bus. Raster data includes, but is not limited to, synchronization data, an SOF, an EOF, a frame rate, a pixel order, multi-primary data (e.g., RGBCMY data), and/or a pixel count. In one embodiment, the raster data is limited to an RGB output that is operable to be transmitted to the at least one output formatter and/or encoder.

For common video display, a separate path is included. The separate path is operable to provide outputs including, but not limited to, SMPTE SDI, Ethernet, DisplayPort, and/or HDMI to the at least one output formatter and/or encoder. The at least one video display controller (e.g., RGB video display controller) is operable to limit and/or optimize video data for streaming and/or compression. In one embodiment, the RGB video display controller and the XYZ video display controller block image data from entering the video bus.

In a preferred embodiment, image data is provided by the raster scaler in the format provided by the file being played (e.g., RGB, multi-primary (e.g., RGBCMY), XYZ, Yxy, Yu'v'). In one embodiment, the raster scaler presets the XYZ video display controller as the format provided and contained within the raster size to be displayed. In one embodiment, non-linear information (e.g., OOTF) sent from the API through the command CPU is sent to the linear converter. The linear converter is operable to use the non-linear information. For example, if the image data was authored using an OETF, then an inverse of the OETF is operable to be used by the linear converter, or, if the image information already has an EOTF applied, the inverse of the EOTF is operable to be used by the linear converter. In one embodiment, the linear converter develops an EOTF map to linearize input data (e.g., when EOTF data is available). In one embodiment, the linear converter uses an EOTF when already available. After linear data is loaded and a summation process is developed, the XYZ video display controller passes the image data in its native format (e.g., RGB, multi-primary data (e.g., RGBCMY), XYZ, Yxy, Yu'v'), but without a non-linearity applied to the luminance (e.g., Y) component. The color channel-to-XYZ converter is operable to accept a native format (e.g., RGB, multi-primary data (e.g., RGBCMY), XYZ, Yxy, Yu'v') and convert to an XYZ format. In one embodiment, the XYZ format includes at least one chromatic adaptation (e.g., D60 to D65). For RGB, the XYZ video display controller uses data supplied from the command CPU, which obtains color gamut and white point specifications from the API to convert to an XYZ output. For a multi-primary system, a corresponding matrix or a look-up table (LUT) is used to convert from the multi-primary system to XYZ. In one embodiment, the multi-primary system is RGBCMY (e.g., 6P-B, 6P-C, S6Pa, S6Pb). For a Yxy system, the color channel-to-XYZ converter formats the Yxy data back to XYZ data. For a Yu'v' system, the color channel-to-XYZ converter formats the Yu'v' data back to XYZ data. In another embodiment, the color channel-to-XYZ converter is bypassed. For example, the color channel-to-XYZ converter is bypassed if there is a requirement to stay within a multi-primary system. Additionally, the color channel-to-XYZ converter is bypassed for XYZ data.

In one embodiment, the input to the scaler and/or limiter is XYZ data or multi-primary data. In one embodiment, the multi-primary data includes, but is not limited to, RGBCMY (e.g., 6P-B, 6P-C, S6Pa, S6Pb), RGBC, $RG_1G_2B$, RGBCW, RGBCY, $RG_1G_2BW$, $RGBW_RW_GW_B$, or $R_1R_2G_1G_2B_1B_2$. Other multi-primary data formats are compatible with the present invention. The scaler and/or limiter is operable to map out of gamut values (e.g., negative values) to in gamut values (e.g., out of gamut values developed in the process to convert to XYZ). In one embodiment, the scaler and/or limiter uses a gamut mapping algorithm to map out of gamut values to in gamut values.

In one embodiment, the input to the scaler and/or limiter is multi-primary data and all channels are optimized to have values between 0 and 1. For example, if the input is RGBCMY data, all six channels are optimized to have values between 0 and 1. In one embodiment, the output of the scaler and/or limiter is operable to be placed into a three-dimensional (3-D) multi-column LUT. In one embodiment, the 3-D multi-column LUT includes one column for each channel. For example, if the output is RGBCMY data, the 3-D multi-column LUT includes six columns (i.e., one for each channel). Within the application feeding the API, each channel is operable to be selected to balance out the white point and/or shade the image toward one particular color channel. In one embodiment, the 3-D multi-column LUT is bypassed if the output of the scaler and/or limiter is XYZ data. The output of the 3-D multi-column LUT is sent to the XYZ-to-Yxy converter, where a simple summation process is used to make the conversion. Alternatively, the output of the 3-D multi-column LUT is sent to the XYZ-to-Yu'v' converter. In one embodiment, if the video data is RGBCMY, the XYZ-to-Yxy converter or XYZ-to-Yu'v' converter process is bypassed.

Because the image data is linear, any tone curve is operable to be added to the luminance (e.g., Y). The advantage to the present invention using, e.g., Yxy data or Yu'v' data, is that only the luminance needs a tone curve modification. L*a*b* has a ⅓ gamma applied to all three channels. IPT and $IC_TC_P$ operate with a gamma in all three channels. The tone curve is operable to be added to the luminance (e.g., Y) only, with the colorimetric coordinates (e.g., x and y channels, u' and v' channels) remaining linear. The tone curve is operable to be anything (e.g., a non-linear function), including standard values currently used. In one embodiment, the tone curve is an EOTF (e.g., those described for television and/or digital cinema). Additionally or alternatively, the tone curve includes HDR modifications. In another embodiment, a non-linear transfer function is added to all three channels (e.g., Yxy or Yu'v').

In one embodiment, the output is handled through this process as three to six individual components (e.g., three components for Yxy, Yu'v', or XYZ, six components for RGBCMY, etc.). Alternative number of primaries and components are compatible with the present invention. However, in some serial formats, this level of payload is too large. In one embodiment, the sampling selector sets a sampling structure (e.g., 4:4:4, 4:2:2, 4:2:0, 4:1:1). In one embodiment, the sampling selector is operable to subsample processed image data. The sampling selector is preferably controlled by the command CPU. In one embodiment, the command CPU gets its information from the API and/or the display EDID. In a preferred embodiment, the sampling selector also places each component in the correct serial data position as shown in Table 11 (supra).

The output of the sampling select is fed to the main video bus, which integrates SOF and EOF information into the image data. It then distributes this to the at least one output formatter and/or encoder. In one embodiment, the output is RGBCMY. In one embodiment, the RGBCMY output is configured as 4:4:4:4:4 data. The format to the at least one viewing device includes, but is not limited to, SMPTE ST2082 (e.g., 3, 6, and 12G serial data output), SMPTE ST2110 (e.g., to move through ethernet), and/or CTA 861 (e.g., DisplayPort, HDMI). The video card preferably has the appropriate connectors (e.g., DisplayPort, HDMI) for distribution through any external system (e.g., computer) and connection to at least one viewing device (e.g., monitor, television, etc.). The at least one viewing device includes, but is not limited to, a smartphone, a tablet, a laptop screen, a light emitting diode (LED) display, an organic light emitting diode (OLED) display, a miniLED display, a microLED display, a liquid crystal display (LCD), a quantum dot display, a quantum nano emitting diode (QNED) device, a personal gaming device, a virtual reality (VR) device and/or an augmented reality (AR) device, an LED wall, a wearable display, and at least one projector. In one embodiment, the at least one viewing device is a single viewing device.

Figure 34:
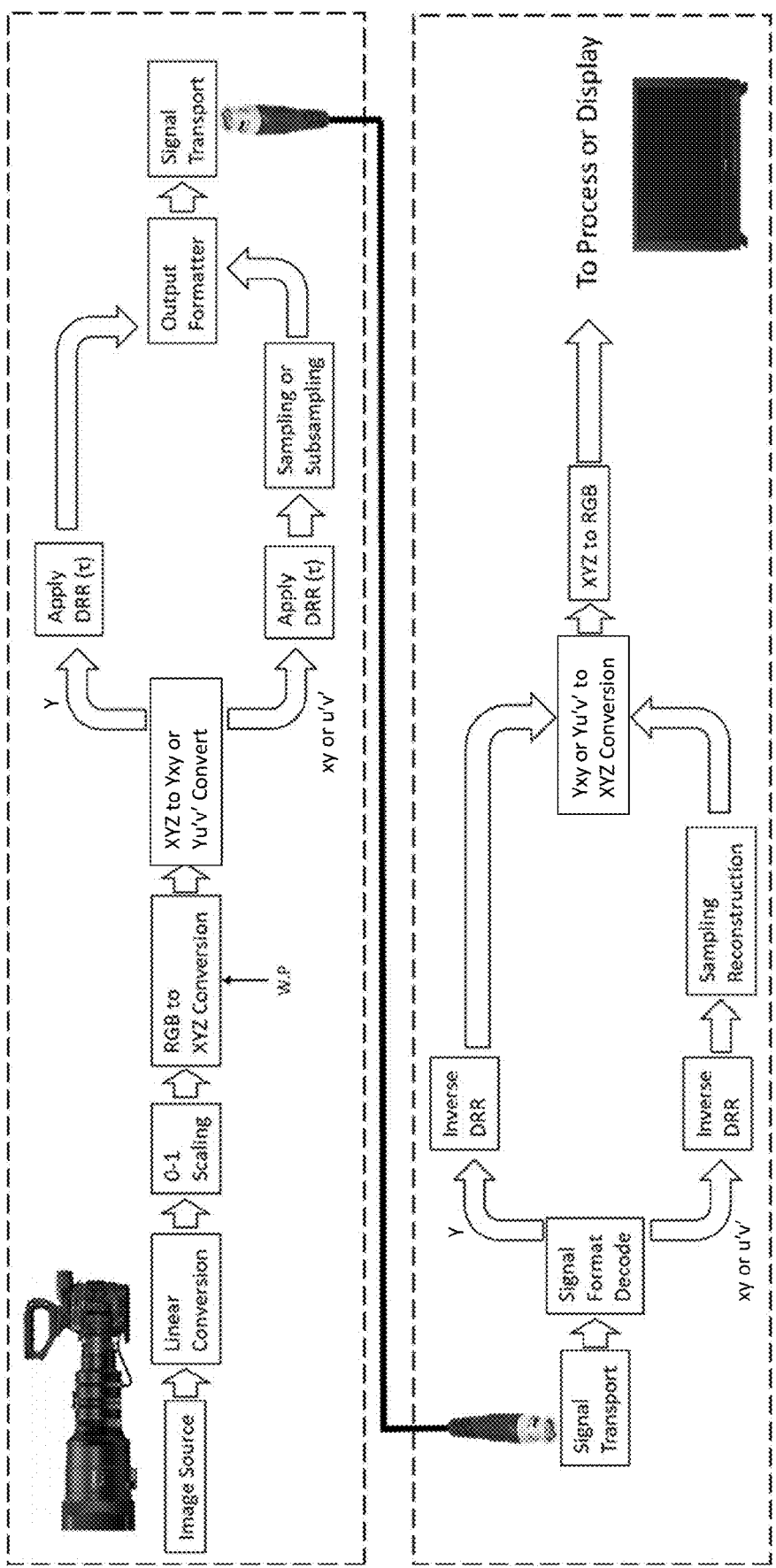
FIG. 34 illustrates one embodiment of a process flow diagram to convert an image for display.

FIG. 34 illustrates one embodiment of a process flow diagram to convert an image for display. An image from an image source undergoes linear conversion and/or scaling (e.g., 0 to 1 scaling) to produce a processed image. The processed image undergoes RGB to XYZ conversion and XYZ to Yxy conversion. Alternatively, the processed image undergoes XYZ to Yu'v' conversion. At least one non-linear transfer function (NLTF) (e.g., ½ DRR) is applied to the luminance (Y) to create a luma (Y'). In a preferred embodiment, the x and y colorimetric coordinates are scaled and then have the at least one NLTF applied. Alternatively, the u' and v' colorimetric coordinates are scaled and then have the at least one NLTF applied. The colorimetric coordinates (x and y, u' and v') are fully sampled or subsampled. The luma and the colorimetric coordinates (e.g., fully sampled, subsampled) are formatted with an output formatter (e.g., ST 2082, ST 2110, DisplayPort, HDMI) before signal transport, thereby creating formatted luma and colorimetric coordinates. The formatted luma and colorimetric coordinates are decoded by using an inverse of the at least one function (e.g., inverse ½ DRR), rescaling of the colorimetric coordinates (x and y, u' and v'), and sampling reconstruction, thereby creating decoded image data. The decoded image data undergoes Yxy to XYZ conversion or Yu'v' to XYZ conversion and XYZ to gamut (e.g., RGB, ITU-R BT.709, SMPTE RP431, ITU-R BT.2020, ACES, custom, multi-primary) conversion before a gamma function is applied, thereby creating image data. The image data is operable to be sent to a display (e.g., operable to display the gamut). In one embodiment, the image data undergoes further processing in the display.

The top of the diagram shows the process that typically resides in the camera or image generator. The bottom of the diagram shows the decode process typically located in the display. The image is acquired from a camera or generated from an electronic source. Typically, a gamma has been applied and needs to be removed to provide a linear image. After the linear image is acquired, the linear image is scaled to values between 0 and 1. this allows scaling to a desired brightness on the display. The source is operable to detail information related to the image including, but not limited to, a color gamut of the device and/or a white point used in acquisition. Using adaptation methods (e.g., chromatic adaptation), an accurate XYZ conversion is possible. After the image is coded as XYZ, it is operable to be converted to Yxy. The components are operable to be split into a Y path and an xy path or a Y path and a u'v' path. A non-linearity (e.g., DRR) is applied to the Y component. In one embodiment, the non-linearity (e.g., DRR) is also applied to the scaled xy or u'v' components. The xy or u'v' components are operable to be subsampled, if required, e.g., to fit into the application without loss of luminance information. These are recombined and input to a format process that formats the signal for output to a transport (e.g., SDI, IP packet).

After the signal arrives at the receiver, it is decoded to output the separate Yxy or Yu'v' components. The Y channel preferably has an inverse non-linearity (e.g., inverse DRR) applied to restore the Y channel to linear space. If the xy or u'v' channels had a non-linearity applied, the xy or u'v' channels preferably have the inverse non-linearity (e.g., inverse DRR) applied to restore the image data (i.e., Yxy, Yu'v') to linear space and then re-scaled to their original values. The xy or u'v' channels are brought back to full sub-pixel sampling. These are then converted from Yxy to XYZ or Yu'v' to XYZ. XYZ is operable to converted to the display gamut (e.g., RGB). Because a linear image is used, any gamma is operable to be applied by the display. This advantageously puts the limit of the image not in the signal, but at the maximum performance of the display.

With this method, images are operable to match between displays with different gammas, gamuts, and/or primaries (e.g., multi-primary). Colorimetric information and luminance are presented as linear values. Any white point, gamma, and/or gamut is operable to be defined, e.g., as a scene referred set of values or as a display referred set. Furthermore, dissimilar displays are operable to be connected and set to match if the image parameters fall within the limitations of the display. Advantageously, this allows accurate comparison without conversion.

In any system, the settings of the camera and the capabilities of the display are known. Current methods take an acquired image and confirm it to an assumed display specification. Even with a sophisticated system (e.g., ACES), the final output is conformed to a known display specification. The design intent of a Yxy or Yu'v' system is to avoid these processes by using a method of image encoding that allows the display to maximize performance while maintaining creative intent.

The system is operable to be divided into simpler parts for explanation: (1) camera/acquisition, (2) files and storage, (3) transmission, and (4) display. Most professional cameras have documentation describing the color gamut that is possible, the OETF used by the camera, and/or a white point to which the camera was balanced. In an RGB system, these parameters must be tracked and modified throughout the workflow.

However, in a Yxy or Yu'v' system, in one embodiment, these conversions are enabled by the camera as part of the encode process because image parameters are known at the time of acquisition. Thus, the Yxy or Yu'v' system has the intrinsic colorimetric and luminance information without having to carry along additional image metadata. Alternatively, the conversions are operable to be accomplished outside the camera in a dedicated encoder (e.g., hardware) or image processing (e.g., software) in a post-production application.

Figure 35:
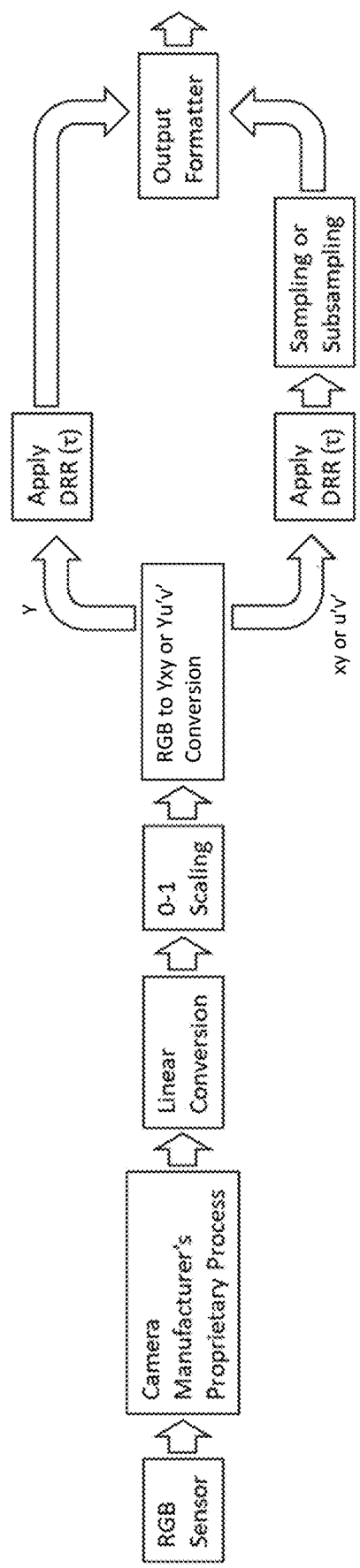
FIG. 35 illustrates one embodiment of a camera process flow.

FIG. 35 illustrates one embodiment of a camera process flow. An image sensor (e.g., RGB sensor) in a camera is operable to obtain image data. In one embodiment, the image data is processed by the camera (e.g., via a camera manufacturer's proprietary process), thereby creating processed camera data. The image data or the camera data undergoes linear conversion and/or scaling (e.g., 0 to 1 scaling) to produce a processed image. In one embodiment, the processed image undergoes conversion from an acquisition gamut (e.g., RGB) to Yxy or Yu'v'. In one embodiment, a non-linear transfer function (NLTF) (e.g., DRR) is applied to Y (e.g., to create luma) and xy. In another embodiment, an NLTF (e.g., DRR) is applied to Y (e.g., to create luma) and u'v'. The luma and the colorimetric coordinates (e.g., fully sampled, subsampled) are formatted with an output formatter (e.g., ST 2082, ST 2110, DisplayPort, HDMI) to provide output data. In one embodiment, the output data is transmitted to a display and/or a decoder. Although the example shown in FIG. 35 uses Yxy or Yu'v' data, the system is operable to be used with a plurality of formats.

Images are acquired in a specific process designed by a camera manufacturer. Instead of using RAW output format, the process starts with the conversion of the RGB channels to a linear (e.g., 16-bit) data format, wherein the RGB data is normalized to 1. In one embodiment, this linear image is then converted from RGB to XYZ (e.g., via a conversion matrix) and then processed to produce the Yxy or Yu'v' data stream. Y continues as a fully sampled value, but xy or u'v' are operable to be subsampled (e.g., 4:2:2, 4:2:0). A DRR value is applied to Yxy or Yu'v' and scaled x and y or u' and v' values prior to being sent as a serial data stream or is stored in a suitable file container.

The biggest advantage that the Yxy or Yu'v' system provides is the ability to send one signal format to any display and achieve an accurate image. The signal includes all image information, which allows for the display design to be optimized for best performance. Issues (e.g., panel, backlight accuracy) are operable to be adjusted to the conformed image gamut and luminance based on the Yxy or Yu'v' data.

Prior art displays use a specific gamut. Typically, the specific gamut is an RGB gamut (e.g., Rec. 2020, P3, Rec. 709). Comparing different displays using a Yxy or Yu'v' input offers a significant advantage. Images displayed on a BT.709 monitor matches a P3 monitor and a BT.2020 monitor for all colors that fall within a gamut of the BT.709 monitor. Colors outside that gamut are controlled by the individual monitor optimized for that device. Images with gamuts falling within the P3 color space will match on the P3 monitor and the BT.2020 monitor until the image gamut exceeds the capability of the P3 monitor.

The display input process is like an inverted camera process. However, the output of this process is operable to be adapted to any display parameters using the same image data.

Figure 36:
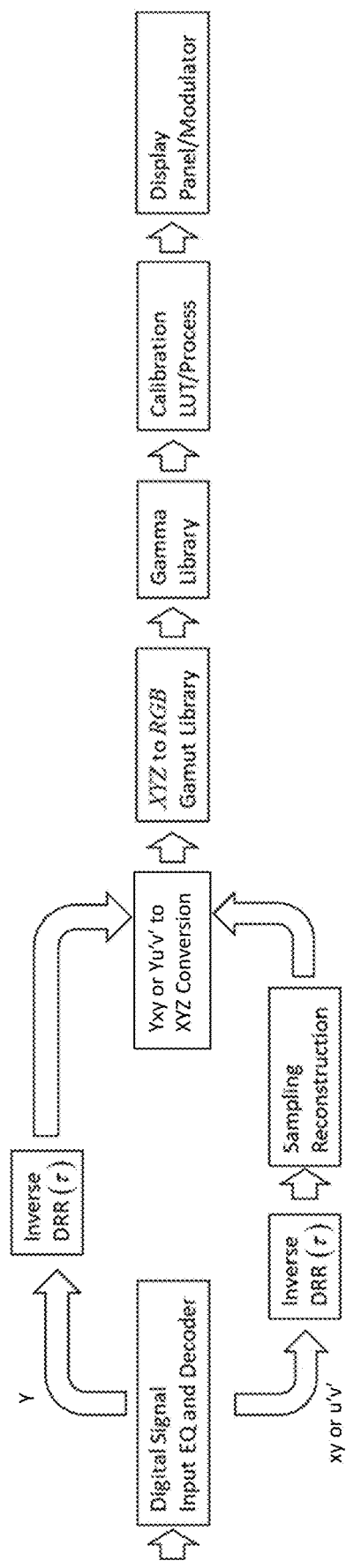
FIG. 36 illustrates one embodiment of a display process flow.

FIG. 36 illustrates one embodiment of a display process flow. In one embodiment, a Yxy or Yu'v' signal is input as a digital signal. In one embodiment, the digital signal undergoes equalization. The formatted luma and colorimetric coordinates are decoded by using an inverse of at least one non-linear function (e.g., inverse ½ DRR), thereby creating decoded image data. In one embodiment, the decoded image data undergoes Yxy to XYZ or Yu'v' or XYZ conversion to create XYZ data. The XYZ data is operable to converted to a gamut (e.g., RGB, ITU-R BT.709, SMPTE RP431, ITU-R BT.2020, ACES, custom, multi-primary) using an XYZ to gamut library, thereby creating gamut data. In one embodiment, a gamma library is operable to apply at least one function (e.g., linear, 2.2, 2.35, 2.4, 2.6 gamma functions, HLG, PQ, custom) to the gamut data. In one embodiment, the gamut data (e.g., with or without the at least one function applied) undergoes a calibration process (e.g., using a LUT) before being transmitted to a display panel and/or modulator. Although FIG. 36 illustrates a Yxy or Yu'v' signal, the system is compatible with a plurality of data formats.

Most image file formats are based on storing the RGB data, and typically only accommodate three sets of data. Advantageously, the Yxy or Yu'v' implementation only requires three sets of data, which simplifies substitutions into any file format.

The ability to move Yxy or Yu'v' coded image content in real time through transmission systems commonly used in production, broadcast, and streaming applications is essential. the requirements call for a simple system using minimal changes to current infrastructure. The Yxy or Yu'v' encoding of image data allows for a simple substitution with a modification to any payload data that is used to identify the type of encode.

The design of an RGB system uses information obtained from the camera and builds a replicating electrical representation formatted within signal. This means that each signal fed to a process or display must be formatted or reformatted to be viewed correctly. Yxy or Yu'v' redefine this and advantageously move the formatting into the acquiring device and the display, leaving a consistent signal available for differing devices. Connection in the system is simplified as connections and display setup are agnostic to the signal format.

System 4 Substitutions

For SMPTE and CTA serial data streams as well as SMPTE ethernet streams, the substitution of Yxy or Yu'v' into each format preferably follows that shown in Table 12.

TABLE 12

| New Values | RGB | $YC_BC_R$ | XYZ | $IC_TC_P$ |
|---|---|---|---|---|
| x or u' | R | $C_B$ | X | $C_T$ |
| Y | G | Y | Y | I |
| y or v' | B | $C_R$ | Z | $C_P$ |

In a preferred embodiment, payload ID identifies Yxy or Yu'v' at Byte 4 as shown in FIG. 37. FIG. 38A illustrates one embodiment of payload ID per SMPTE ST352:2013 and ST292:2018. FIG. 38B illustrates one embodiment of payload ID per SMPTE ST352:2013 and ST372:2017. FIG. 38C illustrates one embodiment of payload ID per SMPTE ST352:2013 and ST425:2017.

Figure 39:
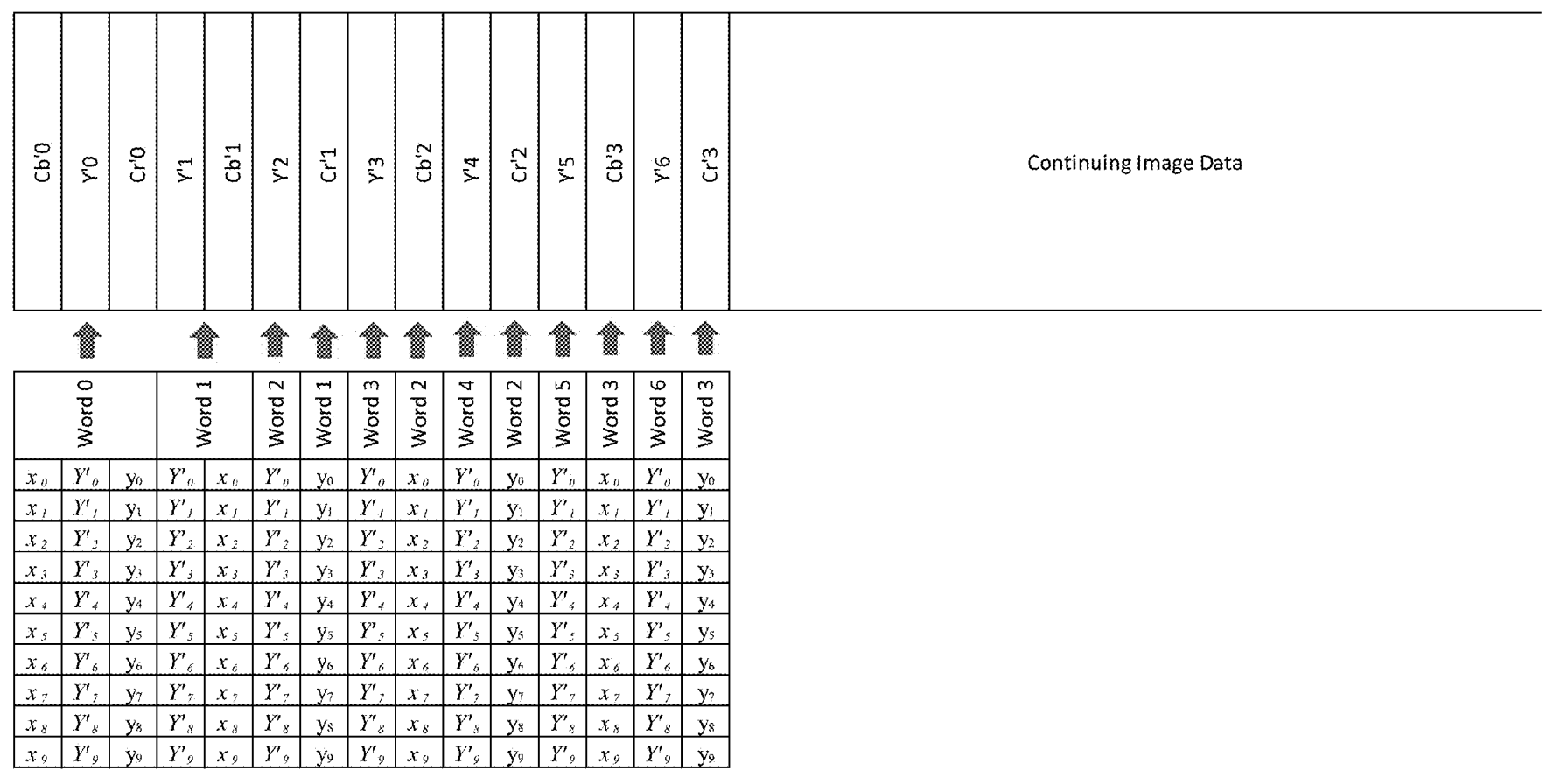

FIG. 39 illustrates one embodiment of a System 4 Yxy 10-bit 4:2:2 encode as applied to SMPTE ST292 (e.g., SMPTE ST292-1:2018).

Figure 40A:
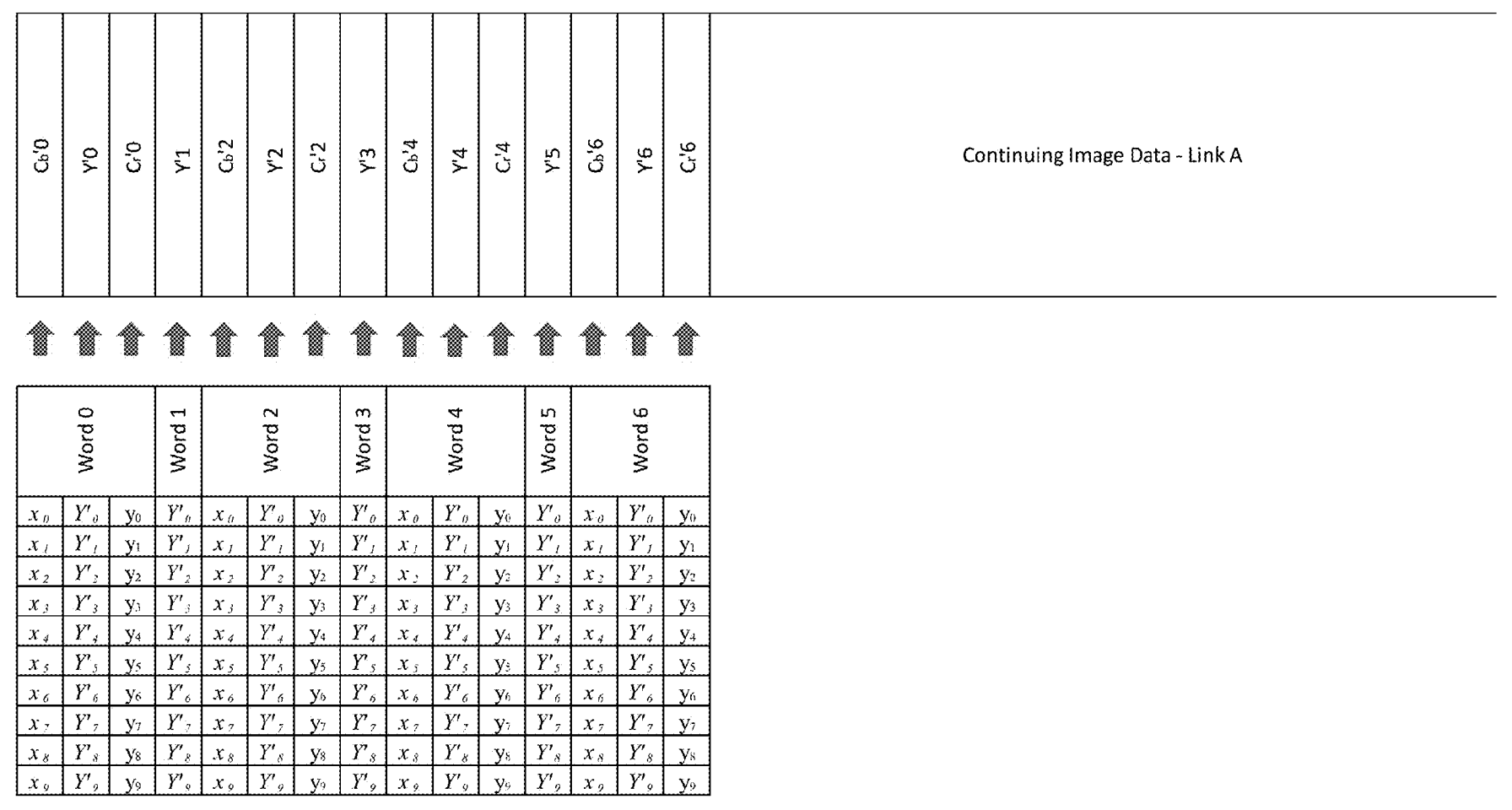
Figure 40B:
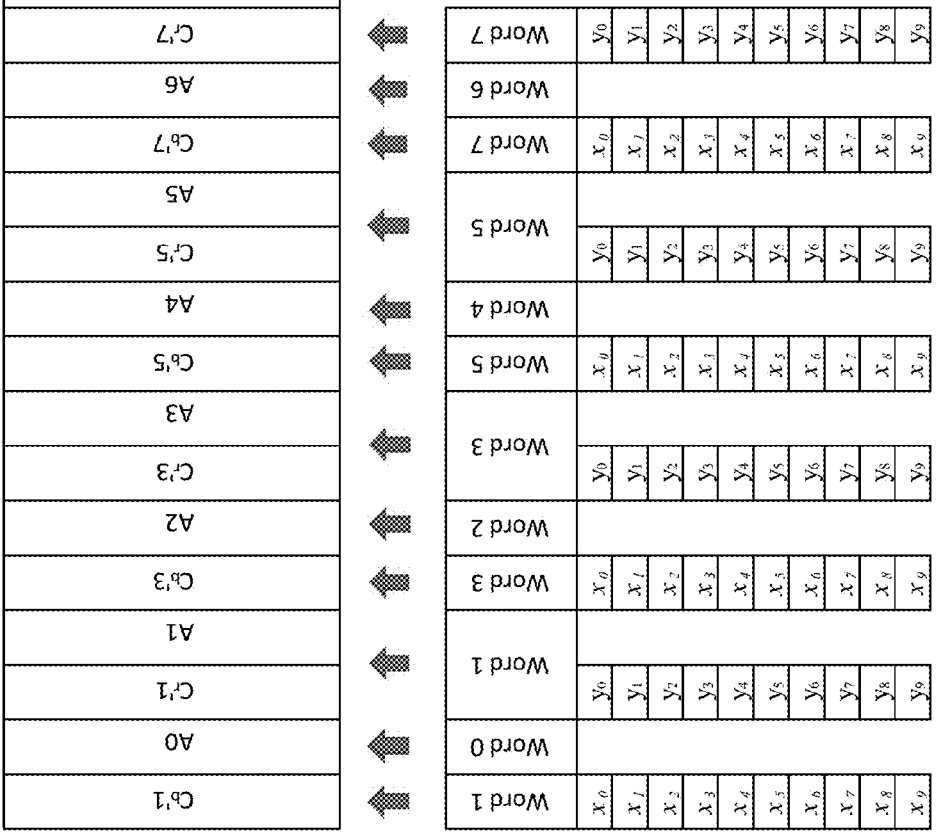
FIG. 40B illustrates one embodiment of a second link for a System 4 Yxy 10-bit 4:4:4 $YC_BC_R$ encode as applied to SMPTE ST372.

FIGS. 40A-40B illustrate one embodiment of a System 4 Yxy 10-bit 4:4:4 $YC_BC_R$ encode as applied to SMPTE ST372 (e.g., SMPTE ST372:2017). In one embodiment, the encode utilizes a first link (e.g., Link A) and a second link (e.g., Link B). FIG. 40A illustrates one embodiment of a first link for a System 4 Yxy 10-bit 4:4:4 $YC_BC_R$ encode as applied to SMPTE ST372. FIG. 40B illustrates one embodiment of a second link for a System 4 Yxy 10-bit 4:4:4 $YC_BC_R$ encode as applied to SMPTE ST372.

Figure 41A:
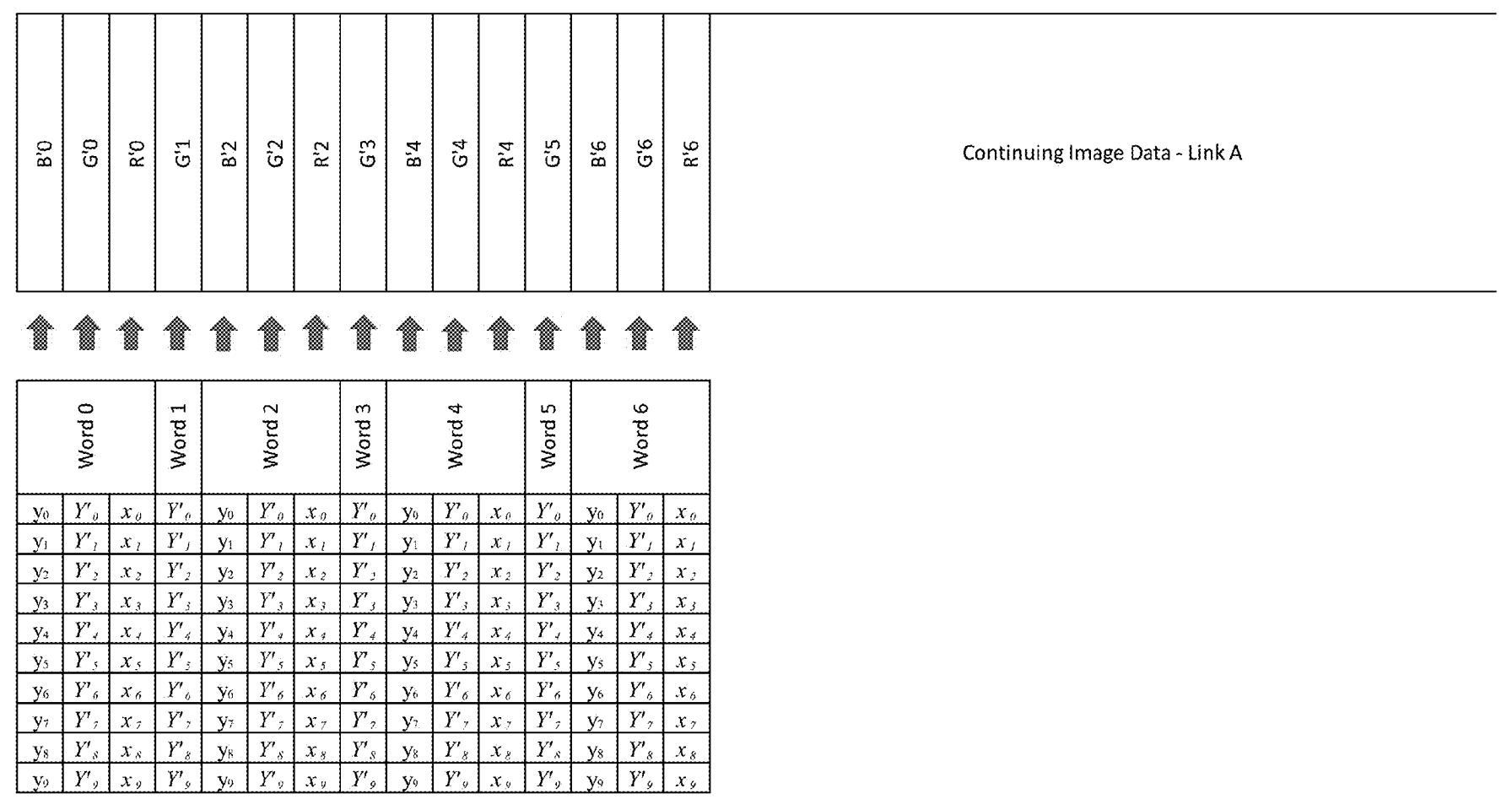
Figure 41B:
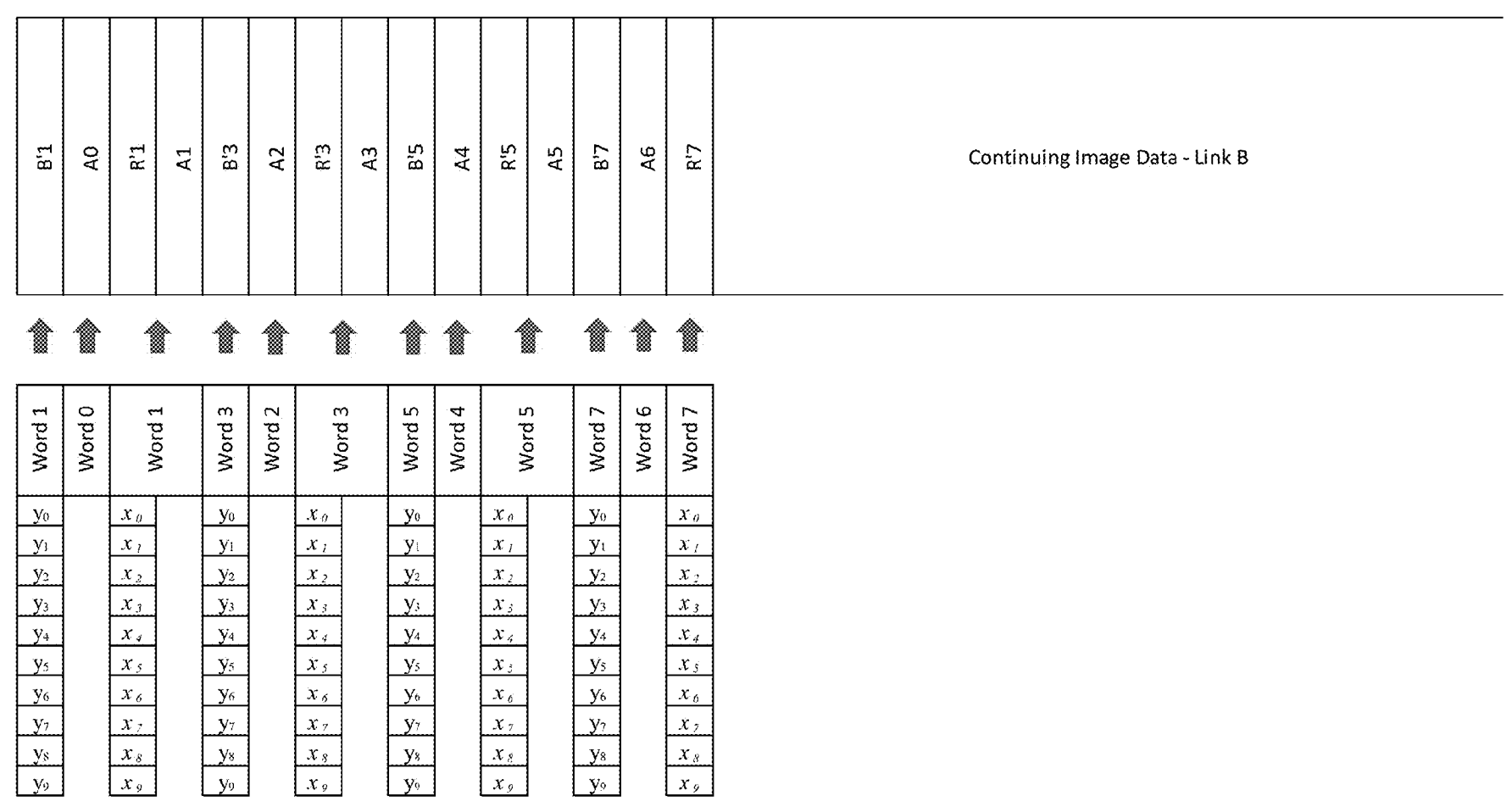

FIGS. 41A-41B illustrate one embodiment of a System 4 10-bit 4:4:4 Yxy RGB encode as applied to SMPTE ST372 (e.g., SMPTE ST372:2017). In one embodiment, the encode utilizes a first link (e.g., Link A) and a second link (e.g., Link B). FIG. 41A illustrates one embodiment of a first link for a System 4 Yxy 10-bit 4:4:4 RGB encode as applied to SMPTE ST372. FIG. 41B illustrates one embodiment of a second link for a System 4 Yxy 10-bit 4:4:4 RGB encode as applied to SMPTE ST372.

Figure 42A:
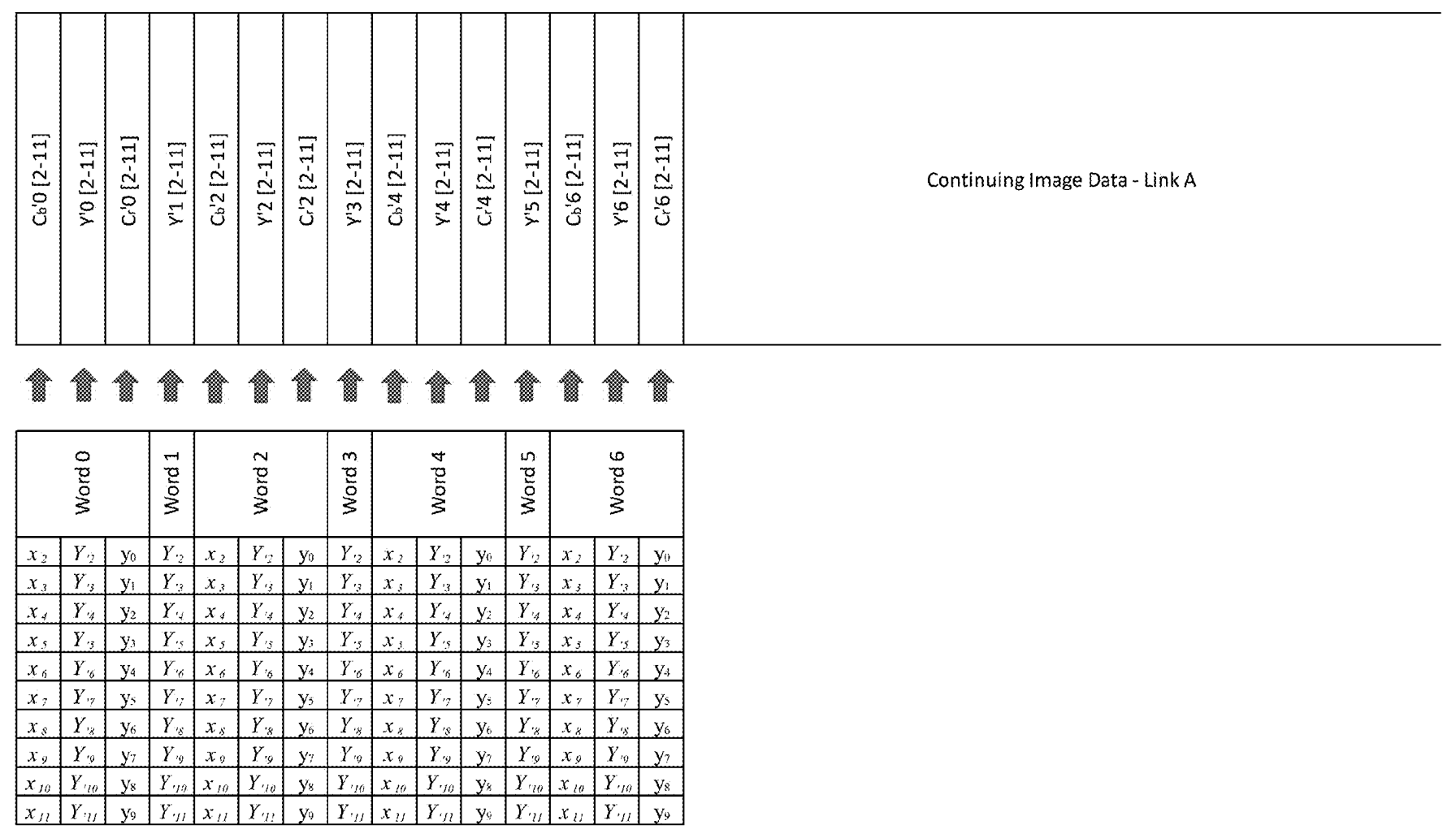
Figure 42B:
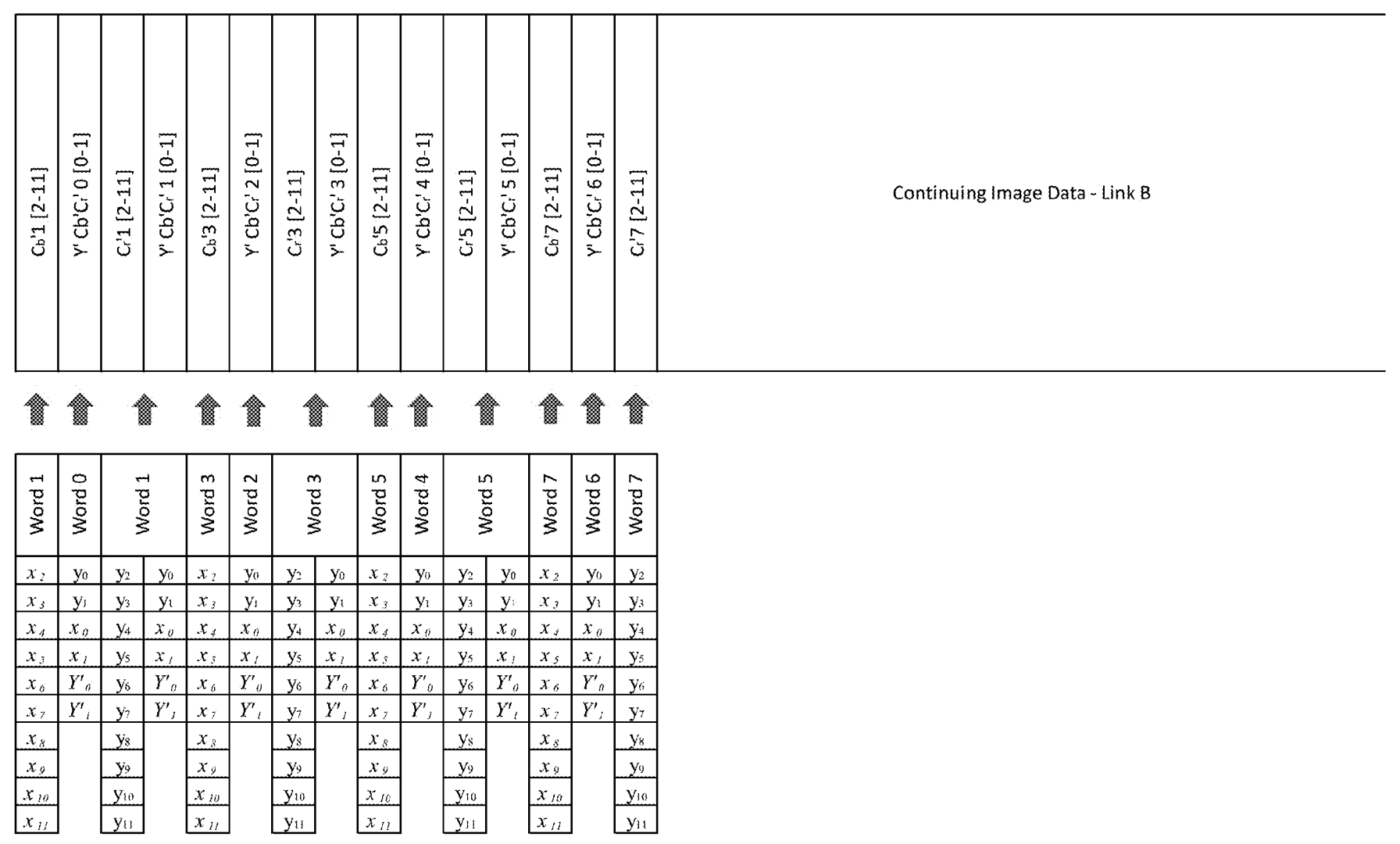

FIGS. 42A-42B illustrate one embodiment of a System 4 12-bit 4:4:4 Yxy $YC_BC_R$ encode as applied to SMPTE ST372 (e.g., SMPTE ST372:2017). In one embodiment, the encode utilizes a first link (e.g., Link A) and a second link (e.g., Link B). FIG. 42A illustrates one embodiment of a first link for a System 4 Yxy 12-bit 4:4:4 $YC_BC_R$ encode as applied to SMPTE ST372. FIG. 42B illustrates one embodiment of a second link for a System 4 Yxy 12-bit 4:4:4 $YC_BC_R$ encode as applied to SMPTE ST372.

Figure 43A:
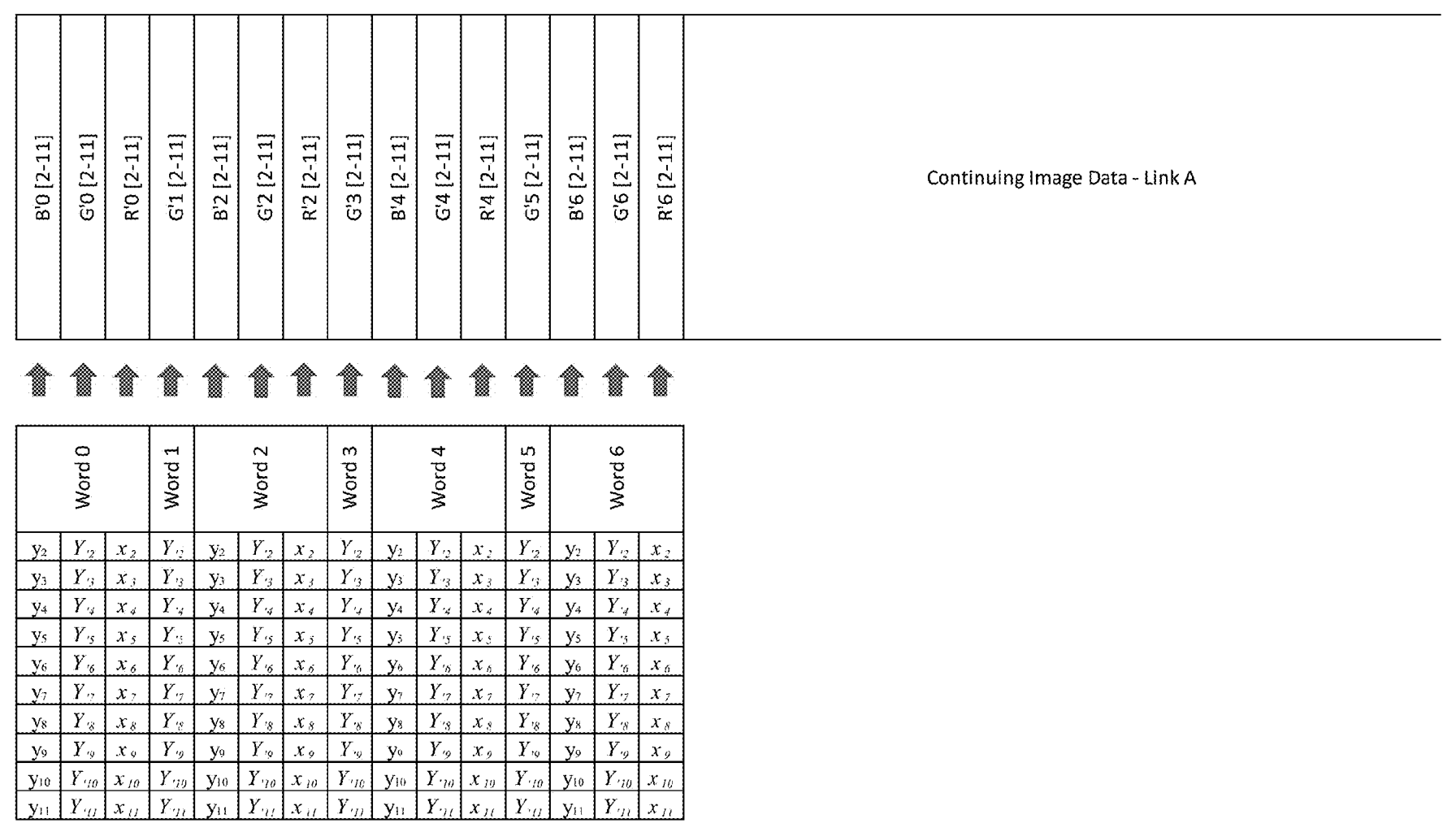
Figure 43B:
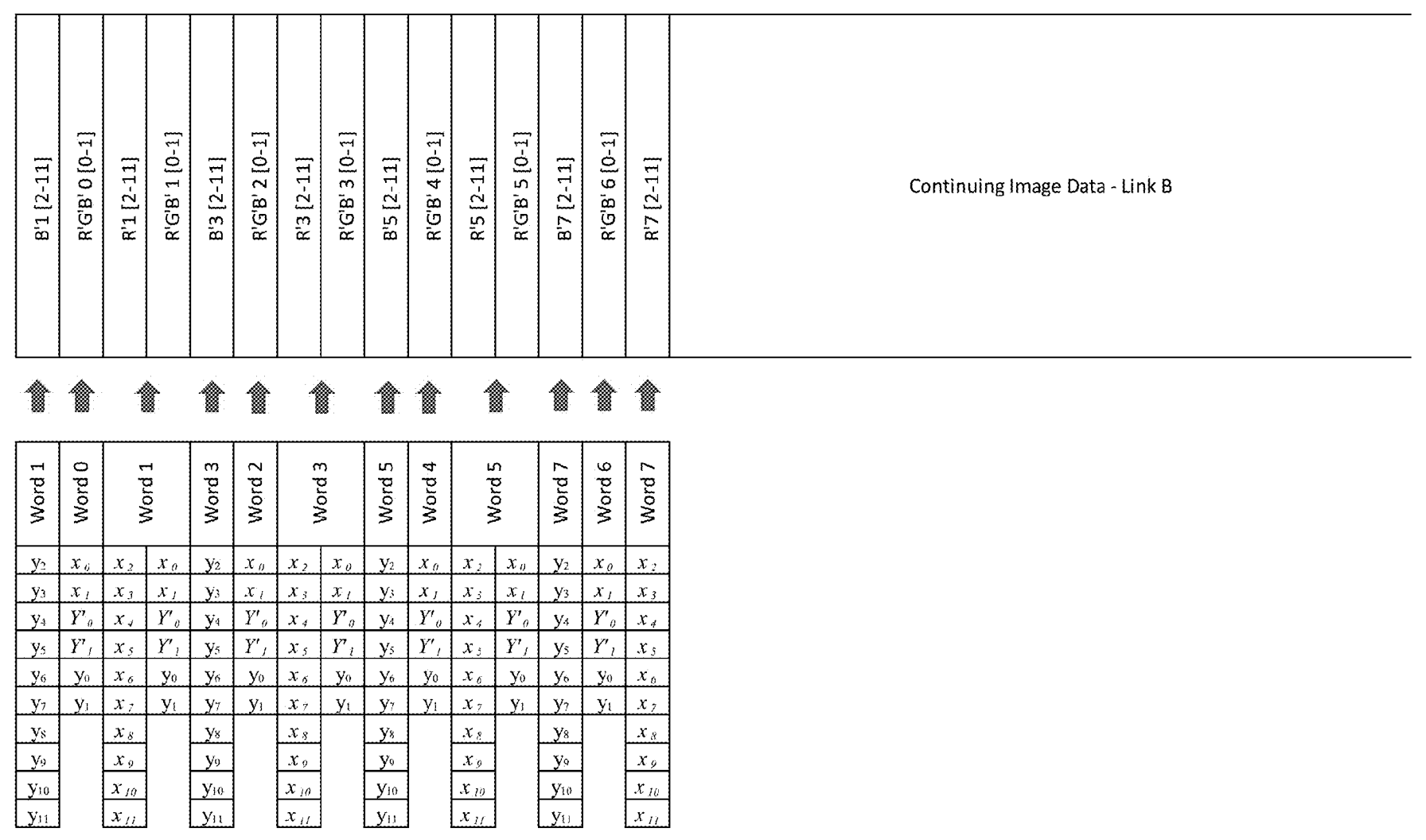

FIGS. 43A-43B illustrate one embodiment of a System 4 12-bit 4:4:4 Yxy RGB encode as applied to SMPTE ST372 (e.g., SMPTE ST372:2017). In one embodiment, the encode utilizes a first link (e.g., Link A) and a second link (e.g., Link B). FIG. 43A illustrates one embodiment of a first link for a System 4 Yxy 12-bit 4:4:4 RGB encode as applied to SMPTE ST372. FIG. 43B illustrates one embodiment of a second link for a System 4 Yxy 12-bit 4:4:4 RGB encode as applied to SMPTE ST372.

FIGS. 44A-44B illustrate one embodiment of a System 4 10-bit 4:2:2 Yxy Level A encode as applied to SMPTE ST425 (e.g., SMPTE ST425-1:2017) ("Mapping Structure 1"). FIG. 44A illustrates one embodiment of a first data stream for a System 4 Yxy 10-bit 4:2:2 Level A encode as applied to SMPTE ST425. FIG. 44B illustrates one embodiment of a second data stream for a System 4 Yxy 10-bit 4:2:2 Level A encode as applied to SMPTE ST425.

Figure 45B:
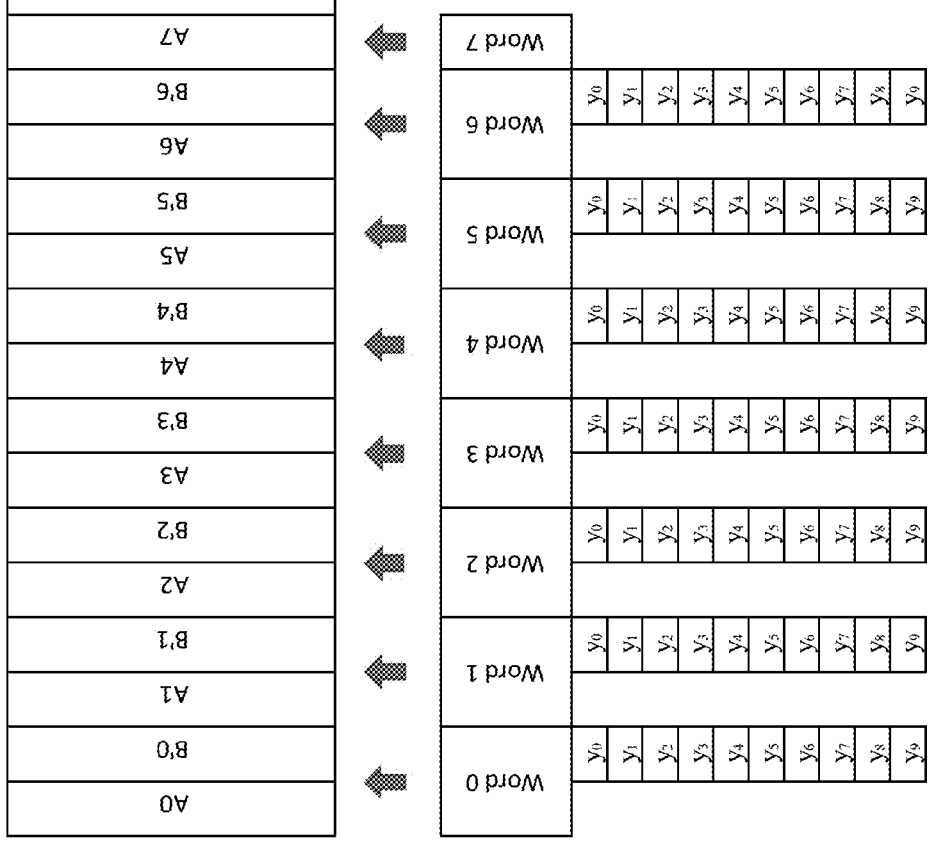
FIG. 45B illustrates one embodiment of a second data stream for a Yxy System 4 10-bit 4:4:4 Level A encode as applied to SMPTE ST425.

FIGS. 45A-45B illustrate one embodiment of a System 4 10-bit 4:4:4 Yxy Level A encode as applied to SMPTE ST425 (e.g., SMPTE ST425-1:2017) ("Mapping Structure 2"). FIG. 45A illustrates one embodiment of a first data stream for a System 4 Yxy 10-bit 4:4:4 Level A encode as applied to SMPTE ST425. FIG. 45B illustrates one embodiment of a second data stream for a System 4 Yxy 10-bit 4:4:4 Level A encode as applied to SMPTE ST425.

Figure 46A:
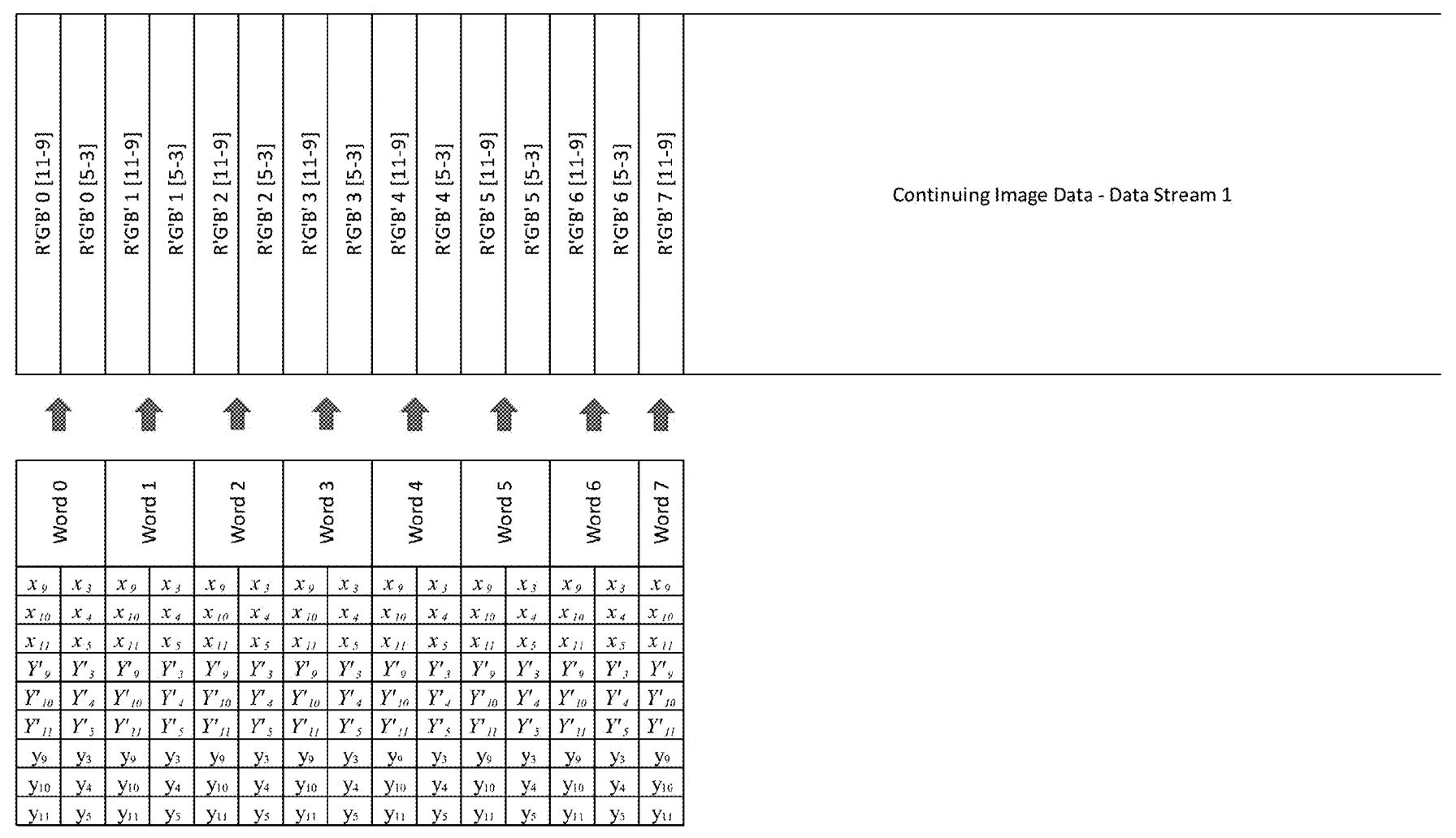
Figure 46B:
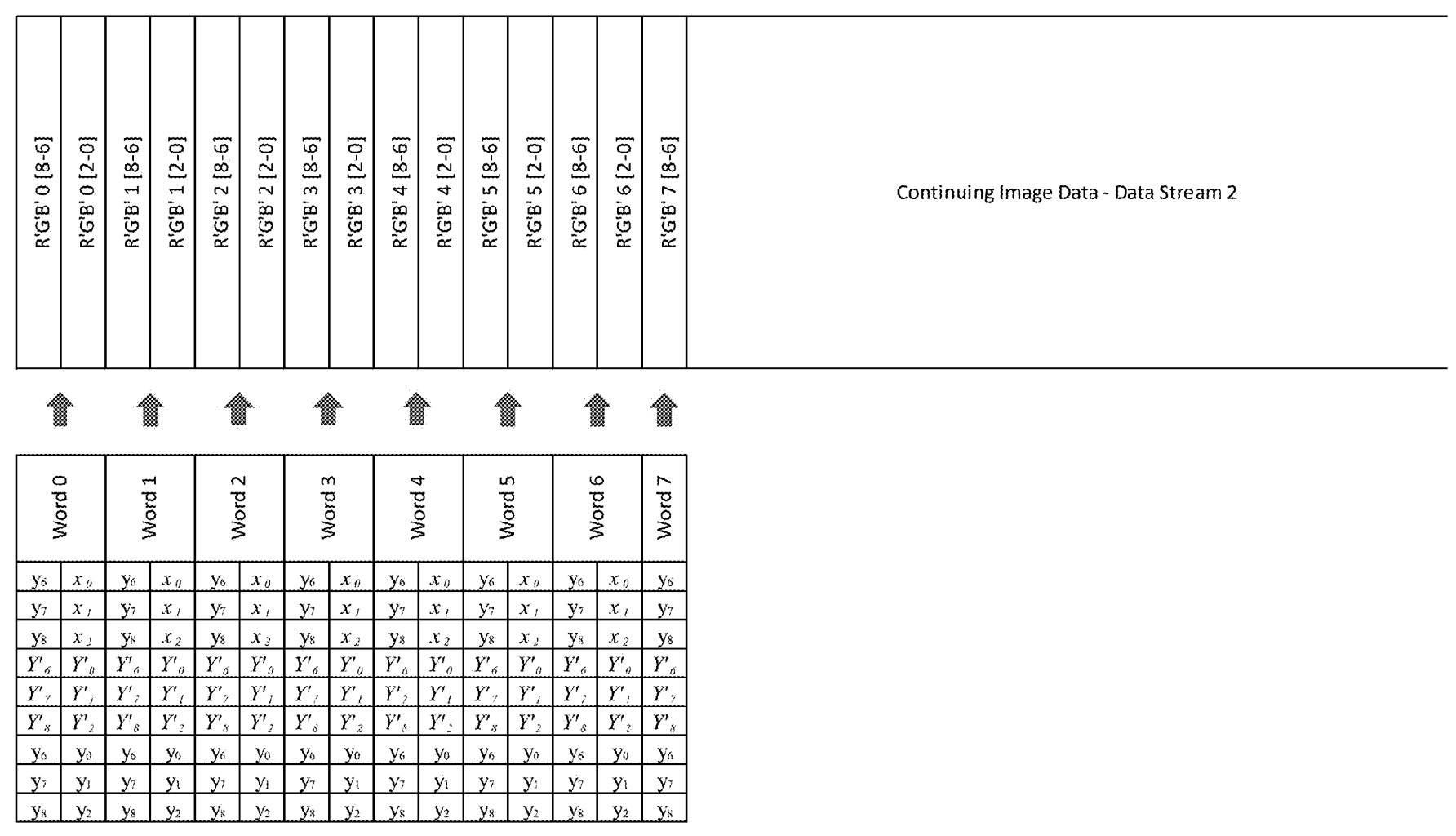

FIGS. 46A-46B illustrate one embodiment of a System 4 Yxy 12-bit 4:4:4 Level A encode as applied to SMPTE ST425 (e.g., SMPTE ST425-1:2017) ("Mapping Structure 3"). FIG. 46A illustrates one embodiment of a first data stream for a System 4 Yxy 12-bit 4:4:4 Level A encode as applied to SMPTE ST425. FIG. 46B illustrates one embodiment of a second data stream for a System 4 Yxy 12-bit 4:4:4 Level A encode as applied to SMPTE ST425.

Figure 47A:
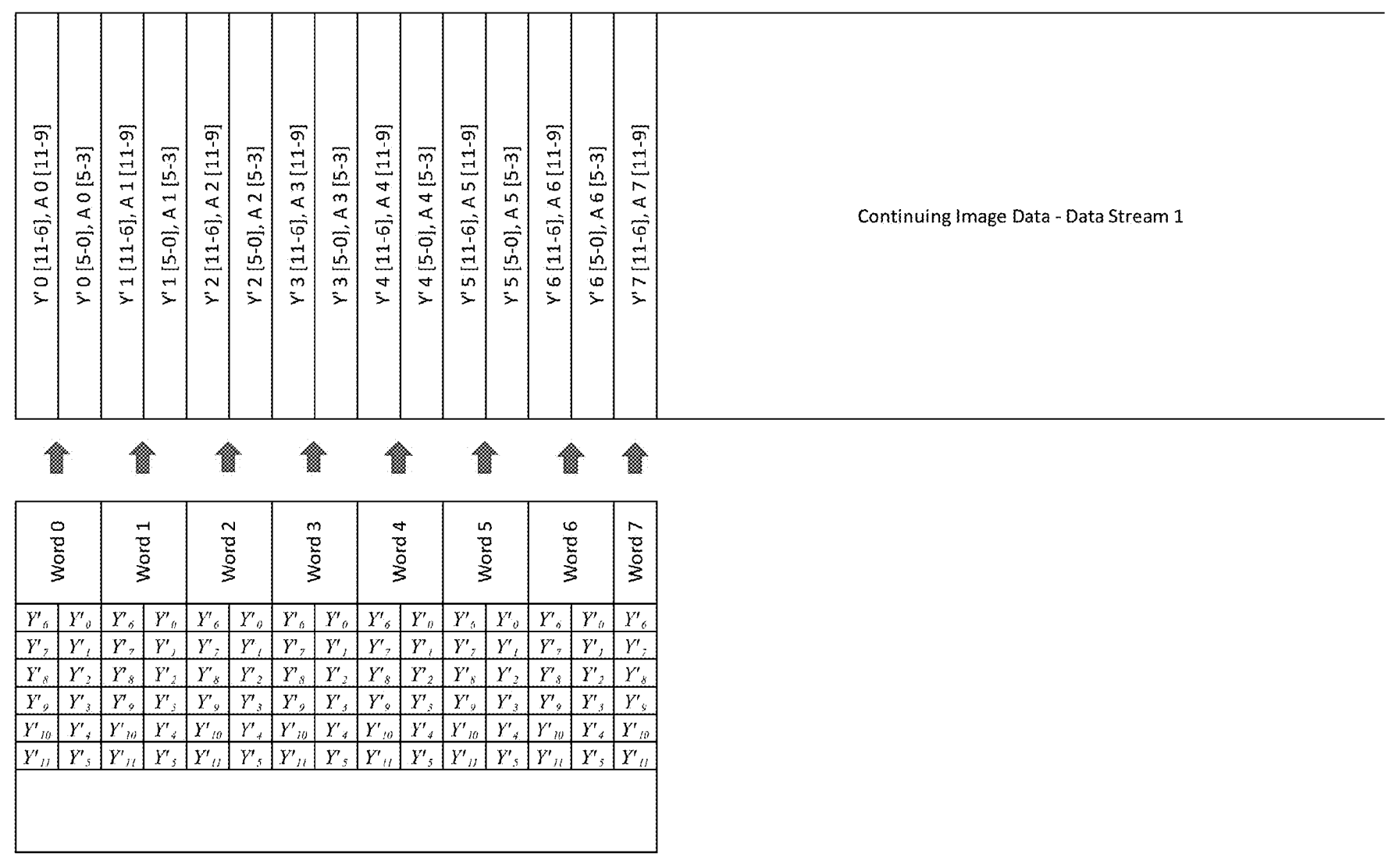
Figure 47B:
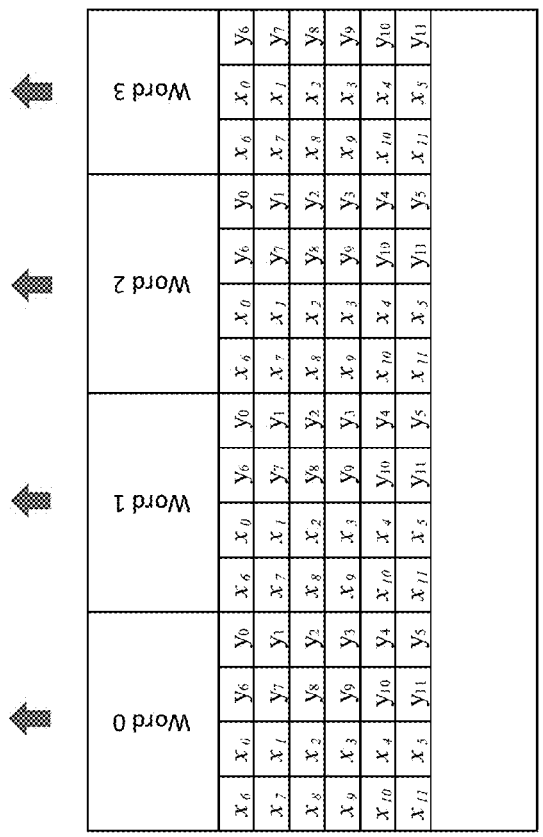
FIG. 47B illustrates one embodiment of a second data stream for a System 4 Yxy 12-bit 4:2:2 Level A encode as applied to SMPTE ST425.

FIGS. 47A-47B illustrate one embodiment of a System 4 12-bit 4:2:2 Yxy Level A encode as applied to SMPTE ST425 (e.g., SMPTE ST425-1:2017) ("Mapping Structure 4"). FIG. 47A illustrates one embodiment of a first data stream for a System 4 Yxy 12-bit 4:2:2 Level A encode as applied to SMPTE ST425. FIG. 47B illustrates one embodiment of a second data stream for a System 4 Yxy 12-bit 4:2:2 Level A encode as applied to SMPTE ST425.

Figure 48A:
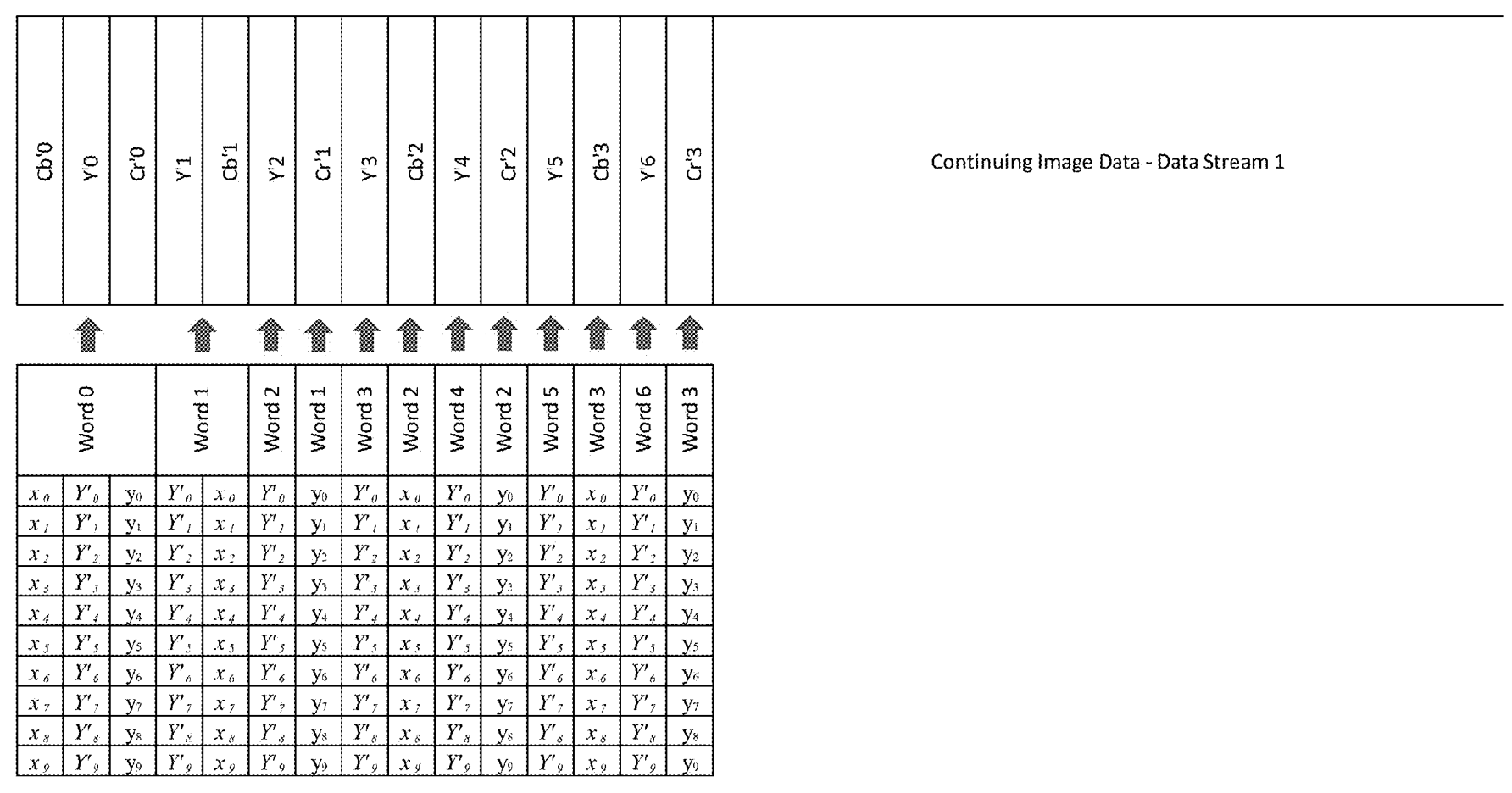
Figure 48B:
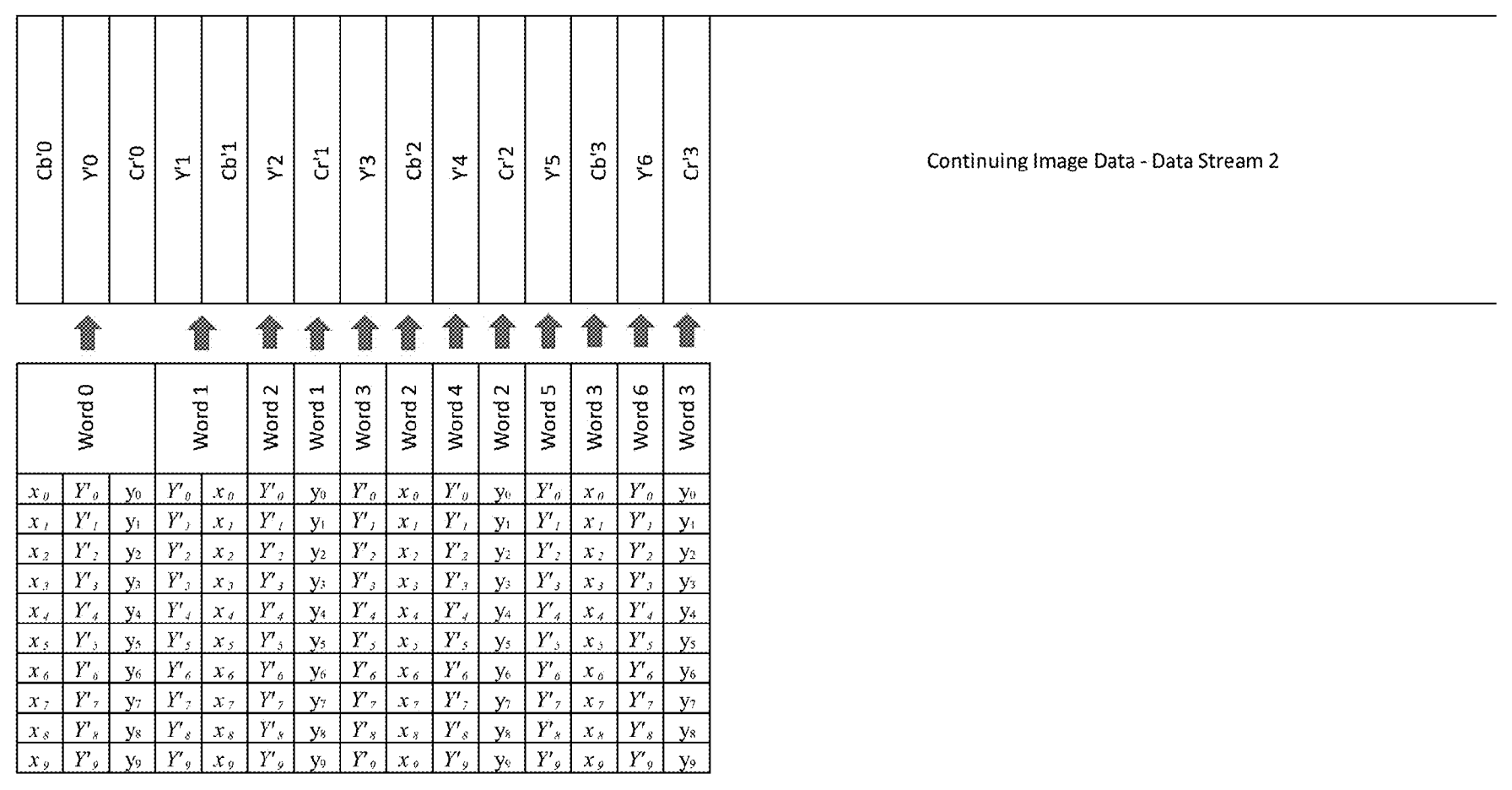

FIGS. 48A-48B illustrate one embodiment of a System 4 Yxy Level B Multiplex Dual Stream (DS) encode as applied to SMPTE ST425 (e.g., SMPTE ST425-1:2017). FIG. 48A illustrates one embodiment of a first data stream for a System 4 Yxy Level B Multiplex Dual Stream (DS) encode as applied to SMPTE ST425. FIG. 48B illustrates one embodiment of a second data stream for a System 4 Yxy Level B Multiplex Dual Stream (DS) encode as applied to SMPTE ST425.

Figure 49A:
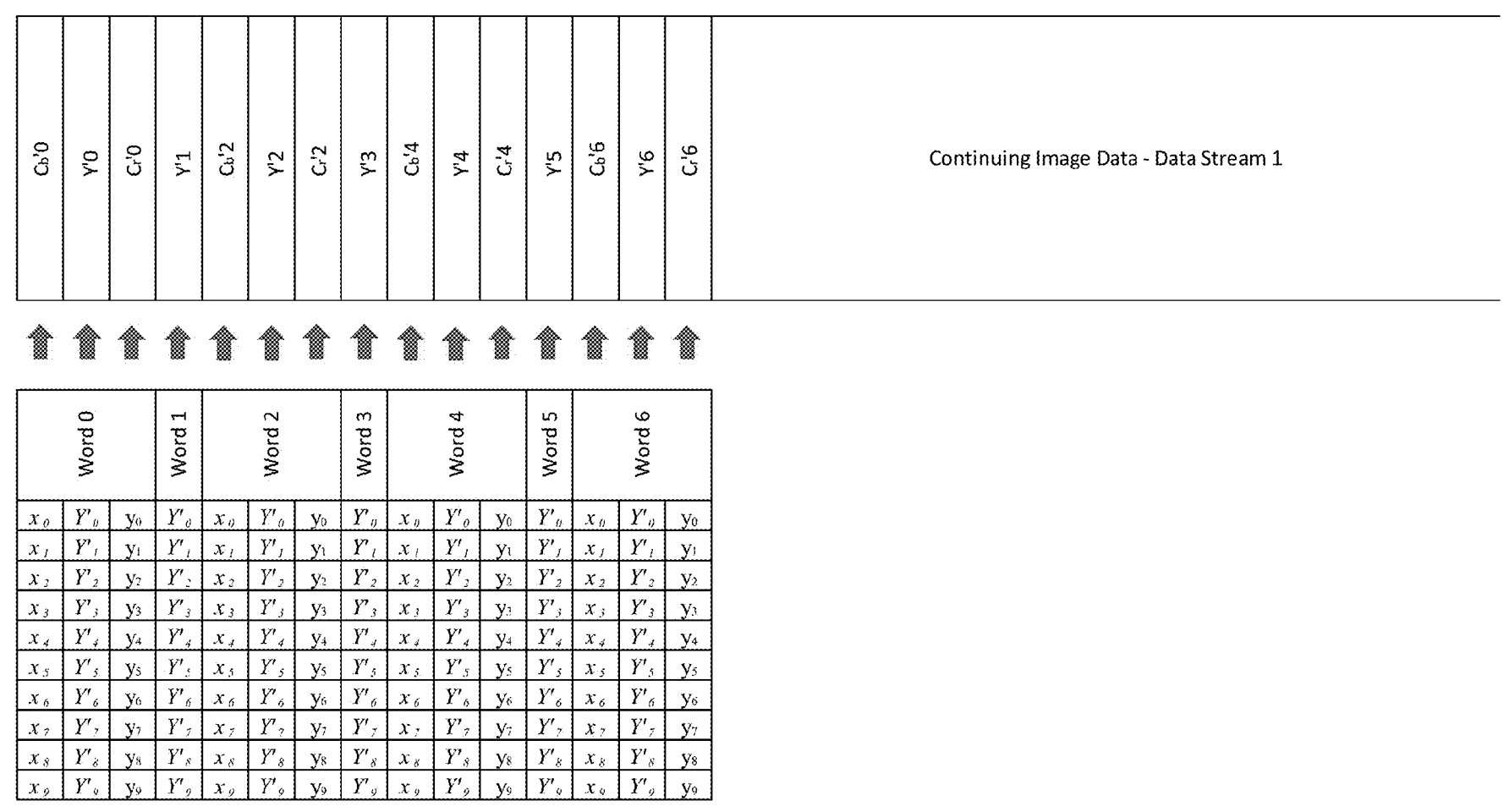
Figure 49B:
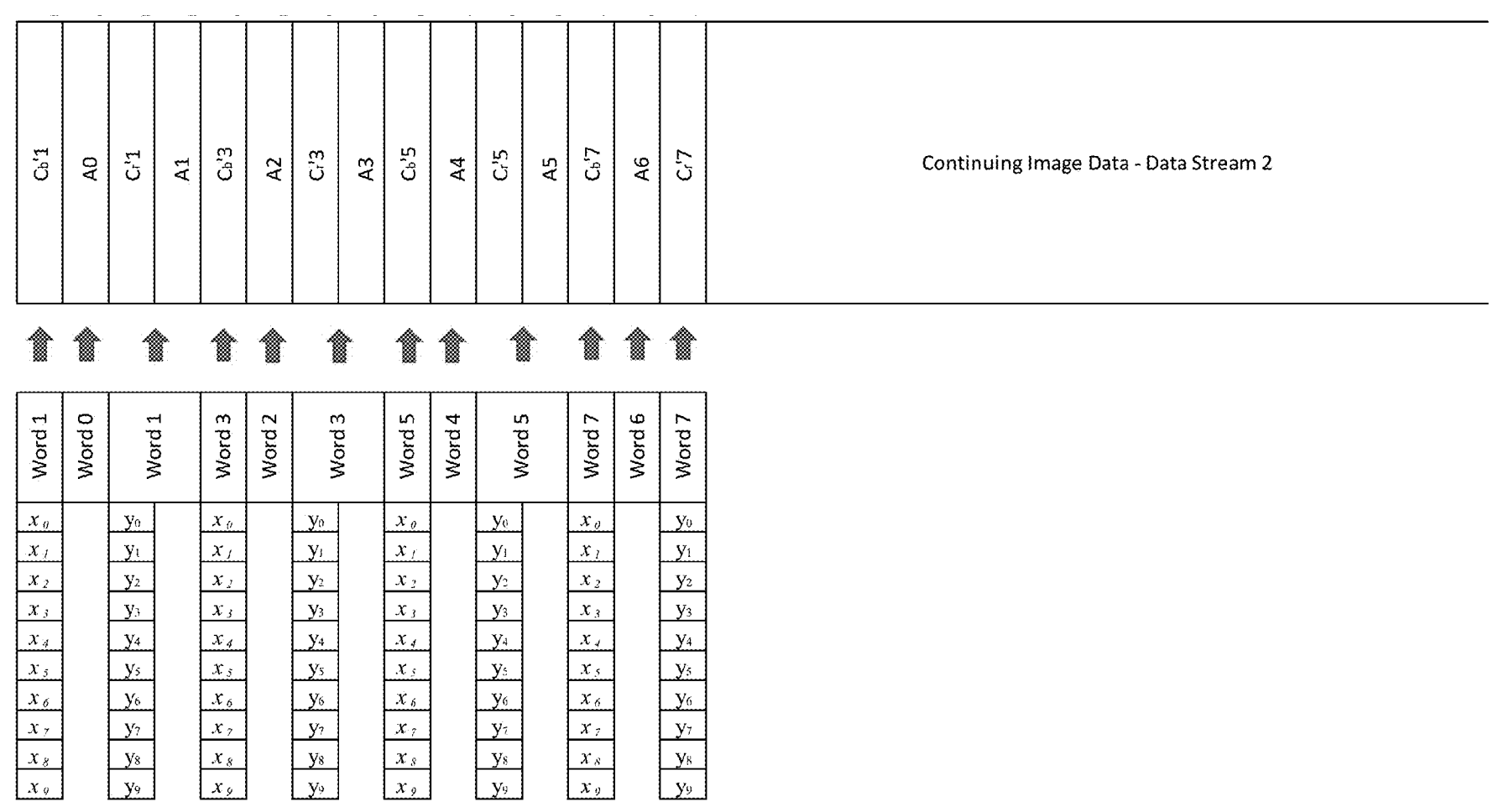

FIGS. 49A-49B illustrate one embodiment of a System 4 Yxy 10-bit Level B Multiplex Dual Link (DL) encode as applied to SMPTE ST425 (e.g., SMPTE ST425-1:2017). FIG. 49A illustrates one embodiment of a first data link for a System 4 Yxy 10-bit Level B Multiplex Dual Link (DL) encode as applied to SMPTE ST425. FIG. 49B illustrates one embodiment of a second data link for a System 4 Yxy 10-bit Level B Multiplex Dual Link (DL) encode as applied to SMPTE ST425.

Figure 50A:
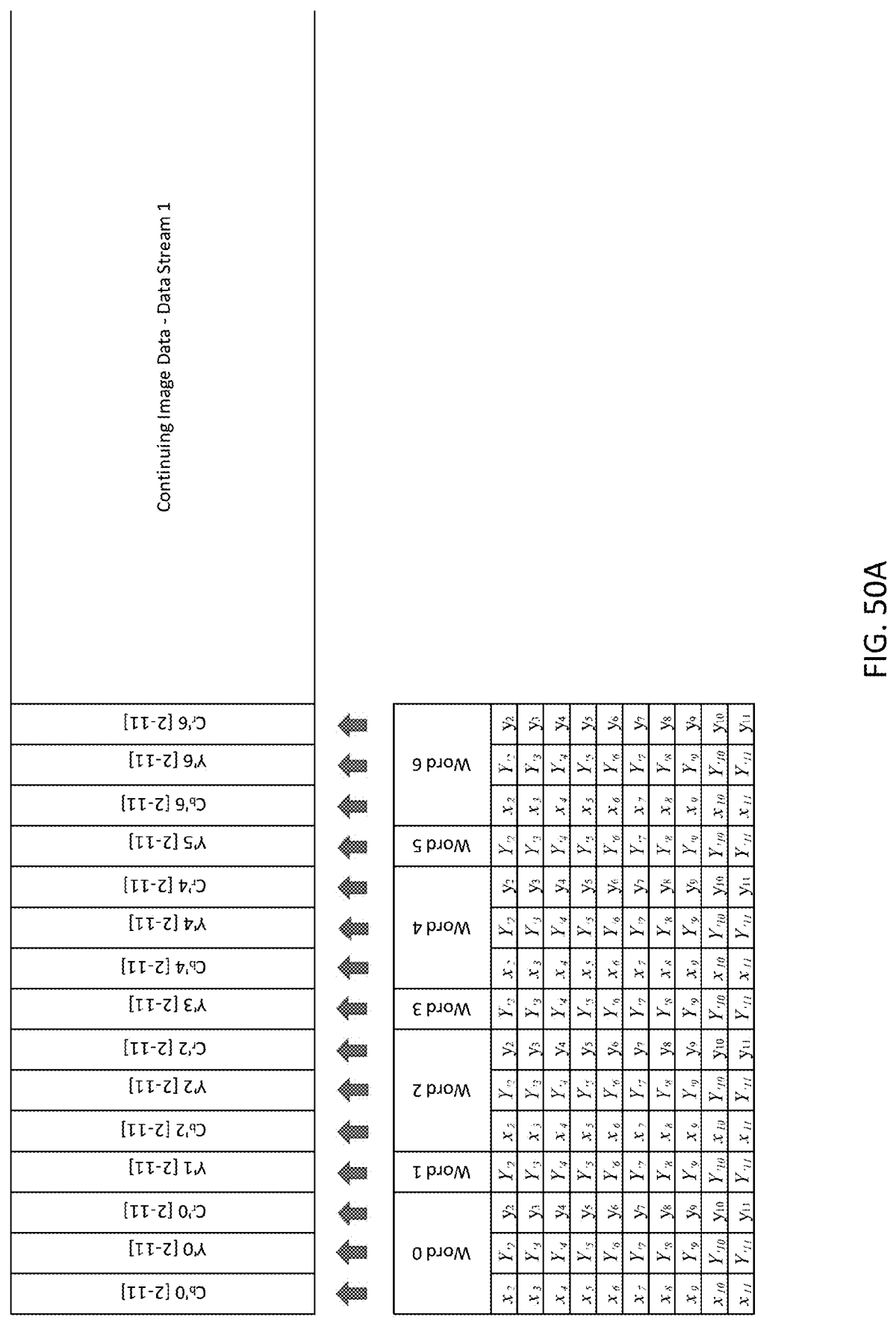
Figure 50B:
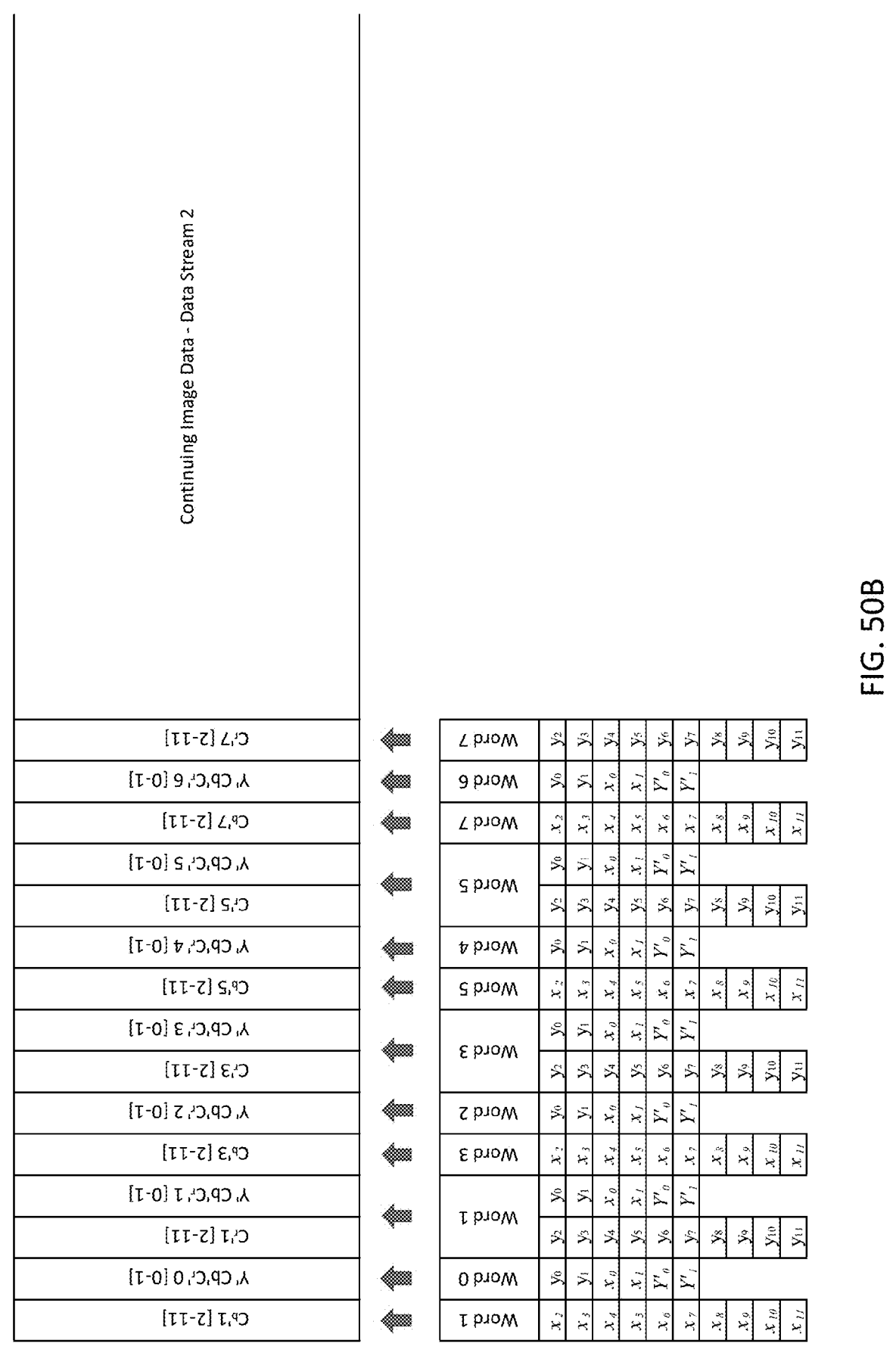

FIGS. 50A-50B illustrate one embodiment of a System 4 Yxy 12-bit Level B Multiplex Dual Link (DL) encode as applied to SMPTE ST425 (e.g., SMPTE ST425-1:2017). FIG. 50A illustrates one embodiment of a first data link for a System 4 Yxy 12-bit Level B Multiplex Dual Link (DL) encode as applied to SMPTE ST425. FIG. 50B illustrates one embodiment of a second data link for a System 4 Yxy 12-bit Level B Multiplex Dual Link (DL) encode as applied to SMPTE ST425.

In one embodiment, the formatting is compatible with SMPTE ST2022-6 (2012). Advantageously, there is no need to add any identification because the Yxy or Yu'v' identification is included in the mapped payload ID. SMPTE ST2022 does not describe any modifications to mapping, so mapping to Ethernet simply follows the appropriate SDI standard. In one embodiment, map code 0x00 uses Level A direct mapping from SMPTE ST292 or SMPTE ST425. In one embodiment, map code 0x01 uses Level B direct mapping formatted as SMPTE ST372 DL. In one embodiment, map code 0x02 uses Level B direct mapping formatted as SMPTE ST292 DS.

FIG. 51 is a table illustrating modification of SMPTE ST2036-1 (2014) parameters to include System 4 (e.g., Yxy, Yu'v').

Table 13 illustrates construction of 4:4:4 pgroups. Table 14 illustrates construction of 4:2:2 pgroups. Table 15 illustrates construction of 4:2:0 pgroups.

TABLE 13

Construction of 4:4:4 pgroups

| sampling | depth | pgroups size (octets) | pgroups coverage (pixels) | Sample Order |
|---|---|---|---|---|
| YCbCr-4:4:4 CLYCbCr-4:4:4 | 8 | 3 | 1 | C'B, Y', C'R |
| | 10 | 15 | 4 | C0'B, Y0', C0'R, C1'B, Y1', C1'R, C2'B, Y2', C2'R, C3'B, Y3', C3'R |
| | 12 | 9 | 2 | C0'B, Y0', C0'R, C1'B, Y1', C1'R |
| | 16, 16f | 6 | 1 | C'B, Y', C'R |
| ICtCp-4:4:4 | 8 | 3 | 1 | CT, I, CP |
| | 10 | 15 | 4 | C0T, I0, C0P, C1T, I1, C1P, C2T, I2, C2P, C3T, I3, C3P |
| | 12 | 9 | 2 | C0T, I0, C0P, C1T, I1, C1P |
| | 16, 16f | 6 | 1 | CT, I, CP |
| RGB (linear) | 8 | 3 | 1 | R, G, B |
| | 10 | 15 | 4 | R0, G0, B0, R1, G1, B1, R2, G2, B2, R3, G3, B3 |
| | 12 | 9 | 2 | R0, G0, B0, R1, G1, B1 |
| | 16, 16f | 6 | 1 | R, G, B |
| RGB (non-linear) | 8 | 3 | 1 | R', G', B' |
| | 10 | 15 | 4 | R0', G0', B0', R1', G1', B1', R2', G2', B2', R3', G3', B3' |
| | 12 | 9 | 2 | R0', G0', B0', R1', G1', B1' |
| | 16, 16f | 6 | 1 | R', G', B' |
| XYZ | 12 | 9 | 2 | X0', Y0', Z0', X1', Y1', Z1' |
| | 16, 16f | 6 | 1 | X', Y', Z' |
| Yxy-4:4:4 | 10 | 15 | 4 | x0, Y0', y0, x1, Y1', y1, x2, Y2', y2, x3, Y3', y3 |
| | 12 | 9 | 2 | x0, Y0', y0, x1, Y1', y1 |
| | 16, 16f | 6 | 1 | x, Y', y |
| Yu'v'-4:4:4 | 10 | 15 | 4 | u'0, Y0', v'0, u'1, Y1',v'1, u'2, Y2',v'2, u'3, Y3',v'3 |
| | 12 | 9 | 2 | u'0, Y0',v'0, u'1, Y1', v'1 |
| | 16, 16f | 6 | 1 | u', Y', v' |

TABLE 14

Construction of 4:2:2 pgroups

| sampling | depth | pgroups size (octets) | pgroups coverage (pixels) | Sample Order |
|---|---|---|---|---|
| YCbCr- 4:2:2 | 8 | 4 | 2 | C'B, Y0', C'R, Y1' |
| CLYCbCr- 4:2:2 | 10 | 5 | 2 | C'B, Y0', C'R, Y1' |
| | 12 | 6 | 2 | C'B, Y0', C'R, Y1' |
| | 16, 16f | 8 | 2 | C'B, Y0', C'R, Y1' |
| ICtCp- 4:2:2 | 8 | 4 | 2 | C'T, I0', C'P, I1' |
| | 10 | 5 | 2 | C'T, I0', C'P, I1' |
| | 12 | 6 | 2 | C'T, I0', C'P, I1' |
| | 16, 16f | 8 | 2 | C'T, I0', C'P, I1' |
| Yxy-4:2:2 | 10 | 5 | 2 | x, Y0',y, Y1' |
| | 12 | 6 | 2 | x, Y0',y, Y1' |
| | 16, 16f | 8 | 2 | x, Y0', y, Y1' |
| Yu'v'-4:2:2 | 10 | 5 | 2 | u',Y0', v', Y1' |
| | 12 | 6 | 2 | u', Y0', v', Y1' |
| | 16, 16f | 8 | 2 | u', Y0', v', Y1' |

TABLE 15

Construction of 4:2:0 pgroups

| sampling | depth | pgroup size (octets) | pgroup coverage (pixels) | Sample Order |
|---|---|---|---|---|
| YCbCr-4:2:0 | 8 | 6 | 4 | Y'00-Y'01-Y'10-Y'11-C'00-$C_R$'00 |
| CLYCbCr-4:2:0 | 10 | 15 | 8 | Y'00-Y'01-Y'10-Y'11-$C_B$'00-CR'00,Y'02-Y'03 -Y'12-Y'13-$C_B$'01-$C_R$'01 |
| | 12 | 9 | 4 | Y'00-Y'01-Y'10-Y'11-$C_B$'00-$C_R$'00 |
| ICtCp-4:2:0 | 8 | 6 | 4 | I00-I01-I10-I11-$C_T$00-$C_P$00 |
| | 10 | 15 | 8 | I00-I01-I10-I11-$C_T$00-$C_P$00, I02-I03-I12-I13-$C_T$01-$C_P$01 |
| | 12 | 9 | 4 | I00-I01-I10-I11-$C_T$00-$C_P$00 |
| Yxy-4:2:0 | 10 | 15 | 8 | Y'00-Y'01 -Y'10-Y'11-x00-y00, Y'02-Y'03-Y'12-Y'13-x01-y01 |
| | 12 | 9 | 4 | Y'00-Y'01-Y'10-Y'11-x00-y00 |
| YuV-4:2:0 | 10 | 15 | 8 | Y'00-Y'01-Y'10-Y'11-u'00-v'00, Y'02-Y'03-Y'12-Y'13-u'01-v'01 |
| | 12 | 9 | 4 | Y'00-Y'01-Y'10-Y'11-u'00-v'00 |

In one embodiment, SDP parameters are defined using SMPTE ST2110-20 (2017). In one embodiment, a Yxy or Yu'v' system uses CIE S 014-3:2011 as a colorimetry standard. Table 16 illustrates one embodiment of SDP colorimetry flag modification.

TABLE 16

| SDP Flag | Colorimetry Standard |
|---|---|
| BT601 | ITU-R BT.601-7 |
| BT709 | ITU-R BT.709-6 |
| BT2020 | ITU-R BT.2020-2 |
| BT2100 | ITU-R BT.2100 table 2 |
| ST2065-1 | SMPTE ST2065-1:2021 ACES |
| ST2065-3 | SMPTE ST2065-3:2020 ADX |
| UNSPECIFIED | No specification |
| XYZ | ISO 11664-1 1931 Standard Observer |
| Yxy | ISO 11664-3/CIE S 014-3:2011 |
| Yu'v' | ISO 11664-5/CIE S 014-3:2011 |

In one example, the SDP parameters for a Yxy system are as follows: m=video 30000 RTP/AVP 112, a=rtpmap: 112 raw/90000, a=fmtp: 112, sampling=YCbCr-4:2:2, width=1280, height=720, exactframerate=60000/1001, depth=10, TCS (Transfer Characteristic System)=SDR, colorimetry=Yxy, PM=2110 GPM, SSN=ST2110-20:2017.

FIG. 52 is a table illustrating modification of CTA 861 Table 6-Colorimetry Transfer Characteristics to include System 4 (e.g., Yxy, Yu'v'). In one embodiment, CTA 861 standards conform to CTA 861-H (2021), which is incorporated herein by reference in its entirety.

FIG. 53A is a table for Yxy 8-bit 4:2:2 encoding with 4 lanes. FIG. 53B is a table for Yxy 8-bit 4:2:2 encoding with 2 lanes. FIG. 53C is a table for Yxy 8-bit 4:2:2 encoding with 1 lane.

FIG. 54A is a table for Yxy 10-bit 4:2:2 encoding with 4 lanes. FIG. 54B is a table for Yxy 10-bit 4:2:2 encoding with 2 lanes. FIG. 54C is a table for Yxy 10-bit 4:2:2 encoding with 1 lane.

FIG. 55A is a table for Yxy 12-bit 4:2:2 encoding with 4 lanes. FIG. 55B is a table for Yxy 12-bit 4:2:2 encoding with 2 lanes. FIG. 55C is a table for Yxy 12-bit 4:2:2 encoding with 1 lane.

FIG. 56A is a table for Yxy 16-bit 4:2:2 encoding with 4 lanes. FIG. 56B is a table for Yxy 16-bit 4:2:2 encoding with 2 lanes. FIG. 56C is a table for Yxy 16-bit 4:2:2 encoding with 1 lane.

FIG. 57A is a table for Yxy 10-bit 4:4:4 encoding with 4 lanes. FIG. 57B is a table for Yxy 10-bit 4:4:4 encoding with 2 lanes. FIG. 57C is a table for Yxy 10-bit 4:4:4 encoding with 1 lane.

FIG. 58A is a table for Yxy 12-bit 4:4:4 encoding with 4 lanes. FIG. 58B is a table for Yxy 12-bit 4:4:4 encoding with 2 lanes. FIG. 58C is a table for Yxy 12-bit 4:4:4 encoding with 1 lane.

FIG. 59A is a table for Yxy 16-bit 4:4:4 encoding with 4 lanes. FIG. 59B is a table for Yxy 16-bit 4:4:4 encoding with 2 lanes. FIG. 59C is a table for Yxy 16-bit 4:4:4 encoding with 1 lane.

The identification of a Yxy or Yu'v' formatted connection is preferably provided in the auxiliary video information (AVI) (e.g., for CTA 861). In one embodiment, the AVI is provided according to InfoFrame version 4 as shown in FIG. 60. Additional information is available in ANSI/CTA-861-H-2021, which is incorporated herein by reference in its entirety. See, e.g., ANSI/CTA-861-H-2021 Section 6.2. In one embodiment, location of the identification is in data byte 14 (e.g., ACE3, ACE2, ACE1, ACE0). In one embodiment, ACE3=0, ACE2=0, ACE1=1, and ACE0=1 identifies a Yxy 4:4:4 formatted image without a DRR applied; ACE3=0, ACE2=1, ACE1=0, and ACE0=0 identifies a Yxy 4:2:2 formatted image without a DRR applied; ACE3=0, ACE2=1, ACE1=0, and ACE0=1 identifies a Yxy 4:2:0 formatted image without a DRR applied; ACE3=0, ACE2=1, ACE1=1, and ACE0=0 identifies a Yxy 4:4:4 formatted image with a DRR applied; ACE3=0, ACE2=1, ACE1=1, and ACE0=1 identifies a Yxy 4:2:2 formatted image with a DRR applied; ACE3=1, ACE2=0, ACE1=0, and ACE0=0 identifies a Yxy 4:2:0 formatted image with a DRR applied; ACE3=1, ACE2=0, ACE1=0, and ACE0=1 identifies a Yu'v' 4:4:4 formatted image without a DRR applied; ACE3=1, ACE2=0, ACE1=1, and ACE0=0 identifies a Yu'v' 4:2:2 formatted image without a DRR applied; ACE3=1, ACE2=0, ACE1=1, and ACE0=1 identifies a Yu'v' 4:2:0 formatted image without a DRR applied; ACE3=1, ACE2=1, ACE1=0, and ACE0=0 identifies a Yu'v' 4:4:4 formatted image with a DRR applied; ACE3=1, ACE2=1, ACE1=0, and ACE0=1 identifies a Yu'v' 4:2:2 formatted image with a DRR applied; and ACE3=1, ACE2=1, ACE1=1, and ACE0=0 identifies a Yu'v' 4:2:0 formatted image with a DRR applied. In another embodiment, ACE3=0, ACE2=0, ACE1=1, and ACE0=1 identifies a Yxy 4:4:4 formatted image; ACE3=0, ACE2=1, ACE1=0, and ACE0=0 identifies a Yxy 4:2:2 formatted image; and ACE3=0, ACE2=1, ACE1=0, and ACE0=1 identifies a Yxy 4:2:0 formatted image. In one embodiment, data byte 2 (C1, C0) reads as C1=1 and C0=1 and data byte 3 (EC2, EC1, EC0) reads as EC2=1, EC1=1, and EC0=1. Table 17 illustrates values for data byte 2. Table 18 illustrates values for data byte 3. Table 19 illustrates values for data byte 14.

TABLE 17

| C1 | C0 | Colorimetry |
|----|----|-------------|
| 0 | 0 | No Data |
| 0 | 1 | SMPTE 170M [1] |
| 1 | 0 | ITU-RBT.709 [7] |
| 1 | 1 | Extended Colorimetry Information Valid (colorimetry indicated in bits EC0, EC1, and EC2. See Table 13) |

TABLE 18

| EC2 | EC1 | EC0 | Extended Colorimetry |
|-----|-----|-----|----------------------|
| 0 | 0 | 0 | xvYCC601 |
| 0 | 0 | 1 | xvYCC709 |
| 0 | 1 | 0 | sYCC601 |
| 0 | 1 | 1 | opYCC601 |
| 1 | 0 | 0 | opRGB |
| 1 | 0 | 1 | ITU-R BT.2020 Y'CC'BCC'RC |
| 1 | 1 | 0 | ITU-R BT.2020 R'G'B' or Y'C'BC'R |
| 1 | 1 | 1 | Additional Colorimetry Extension Information Valid (colorimetry indicated in bits ACE0, ACE1, ACE2, and ACE3. See Table 25) |

TABLE 19

| ACE3 | ACE3 | ACE1 | ACE0 | Additional Colorimetry Extension |
|------|------|------|------|----------------------------------|
| 0 | 0 | 0 | 0 | SMPTE ST2113 (P3 D65) R'G'B' |
| 0 | 0 | 0 | 1 | SMPTE ST2113 (P3 DCI) R'G'B' |
| 0 | 0 | 1 | 0 | ITU-RBT.2100 $IC_TC_P$ |
| 0 | 0 | 1 | 1 | Yxy 4:4:4 DRR not applied |
| 0 | 1 | 0 | 0 | Yxy 4:2:2 DRR not applied |
| 0 | 1 | 0 | 1 | Yxy 4:2:0 DRR not applied |
| 0 | 1 | 1 | 0 | Yxy 4:4:4 DRR applied |
| 0 | 1 | 1 | 1 | Yxy 4:2:2 DRR applied |
| 1 | 0 | 0 | 0 | Yxy 4:2:0 DRR applied |
| 1 | 0 | 0 | 1 | Yuv 4:4:4 DRR not applied |
| 1 | 0 | 1 | 0 | Yuv 4:2:2 DRR not applied |
| 1 | 0 | 1 | 1 | Yuv 4:2:0 DRR not applied |
| 1 | 1 | 0 | 0 | Yuv 4:4:4 DRR applied |
| 1 | 1 | 0 | 1 | Yuv 4:2:2 DRR applied |
| 1 | 1 | 1 | 0 | Yuv 4:2:0 DRR applied |
| 0x0F | | | | Reserved |

Session Description Protocol (SDP) Modification for a Six-Primary Color System

SDP is derived from IETF RFC 4566 which sets parameters including, but not limited to, bit depth and sampling parameters. IETF RFC 4566 (2006) is incorporated herein by reference in its entirety. In one embodiment, SDP parameters are contained within the RTP payload. In another embodiment, SDP parameters are contained within the media format and transport protocol. This payload information is transmitted as text. Therefore, modifications for the additional sampling identifiers requires the addition of new parameters for the sampling statement. SDP parameters include, but are not limited to, color channel data, image data, framerate data, a sampling standard, a flag indicator, an active picture size code, a timestamp, a clock frequency, a frame count, a scrambling indicator, and/or a video format indicator. For non-constant luminance imaging, the additional parameters include, but are not limited to, RGBCMY-4:4:4, YBRCY-4:2:2, and YBRCY-4:2:0. For constant luminance signals, the additional parameters include, but are not limited to, CLYBRCY-4:2:2 and CLYBRCY-4:2:0.

Additionally, differentiation is included with the colorimetry identifier in one embodiment. For example, 6PB1 defines 6P with a color gamut limited to ITU-R BT.709 formatted as System 1, 6PB2 defines 6P with a color gamut limited to ITU-R BT.709 formatted as System 2, 6PB3 defines 6P with a color gamut limited to ITU-R BT.709 formatted as System 3, 6PC1 defines 6P with a color gamut limited to SMPTE RP 431-2 formatted as System 1, 6PC2 defines 6P with a color gamut limited to SMPTE RP 431-2 formatted as System 2, 6PC3 defines 6P with a color gamut limited to SMPTE RP 431-2 formatted as System 3, 6PS1 defines 6P with a color gamut as Super 6P formatted as System 1, 6PS2 defines 6P with a color gamut as Super 6P formatted as System 2, and 6PS3 defines 6P with a color gamut as Super 6P formatted as System 3.

Colorimetry is also operable to be defined between a six-primary color system using the ITU-R BT.709-6 standard and the SMPTE ST431-2 standard, or colorimetry is operable to be left defined as is standard for the desired standard. For example, the SDP parameters for a 1920×1080 six-primary color system using the ITU-R BT.709-6 standard with a 10-bit signal as System 1 are as follows: m=video 30000 RTP/AVP 112, a=rtpmap: 112 raw/90000, a=fmtp: 112, sampling=YBRCY-4:2:2, width=1920, height=1080, exactframerate=30000/1001, depth=10, TCS=SDR, colorimetry=6PB1, PM=2110 GPM, SSN=ST2110-20:2017.

In one embodiment, the six-primary color system is integrated with a Consumer Technology Association (CTA) 861-based system. CTA-861 establishes protocols, requirements, and recommendations for the utilization of uncompressed digital interfaces by consumer electronics devices including, but not limited to, digital televisions (DTVs), digital cable, satellite or terrestrial set-top boxes (STBs), and related peripheral devices including, but not limited to, DVD players and/or recorders, and other related Sources or Sinks.

These systems are provided as parallel systems so that video content is parsed across several line pairs. This enables each video component to have its own transition-minimized differential signaling (TMDS) path. TMDS is a technology for transmitting high-speed serial data and is used by the Digital Visual Interface (DVI) and High-Definition Multimedia Interface (HDMI) video interfaces, as well as other digital communication interfaces. TMDS is similar to low-voltage differential signaling (LVDS) in that it uses differential signaling to reduce electromagnetic interference (EMI), enabling faster signal transfers with increased accuracy. In addition, TMDS uses a twisted pair for noise reduction, rather than a coaxial cable that is conventional for carrying video signals. Similar to LVDS, data is transmitted serially over the data link. When transmitting video data, and using HDMI, three TMDS twisted pairs are used to transfer video data.

In such a system, each pixel packet is limited to 8 bits only. For bit depths higher than 8 bits, fragmented packs are used. This arrangement is no different than is already described in the current CTA-861 standard.

Based on CTA extension Version 3, identification of a six-primary color transmission is performed by the sink device (e.g., the monitor). Adding recognition of the additional formats is flagged in the CTA Data Block Extended Tag Codes (byte 3). Since codes 33 and above are reserved, any two bits are operable to be used to identify that the format is RGB, RGBCMY, Y Cb Cr, or Y Cb Cr Cc Cy and/or identify System 1 or System 2. Should byte 3 define a six-primary sampling format, and where the block 5 extension identifies byte 1 as ITU-R BT.709, then logic assigns as 6P-B. However, should byte 4 bit 7 identify colorimetry as DCI-P3, the color gamut is assigned as 6P-C.

In one embodiment, the system alters the Auxiliary Video Information (AVI) Infoframe Data to identify content. AVI Infoframe Data is shown in Table 10 of CTA 861-G. In one embodiment, Y2=1, Y1=0, and Y0=0 identifies content as 6P 4:2:0:2:0. In another embodiment, Y2=1, Y1=0, and Y0=1 identifies content as Y Cr Cb Cc Cy. In yet another embodiment, Y2=1, Y1=1, and Y0=0 identifies content as RGBCMY.

Byte 2 C1=1, C0=1 identifies extended colorimetry in Table 11 of CTA 861-G. Byte 3 EC2, EC1, EC0 identifies additional colorimetry extension valid in Table 13 of CTA 861-G. Table 14 of CTA 861-G reserves additional extensions. In one embodiment, ACE3=1, ACE2=0, ACE1-0, and ACE0=X identifies 6P-B. In one embodiment, ACE3=0, ACE2=1, ACE1=0, and ACE0=X identifies 6P-C. In one embodiment, ACE3=0, ACE2-0, ACE1=1, and ACE0=X identifies System 1. In one embodiment, ACE3=1, ACE2=1, ACE1=0, and ACE0=X identifies System 2.

Figure 61:
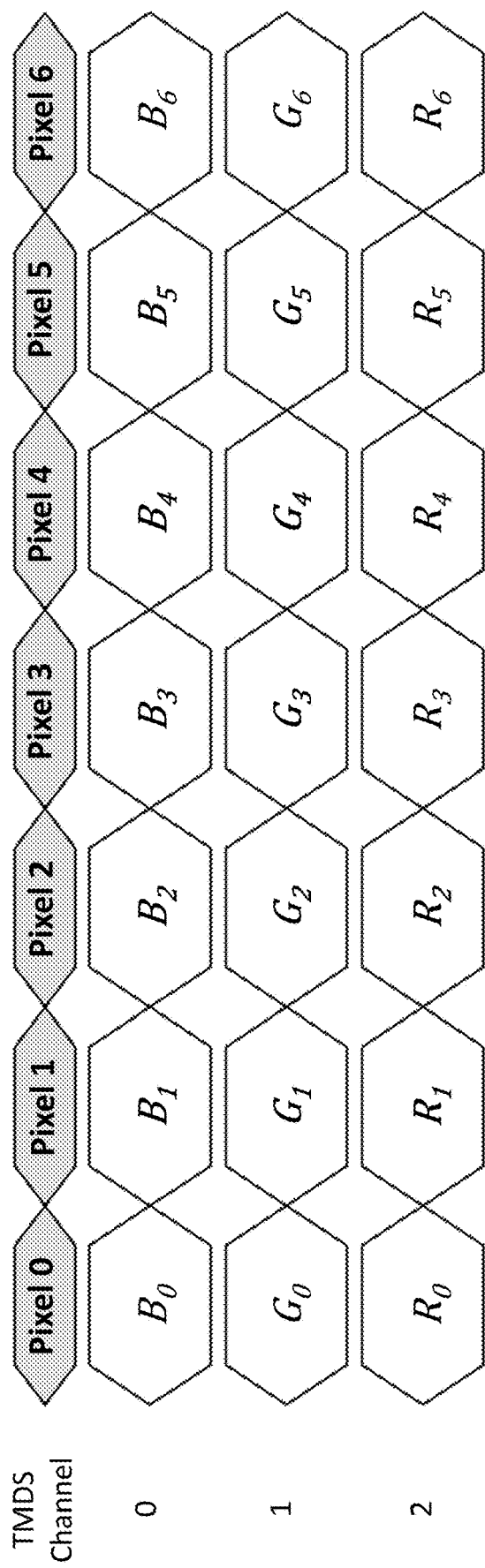
FIG. 61 illustrates an RGB sampling transmission for a 4:4:4 sampling system.
Figure 62:
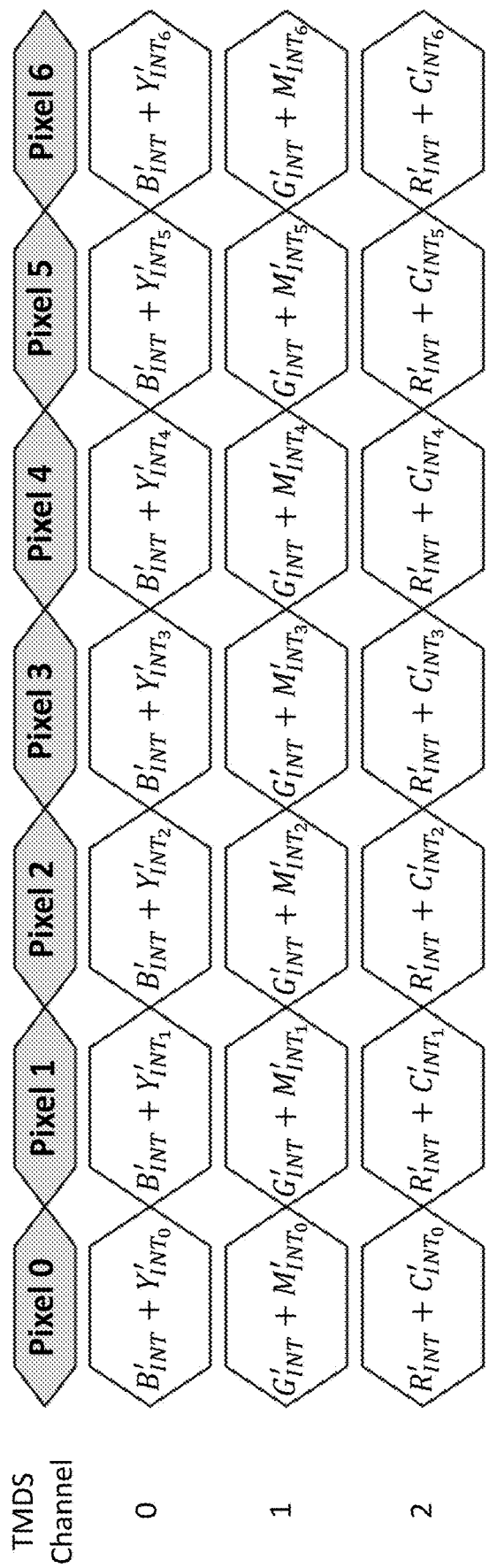
FIG. 62 illustrates a RGBCYM sampling transmission for a 4:4:4 sampling system.
Figure 63:
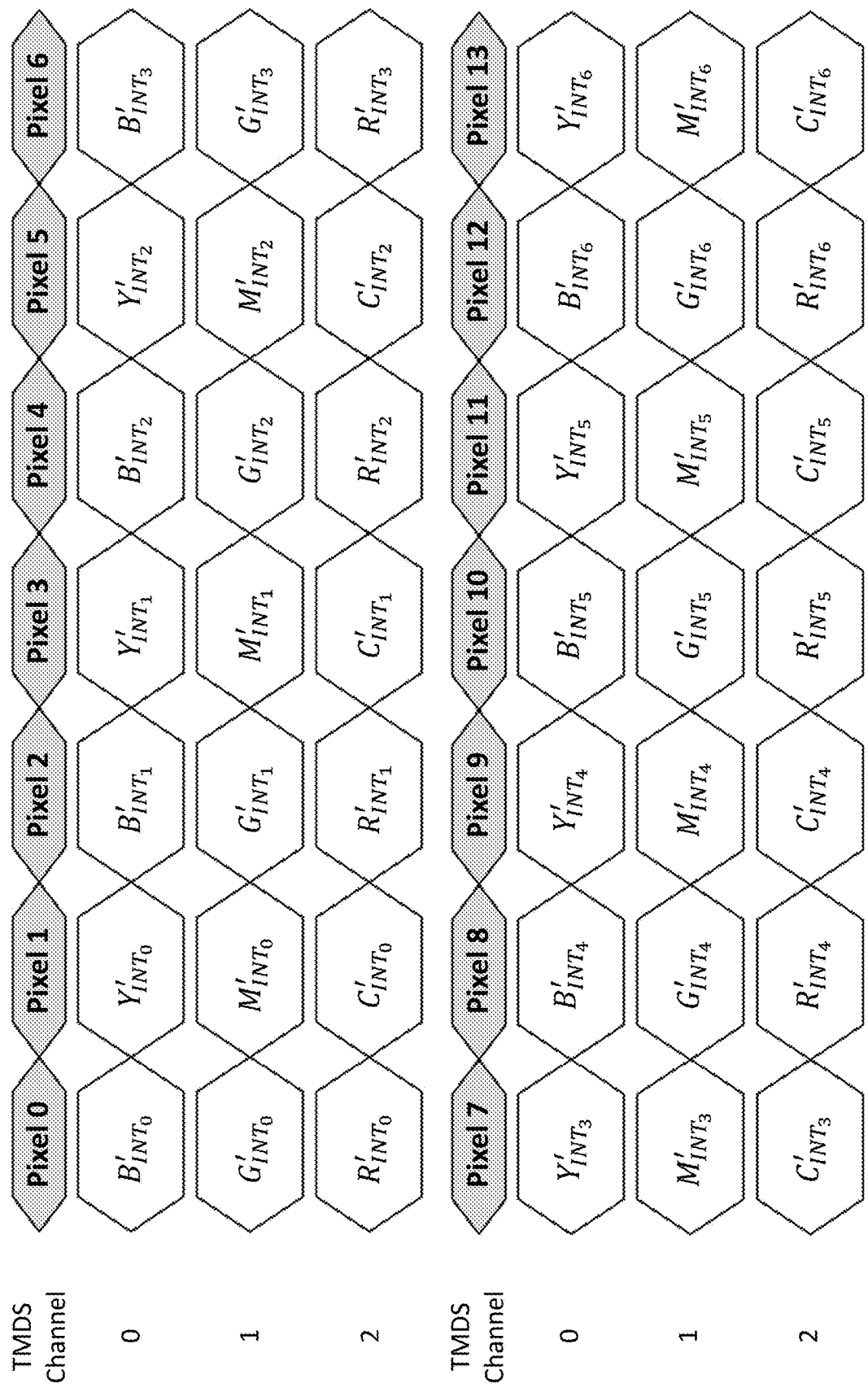
FIG. 63 illustrates an example of System 2 to RGBCYM 4:4:4 transmission.
Figure 64:
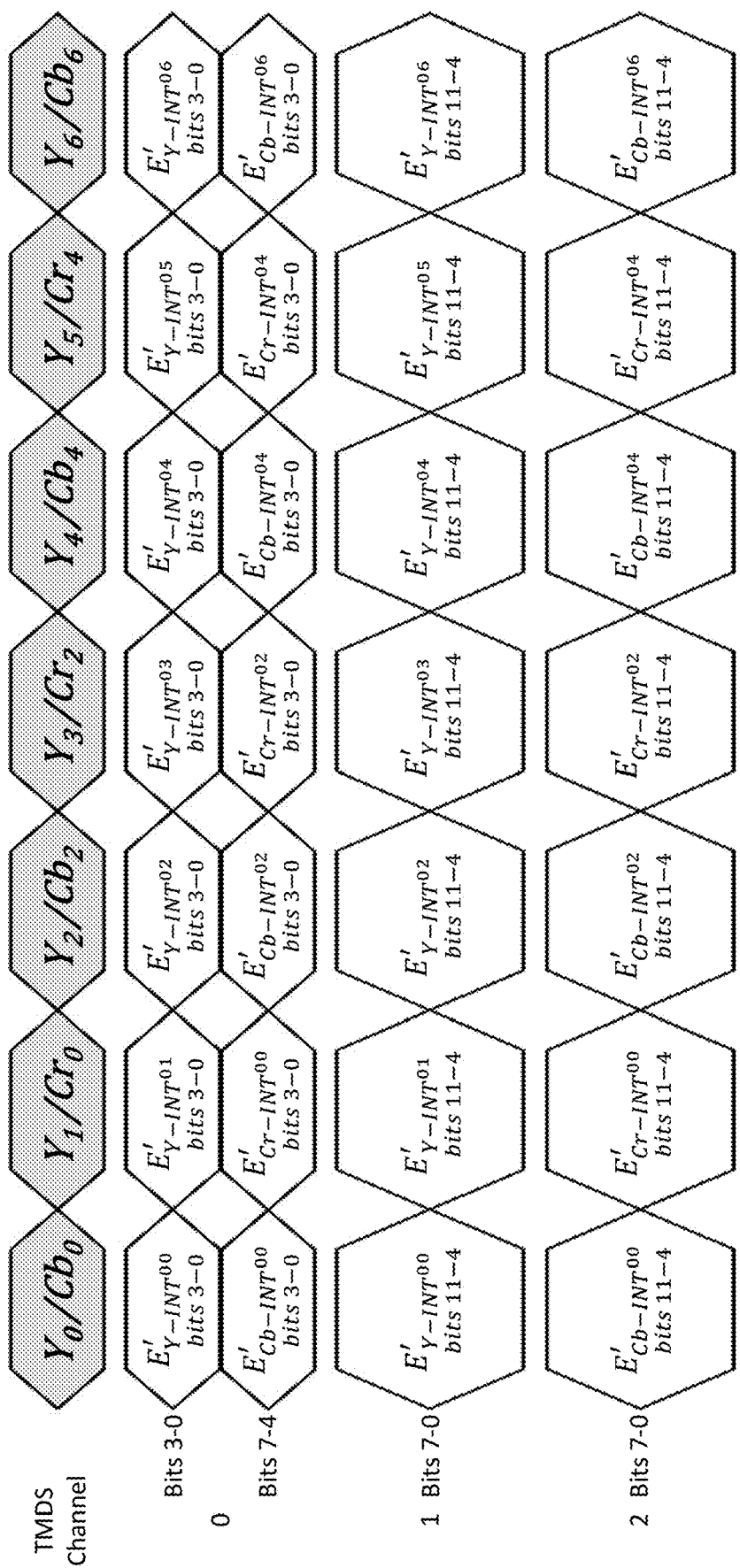
FIG. 64 illustrates a Y Cb Cr sampling transmission using a 4:2:2 sampling system.
Figure 65:
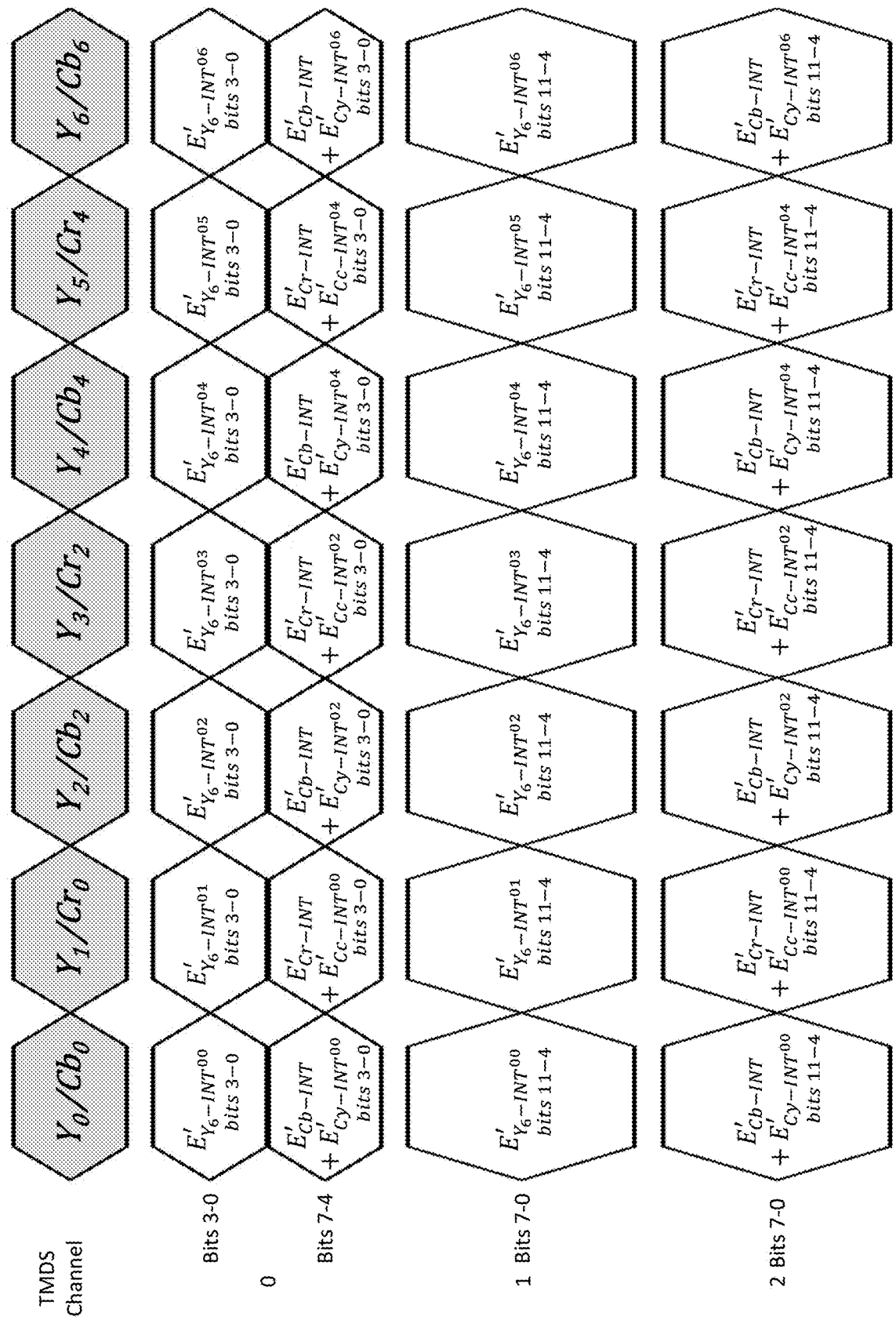
FIG. 65 illustrates a Y Cr Cb Cc Cy sampling transmission using a 4:2:2 sampling system.
Figure 66:
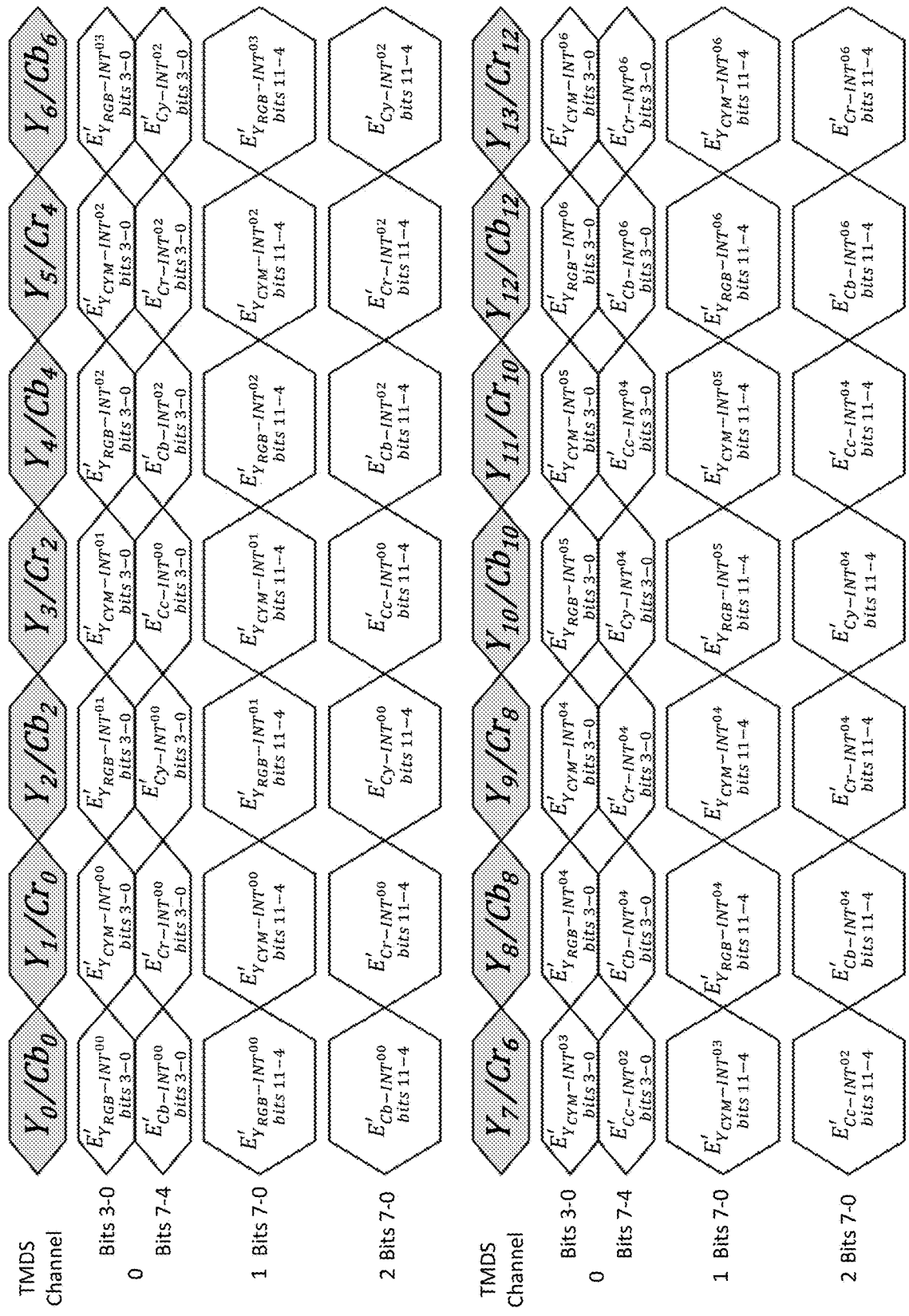
FIG. 66 illustrates an example of a System 2 to Y Cr Cb Cc Cy 4:2:2 Transmission as non-constant luminance.
Figure 67:
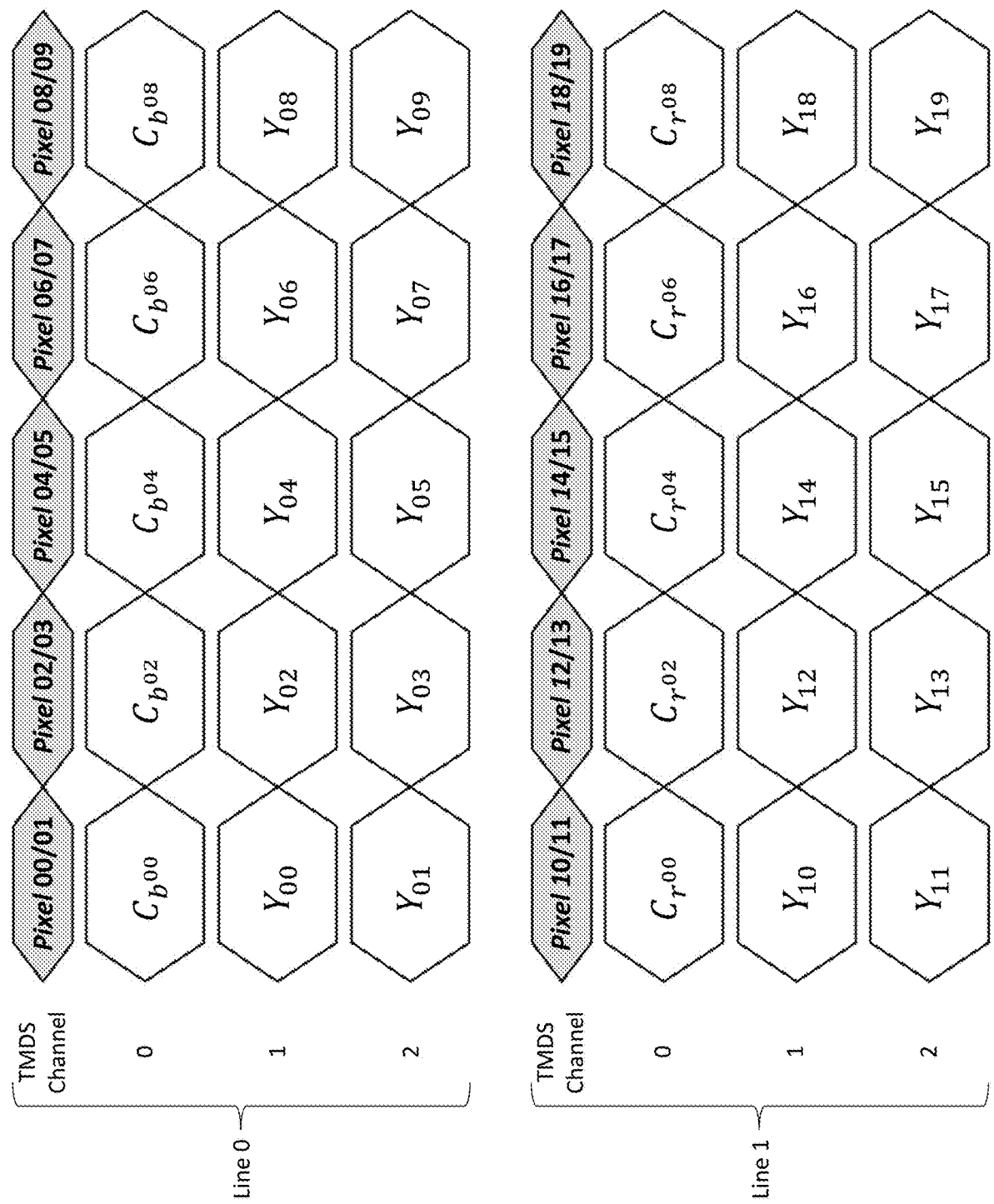
FIG. 67 illustrates a Y Cb Cr sampling transmission using a 4:2:0 sampling system.
Figure 68:
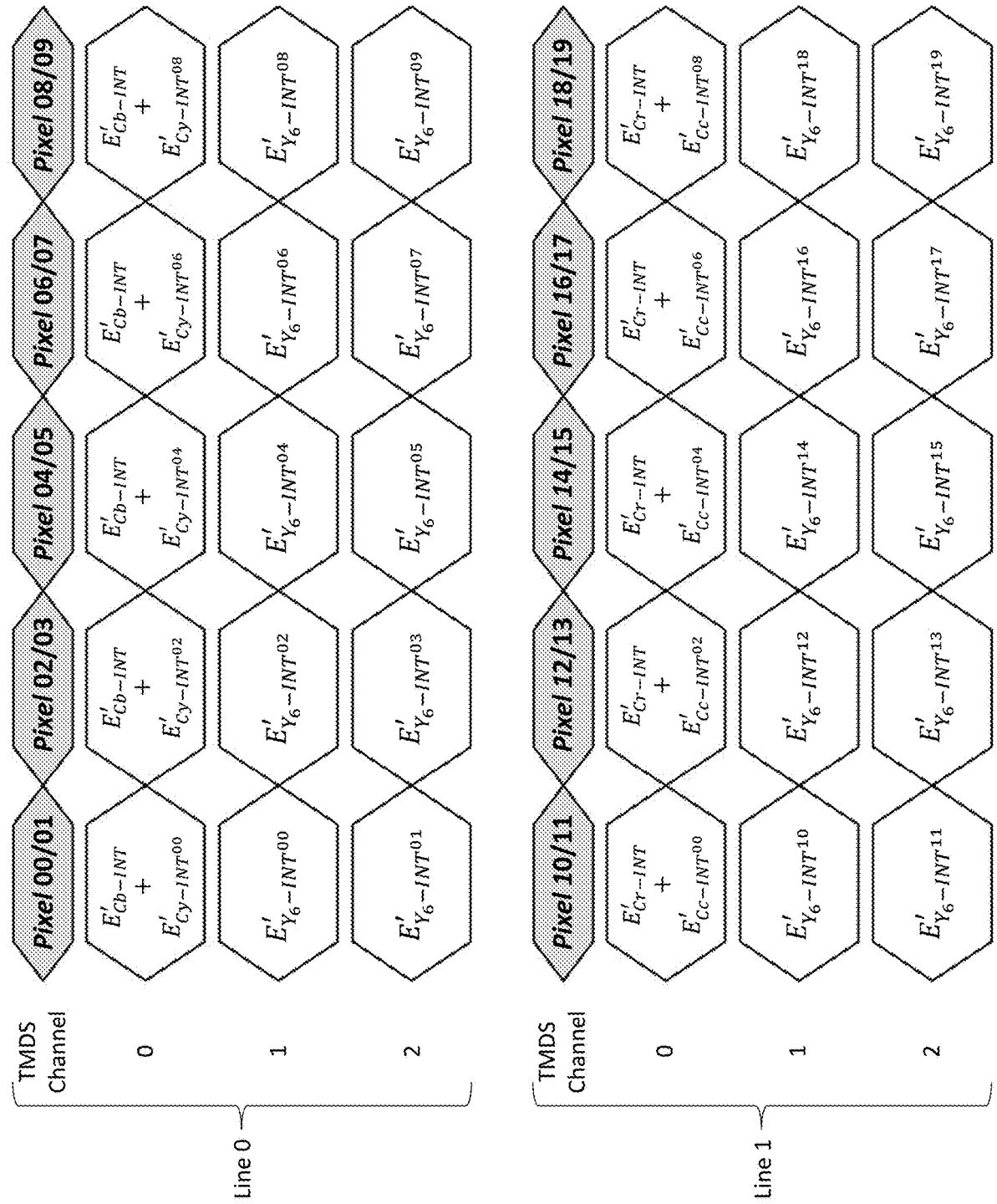
FIG. 68 illustrates a Y Cr Cb Cc Cy sampling transmission using a 4:2:0 sampling system.

FIG. 61 illustrates the current RGB sampling structure for 4:4:4 sampling video data transmission. For HDMI 4:4:4 sampling, video data is sent through three TMDS line pairs. FIG. 62 illustrates a six-primary color sampling structure, RGBCMY, using System 1 for 4:4:4 sampling video data transmission. In one embodiment, the six-primary color sampling structure complies with CTA 861-G, November 2016, Consumer Technology Association, which is incorporated herein by reference in its entirety. FIG. 63 illustrates an example of System 2 to RGBCMY 4:4:4 transmission. FIG. 64 illustrates current Y Cb Cr 4:2:2 sampling transmission as non-constant luminance. FIG. 65 illustrates a six-primary color system (System 1) using Y Cr Cb Cc Cy 4:2:2 sampling transmission as non-constant luminance. FIG. 66 illustrates an example of a System 2 to Y Cr Cb Cc Cy 4:2:2 Transmission as non-constant luminance. In one embodiment, the Y Cr Cb Cc Cy 4:2:2 sampling transmission complies with CTA 861-G, November 2016, Consumer Technology Association. FIG. 67 illustrates current Y Cb Cr 4:2:0 sampling transmission. FIG. 68 illustrates a six-primary color system (System 1) using Y Cr Cb Cc Cy 4:2:0 sampling transmission.

HDMI sampling systems include Extended Display Identification Data (EDID) metadata. EDID metadata describes the capabilities of a display device to a video source. The data format is defined by a standard published by the Video Electronics Standards Association (VESA). The EDID data structure includes, but is not limited to, manufacturer name and serial number, product type, phosphor or filter type, timings supported by the display, display size, luminance data, and/or pixel mapping data. The EDID data structure is modifiable and modification requires no additional hardware and/or tools.

EDID information is transmitted between the source device and the display through a display data channel (DDC), which is a collection of digital communication protocols created by VESA. With EDID providing the display information and DDC providing the link between the display and the source, the two accompanying standards enable an information exchange between the display and source.

In addition, VESA has assigned extensions for EDID. Such extensions include, but are not limited to, timing extensions (00), additional time data black (CEA EDID Timing Extension (02)), video timing block extensions (VTB-EXT (10)), EDID 2.0 extension (20), display information extension (DI-EXT (40)), localized string extension (LS-EXT (50)), microdisplay interface extension (MI-EXT (60)), display ID extension (70), display transfer characteristics data block (DTCDB (A7, AF, BF)), block map (F0), display device data block (DDDB (FF)), and/or extension defined by monitor manufacturer (FF).

In one embodiment, SDP parameters include data corresponding to a payload identification (ID) and/or EDID information.

Multi-Primary Color System Display

Figure 69:
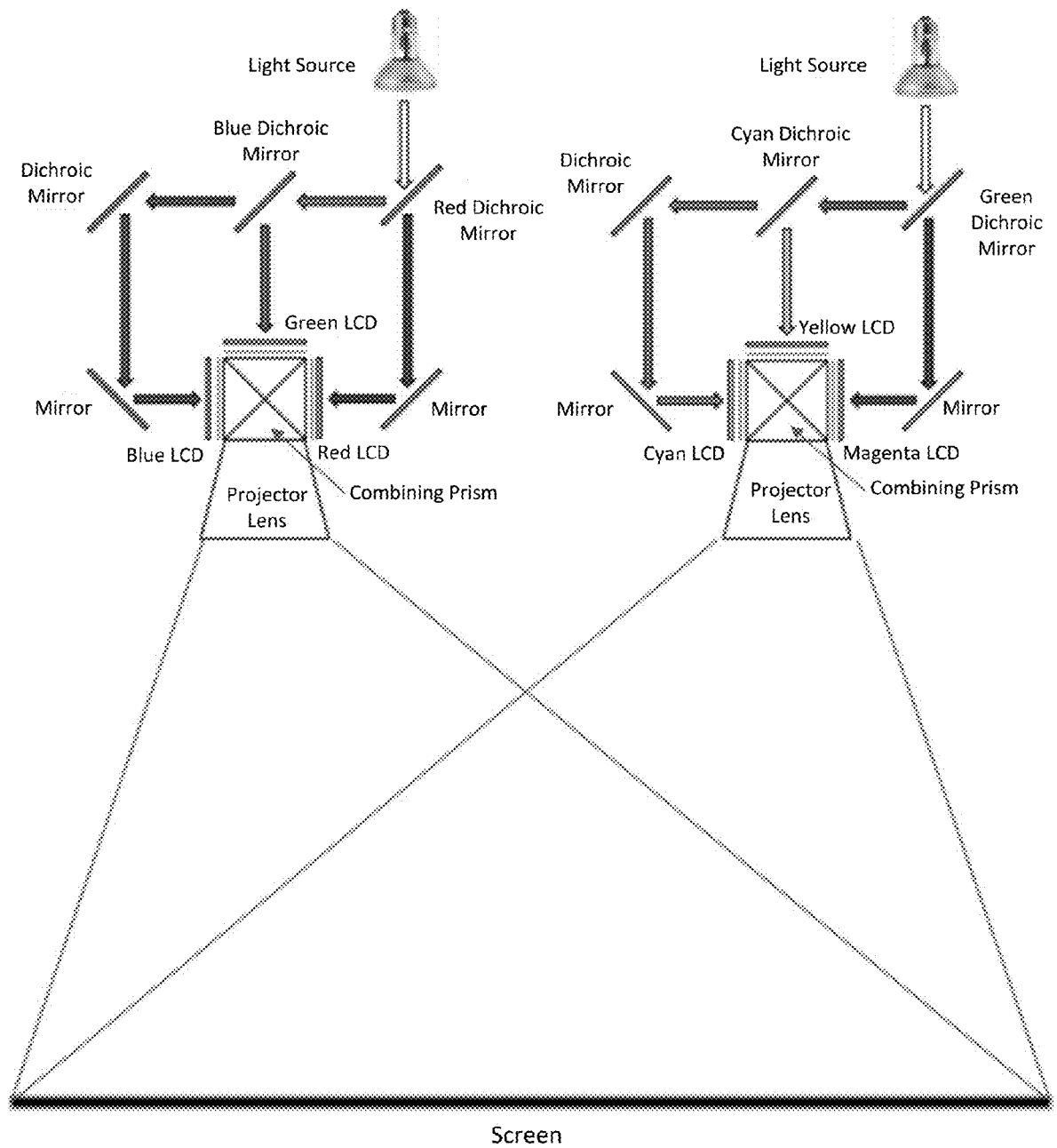
FIG. 69 illustrates a dual stack LCD projection system for a six-primary color system.

FIG. 69 illustrates a dual stack LCD projection system for a six-primary color system. In one embodiment, the display is comprised of a dual stack of projectors. This display uses two projectors stacked on top of one another or placed side by side. Each projector is similar, with the only difference being the color filters in each unit. Refresh and pixel timings are synchronized, enabling a mechanical alignment between the two units so that each pixel overlays the same position between projector units. In one embodiment, the two projectors are Liquid-Crystal Display (LCD) projectors. In another embodiment, the two projectors are Digital Light Processing (DLP) projectors. In yet another embodiment, the two projectors are Liquid-Crystal on Silicon (LCOS) projectors. In yet another embodiment, the two projectors are Light-Emitting Diode (LED) projectors.

Figure 70:
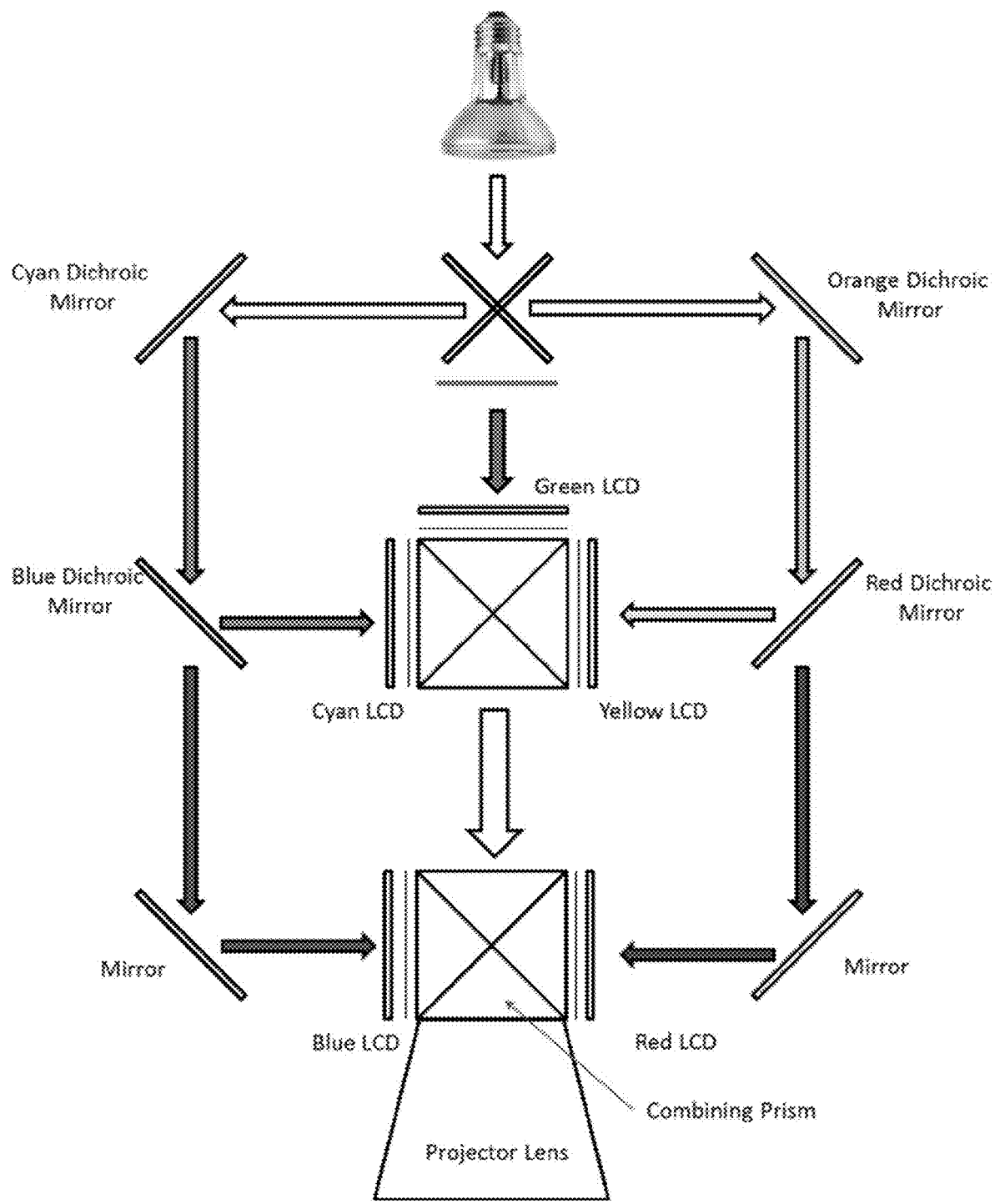
FIG. 70 illustrates one embodiment of a single projector.

In one embodiment, the display is comprised of a single projector. A single projector six-primary color system requires the addition of a second cross block assembly for the additional colors. One embodiment of a single projector (e.g., single LCD projector) is shown in FIG. 70. A single projector six-primary color system includes a cyan dichroic mirror, an orange dichroic mirror, a blue dichroic mirror, a red dichroic mirror, and two additional standard mirrors. In one embodiment, the single projector six-primary color system includes at least six mirrors. In another embodiment, the single projector six-primary color system includes at least two cross block assembly units.

Figure 71:
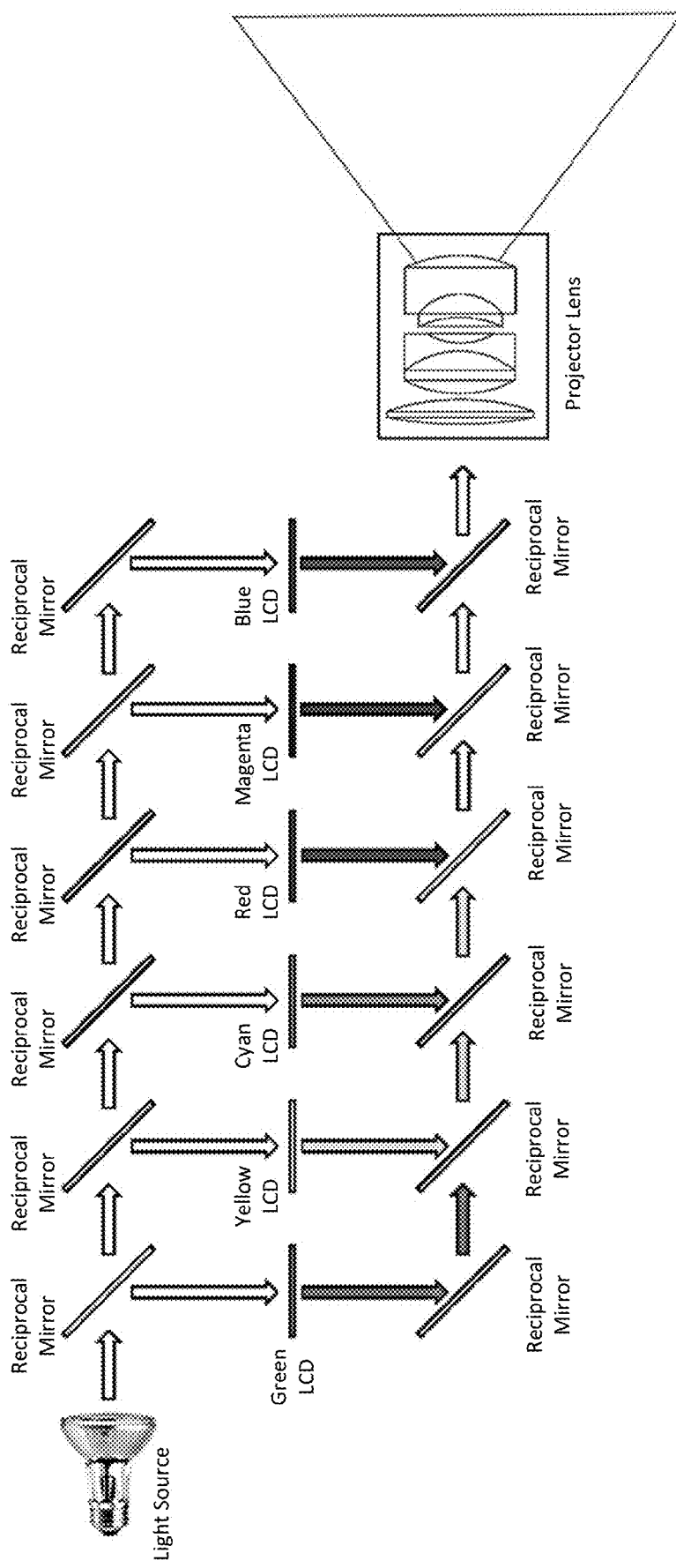
FIG. 71 illustrates a six-primary color system using a single projector and reciprocal mirrors.

FIG. 71 illustrates a six-primary color system using a single projector and reciprocal mirrors. In one embodiment, the display is comprised of a single projector unit working in combination with at first set of at least six reciprocal mirrors, a second set of at least six reciprocal mirrors, and at least six LCD units. Light from at least one light source emits towards the first set of at least six reciprocal mirrors. The first set of at least six reciprocal mirrors reflects light towards at least one of the at least six LCD units. The at least six LCD units include, but are not limited to, a Green LCD, a Yellow LCD, a Cyan, LCD, a Red LCD, a Magenta LCD, and/or a Blue LCD. Output from each of the at least six LCDs is received by the second set of at least six reciprocal mirrors. Output from the second set of at least six reciprocal mirrors is sent to the single projector unit. Image data output by the single projector unit is output as a six-primary color system. In another embodiment, there are more than two sets of reciprocal mirrors. In another embodiment, more than one projector is used.

Figure 72:
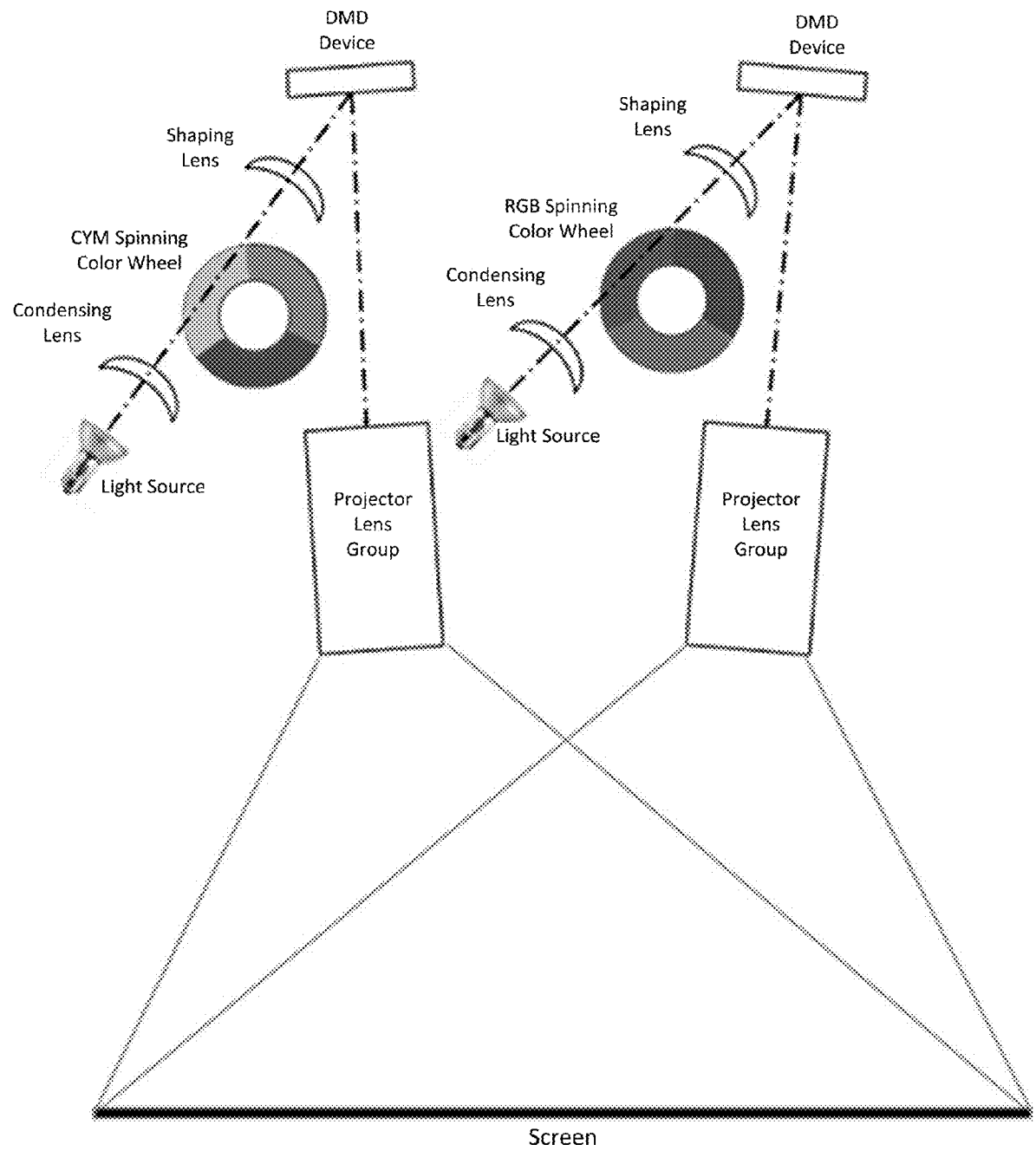
FIG. 72 illustrates a dual stack DMD projection system for a six-primary color system.

In another embodiment, the display is comprised of a dual stack Digital Micromirror Device (DMD) projector system. FIG. 72 illustrates one embodiment of a dual stack DMD projector system. In this system, two projectors are stacked on top of one another. In one embodiment, the dual stack DMD projector system uses a spinning wheel filter. In another embodiment, the dual stack DMD projector system uses phosphor technology. In one embodiment, the filter systems are illuminated by a xenon lamp. In another embodiment, the filter system uses a blue laser illuminator system. Filter systems in one projector are RGB, while the second projector uses a CMY filter set. The wheels for each projector unit are synchronized using at least one of an input video sync or a projector to projector sync, and timed so that the inverted colors are output of each projector at the same time.

In one embodiment, the projectors are phosphor wheel systems. A yellow phosphor wheel spins in time with a DMD imager to output sequential RG. The second projector is designed the same, but uses a cyan phosphor wheel. The output from this projector becomes sequential BG. Combined, the output of both projectors is YRGGCB. Magenta is developed by synchronizing the yellow and cyan wheels to overlap the flashing DMD.

Figure 73:
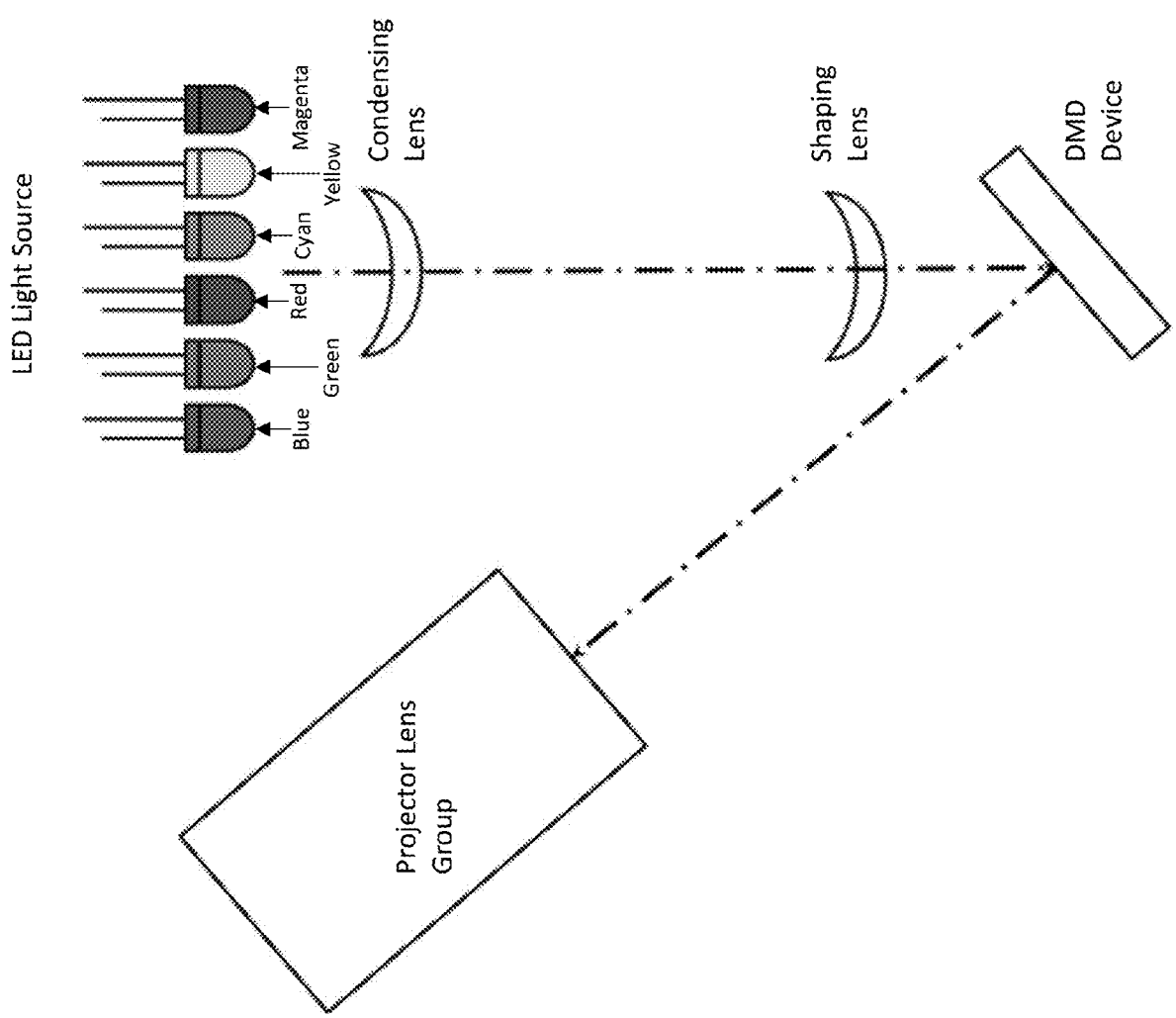
FIG. 73 illustrates one embodiment of a single DMD projector solution.

In another embodiment, the display is a single DMD projector solution. A single DMD device is coupled with an RGB diode light source system. In one embodiment, the DMD projector uses LED diodes. In one embodiment, the DMD projector includes CMY diodes. In another embodiment, the DMD projector creates CMY primaries using a double flashing technique. FIG. 73 illustrates one embodiment of a single DMD projector solution.

Figure 74:
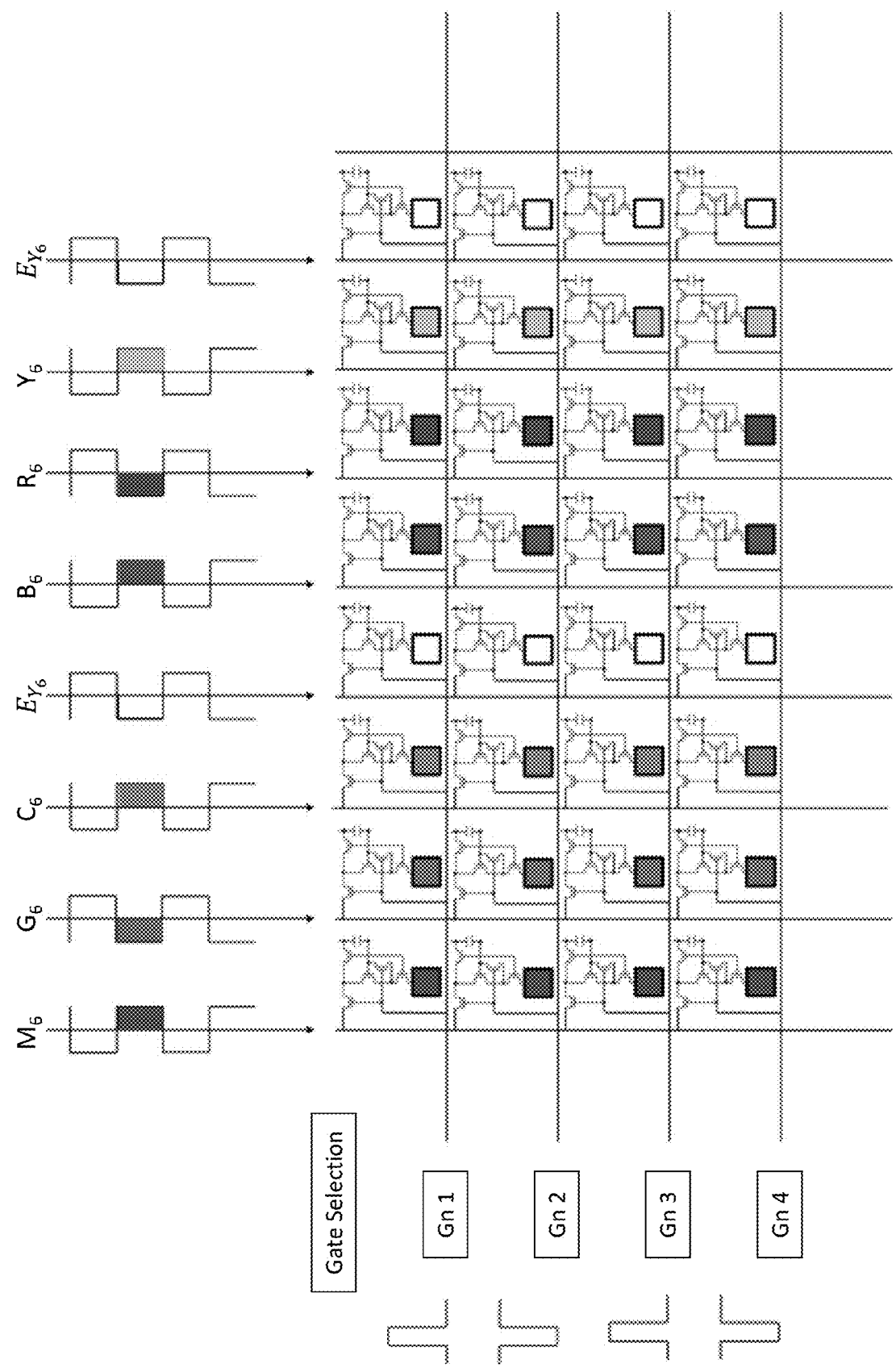
FIG. 74 illustrates one embodiment of a color filter array for a six-primary color system with a white OLED monitor.

FIG. 74 illustrates one embodiment of a six-primary color system using a white OLED display. In yet another embodiment, the display is a white OLED monitor. Current emissive monitor and/or television designs use a white emissive OLED array covered by a color filter. Changes to this type of display only require a change to pixel indexing and new six color primary filters. Different color filter arrays are used, placing each subpixel in a position that provides the least light restrictions, color accuracy, and off axis display.

Figure 75:
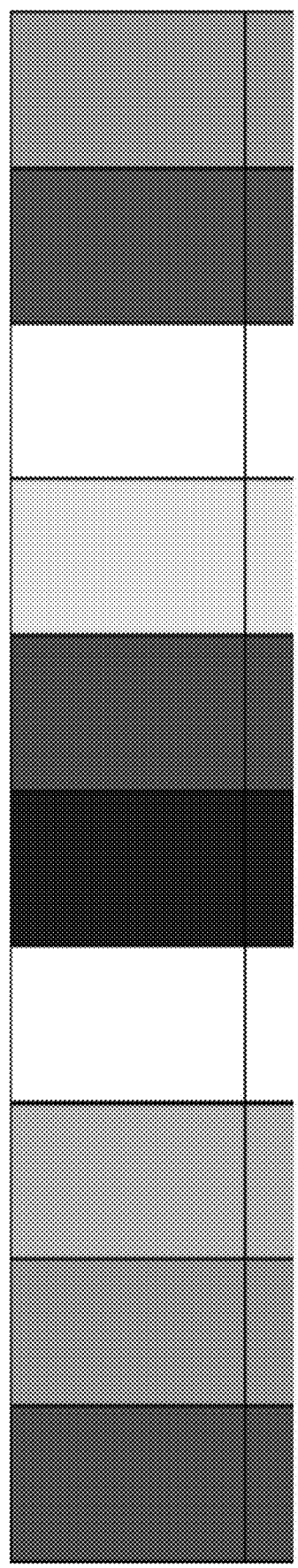
FIG. 75 illustrates one embodiment of an optical filter array for a six-primary color system with a white OLED monitor.

FIG. 75 illustrates one embodiment of an optical filter array for a white OLED display.

Figure 76:
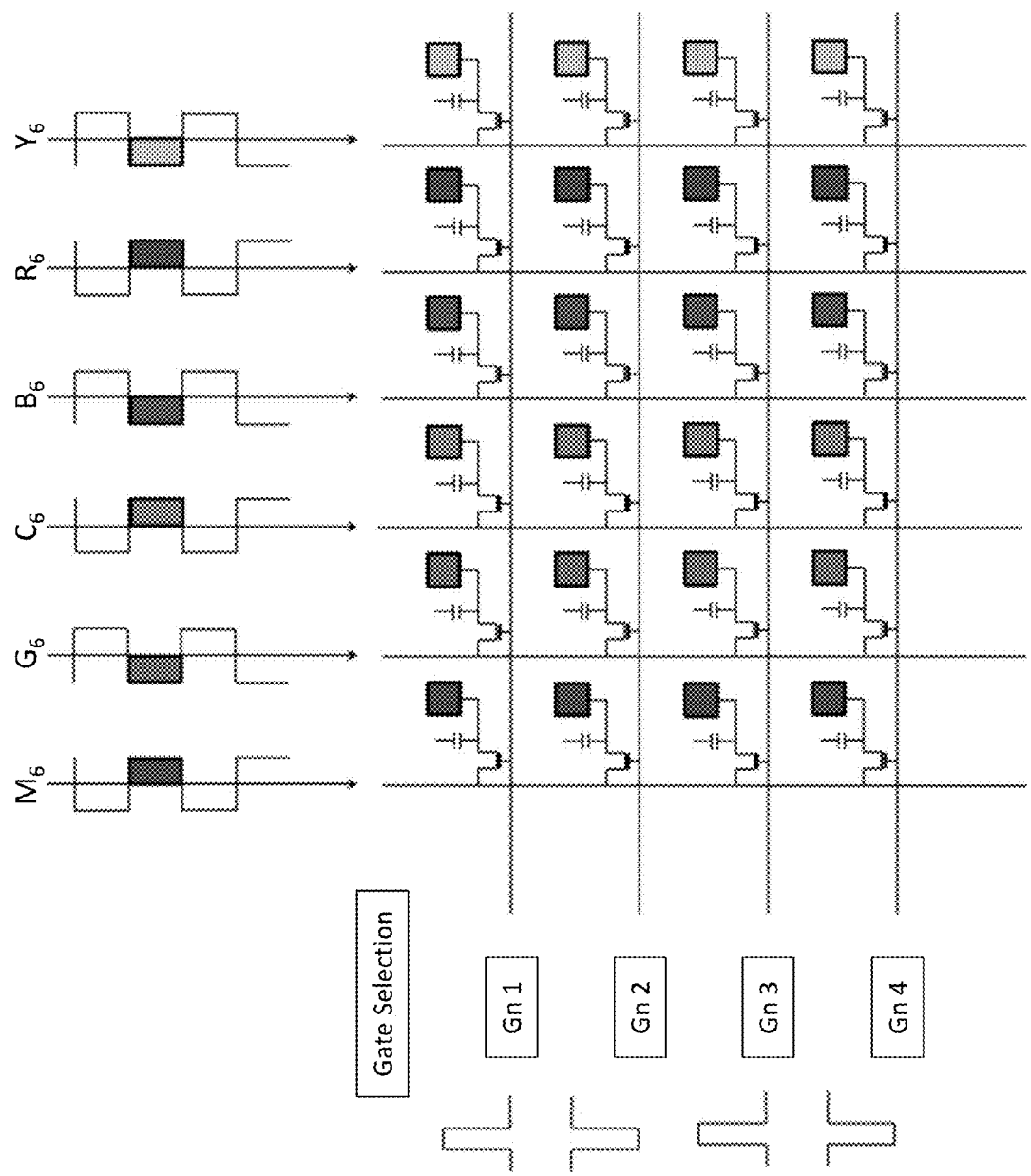
FIG. 76 illustrates one embodiment of a matrix of an LCD drive for a six-primary color system with a backlight illuminated LCD monitor.

FIG. 76 illustrates one embodiment of a matrix of an LCD drive for a six-primary color system with a backlight illuminated LCD monitor. In yet another embodiment, the display is a backlight illuminated LCD display. The design of an LCD display involves adding the CMY subpixels. Drives for these subpixels are similar to the RGB matrix drives. With the advent of 8K LCD televisions, it is technically feasible to change the matrix drive and optical filter and have a 4K six-primary color TV.

Figure 77:
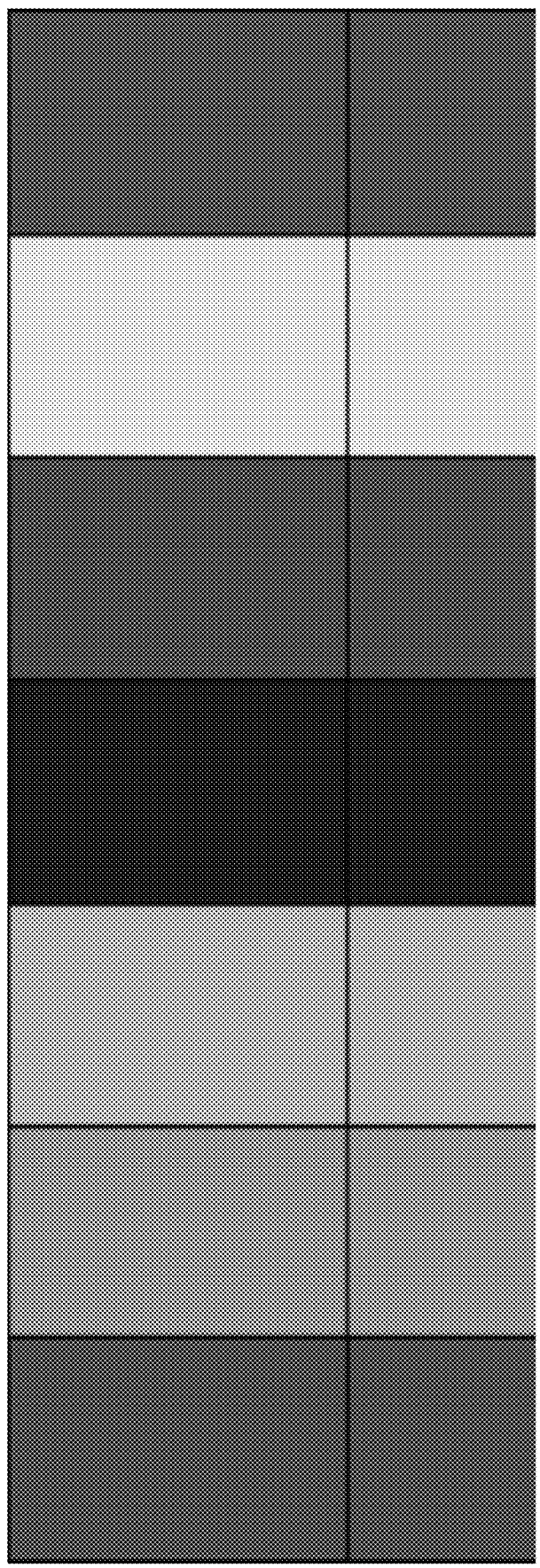
FIG. 77 illustrates one embodiment of an optical filter array for a six-primary color system with a backlight illuminated LCD monitor.

FIG. 77 illustrates one embodiment of an optical filter array for a six-primary color system with a backlight illuminated LCD monitor. The optical filter array includes the additional CMY subpixels.

In yet another embodiment, the display is a direct emissive assembled display. The design for a direct emissive assembled display includes a matrix of color emitters grouped as a six-color system. Individual channel inputs drive each Quantum Dot (QD) element illuminator and/or micro LED element.

Figure 78:
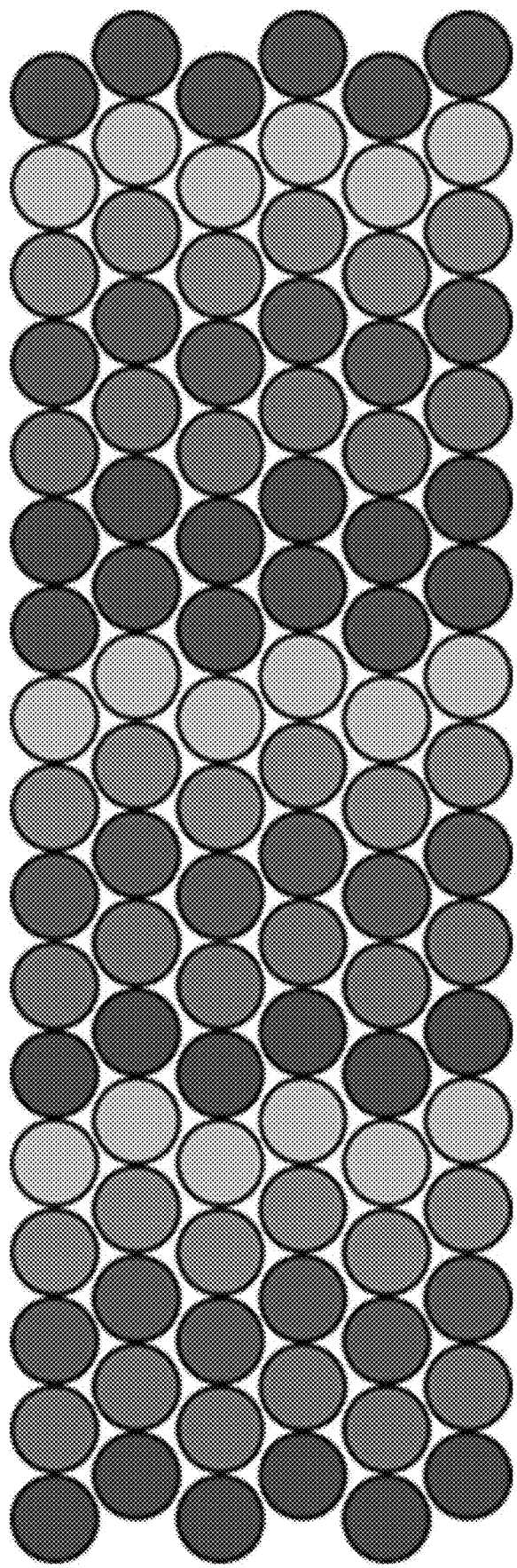
FIG. 78 illustrates an array for a Quantum Dot (QD) display device.

FIG. 78 illustrates an array for a Quantum Dot (QD) display device.

Figure 79:
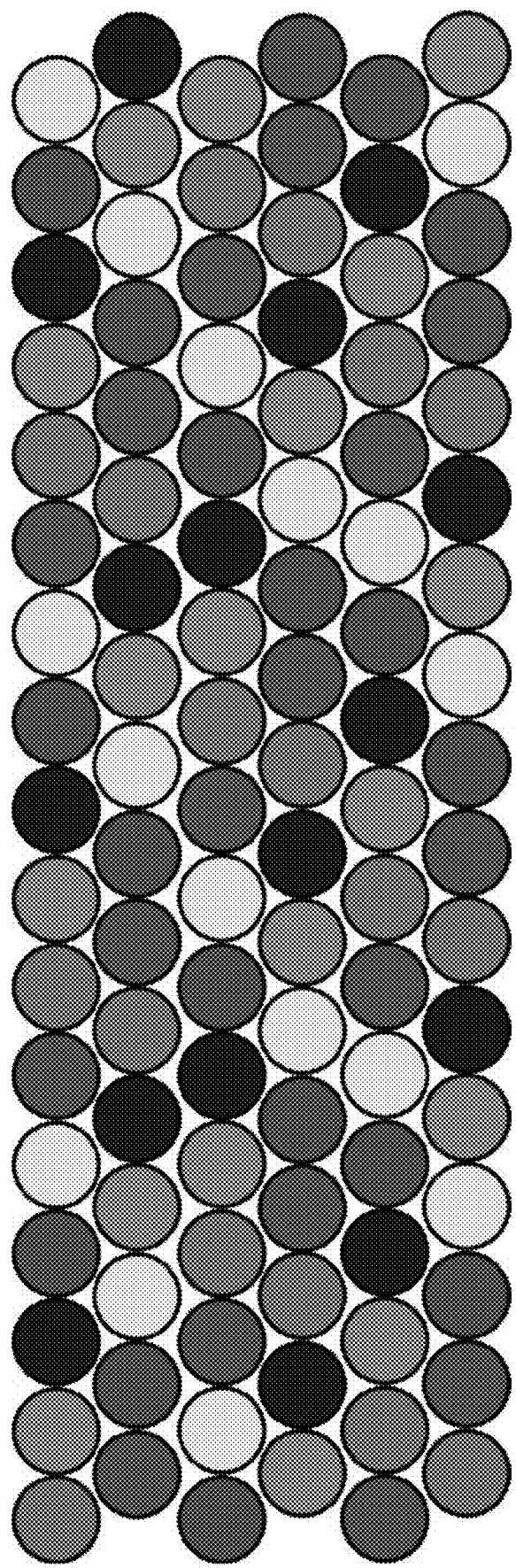
FIG. 79 illustrates one embodiment of an array for a six-primary color system for use with a direct emissive assembled display.

FIG. 79 illustrates one embodiment of an array for a six-primary color system for use with a direct emissive assembled display.

Figure 80:
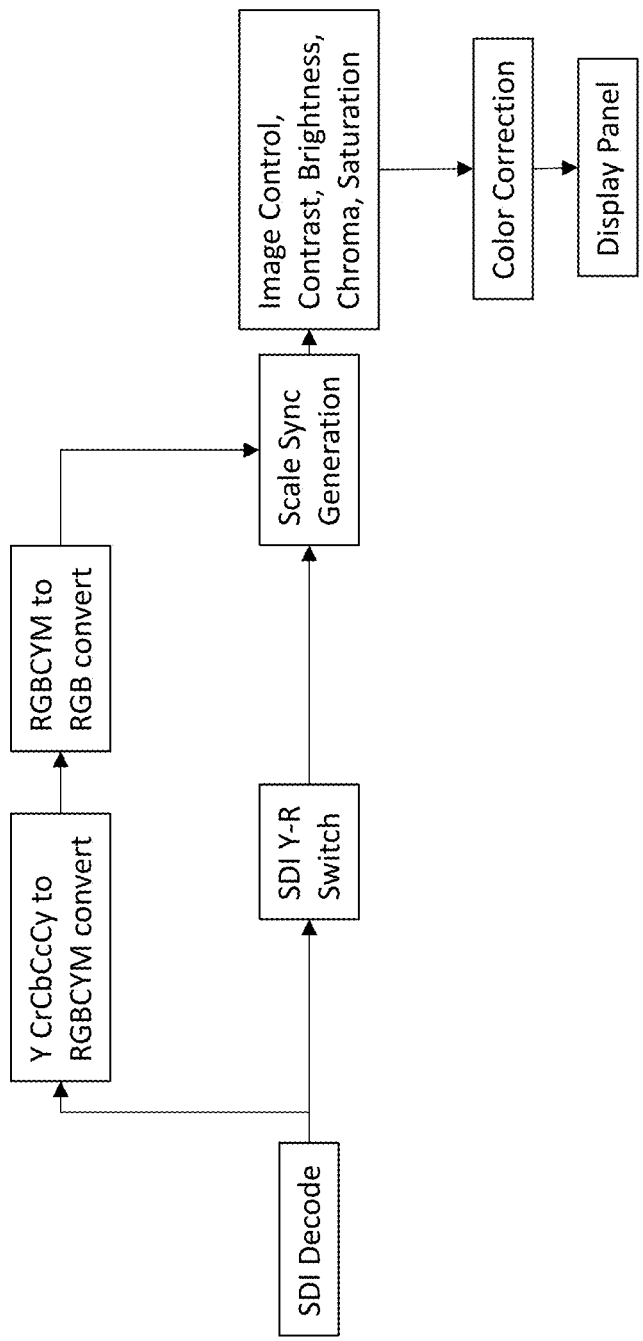
FIG. 80 illustrates one embodiment of a six-primary color system in an emissive display that does not incorporate color filtered subpixels.

FIG. 80 illustrates one embodiment of a six-primary color system in an emissive display that does not incorporate color filtered subpixels. For LCD and WOLED displays, this is operable to be modified for a six-primary color system by expanding the RGB or WRGB filter arrangement to an RGBCMY matrix. For WRGB systems, the white subpixel is operable to be removed as the luminance of the three additional primaries will replace it. SDI video is input through an SDI decoder. In one embodiment, the SDI decoder outputs to a YCrCbCcCy-RGBCMY converter. The converter outputs RGBCMY data, with the luminance component (Y) subtracted. RGBCMY data is then converted to RGB data. This RGB data is sent to a scale sync generation component, receives adjustments to image controls, contrast, brightness, chroma, and saturation, is sent to a color correction component, and output to the display panel as LVDS data. In another embodiment the SDI decoder outputs to an SDI Y-R switch component. The SDI Y-R switch component outputs RGBCMY data. The RGBCMY data is sent to a scale sync generation component, receives adjustments to image controls, contrast, brightness, chroma, and saturation, is sent to a color correction component, and output to a display panel as LVDS data.

In one embodiment, the display is further operable to display super saturated colors, which are described in U.S. application Ser. No. 17/748,655, filed May 19, 2022, which is incorporated herein by reference in its entirety.

Single Device Image Capture and Display

In one embodiment, the present invention includes a device wherein the device is operable to acquire image data, process image data, and/or display image data. The device includes, but is not limited to, a camera (e.g., digital video camera, still camera), a mobile device (e.g., a smartphone), a tablet, a computer (e.g., desktop computer, laptop computer), a monitor, a wearable device, a personal digital assistant (PDA), an electronic book reader, a digital media player, a video gaming device, a video teleconferencing device, a video streaming device, and/or an augmented reality/virtual reality (AR/VR) device (e.g., a headset, a pair of goggles, smart lenses). The device does not require transport of data between separate components via a wireless connection. Additionally, the device does not require transport of data over longer wired and/or cable connections (e.g., HDMI cables, SDI cables). Advantageously, wired connections of the device (e.g., soldered connections) are operable to be shorter because the wired connections are within a single device. Thus, the device streamlines the process of acquiring and displaying image data.

In one embodiment, the device includes at least one imager for acquiring image data. The at least one imager preferably includes at least one lens and at least one image sensor (e.g., a camera, a video camera, a camcorder, a slow-motion camera, and/or a high-speed camera). Charge-coupled device (CCD) image sensors, complementary metal-oxide-semiconductor (CMOS) image sensors (e.g., active-pixel sensors (APS), hybrid CCD/CMOS image sensors, n-type metal-oxide-semiconductor (NMOS) image sensors, and quanta image sensors are compatible with the present invention. In one embodiment, the at least one imager is a single imager with a striped filter system. Alternatively, the at least one imager includes a red imager, a green imager, and a blue imager. The at least one lens directs light towards the at least one image sensor. The at least one lens includes, but is not limited to, at least one convex lens and/or at least one concave lens. In one embodiment, the at least one image sensor is a wide gamut image sensor, e.g., a wide gamut camera. In one embodiment, the at least one image sensor is a single-pixel image sensor. In one embodiment, the at least one image sensor does not include a detector array. In one embodiment, the at least one image sensor is a plurality of image sensors. In one embodiment, one or more of the at least one imager is interchangeable such that the device is compatible with a plurality of imagers. Advantageously, this modular design enables the at least one imager to be upgraded or swapped out depending on varying image acquisition needs and/or technological developments.

In one embodiment, the at least one imager includes a plurality of lenses for a plurality of image sensors. In one embodiment, the plurality of lenses creates different focal lengths for each of the plurality of image sensors. In one embodiment, the device is operable to change the focal lengths, e.g., by zooming. Alternatively, the device is operable to interpolate signals from the plurality of image sensors with different focal lengths to create hybrid sensor data. The device is operable to combine sensor data from each of the plurality of image sensors into a single set of image data. In one embodiment, the device includes a stabilizer, e.g., a gyroscope system, an electronic stabilization system. The at least one imager is preferably located on the stabilizer and the stabilizer moves the at least one imager to counteract movements that would result in blurry images. In one embodiment, the at least one imager includes a lens mount, e.g., a screw mount, a bayonet mount, a breech lock, a tab lock, a double bayonet, Z, X, Electro-Focus (EF), EF-M, EF-S, AF, E, L, RF, G, M, SA, A, K, F, S, PL, T, C, H, and/or 645 mounts.

In one embodiment, the at least one imager includes at least one filter (e.g., optical filter). In one embodiment, the at least one filter is overlaid atop a photosite on the at least one image sensor. In one embodiment, the at least one filter is an absorptive filter. Alternatively, the at least one filter is an interference filter or a dichroic filter. In one embodiment, the at least one filter has at least one cut-off wavelength and passes or blocks light based on the at least one cut-off wavelength (e.g., a long-pass filter, a short-pass filter, a bandpass filter, a multi-bandpass filter, a notch filter). In an alternative embodiment, the at least one filter modifies the intensity of all wavelengths equally, e.g., a neutral density filter. In one embodiment, the at least one filter includes at least one color filter array, e.g., a Bayer filter, a Quad Bayer filter, a diamond pattern color filter array, a Yamanaka color filter array, a vertical stripe color filter array, a diagonal stripe color filter array, a pseudo-random color filter array, and/or a human visual system-based color filter array. Filter colors compatible with the present invention include, but are not limited to, RGB, CYGM, RGBE (red, green, blue, emerald), and/or CMY. The at least one filter is operable to be modified. As a non-limiting example, a Bayer filter is modified to include a magenta filter. Alternatively, the size of the elements in the Bayer filter are adjusted to increase sensitivity of the at least one image sensor. In yet another alternative embodiment, one or more of the at least one filter is operable to be rotated. In one embodiment, the at least one filter includes a plurality of filter layers. In one embodiment, the at least one filter includes at least one filter for light outside of the visible wavelength range, e.g., ultraviolet (UV) filters, infrared (IR) filters. In one embodiment, the device is operable to convert light captured through non-visible wavelength filters into visible light for visual effects such as UV/blacklight simulation. The at least one filter includes any number of color filters. In one embodiment, the at least one filter includes inverse colors to increase a sensitivity of the at least one imager.

Single Device Acquisition

In one embodiment, the device is operable to acquire raw image data as a raw image file. A raw image file is considered unprocessed and thus cannot be edited or printed. Raw image files include image data as well as metadata and a header. The metadata includes, but is not limited to, image sensor parameters, imager parameters, timecodes, frame data, HDR metadata, colorimetric metadata, an aspect ratio, dimensions (e.g., pixel dimensions), and/or lens information (e.g., a focal length, an aperture, a shutter speed, an exposure time, a sensitivity, a white balance). Raw image formats include, but are not limited to, Digital Negative Raw (DNG), ISO 12234-2 (TIFF/EP), NIKON NEF, CANON Raw v2 (CR2), CR3, and/or REDCODE Raw (R3D) files. In one embodiment, the device is operable to store the raw image file before processing. The device is then operable to render the raw image data into rendered image data, wherein the rendered image data is operable to be viewed and/or edited. Rendering includes, but is not limited to, decoding, demosaicing (e.g., removing the effects of a Bayer filter), pixel removal (e.g., of defective pixels), interpolation (e.g., to replace removed pixels), white balancing, noise reduction, color translation, tone reproduction, optical correction, contrast manipulation, resizing, splitting, cropping, and/or compression. Alternatively, the device does not compress the raw image data. In one embodiment, the device is operable to render the image data as a pipeline process, wherein each step is performed in succession. The order of the steps is operable to be changed. Alternatively, the device is operable to render the image data in parallel steps. In yet another alternative embodiment, the device is operable to render the image data by solving a single optimization problem. The device is operable to save image prior data and/or image variation data and use the image prior data and/or the image variation data in rendering, processing, and/or displaying the image data.

In one embodiment, an acquisition color gamut is identical to a display color gamut. In one embodiment, both the acquisition color gamut and the display color gamut are expanded color gamuts and/or include at least four primaries, e.g., 6P-B, 6P-C. Alternatively, the display color gamut (e.g., RGBCMY) has a larger volume than the acquisition color gamut (e.g., RGB). In yet another alternative embodiment, the display color gamut (e.g., RGB) has a smaller volume than the acquisition color gamut (e.g., RGBCMY). The device is preferably operable to convert image data from the acquisition color gamut to the display color gamut.

In one embodiment, rendering includes converting the raw image data into a color space, e.g., CIE 1931, ITU-R BT.2020. In a preferred embodiment, the device is operable to render the image data in a three-coordinate format wherein a first coordinate is a luminance or a luma value and a second and third coordinate are both colorimetric (chroma). As a non-limiting example, the three-coordinate format is Yxy, wherein Y is a luminance coordinate and wherein x and y are orthogonal colorimetric coordinates. The device is also operable to apply a transformation (e.g., a gamma compression) to the luminance coordinate to create a luma coordinate (e.g., Y'). Relative luminance values are also compatible. Alternative three-coordinate formats include, but are not limited to, L*a*b*, ICtCp, YCbCr, YUV, Yu'v', YPbPr, and/or YIQ. Alternatively, the device is operable to render the image data as XYZ data. In one embodiment, the device includes a user interface for accepting user input. In one embodiment, the raw image data is rendered based on the user input. In one embodiment, the device is operable to apply an opto-electronic transfer function (OETF) and an electro-optical transfer function (EOTF) to the image data. Alternatively, the device is operable to apply at least one non-linear function (e.g., an OOTF) to the image data. In one embodiment, the device includes at least one look-up table (LUT). The LUT is operable to be implemented in hardware (e.g., in an FPGA) and/or in software. In one embodiment, rendering includes compressing the image data, e.g., using 4:2:2 sampling, 4:2:0 sampling. In one embodiment, rendering includes applying color gamut constraints for a target color gamut. Alternatively, the image data is not compressed (4:4:4 sampling).

In one embodiment, rendering further includes HDR processing to create a larger visible range of luminance in image data. Displaying HDR images typically requires application of at least one transfer function, e.g., PQ, hybrid log-gamma (HLG). In one embodiment, the device includes a PQ-compatible display and/or an HLG-compatible display to display HDR image data with the at least one transfer function applied. In one embodiment, the device is further operable to apply at least one tone mapping curve to image data, e.g., an S-curve, to preserve highlight and shadow detail. In one embodiment, the metadata includes information about the at least one transfer function and/or the at least one tone mapping curve.

Single Device Processing

In one embodiment, the device is further able to process and/or transform the rendered image data. In one embodiment, the device includes the encoder and the decoder of the present invention in a single unit. In one embodiment, the device is operable to store processed image data that is sent from the encoder to the decoder before the processed image data is decoded. Because the encoder and the decoder are located in the same device, data is transmitted between the encoder and the decoder over a wired connection. The wired connection does not require internet connectivity, BLUETOOTH, or any other type of wireless connection. Advantageously, storing data in intermediate formats creates backup data that is operable to be used in case of corrupted or lost image data. Alternatively, the device is operable to bypass encoding and/or decoding steps because the same device is operable for both image acquisition and image display. For example, the device does not encode the image data as an HDMI input and then decode the HDMI input with an HDMI receiver circuit because HDMI connection is not necessary for displaying the image data. In an alternative embodiment, the device is operable to encode the image data for display on an additional display device separate from the device in addition to displaying the image data on the display screen. Advantageously, in one embodiment, a bit depth of the image data is kept the same in the device throughout each step from acquisition to display.

In one embodiment, the device is operable to process and/or transform the image data internally, e.g., with an embedded ARM (advanced RISC (reduced instruction set computing) machine) processor. Alternatively, the device is operable for remote image processing. For example, the device is in network communication with a platform wherein the device is operable to send image data to the platform and receive image data from the platform. The platform is operable to process the image data. In one embodiment, the platform is hosted on a server, e.g., a cloud-based server, a server hosted on a distributed edge network. Alternatively, the device is operable for wired communication with an external processor (e.g., a computer, a tablet) for image processing. In one embodiment, the device further includes a user interface, wherein the user interface is operable to accept user input to edit the image data, e.g., a brightness, a saturation, a contrast. In one embodiment, the device is operable to edit the image data for a specific feature, e.g., skin tone correction.

In one embodiment, the device is operable to subsample the image data for display. Advantageously, storing and processing the image data in a three-coordinate system such as Yxy allows the chromaticity coordinates to be subsampled for display without affecting perception. As non-limiting examples, 4:2:2, 4:2:0, and 4:1:1 subsampling are compatible with the present invention. Alternatively, the image data is fully sampled. In one embodiment, the device is operable to decompress compressed image data.

In one embodiment, processing the image data for display includes applying color matching functions (CMFs). CMFs describe the chromatic response of the human eye using three functions of wavelength $\bar{x}(\lambda)$, $\bar{y}(\lambda)$, $\bar{z}(\lambda)$. While CIE 1931 CMFs are commonly used, modifications to CIE 1931 CMFs including, but not limited to, Judd in 1951, Vos in 1978, Stiles and Burch in 1959, Stockman and Sharpe (Sharpe, L. T., Stockman, A., Jagla, W., Jägle, H. 2011. *A luminous efficiency function, V\*D65($\lambda$), for daylight adap-* tation: A correction. Color Research and Application, 36, 42-46), the CIE 10-degree cMFs in 1964, CIE S 014 published in 2006, CIE 170-1:2006 published in 2006, the CIE 2-degree XYZ CMFs published in 2012, and/or CIE 170-2:2015 published in 2015 are also compatible with the present invention. Each of these publications, which describe modifications to the CIE 1931 CMF based on a colorimetric observer, is incorporated herein by reference in its entirety. Modifications to the CIE 1931 CMFs address deviations from the linear mapping between XYZ and long medium short (LMS) color space, which represents human cone cell response to long, medium, and short wavelengths of visible light. These deviations from the original mapping are especially present in the blue color region. See also, e.g., CIE Proceedings (1964) Vienna Session, 1963, Vol. B, pp. 209-220 (Committee Report E-1.4.1), Bureau Central de la CIE, Paris; Speranskaya, N. I. (1959). Determination of spectrum color co-ordinates for twenty-seven normal observers. Optics and Spectroscopy, 7, 424-428; Stiles, W. S., & Burch, J. M. (1959) NPL colour-matching investigation: Final report. Optica Acta, 6, 1-26; Wyszecki, G., & Stiles, W. S. (1982). Color Science: concepts and methods, quantitative data and formulae. (2nd ed.). New York: Wiley; CIE. (1932). Commission Internationale de l'Éclairage Proceedings, 1931. Cambridge: Cambridge University Press; Stockman, A., Sharpe, L. T., & Fach, C. C. (1999). The spectral sensitivity of the human short-wavelength cones. Vision Research, 39, 2901-2927; Stockman, A., & Sharpe, L. T. (2000). Spectral sensitivities of the middle- and long-wavelength sensitive cones derived from measurements in observers of known genotype. Vision Research, 40, 1711-1737; Sharpe, L. T., Stockman, A., Jagla, W. & Jägle, H. (2005). A luminous efficiency function, $V^*(\lambda)$, for daylight adaptation. Journal of Vision, 5, 948-968; CIE (2006). Fundamental chromaticity diagram with physiological axes. Parts 1 and 2. Technical Report 170-1. Vienna: Central Bureau of the Commission Internationale de l' Éclairage; Judd, D. B. (1951). Report of U.S. Secretariat Committee on Colorimetry and Artificial Daylight, Proceedings of the Twelfth Session of the CIE, Stockholm (pp. 11) Paris: Bureau Central de la CIE; and Vos, J. J. (1978). Colorimetric and photometric properties of a 2-deg fundamental observer. Color Research and Application, 3, 125-128, each of which is incorporated herein by reference in its entirety.

Single Device Display

In one embodiment, the device further includes a display. The display is preferably operable to display image data using greater than three primaries. In one embodiment, the display is operable to display colors outside of an ITU-R BT.2020 color gamut. In one embodiment, the display is operable to display at least 80% of a total area covered by the CIE-1931 color space. In one embodiment, the display is as described in U.S. Pat. No. 11,030,934, filed Oct. 1, 2020 and issued Jun. 8, 2021, which is incorporated herein by reference in its entirety. In one embodiment, the display is a screen, e.g., a liquid crystal display (LCD) screen, a light-emitting diode (LED) screen, an LED-backlit screen, an organic LED (OLED) screen, an active matrix OLED (AMOLED) screen, a quantum dot (QD) display, an LCD display using QD backlight, a perovskite display, and/or a laser display (e.g., using discrete modulation, grating modulation). In an alternative embodiment, the display includes at least one projector. The device is operable to display the image data after it has been acquired, rendered, and/or processed by the device. Additionally or alternatively, the device is operable to receive image data for display from an external source. In another embodiment, the display includes a plurality of display devices (e.g., screens, projectors).

In one embodiment, the device is operable to modify display parameters of the image data, including, but not limited to, a gamut, a frame rate, a sampling rate, an aspect ratio, a data format, metadata, and/or SDP parameters. In one embodiment, the display of the device is interchangeable. In one embodiment, the device is also operable to project the image data onto a second display wherein the second display is separate from the device. For example, the device is operable to cast the image data onto a second display wherein the second display mirrors the display of the device (e.g., via a wireless or wired connection). Alternatively, the second display extends the first display. The device is further operable to optimize the image data for display on the second display, e.g., by applying a tone curve, changing a resolution, changing a color space of the image data.

Augmented Reality/Virtual Reality

In one embodiment, the system includes at least one headset (e.g., a headset, two headsets, etc.) configured for virtual reality, augmented reality, and/or mixed reality environments ("AR/VR"). The headset preferably includes a display, an eyewear component, at least one power supply component, at least one image capturing device, and/or control electronics. In one embodiment, the headset is a pair of goggles. Alternatively, the headset is a pair of glasses. In one embodiment, the headset includes at least one strap and/or temples. In one embodiment, the power supply component includes at least one battery, at least one super-capacitor, or other similar power supply components. In another embodiment, the battery includes at least one rechargeable battery. In yet another embodiment, the at least one rechargeable battery includes a lithium ion battery.

The headset is configured to receive and display an image of a virtual scene, movie, and/or environment. The headset is further operable to receive audio data and communicate the audio data to a wearer via a speaker, headphones, and other similar audio playback devices. In one embodiment, the headphones are noise-cancelling headphones. The noise-cancelling headphones are configured to block out external noise such that the wearer is completely immersed in the AR/VR environment.

Examples of headsets and/or AR/VR systems include, but are not limited to, those described in U.S. Pat. Nos. 8,217, 856; 8,743,145; 9,094,677; 9,223,136; 9,635,450; 9,671, 614; 9,733,480; 9,734,402; 9,766,462; 9,846,483; 9,858, 703; 9,897,812; 9,989,998; 10,025,060; 10,037,084; 10,055, 645; 10,055,887; 10,061,352; 10,061,391; 10,102,674; 10,124,251; 10,133,305; 10,185,390; 10,209,769; 10,244, 226; 10,254,547; 10,261,579; 10,318,007; 10,419,731; 10,429,647; 10,540,003; 10,656,423; 10,656,822; 10,769, 438; 10,825,255; 10,838,206; 10,890,941; 10,911,734; 10,922,886; 10,928,613; 10,951,880; 11,106,276; 11,145, 096; and 11,217,021, each of which is incorporated herein by reference in its entirety.

In one embodiment, the at least one strap is configured to wrap around a wearer's head and attach to the eyewear component via at least one attachment mechanism. The at least one attachment mechanism includes a hook and loop fastener, a latch, a button, a buckle, a snap, a tie, a clip, and other similar attachment mechanisms. The at least one strap is adjustable to a wearer's head. Advantageously, this allows the headset to be used for wearers of different head sizes. For example, and not limitation, the at least one strap includes a tightening mechanism. In one embodiment, the tightening mechanism is configured to rotate in one direction and increase the tension in the head strap and rotate in the opposite direction to loosen the tension in the head strap. In yet another embodiment, the at least one strap includes at least two straps. In one embodiment, the at least two straps do not overlap and are in a parallel position around a wearer's head. Alternatively, the at least two straps are configured to intersect in the center of the back of a wearer's head to provide a tighter fit.

Advantageously, the headset is configured to provide minimal pressure to a wearer's face. In one embodiment, the headset includes a nose component. In one embodiment, a wearer's nose is operable to rest inside the nose component. In one embodiment, the nose component is adjustable. In one embodiment, the nose component is configured to move left, right, up, and/or down. In one embodiment, the nose component is operable to expand. Alternatively, the headset is designed to rest on the ridge of the wearer's nose. In yet another embodiment, the headset covers a wearer's entire face.

In one embodiment, the at least one image capturing device is a motion sensor camera. In one embodiment, the motion sensor camera is configured to capture a wearer's body movement. Additionally or alternatively, the at least one image capturing device includes a LIDAR camera. The at least one image capturing device is further operable to determine a wearer's positioning and provide at least one recommendation to correct a wearer's positioning based on the display.

In one embodiment, the display includes Active Matrix Organic Light Emitting Diode (AMOLED) technology. In one embodiment, the display includes a diamond PenTile subpixel matrix. In one embodiment, the display has a display panel size of between 12.7 cm (5 inches) and 22.9 cm (9 inches) (e.g., 17.8 cm (7 inches)). In one embodiment, the display has a screen resolution of 2160×1200 and a per eye resolution of 1080×1200. In one embodiment, the total pixels per eye is 1,296,000 pixels. In one embodiment, the display has a refresh rate of 90 Hz.

In one embodiment, the system includes a 6 degrees of freedom constellation camera. In one embodiment, the system includes an optical 360-degree infrared (IR) LED tracking system. In one embodiment, the system includes a field of view of 110 degrees. In an alternative embodiment, the system includes a near infrared CMOS sensor. See, e.g., Shafer D M, Carbonara C P, Korpi M F. Factors Affecting Enjoyment of Virtual Reality Games A Comparison Involving Consumer-Grade Virtual Reality Technology. Games Health J. 2019 February; 8 (1): 15-23. doi: 10.1089/g4h.2017.0190. Epub 2018 Sep. 8. PMID: 30199273, which is incorporated herein by reference in its entirety.

The control electronics preferably include at least one processor. By way of example, and not limitation, the processor includes a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated or transistor logic, discrete hardware components, or any other suitable entity or combinations thereof that is operable to perform calculations, process instructions for execution, and/or other manipulations of information. In one embodiment, one or more of the at least one processor is operable to run predefined programs stored in at least one memory of the control electronics.

The control electronics preferably includes at least one antenna, which allows the control electronics to receive and process input data (e.g., AR/VR settings) from at least one remote device (e.g., smartphone, tablet, laptop computer, desktop computer, gaming system). In a preferred embodiment, the at least one remote device is in wireless network communication with the control electronics. The wireless communication is, by way of example and not limitation, radiofrequency, BLUETOOTH®, ZIGBEE®, WI-FI®, wireless local area networking, near field communication (NFC), infrared optical link, or other similar commercially utilized standards. Alternatively, the at least one remote device is in wired communication with the control electronics through USB or equivalent.

In one embodiment, the at least one processor is a microcontroller. The microcontroller includes a transceiver, BLUETOOTH module, WI-FI module, a microprocessor, an ultra-low-power co-processor, read-only memory (ROM), random-access memory (RAM) (e.g., static random-access memory (SRAM)), flash memory, a power management unit, and/or a digital-to-analog converter.

In yet another embodiment, the AR/VR system is operable to receive wearer voice input data. The AR/VR system includes a microphone that is operable to receive and record a wearer's voice. The headset is further operable to change the display based on the wearer's words. For example, and not limitation, the AR/VR system is configured to receive the words "start virtual reality game" from a wearer, and activate the virtual reality game.

The headset is operable to communicate, preferably wirelessly, with at least one remote device including, but not limited to, a mobile phone (e.g., smartphone), a tablet, a gaming system, at least one other headset, and/or a computer (e.g., laptop computer). The mobile phone is operable to be any mobile phone that (1) is capable of running mobile applications and (2) is capable of communicating with the headset. The mobile phone includes, for example, an ANDROID™ phone, an APPLE® IPHONE®, or a SAMSUNG® GALAXY® phone. Likewise, the tablet is operable to be any tablet that (1) is capable of running mobile applications and (2) is capable of communicating with the headset. The tablet includes, for example, the 3G or 4G version of the APPLE IPAD® or the 5G version of the Samsung Galaxy Tab S6.

Further in the AR/VR system, the remote device is in communication with a cellular network and/or a network. The network is operable to be any network for providing wired or wireless connection to the Internet, such as a local area network (LAN) or a wide area network (WAN).

In one embodiment, an AR/VR application (e.g., AR/VR mobile application) is installed and running at the remote device. The AR/VR system application is implemented according to the type (i.e., the operating system) of remote device on which it is running. The AR/VR system application is designed to receive wearer information from the headset. In one embodiment, the AR/VR application is operable to provide graphical, audible, and/or tactile feedback to the wearer. In one embodiment, the AR/VR system is configured to develop a personalized profile based on a wearer's prior AR/VR environments and response.

In one embodiment, the AR/VR system is further operable to display super saturated colors, which are described in U.S. application Ser. No. 17/748,655, filed May 19, 2022, which is incorporated herein by reference in its entirety.

The AR/VR system is operable to utilize a plurality of learning techniques including, but not limited to, machine learning (ML), artificial intelligence (AI), deep learning (DL), neural networks (NNs), artificial neural networks (ANNs), support vector machines (SVMs), Markov decision process (MDP), and/or natural language processing (NLP). The AR/VR system is operable to use any of the aforementioned learning techniques alone or in combination.

Further, the AR/VR system is operable to utilize predictive analytics techniques including, but not limited to, machine learning (ML), artificial intelligence (AI), neural networks (NNs) (e.g., long short term memory (LSTM) neural networks), deep learning, historical data, and/or data mining to make future predictions and/or models. The AR/VR system is preferably operable to recommend and/or perform actions based on historical data, external data sources, ML, AI, NNs, and/or other learning techniques. The AR/VR system is operable to utilize predictive modeling and/or optimization algorithms including, but not limited to, heuristic algorithms, particle swarm optimization, genetic algorithms, technical analysis descriptors, combinatorial algorithms, quantum optimization algorithms, iterative methods, deep learning techniques, and/or feature selection techniques.

Medical Imaging and Diagnostics

In one embodiment, the present invention is incorporated into medical imaging and/or diagnostics. Medical imaging and/or diagnostics has started moving away from grayscale, and the use of color in the field is increasing. For example, the medical imaging and/or the diagnostics include, but are not limited to, telemedicine, digital microscopy, whole-slide imaging (WSI), histopathology, endoscopy, laparoscopy, retinal imaging, ophthalmology, dermatology, digital dermoscopy, echocardiography, radiology (e.g., magnetic resonance imaging (MRI) (e.g., 3D MRI), computed tomography (CT) scanning, positron emission tomography (PET) scanning, color-flow imaging, ultrasound (e.g., 2D flow imagery)), surgery (e.g., robotic surgery), veterinary applications, wound care management, cellular spectroscopy, digital pathology, short-wave infrared fluorescence tri-band imaging (SWIFTI), hyperspectral imaging (HSI), and/or dentistry (e.g., aesthetic dentistry, implants, dentures). In one embodiment, the robotic surgery includes at least one robotic surgery component including, but not limited to, a surgeon console, a patient cart, and/or a vision cart. In one embodiment, the at least one robotic surgery component is a DA VINCI SYSTEMS robotic surgery component. See, e.g., (1) Mingels C, Sachpekidis C, Bohn K P, Hünermund J N, Schepers R, Fech V, Prenosil G, Rominger A, Afshar-Oromieh A, Alberts I. The influence of colour scale in lesion detection and patient-based sensitivity in [68Ga]Ga-PSMA-PET/CT. Nucl Med Commun. 2021 May 1; 42 (5):495-502. doi: 10.1097/MNM.0000000000001364. PMID: 33481506, (2) Papadacci C, Finel V, Villemain O, Goudot G, Provost J, Messas E, Tanter M, Pernot M. 4D simultaneous tissue and blood flow Doppler imaging: revisiting cardiac Doppler index with single heart beat 4D ultrafast echocardiography. Phys Med Biol. 2019 Apr. 10; 64(8):085013. doi: 10.1088/1361-6560/ab1107. PMID: 30889552, (3) Mckeown, L. A. (May 13, 2021). Color-coded radiation monitoring: Coming to a cath lab near you. TCTMD.com. Retrieved Oct. 27, 2022, from https://www.tctmd.com/news/color-coded-radiation-monitoring-coming-cath-lab-near-you, (4) Wild, T., Prinz, M., Fortner, N. et al. Digital measurement and analysis of wounds based on colour segmentation. Eur Surg 40, 5-10 (2008). https://doi.org/10.1007/s10353-008-0378-0, (5) Sisson, Christye & Farnand, Susan & Fairchild, Mark & Fischer, Bill. (2014). Analysis of Color Consistency in Retinal Fundus Photography: Application of Color Management and Development of an Eye Model Standard. Analytical Cellular Pathology. 2014. 1-2. 10.1155/2014/398462, (6) Spatial Team (Aug. 19, 2020). Applications of 3D printing in the medical field. Retrieved Oct. 27, 2022, from https://blog.spatial.com/the future-of-3d-printing-in-the-medical-field, and (7) Petrie, S. (Nov. 17, 2021). Hyperspectral imaging captures spatial and spectral data of the human landscape. Laser Focus World. Retrieved Oct. 27, 2022, from https://www.laserfocusworld.com/detectors-imaging/article/14212197/hyperspectral-imaging-captures-spatial-and-spectral-data-of-the-human-landscape, each of which is incorporated herein by reference in its entirety.

In one embodiment, the present invention provides true color. Alternatively or additionally, the present invention provides false color (e.g., pseudo color, density slicing, choropleth). In one embodiment, the system is operable to use a greater bit depth (e.g., larger than 8 bits) coupled with additional color primaries to provide pseudo color from a single band of data or single filter source. Advantageously, the use of greater bit depth and additional color primaries enables the system to provide pseudo color in an RGB false color application. See, e.g., Zabala-Travers S, Choi M, Cheng W C, Badano A. Effect of color visualization and display hardware on the visual assessment of pseudocolor medical images. Med Phys. 2015; 42(6):2942-2954. doi: 10.1118/1.4921125 and Plaxco, J. The Difference Between True Color, False Color and Pseudo Color. Mars Art Gallery. Retrieved Oct. 27, 2022, from http://www.marsartgallery.com/color.html, each of which is incorporated herein by reference in its entirety.

In one embodiment, the system incorporates at least one imager (e.g., camera), at least one spectrometer, at least one scanner, at least one medical device, at least one lighting source, at least one sensor, at least one lens, at least one processor, at least one memory, at least one computing device, at least one database, at least one learning algorithm (e.g., deep neural network) for image processing and comparison, and/or at least one viewing device.

In one embodiment, the at least one lighting source is a white light which is effective in detecting lesions. In another embodiment, the at least one lighting source is a variable frequency lighting source including, but not limited to, visible light, infrared light, and/or ultraviolet light. Advantageously, visible light, infrared, and/or ultraviolet light are effective in detecting bacterial infections, lipid plaque, and precancerous and subtle inflammatory conditions. In one embodiment, the system is preferably operable to use a narrowband lighting source (e.g., 300-3400 Hz) in endoscopic diagnostic tests to provide a sharper and/or better contrast image. In another embodiment, the system is preferably operable to use an infrared lighting source to provide a transcutaneous illumination of tissue. See, e.g., Hermanowski, J. Light Source Helps Endoscopes Get Smaller and Smaller. Photonics. Retrieved Oct. 27, 2022, from https://www.photonics.com/Articles/Light_Source-_Helps_Endoscopes_Get_Smaller_and/a51902, which is incorporated herein by reference in its entirety.

In one embodiment, the system further includes at least one contrast dye and/or at least one contrast agent. In one embodiment, the at least one contrast dye and/or at least one contrast agent is operable to increase the contrast of structures or fluids within the body in medical imaging. In one embodiment, the at least one contrast dye and/or at least one contrast agent is radioactive. In one embodiment, the at least one contrast dye and/or at least one contrast agent includes, but is not limited to, iodine, barium (e.g., barium sulfate), gadolinium, and/or microbubbles (e.g., saline). In one embodiment, the at least one contrast dye and/or at least one contrast agent is a fluorescence dye (e.g., indocyanine green, methylene blue). In another embodiment, the at least one contrast dye and/or at least one contrast agent includes at least one magnetic microstructure. See, e.g., U.S. Pat. Nos. 10,188,755; 9,084,820; and 10,215,825, each of which is incorporated herein by reference in its entirety.

In one embodiment, the system includes at least one imager for acquiring image data. The at least one imager preferably includes at least one lens and at least one image sensor (e.g., a camera, a video camera, a camcorder, a slow-motion camera, and/or a high-speed camera). The at least one lens directs light towards the at least one image sensor. The at least one lens includes, but is not limited to, at least one convex lens and/or at least one concave lens. In one embodiment, the at least one image sensor is a wide gamut image sensor, e.g., a wide gamut camera. In one embodiment, the at least one image sensor is a single-pixel image sensor. In one embodiment, the at least one image sensor does not include a detector array. In one embodiment, the at least one image sensor is a plurality of image sensors.

In one embodiment, one or more of the at least one imager is incorporated into the at least one medical device (e.g., endoscope). In one embodiment, one or more of the at least one imager is interchangeable such that the at least one medical device is compatible with a plurality of imagers. Advantageously, this modular design enables the at least one imager to be upgraded or swapped out depending on varying image acquisition needs and/or technological developments. In one embodiment, the at least one imager includes an array sensor such that the at least one imager is operable to provide multi-spectral capture and/or operate as a light field sensor.

In one embodiment, the at least one imager includes a plurality of lenses for a plurality of image sensors. In one embodiment, the plurality of lenses creates different focal lengths for each of the plurality of image sensors. In one embodiment, the at least one imager is operable to change the focal lengths, e.g., by zooming. Alternatively, the system is operable to interpolate signals from the plurality of image sensors with different focal lengths to create hybrid sensor data. The system is operable to combine sensor data from each of the plurality of image sensors into a single set of image data. In one embodiment, the system includes a stabilizer, e.g., a gyroscope system. The at least one imager is preferably located on the stabilizer and the stabilizer moves the at least one imager to counteract movements that would result in blurry images. In one embodiment, the plurality of lenses is made from meta-materials such that the meta-materials enable a negative index of refraction. Advantageously, this optimizes focal length while minimizing physical length.

In one embodiment, the at least one imager includes at least one optical filter. In one embodiment, the at least one optical filter is overlaid atop of the at least one image sensor. In one embodiment, the at least one filter is an absorptive filter. Alternatively, the at least one filter is an interference filter or a dichroic filter. In one embodiment, the at least one filter has at least one cut-off wavelength and passes or blocks light based on the at least one cut-off wavelength (e.g., a long-pass filter, a short-pass filter, a bandpass filter, a multi-bandpass filter, a notch filter). In an alternative embodiment, the at least one filter modifies the intensity of all wavelengths equally, e.g., a neutral density filter. In one embodiment, the at least one filter is a filter array, e.g., a Bayer filter. Bayer filter arrays compatible with the present invention include, but are not limited to, RGB, CYGM, RGBE (red, green, blue, emerald), and/or CMY. The Bayer filter is operable to be modified. As a non-limiting example, the Bayer filter includes a magenta filter. Alternatively, the size of the elements in the Bayer filter are differentially adjusted to increase sensitivity of the at least one image sensor. In yet another alternative embodiment, one or more of the at least one filter is operable to be rotated, which advantageously enables the system to use different filters for different exposures. In one embodiment, the at least one filter includes a plurality of filter layers. In one embodiment, the at least one filter includes a plurality of filters. In one embodiment, the plurality of filters are arranged in a radial pattern. In one embodiment, the plurality of filters form a spinning filter wheel.

In one embodiment, an acquisition color gamut is identical to a display color gamut. In one embodiment, both the acquisition color gamut and the display color gamut are expanded color gamuts and/or include at least four primaries, e.g., 6P-B, 6P-C. Alternatively, the display color gamut (e.g., RGBCMY) has a larger volume than the acquisition color gamut (e.g., RGB). In yet another alternative embodiment, the display color gamut (e.g., RGB) has a smaller volume than the acquisition color gamut (e.g., RGBCMY, RGBCEY (i.e., two greens-green (G) and emerald (E))). The system is preferably operable to convert image data from the acquisition color gamut to the display color gamut.

In one embodiment, the system is operable to acquire raw image data as a raw image file. A raw image file is considered unprocessed and thus cannot be edited or printed. Raw image files include image data as well as metadata and a header. The metadata includes, but is not limited to, patient health information (PHI) (e.g., patient name, medical record number, date of birth), image anatomic source and/or tissue type, image acquisition parameters (e.g., image dimensions, voxel size, repetition time, voxel data type), image sensor parameters, imager parameters, timecodes, imager ISO, aperture measurements (e.g., f-stop, aperture size), exposure data, color space parameters, lens data (e.g., focal length and lens type), filter data, file format, compression data, frame rate data, flash data, light source, location data, and/or frame data.

In one embodiment, the system is compatible with Digital Imaging and Communication in Medicine (DICOM) standards for metadata. DICOM metadata varies based on different imaging modalities (e.g., CT scans and ultrasounds) because there is specific metadata related to each modality. DICOM metadata defines information object definitions (IODs), which are object-oriented metadata organized into modules. Further, DICOM standardizes the structure of data values (e.g., date, time, patient names) and provides predefined lists of attributes (e.g., sex, body part). Additional information about DICOM is found in ISO 12052:2017 Health informatics-Digital imaging and communication in medicine (DICOM) including workflow and data management (August 2017), which is incorporated herein by reference in its entirety. See also, e.g., Caffery, Liam J et al, "Transforming Dermatologic Imaging for the Digital Era: Metadata and Standards," Journal of Digital Imaging vol. 31, 4 (2018): 568-577, doi: 10.1007/s10278-017-0045-8, which is incorporated herein by reference in its entirety.

Raw image formats include, but are not limited to, Digital Negative Raw (DNG), ISO 12234-2 (TIFF/EP), Nikon NEF, Canon Raw v2 (CR2), CR3, Sony S-Log, ARRI Log, Panasonic V-Log, and/or Redcode Raw (R3D) files. In one embodiment, the system is operable to store the raw image file before processing. The system is then operable to render the raw image data into rendered image data, wherein the rendered image data is operable to be viewed and/or edited. Rendering includes, but is not limited to, decoding, demosaicing (e.g., removing the effects of a Bayer filter), pixel removal (e.g., of defective pixels), interpolation (e.g., to replace removed pixels), white balancing, noise reduction, color translation, tone reproduction, optical correction, contrast manipulation, resizing, splitting, and/or compression. Alternatively, the system does not compress the raw image data. In one embodiment, the system is operable to render the image data as a pipeline process, wherein each step is performed in succession. The order of the steps is operable to be changed. Alternatively, the system is operable to render the image data in parallel steps. In yet another alternative embodiment, the system is operable to render the image data by solving a single optimization problem. The system is operable to save image prior data and/or image variation data and use the image prior data and/or the image variation data in rendering, processing, and/or displaying the image data.

In one embodiment, rendering includes converting the raw image data into a color space, e.g., CIE 1931, ITU-R BT.2020. In a preferred embodiment, the system is operable to render the image data in a three-coordinate format wherein a first coordinate and a second coordinate are both colorimetric (chroma) and wherein a third coordinate is a luminance or a luma value. As a non-limiting example, the three-coordinate format is Yxy, wherein x and y are orthogonal colorimetric coordinates and wherein Y is a luminance coordinate. The system is also operable to apply a transformation (e.g., a gamma compression) to the luminance coordinate to create a luma coordinate (e.g., Y'). Relative luminance values are also compatible. Alternative three-coordinate formats include, but are not limited to, $L^*a^*b^*$, ICtCp, YCbCr, YUV, Yu'v', YPbPr, and/or YIQ. Alternatively, the system is operable to render the image data as XYZ data. In one embodiment, the system includes a user interface for accepting user input. In one embodiment, the user input determines how the raw image data is rendered. In one embodiment, the system is operable to apply an opto-electronic transfer function (OETF) and an electro-optical transfer function (EOTF) to the image data. Alternatively, the system is operable to apply at least one non-linear function (e.g., an OOTF) to the image data. In one embodiment, the system includes at least one look-up table (LUT). The LUT is operable to be implemented in hardware (e.g., in an FPGA) and/or in software.

In one embodiment, the system is operable to remap colors to include a just noticeable difference for display on a viewing device. For example, a first color and a second color are not perceptually different to a viewer, so the second color is remapped to a modified second color, which advantageously allows the viewer to perceive the differences between the first color and the modified second color. Further, the system retains the original information, which allows the system to perform a plurality of learning techniques and/or a plurality of predictive analytics techniques using unmodified data. The system is also operable to retain information regarding the remapping. In one embodiment, the retained information is stored in the metadata.

In one embodiment, the at least one imager acquires data as Yxy data, XYZ data, RGB data, and/or multi-primary data (e.g., RGBC, RGBCY, RGBCMY, RGBEYC). Additionally or alternatively, the at least one imager is operable to acquire data including, but not limited to, hyperspectral data, ultraviolet (UV) data, and/or infrared (IR) data. See, e.g., Lu, Guolan, and Baowei Fei. "Medical hyperspectral imaging: a review." Journal of Biomedical Optics vol. 19, 1 (2014): 10901. doi:10.1117/1.JBO.19.1.010901, which is incorporated herein by reference in its entirety.

In one embodiment, the present invention is used to process hyperspectral data, UV data, and/or IR data that is outside of the visible spectrum. In one embodiment, the system extends colorimetric visible data with data that is outside of the visible spectrum. For example, the system creates two different three-coordinate format elements for each data point acquired from the at least one imager such that one of the elements is related to Yxy (e.g., Y'xy) and the other is related to WUI (e.g., W'UI), wherein W (or W') is a function similar to Y (or Y') but encompasses more of the UV and IR wavelengths, wherein U is the UV channel, and I is the IR channel, and W (or W') is proportional to the intensity of U and I. The system is operable to calculate a projection using the WUI values such that the projection plane is wui. The system is operable to assess the relevance of a spectral captured channel and its propensity to change rapidly. The system is operable to assign captured elements to a specific primary. Alternatively, the system is operable to assign captured elements to a mathematical combination of captured elements, for example, UV*Red and IR*Cyan. Although the system is described with respect to non-linear forms including Y'xy and W'UI, the system is not limited to these forms. In one embodiment, a non-linear function is applied to xy and/or UI. In one embodiment, xy and/or UI are scaled.

In one embodiment, the present invention further includes at least one spectrometer. The at least one spectrometer includes, but is not limited to, a filtered camera, a whiskbroom scanner, a pushbroom scanner, an integral field spectrograph, a wedge imaging spectrometer, a Fourier transform imaging spectrometer, a computed tomography imaging spectrometer (CTIS), an image replicating imaging spectrometer (IRIS), a coded aperture snapshot spectral imager (CASSI), an image mapping spectrometer (IMS), and/or a spectrophotometer. For example, the spectrophotometer is used to acquire color data to perform shade matching for a dental implant.

In a preferred embodiment, the present invention incorporates a luminance (e.g., Y) and two independent colorimetric coordinates (e.g., x and y, u' and v'). Advantageously, this allows for separate processing of luminance and the two independent colorimetric coordinates. In one embodiment, a non-linear function, an algorithm, and/or a LUT is operable to be placed only on the luminance. In another embodiment, the non-linear function, the algorithm, and/or the LUT is operable to be placed on the luminance and the two independent colorimetric coordinates. In one embodiment, the system is operable to include at least two luminance levels (e.g., standard and increased luminance). Advantageously, increasing the luminance temporarily may improve visualization of images while minimizing impact to the longevity of the display. In addition, the system is operable to leverage Yxy and/or Yu'v' to plot the two independent colorimetric coordinates x and y outside the boundaries of the CIE-1931 color space. Advantageously, this enables the system to render Ultraviolet Visible Near Infrared Spectrophotometry (UV-Vis-NIR) raw data into rendered image data. See, e.g., U.S. Pat. No. 9,685,109 and Tom Kimpe and Albert Xthona, "Quantification of detection probability of microcalcifications at increased display luminance levels," Breast Imaging, Springer Berlin Heidelberg, 2012, 490-497, and Ultraviolet Visible Near Infrared Spectrophotometry (UV-Vis-NIR). Covalent Metrology. Retrieved Oct. 27, 2022, from https://covalentmetrolgoy.com/techniques/ultraviolet-visible-near-infrared-spectrophotometry-uv-vis-nir/, each of which is incorporated herein by reference.

As previously described, the system further includes at least one viewing device. In one embodiment, the at least one viewing device is a multi-primary display (e.g., RGBC, RGBCY, RGBCMY). Advantageously, adding a cyan primary allows for greater range of colors and allows for better visualization of green-cyan pseudocolor, which is a current challenge in medical imagery. See, e.g., Zabala-Travers, Silvina et al. "Effect of color visualization and display hardware on the visual assessment of pseudocolor medical images." Medical Physics vol. 42, 6 (2015): 2942-54. doi: 10.1118/1.4921125, which is incorporated herein by reference in its entirety. Additionally, a multi-primary display is operable to provide additional colors that are not available on an RGB device. For example, and not limitation, an RGB 12-bit display is operable to display $(2^{12})^3=68.7$ trillion colors, while a 12-bit display having four primaries (e.g., RGBC) is operable to display $(2^{12})^4=281.5$ trillion colors.

In one embodiment, the at least one viewing device is operable to display colors outside of an ITU-R BT.2020 color gamut. In one embodiment, the at least one viewing device is operable to display at least 80% of a total area covered by the CIE-1931 color space. In one embodiment, the at least one viewing device is as described in U.S. Pat. No. 11,030,934, filed Oct. 1, 2020 and issued Jun. 8, 2021, which is incorporated herein by reference in its entirety. In one embodiment, the at least one viewing device is a screen, e.g., a liquid crystal display (LCD) screen, a light-emitting diode (LED) screen, an LED-backlit screen, an organic LED (OLED) screen, an active matrix OLED (AMOLED) screen, a quantum dot (QD) display, a perovskite display, a stereoscopic display (e.g., head-mounted and/or autostereoscopic), a virtual reality (VR) display, and/or an augmented reality display. In an alternative embodiment, the at least one viewing device includes at least one projector. The at least one viewing device is operable to display the image data after it has been acquired, rendered, and/or processed by the system. In another embodiment, the at least one viewing device includes a plurality of display devices (e.g., screens, projectors).

In one embodiment, the at least one viewing device is operable to modify display parameters of the image data, including, but not limited to, a gamut, a frame rate, a sampling rate, an aspect ratio, a data format, metadata, a tone curve (e.g., perceptual quantizer (PQ), hybrid log-gamma (HLG), and gamma), and/or SDP parameters.

In one embodiment, the system further includes additional health information including, but not limited to, vital signs, test results (e.g., blood test results, genetic test results), previous images or scans, and/or health history.

In one embodiment, the system incorporates a plurality of learning techniques in the imaging and/or the diagnostics. In a preferred embodiment, the plurality of learning technique utilizes a training set to train the system (e.g., during a learning period). The plurality of learning techniques includes, but is not limited to, machine learning (ML), artificial intelligence (AI), deep learning (DL), neural networks (NNs), artificial neural networks (ANNs), support vector machines (SVMs), Markov decision process (MDP), decision trees, linear regression, logistic regression, naive Bayes, k-nearest neighbor, random forest, Adaptive Boosting (i.e., AdaBoost), and/or natural language processing (NLP). In one embodiment, the plurality of learning techniques is operable to extract features from an image including, but not limited to, at least one intensity, at least one edge, at least one texture, at least one segment, at least one color, at least one luminance, at least one color/tone gradient, at least one histogram/heat diagram, and/or at least one wavelength from an image. In one embodiment, the system is operable to generate a visualization from an image or set of images using the plurality of learning techniques. In one embodiment, the visualization comprises a color/tone gradient. In one embodiment, the visualization comprises a color palette, wherein colors of the color palette represent a plurality of categories. In one embodiment, the ANNs include, but are not limited to, a multilayer perceptron (MLP). Alternatively or additionally, the ANNs include a single-layer perceptron (SLP). In one embodiment, the learning system includes a feed-forward network trained by a backpropagation algorithm. In one embodiment, the plurality of learning techniques includes supervised learning techniques. See, e.g., Mahmood F, Bendayan S, Ghazawi F M, Litvinov I V. Editorial: The Emerging Role of Artificial Intelligence in Dermatology. Front Med (Lausanne). 2021 Nov. 17; 8:751649. doi: 10.3389/fmed.2021.751649. PMID: 34869445; PMCID: PMC8635630 and Lavars, N. (Feb. 19, 2021). AI uses "Ugly duckling" technique to spot melanoma with high accuracy. New Atlas. Retrieved Oct. 27, 2022, from https://newatlas.com/medical/ai-ugly-duckling-melanoma-skin-cancer/, each of which is incorporated herein by reference in its entirety.

Alternatively or additionally, the plurality of learning techniques includes unsupervised learning techniques. Unsupervised learning techniques include, but are not limited to, K-means, mean shift, affinity propagation, hierarchical clustering, density-based spatial clustering of applications with noise (DBSCAN), Gaussian mixture modeling, Markov random fields, iterative self-organizing data (ISO-DATA), and fuzzy C-means systems. In one embodiment, the plurality of learning techniques includes reinforcement learning techniques (e.g., Maja, Teaching-Box) The system is operable to use any of the aforementioned learning techniques alone or in combination.

Further, the system is operable to utilize predictive analytics techniques including, but not limited to, machine learning (ML), artificial intelligence (AI), neural networks (NNs) (e.g., long short term memory (LSTM) neural networks), deep learning, historical data, and/or data mining to make future predictions and/or models. The system is preferably operable to recommend and/or perform actions based on historical data, external data sources, ML, AI, NNs, and/or other learning techniques. The system is operable to utilize predictive modeling and/or optimization algorithms including, but not limited to, heuristic algorithms, particle swarm optimization, genetic algorithms, technical analysis descriptors, combinatorial algorithms, quantum optimization algorithms, iterative methods, deep learning techniques, and/or feature selection techniques. In one embodiment, the predictive modeling and/or optimization algorithms include extraction of features from an image including, but not limited to, at least one intensity, at least one edge, at least one texture, at least one segment, at least one color, at least one luminance, and/or at least one wavelength from an image. See, e.g., Erickson, Bradley J et al. "Machine Learning for Medical Imaging." Radiographics: a review publication of the Radiological Society of North America, Inc vol. 37, 2 (2017): 505-515. doi: 10.1148/rg.2017160130, which is incorporated herein by reference in its entirety.

In one embodiment, the system is used in digital dermoscopy and/or imaging, viewing, and/or diagnosing skin conditions. The viewing device is preferably operable to display images of tissue, live tissue manipulation (e.g., in real time or near-real time), and/or images of various tissue types within or on the body with increased color accuracy. In particular, the ability to identify and detect tissue color variations and changes is important for diagnostic imaging related to the skin and other organs (e.g., brain, lungs, etc.). A person's skin tone may vary slightly due to a number of factors, but the two main influences are health and emotion. The human visual system has been optimized to detect small changes in skin reflectivity due to blood flow and oxygenation. The M (green) and L (red) cones are operable to detect these changes. There is a long-standing, unmet need for an extended gamut providing more accurate flesh tones. In a preferred embodiment, the viewing device is a multi-primary (e.g., RGBCMY) viewing device. In a preferred embodiment, the viewing device includes a cyan primary. In another preferred embodiment, the viewing device includes a yellow primary. In one embodiment, the viewing device has a red primary with a longer wavelength than 615 nm. Flesh tones often appear yellowish or reddish after color correction. Additionally, skin often appears shiny after color correction. Advantageously, increasing a cyan component and/or a magenta component improves the color accuracy of the flesh tones and reduces the shiny appearance of skin.

In one embodiment, the present invention is used to ensure color fidelity of the imaging and/or the diagnostics. In one embodiment, the system includes at least one chip chart with a plurality of colors and/or at least one reference to calibrate the system. For example, a digital pathology scanner often incorporates at least one sensor, at least one light source, at least one lens, and at least one processor. In one embodiment, the digital pathology scanner is calibrated using at least one reference slide with a plurality of known colors. In one embodiment, the at least one reference slide mimics at least one stained tissue sample and/or at least one fluorescent marker. An example of a reference slide is disclosed in U.S. Pat. No. 10,241,310, which is incorporated herein by reference in its entirety. In a preferred embodiment, the digital pathology scanner is operable to scan the at least one reference slide and/or at least one sample as Yxy data and/or XYZ data. Alternatively, the digital pathology scanner is calibrated using at least one color patch. In one embodiment, spectral transmittance of each of the at least one color patch is measured (e.g., using a spectroradiometer). Advantageously, scanning as Yxy data and/or XYZ data provides a larger gamut than RGB data. Color fidelity in scanning is very important, both for individual diagnostics and in conducting research studies across multiple sites. Additional information regarding colorimetry is included in ISO CIE 11664-6:2014 and ISO CIE 15076-1:2010, each of which is incorporated herein by reference in its entirety.

In one embodiment, the present invention is used to ensure standardization of images captured for telemedicine regardless of the light source used in the image. In one embodiment, the system includes at least one tele-med-chart with a plurality of colors and/or at least one reference to normalize and equalize various light sources and calibrate the at least one imager. The system is operable to digitally evaluate an image of the tele-med-chart that was captured by the at least one imager to characterize the overall light field within the image. The system is operable to use data from the captured image of the tele-med-chart along with data of the at least one imager to digitally standardize a captured image for the purpose of telemedicine. Advantageously, this eliminates any ambiguity of what light source was used when assessing an image for telemedicine purposes. In one embodiment, the tele-med-chart includes at least one UV fluorescent dye that emits in the visible spectrum. In another embodiment, the tele-med-chart is transparent such that different transparent dyes are selected to attenuate different wavelengths. Advantageously, a transparent tele-med-chart is operable to have a clear segment with no dye such that the clear segment is used as a reference.

In one embodiment, the at least one viewing device has a built-in calibrator to calibrate the individual primary channels of the at least one viewing device over time. The system is operable to calibrate the channels of the viewing device as the relative intensities of the individual primary channels drift over time. For example, the system is operable to adjust the relative individual primary channel intensity ratios to a desired standard point. Advantageously, this improves the stability of the primaries of the viewing device over time.

General Research Applications

In one embodiment, the present invention includes image data for scientific research. In one embodiment, the system is operable to create a visualization from the image data, wherein the visualization includes a plurality of visually distinct colors.

In one embodiment, the present invention provides true color. Alternatively or additionally, the present invention provides false color (e.g., pseudo color, density slicing, choropleth). In one embodiment, the system is operable to use a greater bit depth (e.g., larger than 8 bits) coupled with additional color primaries to provide pseudo color from a single band of data or single filter source. Advantageously, the use of greater bit depth and additional color primaries enables the system to provide pseudo color in an RGB false color application.

In one embodiment, the system incorporates at least one imager (e.g., camera), at least one sensor, at least one lens, at least one processor, at least one memory, at least one computing device, at least one database, at least one learning algorithm (e.g., deep neural network), and/or at least one viewing device. In one embodiment, the at least one learning algorithm is for image processing and comparison. In one embodiment, the system is operable to access data captured and/or produced by the at least one sensor, process the data, and incorporate the data as metadata of the image data. As a non-limiting example, the at least one sensor is a motion sensor, an acceleration sensor, an electromagnetic sensor, a location sensor, a sound sensor, a temperature sensor, a humidity sensor, an object sensor, an air pressure sensor, a precipitation sensor, an anemometer, a light sensor, an air quality sensor, a chemical sensor, an ammeter, a voltmeter, a power meter, a magnetic field sensor, an orientation sensor, and/or an acceleration sensor. In one embodiment, one of the at least one sensor is an image sensor.

In one embodiment, the system includes at least one lighting source. In one embodiment, the at least one lighting source is a white light. In another embodiment, the at least one lighting source is a variable frequency lighting source including, but not limited to, visible light, infrared light, and/or ultraviolet light. In one embodiment, the at least one lighting source is optimized for high-speed videography. In one embodiment, the at least one lighting source is optimized for microscopy.

In one embodiment, the system includes at least one imager for acquiring image data. The at least one imager preferably includes at least one lens and at least one image sensor (e.g., a camera, a video camera, a camcorder, a slow-motion camera, and/or a high-speed camera). The at least one lens directs light towards the at least one image sensor. The at least one lens includes, but is not limited to, at least one convex lens and/or at least one concave lens. In one embodiment, the at least one image sensor is a wide gamut image sensor, e.g., a wide gamut camera. In one embodiment, the at least one image sensor is a single-pixel image sensor. In one embodiment, the at least one image sensor does not include a detector array. In one embodiment, the at least one image sensor is a plurality of image sensors. In one embodiment, the at least one imager includes an array sensor such that the at least one imager is operable to provide multi-spectral capture and/or operate as a light field sensor.

In one embodiment, the at least one imager includes a plurality of lenses for a plurality of image sensors. In one embodiment, the plurality of lenses creates different focal lengths for each of the plurality of image sensors. In one embodiment, the at least one imager is operable to change the focal lengths, e.g., by zooming. Alternatively, the system is operable to interpolate signals from the plurality of image sensors with different focal lengths to create hybrid sensor data. The system is operable to combine sensor data from each of the plurality of image sensors into a single set of image data. In one embodiment, the system includes a stabilizer, e.g., a gyroscope system. The at least one imager is preferably located on the stabilizer and the stabilizer moves the at least one imager to counteract movements that would result in blurry images. In one embodiment, the plurality of lenses is made from meta-materials such that the meta-materials enable a negative index of refraction. Advantageously, this optimizes focal length while minimizing physical length.

In one embodiment, the at least one imager includes at least one optical filter. In one embodiment, the at least one optical filter is overlaid atop of the at least one image sensor. In one embodiment, the at least one filter is an absorptive filter. Alternatively, the at least one filter is an interference filter or a dichroic filter. In one embodiment, the at least one filter has at least one cut-off wavelength and passes or blocks light based on the at least one cut-off wavelength (e.g., a long-pass filter, a short-pass filter, a bandpass filter, a multi-bandpass filter, a notch filter). In an alternative embodiment, the at least one filter modifies the intensity of all wavelengths equally, e.g., a neutral density filter. In one embodiment, the at least one filter is a filter array, e.g., a Bayer filter. Bayer filter arrays compatible with the present invention include, but are not limited to, RGB, CYGM, RGBE (red, green, blue, emerald), and/or CMY. The Bayer filter is operable to be modified. As a non-limiting example, the Bayer filter includes a magenta filter. Alternatively, the size of the elements in the Bayer filter are differentially adjusted to increase sensitivity of the at least one image sensor. In yet another alternative embodiment, one or more of the at least one filter is operable to be rotated, which advantageously enables the system to use different filters for different exposures. In one embodiment, the at least one filter includes a plurality of filter layers. In one embodiment, the at least one filter includes a plurality of filters. In one embodiment, the plurality of filters are arranged in a radial pattern. In one embodiment, the plurality of filters form a spinning filter wheel.

In one embodiment, an acquisition color gamut is identical to a display color gamut. In one embodiment, both the acquisition color gamut and the display color gamut are expanded color gamuts and/or include at least four primaries, e.g., 6P-B, 6P-C. Alternatively, the display color gamut (e.g., RGBCMY) has a larger volume than the acquisition color gamut (e.g., RGB). In yet another alternative embodiment, the display color gamut (e.g., RGB) has a smaller volume than the acquisition color gamut (e.g., RGBCMY, RGBCEY (i.e., two greens-green (G) and emerald (E))). The system is preferably operable to convert image data from the acquisition color gamut to the display color gamut.

In one embodiment, the system is operable to acquire raw image data as a raw image file. A raw image file is considered unprocessed and thus cannot be edited or printed. Raw image files include image data as well as metadata and a header. The metadata includes, but is not limited to, image acquisition parameters (e.g., image dimensions, pixel size), image sensor parameters, imager parameters, timecodes, imager ISO, aperture measurements (e.g., f-stop, aperture size), exposure data, color space parameters, lens data (e.g., focal length and lens type), filter data, file format, compression data, frame rate data, flash data, light source, location data, and/or frame data.

Raw image formats include, but are not limited to, Digital Negative Raw (DNG), ISO 12234-2 (TIFF/EP), Nikon NEF, Canon Raw v2 (CR2), CR3, Sony S-Log, ARRI Log, Panasonic V-Log, and/or Redcode Raw (R3D) files. In one embodiment, the system is operable to store the raw image file before processing. The system is then operable to render the raw image data into rendered image data, wherein the rendered image data is operable to be viewed and/or edited. Rendering includes, but is not limited to, decoding, demosaicing (e.g., removing the effects of a Bayer filter), pixel removal (e.g., of defective pixels), interpolation (e.g., to replace removed pixels), white balancing, noise reduction, color translation, tone reproduction, optical correction, contrast manipulation, resizing, splitting, and/or compression. Alternatively, the system does not compress the raw image data. In one embodiment, the system is operable to render the image data as a pipeline process, wherein each step is performed in succession. The order of the steps is operable to be changed. Alternatively, the system is operable to render the image data in parallel steps. In yet another alternative embodiment, the system is operable to render the image data by solving a single optimization problem. The system is operable to save image prior data and/or image variation data and use the image prior data and/or the image variation data in rendering, processing, and/or displaying the image data.

In one embodiment, rendering includes converting the raw image data into a color space, e.g., CIE 1931, ITU-R BT.2020. In a preferred embodiment, the system is operable to render the image data in a three-coordinate format wherein a first coordinate and a second coordinate are both colorimetric (chroma) and wherein a third coordinate is a luminance or a luma value. As a non-limiting example, the three-coordinate format is Yxy, wherein x and y are orthogonal colorimetric coordinates and wherein Y is a luminance coordinate. The system is also operable to apply a transformation (e.g., a gamma compression) to the luminance coordinate to create a luma coordinate (e.g., Y'). Relative luminance values are also compatible. Alternative three-coordinate formats include, but are not limited to, L*a*b*, ICtCp, YCbCr, YUV, Yu'v', YPbPr, and/or YIQ. Alternatively, the system is operable to render the image data as XYZ data. In one embodiment, the system includes a user interface for accepting user input. In one embodiment, the user input determines how the raw image data is rendered. In one embodiment, the system is operable to apply an opto-electronic transfer function (OETF) and an electro-optical transfer function (EOTF) to the image data. Alternatively, the system is operable to apply at least one non-linear function (e.g., an OOTF) to the image data. In one embodiment, the system includes at least one look-up table (LUT). The LUT is operable to be implemented in hardware (e.g., in an FPGA) and/or in software.

In one embodiment, the system is operable to remap colors to include a just noticeable difference for display on a viewing device. For example, a first color and a second color are not perceptually different to a viewer, so the second color is remapped to a modified second color, which advantageously allows the viewer to perceive the differences between the first color and the modified second color. Further, the system retains the original information, which allows the system to perform a plurality of learning techniques and/or a plurality of predictive analytics techniques using unmodified data. The system is also operable to retain information regarding the remapping. In one embodiment, the retained information is stored in the metadata.

In one embodiment, the at least one imager acquires data as Yxy data, XYZ data, RGB data, and/or multi-primary data (e.g., RGBC, RGBCY, RGBCMY, RGBEYC). Additionally or alternatively, the at least one imager is operable to acquire data including, but not limited to, hyperspectral data, ultraviolet (UV) data, and/or infrared (IR) data.

In one embodiment, the present invention is used to process hyperspectral data, UV data, and/or IR data that is outside of the visible spectrum. In one embodiment, the system extends colorimetric visible data with data that is outside of the visible spectrum. For example, the system creates two different three-coordinate format elements for each data point acquired from the at least one imager such that one of the elements is related to Yxy (e.g., Y'xy) and the other is related to WUI (e.g., W'UI), wherein W (or W') is a function similar to Y (or Y') but encompasses more of the UV and IR wavelengths, wherein U is the UV channel, and I is the IR channel, and W (or W') is proportional to the intensity of U and I. The system is operable to calculate a projection using the WUI values such that the projection plane is wui. The system is operable to assess the relevance of a spectral captured channel and its propensity to change rapidly. The system is operable to assign captured elements to a specific primary. Alternatively, the system is operable to assign captured elements to a mathematical combination of captured elements, for example, UV*Red and IR*Cyan. Although the system is described with respect to non-linear forms including Y'xy and W'UI, the system is not limited to these forms. In one embodiment, a non-linear function is applied to xy and/or UI. In one embodiment, xy and/or UI are scaled.

In a preferred embodiment, the present invention incorporates a luminance (e.g., Y) and two independent colorimetric coordinates (e.g., x and y, u' and v'). Advantageously, this allows for separate processing of luminance and the two independent colorimetric coordinates. In one embodiment, a non-linear function, an algorithm, and/or a LUT is operable to be placed only on the luminance. In another embodiment, the non-linear function, the algorithm, and/or the LUT is operable to be placed on the luminance and the two independent colorimetric coordinates. In one embodiment, the system is operable to include at least two luminance levels (e.g., standard and increased luminance). Advantageously, increasing the luminance temporarily may improve visualization of images while minimizing impact to the longevity of the display. In addition, the system is operable to leverage Yxy and/or Yu'v' to plot the two independent colorimetric coordinates x and y outside the boundaries of the CIE-1931 color space. Advantageously, this enables the system to render Ultraviolet Visible Near Infrared Spectrophotometry (UV-Vis-NIR) raw data into rendered image data.

As previously described, the system further includes at least one viewing device. In one embodiment, the at least one viewing device is a multi-primary display (e.g., RGBC, RGBCY, RGBCMY). Advantageously, adding a cyan primary allows for greater range of colors and allows for better visualization of green-cyan pseudocolor. Additionally, a multi-primary display is operable to provide additional colors that are not available on an RGB device. For example, and not limitation, an RGB 12-bit display is operable to display $(2^{12})^3=68.7$ trillion colors, while a 12-bit display having four primaries (e.g., RGBC) is operable to display $(2^{12})^4=281.5$ trillion colors.

In one embodiment, the at least one viewing device is operable to display colors outside of an ITU-R BT.2020 color gamut. In one embodiment, the at least one viewing device is operable to display at least 80% of a total area covered by the CIE-1931 color space. In one embodiment, the at least one viewing device is as described in U.S. Pat. No. 11,030,934, filed Oct. 1, 2020 and issued Jun. 8, 2021, which is incorporated herein by reference in its entirety. In one embodiment, the at least one viewing device is a screen, e.g., a liquid crystal display (LCD) screen, a light-emitting diode (LED) screen, an LED-backlit screen, an organic LED (OLED) screen, an active matrix OLED (AMOLED) screen, a quantum dot (QD) display, a perovskite display, a stereoscopic display (e.g., head-mounted and/or autostereoscopic), a virtual reality (VR) display, and/or an augmented reality display. In an alternative embodiment, the at least one viewing device includes at least one projector. The at least one viewing device is operable to display the image data after it has been acquired, rendered, and/or processed by the system. In another embodiment, the at least one viewing device includes a plurality of display devices (e.g., screens, projectors).

In one embodiment, the at least one viewing device is operable to modify display parameters of the image data, including, but not limited to, a gamut, a frame rate, a sampling rate, an aspect ratio, a data format, metadata, a tone curve (e.g., perceptual quantizer (PQ), hybrid log-gamma (HLG), and gamma), and/or SDP parameters.

In one embodiment, the system incorporates a plurality of learning techniques in the imaging. In one embodiment, the system incorporates a plurality of learning techniques in the image processing and/or image analysis. In a preferred embodiment, the plurality of learning technique utilizes a training set to train the system (e.g., during a learning period). The plurality of learning techniques includes, but is not limited to, machine learning (ML), artificial intelligence (AI), deep learning (DL), neural networks (NNs), artificial neural networks (ANNs), support vector machines (SVMs), Markov decision process (MDP), decision trees, linear regression, logistic regression, naive Bayes, k-nearest neighbor, random forest, Adaptive Boosting (i.e., AdaBoost), and/or natural language processing (NLP). In one embodiment, the plurality of learning techniques is operable to extract features from an image including, but not limited to, at least one intensity, at least one edge, at least one texture, at least one segment, at least one color, at least one luminance, at least one color/tone gradient, at least one histogram/heat diagram, and/or at least one wavelength from an image. In one embodiment, the system is operable to generate a visualization from an image or set of images using the plurality of learning techniques. In one embodiment, the visualization comprises a color/tone gradient. In one embodiment, the visualization comprises a color palette, wherein colors of the color palette represent a plurality of categories. In one embodiment, the ANNs include, but are not limited to, a multilayer perceptron (MLP). Alternatively or additionally, the ANNs include a single-layer perceptron (SLP). In one embodiment, the learning system includes a feed-forward network trained by a backpropagation algorithm. In one embodiment, the plurality of learning techniques includes supervised learning techniques.

Alternatively or additionally, the plurality of learning techniques includes unsupervised learning techniques. Unsupervised learning techniques include, but are not limited to, K-means, mean shift, affinity propagation, hierarchical clustering, density-based spatial clustering of applications with noise (DBSCAN), Gaussian mixture modeling, Markov random fields, iterative self-organizing data (ISODATA), and fuzzy C-means systems. In one embodiment, the plurality of learning techniques includes reinforcement learning techniques (e.g., Maja, Teaching-Box) The system is operable to use any of the aforementioned learning techniques alone or in combination.

Further, the system is operable to utilize predictive analytics techniques including, but not limited to, machine learning (ML), artificial intelligence (AI), neural networks (NNs) (e.g., long short term memory (LSTM) neural networks), deep learning, historical data, and/or data mining to make future predictions and/or models. The system is preferably operable to recommend and/or perform actions based on historical data, external data sources, ML, AI, NNS, and/or other learning techniques. The system is operable to utilize predictive modeling and/or optimization algorithms including, but not limited to, heuristic algorithms, particle swarm optimization, genetic algorithms, technical analysis descriptors, combinatorial algorithms, quantum optimization algorithms, iterative methods, deep learning techniques, and/or feature selection techniques. In one embodiment, the predictive modeling and/or optimization algorithms include extraction of features from an image including, but not limited to, at least one intensity, at least one edge, at least one texture, at least one segment, at least one color, at least one luminance, and/or at least one wavelength from an image.

Figure 81:
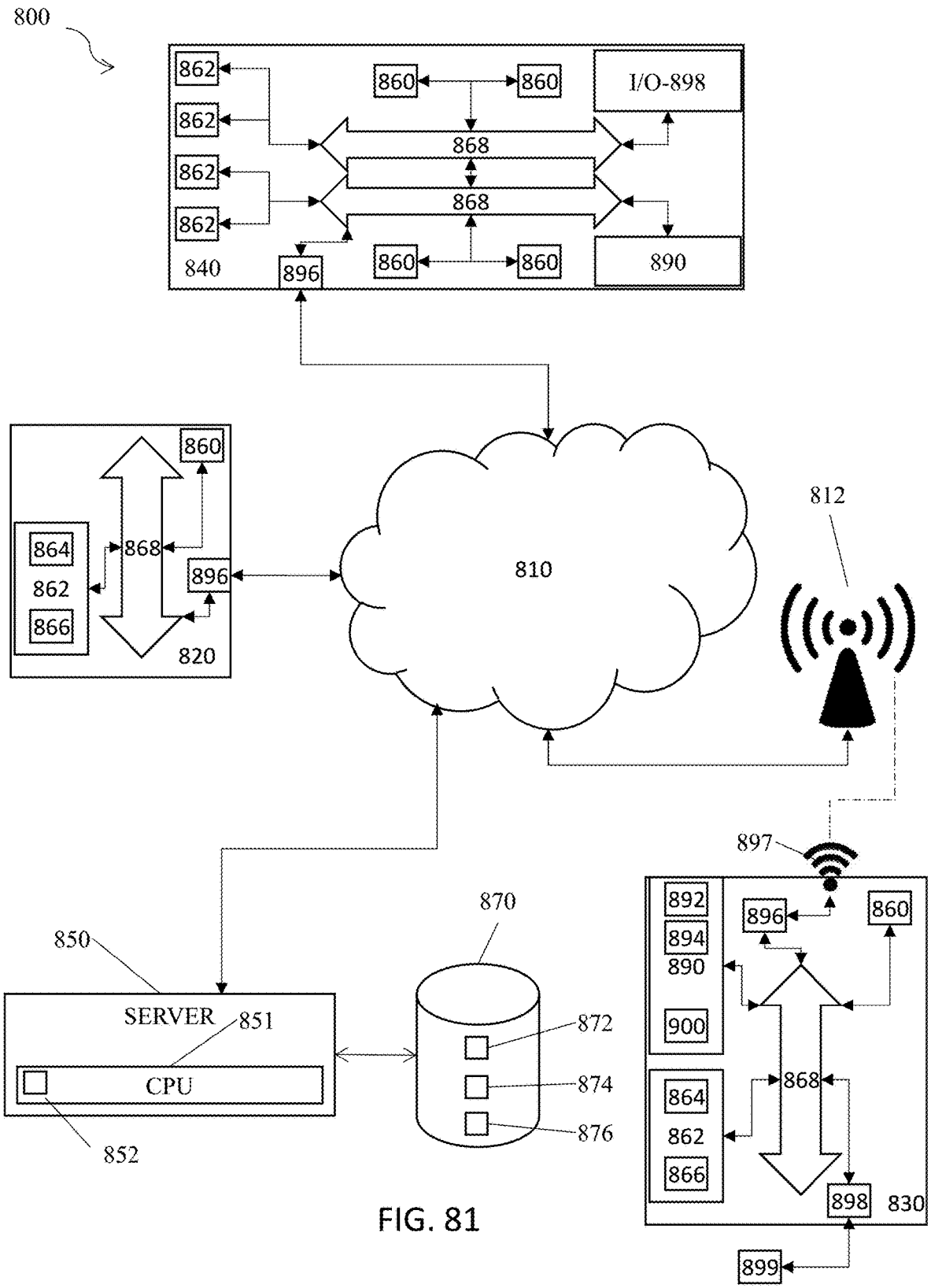
FIG. 81 is a schematic diagram of an embodiment of the invention illustrating a computer system.

FIG. 81 is a schematic diagram of an embodiment of the invention illustrating a computer system, generally described as 800, having a network 810, a plurality of computing devices 820, 830, 840, a server 850, and a database 870.

The server 850 is constructed, configured, and coupled to enable communication over a network 810 with a plurality of computing devices 820, 830, 840. The server 850 includes a processing unit 851 with an operating system 852. The operating system 852 enables the server 850 to communicate through network 810 with the remote, distributed user devices. Database 870 may house an operating system 872, memory 874, and programs 876.

In one embodiment of the invention, the system 800 includes a network 810 for distributed communication via a wireless communication antenna 812 and processing by at least one mobile communication computing device 830. Alternatively, wireless and wired communication and connectivity between devices and components described herein include wireless network communication such as WI-FI, WORLDWIDE INTEROPERABILITY FOR MICROWAVE ACCESS (WIMAX), Radio Frequency (RF) communication including RF identification (RFID), NEAR FIELD COMMUNICATION (NFC), BLUETOOTH including BLUETOOTH LOW ENERGY (BLE), ZIGBEE, Infrared (IR) communication, cellular communication, satellite communication, Universal Serial Bus (USB), Ethernet communications, communication via fiber-optic cables, coaxial cables, twisted pair cables, and/or any other type of wireless or wired communication. In another embodiment of the invention, the system 800 is a virtualized computing system capable of executing any or all aspects of software and/or application components presented herein on the computing devices 820, 830, 840. In certain aspects, the computer system 800 may be implemented using hardware or a combination of software and hardware, either in a dedicated computing device, or integrated into another entity, or distributed across multiple entities or computing devices.

By way of example, and not limitation, the computing devices 820, 830, 840 are intended to represent various forms of electronic devices including at least a processor and a memory, such as a server, blade server, mainframe, mobile phone, personal digital assistant (PDA), smartphone, desktop computer, notebook computer, tablet computer, workstation, laptop, and other similar computing devices. The components shown here, their connections and relationships, and their functions, are meant to be exemplary only, and are not meant to limit implementations of the invention described and/or claimed in the present application.

In one embodiment, the computing device 820 includes components such as a processor 860, a system memory 862 having a random access memory (RAM) 864 and a read-only memory (ROM) 866, and a system bus 868 that couples the memory 862 to the processor 860. In another embodiment, the computing device 830 may additionally include components such as a storage device 890 for storing the operating system 892 and one or more application programs 894, a network interface unit 896, and/or an input/output controller 898. Each of the components may be coupled to each other through at least one bus 868. The input/output controller 898 may receive and process input from, or provide output to, a number of other devices 899, including, but not limited to, alphanumeric input devices, mice, electronic styluses, display units, touch screens, gaming controllers, joy sticks, touch pads, signal generation devices (e.g., speakers), augmented reality/virtual reality (AR/VR) devices (e.g., AR/VR headsets), or printers. By way of example, and not limitation, the processor 860 may be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated or transistor logic, discrete hardware components, or any other suitable entity or combinations thereof that can perform calculations, process instructions for execution, and/or other manipulations of information.

In another implementation, shown as 840 in FIG. 81 multiple processors 860 and/or multiple buses 868 may be used, as appropriate, along with multiple memories 862 of multiple types (e.g., a combination of a DSP and a microprocessor, a plurality of microprocessors, one or more microprocessors in conjunction with a DSP core).

Also, multiple computing devices may be connected, with each device providing portions of the necessary operations (e.g., a server bank, a group of blade servers, or a multi-processor system). Alternatively, some steps or methods may be performed by circuitry that is specific to a given function.

According to various embodiments, the computer system 800 may operate in a networked environment using logical connections to local and/or remote computing devices 820, 830, 840 through a network 810. A computing device 830 may connect to a network 810 through a network interface unit 896 connected to a bus 868. Computing devices may communicate communication media through wired networks, direct-wired connections or wirelessly, such as acoustic, RF, or infrared, through an antenna 897 in communication with the network antenna 812 and the network interface unit 896, which may include digital signal processing circuitry when necessary. The network interface unit 896 may provide for communications under various modes or protocols.

In one or more exemplary aspects, the instructions may be implemented in hardware, software, firmware, or any combinations thereof. A computer readable medium may provide volatile or non-volatile storage for one or more sets of instructions, such as operating systems, data structures, program modules, applications, or other data embodying any one or more of the methodologies or functions described herein. The computer readable medium may include the memory 862, the processor 860, and/or the storage media 890 and may be a single medium or multiple media (e.g., a centralized or distributed computer system) that store the one or more sets of instructions 900. Non-transitory computer readable media includes all computer readable media, with the sole exception being a transitory, propagating signal per se. The instructions 900 may further be transmitted or received over the network 810 via the network interface unit 896 as communication media, which may include a modulated data signal such as a carrier wave or other transport mechanism and includes any deliver media. The term "modulated data signal" means a signal that has one or more of its characteristics changed or set in a manner as to encode information in the signal.

Storage devices 890 and memory 862 include, but are not limited to, volatile and non-volatile media such as cache, RAM, ROM, EPROM, EEPROM, FLASH memory, or other solid state memory technology, discs (e.g., digital versatile discs (DVD), HD-DVD, BLU-RAY, compact disc (CD), or CD-ROM) or other optical storage; magnetic cassettes, magnetic tape, magnetic disk storage, floppy disks, or other magnetic storage devices; or any other medium that can be used to store the computer readable instructions and which can be accessed by the computer system 800.

In one embodiment, the computer system 800 is within a cloud-based network. In one embodiment, the server 850 is a designated physical server for distributed computing devices 820, 830, and 840. In one embodiment, the server 850 is a cloud-based server platform. In one embodiment, the cloud-based server platform hosts serverless functions for distributed computing devices 820, 830, and 840.

In another embodiment, the computer system 800 is within an edge computing network. The server 850 is an edge server, and the database 870 is an edge database. The edge server 850 and the edge database 870 are part of an edge computing platform. In one embodiment, the edge server 850 and the edge database 870 are designated to distributed computing devices 820, 830, and 840. In one embodiment, the edge server 850 and the edge database 870 are not designated for computing devices 820, 830, and 840. The distributed computing devices 820, 830, and 840 are connected to an edge server in the edge computing network based on proximity, availability, latency, bandwidth, and/or other factors.

It is also contemplated that the computer system 800 may not include all of the components shown in FIG. 81 may include other components that are not explicitly shown in FIG. 81 or may utilize an architecture completely different than that shown in FIG. 81. The various illustrative logical blocks, modules, elements, circuits, and algorithms described in connection with the embodiments discussed herein may be implemented as electronic hardware, computer software, or combinations of both. To clearly illustrate the interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application (e.g., arranged in a different order or positioned in a different way), but such implementation decisions should not be interpreted as causing a departure from the scope of the present invention.

The above-mentioned examples are provided to serve the purpose of clarifying the aspects of the invention, and it will be apparent to one skilled in the art that they do not serve to limit the scope of the invention. By nature, this invention is highly adjustable, customizable and adaptable. The above-mentioned examples are just some of the many configurations that the mentioned components can take on. All modifications and improvements have been deleted herein for the sake of conciseness and readability but are properly within the scope of the present invention.

The invention claimed is:

1. A system for displaying a primary color system, comprising:
    a set of image data including a set of primary color signals, wherein the set of primary color signals corresponds to a set of values in an International Commission on Illumination (CIE) Yxy color space, wherein the set of values in the CIE Yxy color space includes a luminance (Y) and two colorimetric coordinates (x,y);
    an image data converter, wherein the image data converter includes a digital interface, and wherein the digital interface is operable to encode and decode the set of values in the CIE Yxy color space; and
    at least one viewing device;
    wherein the set of image data further includes hyperspectral data, ultraviolet (UV) data, and/or infrared (IR) data;
    wherein the image data converter is operable to create two different three-coordinate format elements, wherein the first three-coordinate format element is Yxy and the second three-coordinate format element includes a first coordinate related to the UV data, a second coordinate related to the IR data, and a third coordinate proportional to an intensity of the UV data and the IR data;
    wherein processed Yxy data is transported between the encode and the decode;
    wherein the image data converter is operable to convert the set of image data for display on the at least one viewing device;
    wherein a learning algorithm is operable to output a visualization from the set of image data, wherein the visualization comprises a plurality of visually distinct colors; and
    wherein the at least one viewing device is operable to display the visualization.

2. The system of claim 1, wherein the image data converter is operable to convert the set of values in the CIE Yxy color space to a plurality of color gamuts.

3. The system of claim 1, wherein the learning algorithm is operable to extract a feature from the set of image data, and wherein the feature is at least one intensity, at least one edge, at least one texture, at least one segment, at least one color, at least one luminance, at least one color gradient, at least one tone gradient, at least one histogram diagram, at least one heat diagram, and/or at least one wavelength.

4. The system of claim 1, wherein the image data converter includes a look-up table.

5. The system of claim 1, wherein the set of image data includes colors outside of an International Telecommunication Union Recommendation (ITU-R) BT.2020 color gamut.

6. The system of claim 1, wherein the image data converter is operable to fully sample the processed Yxy data on a first channel and subsample the processed Yxy data on a second channel and a third channel.

7. The system of claim 1, wherein the processed Yxy data on a first channel, a second channel, and a third channel are fully sampled.

8. The system of claim 1, wherein the encode includes scaling of the two colorimetric coordinates (x,y), thereby creating a first scaled colorimetric coordinate and a second scaled colorimetric coordinate and/or the decode includes rescaling of data related to the first scaled colorimetric coordinate and data related to the second scaled colorimetric coordinate.

9. The system of claim 1, wherein the encode includes converting the set of primary color signals to XYZ data and then converting the XYZ data to create the set of values in the CIE Yxy color space and/or the decode includes converting the processed Yxy data to XYZ data and then converting the XYZ data to a format operable to display on the at least one viewing device.

10. The system of claim 1, further including at least one non-linear function.

11. The system of claim 1, further including at least one imager, wherein one or more of the at least one imager is operable to provide the set of image data.

12. The system of claim 1, wherein the system is compatible with Digital Imaging Communication in Medicine standards for metadata.

13. The system of claim 1, wherein the at least one viewing device is operable to modify display parameters of the set of image data.

14. The system of claim 1, further comprising at least one chip chart or at least one tele-med-chart with a plurality of colors and/or at least one reference to calibrate the system.

15. A system for displaying a primary color system, comprising:
- a set of image data including a set of primary color signals, wherein the set of primary color signals corresponds to a set of values in an International Commission on Illumination (CIE) Yxy color space, wherein the set of values in the CIE Yxy color space includes a luminance (Y) and two colorimetric coordinates (x,y);
- at least one imager;
- at least one processor coupled to at least one memory;
- a learning algorithm; and
- an image data converter, wherein the image data converter includes a digital interface, and wherein the digital interface is operable to encode and decode the set of values in the CIE Yxy color space;
- wherein the set of image data further includes hyperspectral data, ultraviolet (UV) data, and/or infrared (IR) data;
- wherein the image data converter is operable to create two different three-coordinate format elements, wherein the first three-coordinate format element is Yxy and the second three-coordinate format element includes a first coordinate related to the UV data, a second coordinate related to the IR data, and a third coordinate proportional to an intensity of the UV data and the IR data;
- wherein processed Yxy data is transported between the encode and the decode;
- wherein the set of image data is operable to be converted for display;
- wherein the learning algorithm is operable to output a visualization from the set of image data, wherein the visualization comprises a plurality of visually distinct colors; and
- wherein the visualization is operable to be displayed.

16. A system for displaying a primary color system, comprising:
- a set of image data including a set of primary color signals, wherein the set of primary color signals corresponds to a set of values in an International Commission on Illumination (CIE) Yxy color space, wherein the set of values in the CIE Yxy color space includes a luminance (Y) and two colorimetric coordinates (x,y);
- at least one imager, wherein one or more of the at least one imager is operable to provide the set of image data;
- at least one display device;
- wherein the imager and the at least one display device are in communication;
- wherein the set of image data further includes hyperspectral data, ultraviolet (UV) data, and/or infrared (IR) data;
- wherein the image data converter is operable to create two different three-coordinate format elements, wherein the first three-coordinate format element is Yxy and the second three-coordinate format element includes a first coordinate related to the UV data, a second coordinate related to the IR data, and a third coordinate proportional to an intensity of the UV data and the IR data;
- wherein processed Yxy data is transported between an encode and a decode;
- wherein the set of image data is operable to be converted for display;
- wherein an artificial intelligence model is operable to output a visualization from the set of image data, wherein the visualization comprises a plurality of visually distinct colors; and
- wherein the at least one display device is operable to display the visualization.

17. The system of claim 16, wherein the at least one display device includes at least four primaries.

18. The system of claim 16, wherein the at least one display device is operable to display colors outside of an International Telecommunication Union Recommendation (ITU-R) BT.2020 color gamut.

19. The system of claim 16, wherein the one or more of the at least one imager is incorporated into at least one medical device.

* * * * *